United States Patent
Sobieraj et al.

(10) Patent No.: US 12,435,444 B2
(45) Date of Patent: Oct. 7, 2025

(54) RABBIT-DERIVED ANTIGEN BINDING PROTEIN NUCLEIC ACID LIBRARIES AND METHODS OF MAKING THE SAME

(71) Applicant: CDR-LIFE AG, Schlieren (CH)

(72) Inventors: Anna Maria Sobieraj, Zürich (CH); Severin Oliver Wendelspiess, Zürich (CH); Fabian Bert Scheifele, Mägenwil (CH)

(73) Assignee: CDR-LIFE AG, Horgen (CH)

( * ) Notice: Subject to any disclaimer, the term of this patent is extended or adjusted under 35 U.S.C. 154(b) by 507 days.

(21) Appl. No.: 17/690,089

(22) Filed: Mar. 9, 2022

(65) Prior Publication Data

US 2022/0340894 A1    Oct. 27, 2022

Related U.S. Application Data

(60) Provisional application No. 63/292,095, filed on Dec. 21, 2021, provisional application No. 63/172,863, filed on Apr. 9, 2021, provisional application No. 63/158,689, filed on Mar. 9, 2021.

(51) Int. Cl.
  *C40B 30/04*  (2006.01)
  *C12N 15/10*  (2006.01)

(52) U.S. Cl.
  CPC .......... *C40B 30/04* (2013.01); *C12N 15/1086* (2013.01); *C07K 2317/31* (2013.01); *C07K 2317/55* (2013.01); *C07K 2317/565* (2013.01)

(58) Field of Classification Search
  None
  See application file for complete search history.

(56) References Cited

U.S. PATENT DOCUMENTS

| | | |
|---|---|---|
| 6,710,172 B1 | 3/2004 | Chaux et al. |
| 7,199,231 B1 | 4/2007 | Guagler et al. |
| 7,311,914 B2 | 12/2007 | Zhang et al. |
| 8,003,770 B2 | 8/2011 | Shiku et al. |
| 9,802,997 B2 | 10/2017 | Mahr et al. |
| 10,738,132 B2 | 8/2020 | Desjarlais et al. |
| 10,859,566 B2 | 12/2020 | Flechtner et al. |
| 11,098,115 B2 | 8/2021 | Willemsen et al. |
| 11,286,289 B2 | 3/2022 | Tribble et al. |
| 11,497,768 B2 | 11/2022 | Shiku et al. |
| 11,505,590 B2 | 11/2022 | Hayes et al. |
| 11,912,771 B2 | 2/2024 | Sobieraj et al. |
| 2005/0033031 A1 | 2/2005 | Couto |

(Continued)

FOREIGN PATENT DOCUMENTS

| | | |
|---|---|---|
| CN | 108866098 A | 11/2018 |
| CN | 110333352 A | 10/2019 |

(Continued)

OTHER PUBLICATIONS

Al-Lazikani et al., "Standard conformations for the canonical structures of immunoglobulins", JMB, 1997, 273(4): 927-948.

(Continued)

*Primary Examiner* — Christian C Boesen
(74) *Attorney, Agent, or Firm* — LATHROP GPM LLP; James H. Velema, Esq.; Michael J. Spellberg, Esq.

(57) ABSTRACT

Rabbit antigen binding protein nucleic acid libraries are provided (e.g., nucleic acid libraries encoding antigen binding proteins that specifically recognize a target peptide-MHC (pMHC)). Methods of producing the rabbit antigen binding protein nucleic acid libraries are also provided.

28 Claims, 12 Drawing Sheets

Specification includes a Sequence Listing.

(56) References Cited

U.S. PATENT DOCUMENTS

| | | | |
|---|---|---|---|
| 2011/0219464 A1 | 9/2011 | Domon et al. |
| 2018/0088140 A1 | 3/2018 | Grabert et al. |
| 2018/0118827 A1 | 5/2018 | Moore et al. |
| 2019/0092834 A1 | 3/2019 | Hayes et al. |
| 2019/0144521 A1 | 5/2019 | Tribble et al. |
| 2020/0400674 A1 | 12/2020 | Williams |
| 2020/0408769 A1 | 12/2020 | Kumaki et al. |
| 2021/0032361 A1 | 2/2021 | Hutt et al. |
| 2021/0032370 A1 | 2/2021 | Pszolla et al. |
| 2021/0061914 A1 | 3/2021 | Jooss et al. |
| 2021/0147550 A1 | 5/2021 | Jooss et al. |
| 2021/0230278 A1 | 7/2021 | Weinzierl et al. |
| 2021/0238543 A1 | 8/2021 | Renes et al. |
| 2022/0119479 A1 | 4/2022 | Conroy et al. |
| 2022/0324939 A1 | 10/2022 | Bowerman et al. |
| 2022/0380472 A1 | 12/2022 | Sobieraj et al. |
| 2023/0159612 A1 | 5/2023 | Ellinger et al. |
| 2024/0091262 A1 | 3/2024 | Jungmichel et al. |

FOREIGN PATENT DOCUMENTS

| | | |
|---|---|---|
| WO | WO 2009/155725 A1 | 12/2003 |
| WO | WO 2004/016740 A2 | 2/2004 |
| WO | WO 2005/016950 A1 | 2/2005 |
| WO | WO 2007/101661 A1 | 9/2007 |
| WO | WO 2008/110348 A1 | 9/2008 |
| WO | WO 2008/144757 A1 | 11/2008 |
| WO | WO 2009/000098 A2 | 12/2008 |
| WO | WO 2009/000099 A2 | 12/2008 |
| WO | WO 2009/155726 A1 | 12/2009 |
| WO | WO 2016/086196 A2 | 6/2016 |
| WO | WO 2016/199140 A1 | 12/2016 |
| WO | WO 2016/199141 A1 | 12/2016 |
| WO | WO 2017/175006 A1 | 10/2017 |
| WO | WO 2017/201493 A1 | 11/2017 |
| WO | WO 2018/178307 A1 | 10/2018 |
| WO | WO 2019/012138 A1 | 1/2019 |
| WO | WO 2019/171064 A1 | 9/2019 |
| WO | WO 2020/109616 A1 | 6/2020 |
| WO | WO 2020/193767 A1 | 10/2020 |
| WO | WO 2020/243315 A1 | 12/2020 |
| WO | WO 2020/257288 A2 | 12/2020 |
| WO | WO 2021/016585 A1 | 1/2021 |
| WO | WO 2021/046316 A2 | 3/2021 |
| WO | WO 2021/112676 A2 | 6/2021 |
| WO | WO 2021/116469 A2 | 6/2021 |
| WO | WO 2021/122875 A1 | 6/2021 |
| WO | WO 2021/216972 A1 | 10/2021 |
| WO | WO 2021/224913 A1 | 11/2021 |
| WO | WO 2021/229234 A1 | 11/2021 |
| WO | WO 2021/229235 A1 | 11/2021 |
| WO | WO 2022/105924 A1 | 5/2022 |
| WO | WO 2022/190007 A1 | 9/2022 |
| WO | WO 2022/190009 A1 | 9/2022 |
| WO | WO 2022/235662 A1 | 11/2022 |
| WO | WO 2022/262678 A1 | 12/2022 |
| WO | WO 2023/011268 A1 | 2/2023 |
| WO | WO 2023/011273 A1 | 2/2023 |
| WO | WO 2023/014809 A2 | 2/2023 |
| WO | WO 2023/044402 A1 | 3/2023 |

OTHER PUBLICATIONS

Arimilli et al., "Refolding and reconstitution of functionally active complexes of human leukocyte antigen DR2 and myelin basic protein peptide from recombinant alpha and beta polypeptide chains", J Biol Chem., Jan. 13, 1995, 270(2): 971-977.

AYYAR rabbit scFv, Appl Microbiol Biotechnol., Dec. 24, 2014, 99(6): 2693-2703.

Bird et al., "Single-chain antigen-binding proteins", Science, 1988, 242(4877): 423-426.

Chaudhary et al., "A rapid method of cloning functional variable-region antibody genes in *Escherichia coli* as single-chain immunotoxins", PNAS, 1990, 87(3): 1066-1070.

Cooper et al., "T-cell clones can be rendered specific for CD19: toward the selective augmentation of the graft-versus-B-lineage leukemia effect", Blood, 2003, 101(4): 1637-1644.

Davari et al., "Development of a CD8 co-receptor independent T-cell receptor specific for tumor-associated antigen MAGE-A4 for next generation T-cell-based immunotherapy", Journal for ImmunoTherapy of Cancer, Feb. 17, 2021, 9(3): e002035.

Davis et al., "Ligand recognition by alpha beta T cell receptors", Annu Rev Immunol., 1998, 16: 523-544.

Gertz et al., "Accuracy and coverage assessment of*Oryctolagus cuniculus*(rabbit) genes encoding immunoglobulins in the whole genome sequence assembly (OryCun2.0) and localization of theIGHlocus to chromosome 20", Immunogenetics, Aug. 8, 2013, 65(10): 749-762.

Grossman et al., "Toward a Shared Vision for Cancer Genomic Data", N Engl J Med., 2016, 375: 1109-1112.

Heeley et al., "Mutations Flanking the Polyglutamine Repeat in the Modulatory Domain of Rat Glucocorticoid Receptor Lead to an Increase in Affinity for Hormone", Endocr Res, 2002, 28(3): 217-229.

Honegger et al., "Yet another numbering scheme for immunoglobulin variable domains: an automatic modeling and analysis tool," J Mol Biol, Jun. 8, 2001; 309(3): 657-670.

Hossler, "Optimal and consistent protein glycosylation in mammalian cell culture", Glycobiology, Jun. 3, 2009, 19(9): 936-949.

International Search Report and Written Opinion for PCT International Patent Application No. PCT/IB2022/052117, dated Aug. 1, 2022.

International Search Report and Written Opinion for PCT International Patent Application No. PCT/IB2022/052119, dated Aug. 3, 2022.

Kim et al., "Hybrid restriction enzymes: zinc finger fusions to Fok I cleavage domain", PNAS, 1996, 93(3): 1156-1160.

Lefranc et al., "IMGT unique numbering for immunoglobulin and T cell receptor variable domains and Ig superfamily V-like domains," Dev Comp Immunol, Jan. 2003, 27(1): 55-77.

Liljeblad et al., "Analysis of agalacto-IgG in rheumatoid arthritis using surface plasmon resonance", Glyco Journ., 2000, 17: 323-329.

Liu et al., "Design of polydactyl zinc-finger proteins for unique addressing within complex genomes", PNAS USA, 1997, 94(11): 5525-5530.

MacCallum et al., "Antibody-antigen interactions: Contact analysis and binding site topography", J. Mol. Biol., 1996, 262: 732-745.

Maus et al., "Antibody-modified T cells: CARs take the front seat for hematologic malignancies", Blood, 2014, 123(17): 2625-2635.

Popkov et al., "Rabbit Immune Repertoires as Sources for Therapeutic Monoclonal Antibodies: The Impact of Kappa Allotype-correlated Variation in Cysteine Content on Antibody Libraries Selected by Phage Display", Journal of Molecular Biology, Jan. 10, 2003, 325(2): 325-335.

Rodenko et al., "Generation of peptide-MHC class I complexes through UV-mediated ligand exchange", Nat. Protoc., 2006, 1(3): 1120-1132.

Rudolph et al., "How TCRs bind MHCs, peptides, and coreceptors", Annu Rev Immunol., 2006, 24: 419-466.

Sanderson et al., "Preclinical evaluation of an affinity-enhanced MAGE-A4-specific T-cell receptor for adoptive T-cell therapy", Oncoimmunology, Nov. 24, 2019, 9(1): 1682381.

Tian et al., "CD8+ T Cell Activation Is Governed by TCR-Peptide/MHC Affinity, Not Dissociation Rate", J Immunol., 2007, 179(5): 2952-2960.

AACR 2021—Abstract LB167: A powerful discovery platform for the generation of high affinity and specificity TCR-like antibodies for immunotherapies in solid tumor, Jul. 1, 2021, Proceedings: AACR Annual Meeting 2021, 81(13): Supplement.

AACR 2022—Abstract 2891: Enhanced anti-tumor responses with a novel dual pMHC T-cell engager bispecific antibody, Jun. 15, 2022, Proceedings: AACR Annual Meeting 2022, 82(12): Supplement.

(56) References Cited

OTHER PUBLICATIONS

Almagro et al., "Progress and Challenges in the Design and Clinical Development of Antibodies for Cancer Therapy", Front Immunol., Jan. 2018, 8: 1751.

Brown et al., "Tolerance of single, but not multiple, amino acid replacements in antibody VH CDR 2: a means of minimizing B cell wastage from somatic hypermutation?", J. Immunol., May 1996, 156(9): 3285-3291.

Chiu et al., "Antibody Structure and Function: The Basis for Engineering Therapeutics", Antibodies (Basel), Dec. 2019, 8(4): 55.

Gupta, "Cancer Associated Testis Antigens", Proteomics of Spermatogenesis, Jan. 2005, 777-794.

Janeway et al., "Immunobiology: The immune system in Health and Disease", 5th edition, 2001.

Lydard et al., "Generation of diversity", Immunology, 2011, Section D: Antibodies, 76-85.

Rudikoff et al., "Single amino acid substitution altering antigen-binding specificity", Proc. Natl. Acad. Sci. USA, Mar. 1982, 79(6): 1979-1983.

Saito et al., "High expression of MAGE-A4 and MHC class I antigens in tumor cells and induction of MAGE-A4 immune responses are prognostic markers of CHP-MAGE-A4 cancer vaccine", Vaccine, Oct. 14, 2014, 32(45): 5901-5907.

Sampei et al., "Antibody engineering to generate SKY59, a long-acting anti-C5 recycling antibody", PLOS ONE, Dec. 2018, 13(12): 1-20.

Sang et al., "MAGE-A family: Attractive targets for cancer immunotherapy", Vaccine, Nov. 3, 2011, 29(47), 8496-8500.

Shichijo et al., "Detection of mage-4 protein in lung cancers", 1995, International Journal of Cancer (Pred. Oncol.), 64(3): 158-165.

Paul, Fundamental Immunology, 3rd Edition, Raven Press, New York, 1993, Chapter 9, pp. 292-295.

Murphy et al., "Enhancing recombinant antibody performance by optimally engineering its format", Journal of Immunological Methods, Dec. 2018, 463: 127-133.

U.S. Appl. No. 17/690,089 2022/0340894, filed Mar. 9, 2022 Oct. 27, 2022, Anna Maria Sobieraj, Rabbit-Derived Antigen Binding Protein Nucleic Acid Libraries and Methods of Making the Same.

U.S. Appl. No. 17/690,526 2022/0380472, filed Mar. 9, 2022 Dec. 1, 2022, Anna Maria Sobieraj, Mage-A4 Peptie-MHC Antigen Binding Proteins.

Augsberger et al., "Targeting intracellular WT1 in AML with a novel RMF-peptide-MHC-specific T-cell bispecific antibody", Blood, Immunobiology and Immuotherapy, Dec. 23, 2021, 138(25): 2655-2669.

International Search Report and Written Opinion for PCT International Patent Application No. PCT/EP2022/085689, dated Mar. 23, 2023.

International Search Report and Written Opinion for PCT International Patent Application No. PCT/EP2023/075190, dated Jan. 3, 2024.

Jungmichael et al., "Abstract 2891: Enhanced anti-tumor responses with a novel dual pMHC T-cell engager bispecific antibody", Power Presentations—Proffered Abstracts, Jun. 15, 2022, Cancer Res., 2022, 82(Suppl. 12): 2891.

Liu et al., "N-terminal glutamate to pyroglutamate conversion in vivo for human IgG2 antibodies", J Biol Chem., Apr. 1, 2011, 286(13): 11211-11217.

Roosnek et al., "T cell activation by a bispecific anti-CD3/anti-major histocompatibility complex class I antibody", European Journal of Immunology, Jun. 1990, 20(6): 1393-1396.

Schoonjans et al., "A new model for intermediate molecular weight recombinant bispecific and trispecific antibodies by efficient heterodimerization of single chain variable domains through fusion to a Fab-chain", Biomolecular Engineering, 2001, 17(6): 193-202.

Schoonjans et al., "Fab Chains as an Efficient Heterodimerization Scaffold for the Production of Recombinant Bispecific and Trispecific Antibody Derivatives", J. Immunology, 2000, 165(12): 7050-7057.

SEQUENCE LISTING

<160> NUMBER OF SEQ ID NOS: 385

<210> SEQ ID NO 1
<211> LENGTH: 275
<212> TYPE: PRT
<213> ORGANISM: Homo sapiens

<400> SEQUENCE: 1

Gly Ser His Ser Met Arg Tyr Phe Phe Thr Ser Val Ser Arg Pro Gly
1               5                   10                  15

Arg Gly Glu Pro Arg Phe Ile Ala Val Gly Tyr Val Asp Asp Thr Gln
            20                  25                  30

Phe Val Arg Phe Asp Ser Asp Ala Ala Ser Gln Arg Met Glu Pro Arg
        35                  40                  45

Ala Pro Trp Ile Glu Gln Glu Gly Pro Glu Tyr Trp Asp Gly Glu Thr
    50                  55                  60

Arg Lys Val Lys Ala His Ser Gln Thr His Arg Val Asp Leu Gly Thr
65                  70                  75                  80

Leu Arg Gly Tyr Tyr Asn Gln Ser Glu Ala Gly Ser His Thr Val Gln
                85                  90                  95

Arg Met Tyr Gly Cys Asp Val Gly Ser Asp Trp Arg Phe Leu Arg Gly
            100                 105                 110

-continued

Tyr His Gln Tyr Ala Tyr Asp Gly Lys Asp Tyr Ile Ala Leu Lys Glu
        115                 120                 125

Asp Leu Arg Ser Trp Thr Ala Asp Met Ala Ala Gln Thr Thr Lys
130                 135                 140

His Lys Trp Glu Ala Ala His Val Ala Glu Gln Leu Arg Ala Tyr Leu
145                 150                 155                 160

Glu Gly Thr Cys Val Glu Trp Leu Arg Arg Tyr Leu Glu Asn Gly Lys
                165                 170                 175

Glu Thr Leu Gln Arg Thr Asp Ala Pro Lys Thr His Met Thr His His
            180                 185                 190

Ala Val Ser Asp His Glu Ala Thr Leu Arg Cys Trp Ala Leu Ser Phe
        195                 200                 205

Tyr Pro Ala Glu Ile Thr Leu Thr Trp Gln Arg Asp Gly Glu Asp Gln
        210                 215                 220

Thr Gln Asp Thr Glu Leu Val Glu Thr Arg Pro Ala Gly Asp Gly Thr
225                 230                 235                 240

Phe Gln Lys Trp Ala Ala Val Val Val Pro Ser Gly Gln Glu Gln Arg
                245                 250                 255

Tyr Thr Cys His Val Gln His Glu Gly Leu Pro Lys Pro Leu Thr Leu
            260                 265                 270

Arg Trp Glu
        275

<210> SEQ ID NO 2
<211> LENGTH: 99
<212> TYPE: PRT
<213> ORGANISM: Homo sapiens

<400> SEQUENCE: 2

Ile Gln Arg Thr Pro Lys Ile Gln Val Tyr Ser Arg His Pro Ala Glu
1               5                   10                  15

Asn Gly Lys Ser Asn Phe Leu Asn Cys Tyr Val Ser Gly Phe His Pro
            20                  25                  30

Ser Asp Ile Glu Val Asp Leu Leu Lys Asn Gly Glu Arg Ile Glu Lys
        35                  40                  45

Val Glu His Ser Asp Leu Ser Phe Ser Lys Asp Trp Ser Phe Tyr Leu
    50                  55                  60

Leu Tyr Tyr Thr Glu Phe Thr Pro Thr Glu Lys Asp Glu Tyr Ala Cys
65                  70                  75                  80

Arg Val Asn His Val Thr Leu Ser Gln Pro Lys Ile Val Lys Trp Asp
                85                  90                  95

Arg Asp Met

<210> SEQ ID NO 3
<211> LENGTH: 10
<212> TYPE: PRT
<213> ORGANISM: Homo sapiens

<400> SEQUENCE: 3

Gly Val Tyr Asp Gly Arg Glu His Thr Val
1               5                   10

<210> SEQ ID NO 4
<211> LENGTH: 17
<212> TYPE: DNA
<213> ORGANISM: Artificial Sequence
<220> FEATURE:

<223> OTHER INFORMATION: Description of Artificial Sequence: Synthetic
      primer

<400> SEQUENCE: 4
gctgacgatg ctgccac                                                  17

<210> SEQ ID NO 5
<211> LENGTH: 15
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 5
gctgccgatg ctgcc                                                    15

<210> SEQ ID NO 6
<211> LENGTH: 16
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 6
ctccacgcca ctgatg                                                   16

<210> SEQ ID NO 7
<211> LENGTH: 17
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 7
ctgtacgcca ctgatgg                                                  17

<210> SEQ ID NO 8
<211> LENGTH: 16
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 8
ctgcacaccg ctgatg                                                   16

<210> SEQ ID NO 9
<211> LENGTH: 13
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 9
ctgcacgccg ctg                                                      13

<210> SEQ ID NO 10
<211> LENGTH: 16
<212> TYPE: DNA
<213> ORGANISM: Artificial Sequence
<220> FEATURE:
<223> OTHER INFORMATION: Description of Artificial Sequence: Synthetic -continued

```
      primer

<400> SEQUENCE: 10
ctgcacgcca ctgatg                                              16

<210> SEQ ID NO 11
<211> LENGTH: 16
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 11
ctgcacgccg ttgatg                                              16

<210> SEQ ID NO 12
<211> LENGTH: 17
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 12
ctccaggtcg ctgatgg                                             17

<210> SEQ ID NO 13
<211> LENGTH: 16
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 13
ctgtgcaccg ctgatg                                              16

<210> SEQ ID NO 14
<211> LENGTH: 16
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 14
ctgcacgtcg ctgatg                                              16

<210> SEQ ID NO 15
<211> LENGTH: 17
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 15
ctgcacacca ctgatgg                                             17

<210> SEQ ID NO 16
<211> LENGTH: 252
<212> TYPE: PRT
<213> ORGANISM: Artificial Sequence
<220> FEATURE:
<223> OTHER INFORMATION: Description of Artificial Sequence: Synthetic
      polypeptide
```

<400> SEQUENCE: 16

```
Gln Glu Gln Leu Val Glu Ser Gly Gly Gly Leu Val Thr Pro Gly Thr
1               5                   10                  15

Pro Leu Thr Leu Thr Cys Thr Val Ser Gly Phe Ser Leu Ser Ser Tyr
            20                  25                  30

Ala Met Gly Trp Val Arg Gln Ala Pro Gly Lys Gly Leu Glu Trp Ile
        35                  40                  45

Gly Thr Ile Asn Asp Gly Gly Thr Ala Phe Tyr Ala Ser Trp Val Lys
    50                  55                  60

Gly Arg Phe Thr Ile Ser Arg Thr Ser Thr Thr Val Asp Leu Arg Val
65                  70                  75                  80

Thr Ser Pro Thr Thr Glu Asp Thr Ala Thr Tyr Phe Cys Ala Arg Ala
                85                  90                  95

Tyr Gly Ser Asn Gly Asp Val Tyr Trp Gly Tyr Phe Asn Leu Trp Gly
            100                 105                 110

Gln Gly Thr Leu Val Thr Val Ser Ser Gly Gly Gly Ser Gly Gly
        115                 120                 125

Gly Gly Ser Gly Gly Gly Gly Ser Gly Gly Gly Ala Ser Glu Leu
    130                 135                 140

Asp Leu Thr Gln Thr Pro Ala Ser Val Glu Val Ala Val Gly Gly Thr
145                 150                 155                 160

Val Thr Ile Lys Cys Gln Ala Ser Gln Ser Ile Gly Ser Tyr Leu Ser
                165                 170                 175

Trp Tyr Gln Gln Lys Pro Gly Gln Arg Pro Lys Leu Leu Ile Phe Arg
            180                 185                 190

Ala Ser Thr Leu Ala Ser Gly Val Ser Ser Arg Phe Lys Gly Ser Gly
        195                 200                 205

Ser Gly Thr Gln Phe Thr Leu Thr Ile Ser Gly Val Glu Cys Ala Asp
    210                 215                 220

Ala Ala Thr Tyr Tyr Cys Gln Gln Gly Tyr Ser Ser Thr Asn Leu Asp
225                 230                 235                 240

Asn Val Phe Gly Gly Gly Thr Glu Val Val Val Lys
                245                 250
```

<210> SEQ ID NO 17
<211> LENGTH: 121
<212> TYPE: PRT
<213> ORGANISM: Artificial Sequence
<220> FEATURE:
<223> OTHER INFORMATION: Description of Artificial Sequence: Synthetic polypeptide

<400> SEQUENCE: 17

```
Gln Glu Gln Leu Val Glu Ser Gly Gly Gly Leu Val Thr Pro Gly Thr
1               5                   10                  15

Pro Leu Thr Leu Thr Cys Thr Val Ser Gly Phe Ser Leu Ser Ser Tyr
            20                  25                  30

Ala Met Gly Trp Val Arg Gln Ala Pro Gly Lys Gly Leu Glu Trp Ile
        35                  40                  45

Gly Thr Ile Asn Asp Gly Gly Thr Ala Phe Tyr Ala Ser Trp Val Lys
    50                  55                  60

Gly Arg Phe Thr Ile Ser Arg Thr Ser Thr Thr Val Asp Leu Arg Val
65                  70                  75                  80

Thr Ser Pro Thr Thr Glu Asp Thr Ala Thr Tyr Phe Cys Ala Arg Ala
                85                  90                  95
```

```
Tyr Gly Ser Asn Gly Asp Val Tyr Trp Gly Tyr Phe Asn Leu Trp Gly
            100                 105                 110

Gln Gly Thr Leu Val Thr Val Ser Ser
        115                 120

<210> SEQ ID NO 18
<211> LENGTH: 110
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 18

Glu Leu Asp Leu Thr Gln Thr Pro Ala Ser Val Glu Val Ala Val Gly
1               5                   10                  15

Gly Thr Val Thr Ile Lys Cys Gln Ala Ser Gln Ser Ile Gly Ser Tyr
            20                  25                  30

Leu Ser Trp Tyr Gln Gln Lys Pro Gly Gln Arg Pro Lys Leu Leu Ile
        35                  40                  45

Phe Arg Ala Ser Thr Leu Ala Ser Gly Val Ser Ser Arg Phe Lys Gly
    50                  55                  60

Ser Gly Ser Gly Thr Gln Phe Thr Leu Thr Ile Ser Gly Val Glu Cys
65                  70                  75                  80

Ala Asp Ala Ala Thr Tyr Tyr Cys Gln Gln Gly Tyr Ser Ser Thr Asn
                85                  90                  95

Leu Asp Asn Val Phe Gly Gly Gly Thr Glu Val Val Val Lys
            100                 105                 110

<210> SEQ ID NO 19
<211> LENGTH: 6
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 19

Ser Ser Tyr Ala Met Gly
1               5

<210> SEQ ID NO 20
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 20

Thr Ile Asn Asp Gly Gly Thr Ala Phe Tyr Ala Ser Trp Val Lys Gly
1               5                   10                  15

<210> SEQ ID NO 21
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 21

Ala Tyr Gly Ser Asn Gly Asp Val Tyr Trp Gly Tyr Phe Asn Leu
```

-continued

```
1               5                   10                  15
```

<210> SEQ ID NO 22
<211> LENGTH: 11
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 22

```
Gln Ala Ser Gln Ser Ile Gly Ser Tyr Leu Ser
1               5                   10
```

<210> SEQ ID NO 23
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 23

```
Arg Ala Ser Thr Leu Ala Ser
1               5
```

<210> SEQ ID NO 24
<211> LENGTH: 12
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 24

```
Gln Gln Gly Tyr Ser Ser Thr Asn Leu Asp Asn Val
1               5                   10
```

<210> SEQ ID NO 25
<211> LENGTH: 252
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 25

```
Gln Glu Gln Leu Glu Glu Ser Gly Gly Gly Leu Val Thr Pro Gly Gly
1               5                   10                  15

Thr Leu Thr Leu Thr Cys Thr Val Ser Gly Phe Ser Leu Ser Asn Tyr
                20                  25                  30

Ala Met Gly Trp Val Arg Gln Ala Pro Gly Lys Gly Leu Glu Trp Ile
            35                  40                  45

Gly Thr Ile Asn Asp Gly Gly Thr Ala Phe Tyr Ala Lys Trp Leu Lys
        50                  55                  60

Gly Arg Phe Thr Ile Ser Arg Thr Ser Thr Val Asp Leu Lys Ile
65                  70                  75                  80

Thr Ser Pro Thr Thr Glu Asp Thr Ala Thr Tyr Phe Cys Ala Arg Ala
                85                  90                  95

Tyr Gly Ser Asn Gly Asp Val Tyr Trp Gly Tyr Phe Asn Leu Trp Gly
            100                 105                 110

Gln Gly Thr Leu Val Thr Ile Ser Ser Gly Gly Gly Ser Gly Gly
        115                 120                 125
```

Gly Gly Ser Gly Gly Gly Ser Gly Gly Gly Ala Ser Glu Leu
            130                 135                 140

Val Met Thr Gln Thr Pro Ser Ser Val Ser Glu Pro Val Gly Gly Thr
145                 150                 155                 160

Val Thr Ile Lys Cys Gln Ala Ser Gln Ser Ile Gly Ser Asn Leu Ala
                165                 170                 175

Trp Tyr Gln Gln Arg Pro Gly Gln Pro Pro Lys Leu Leu Ile Tyr Ser
                180                 185                 190

Ala Ser Thr Leu Ala Ser Gly Val Ser Ser Arg Phe Lys Gly Ser Gly
            195                 200                 205

Ser Gly Thr Glu Ser Thr Leu Thr Ile Ser Gly Val Gln Ala Ala Asp
    210                 215                 220

Ala Ala Thr Tyr Tyr Cys Gln Gln Gly Tyr Ser Ser Ser Asn Val Asp
225                 230                 235                 240

Asn Val Phe Gly Gly Gly Thr Glu Leu Glu Ile Leu
                245                 250

<210> SEQ ID NO 26
<211> LENGTH: 121
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 26

Gln Glu Gln Leu Glu Glu Ser Gly Gly Gly Leu Val Thr Pro Gly Gly
1               5                   10                  15

Thr Leu Thr Leu Thr Cys Thr Val Ser Gly Phe Ser Leu Ser Asn Tyr
            20                  25                  30

Ala Met Gly Trp Val Arg Gln Ala Pro Gly Lys Gly Leu Glu Trp Ile
        35                  40                  45

Gly Thr Ile Asn Asp Gly Gly Thr Ala Phe Tyr Ala Lys Trp Leu Lys
    50                  55                  60

Gly Arg Phe Thr Ile Ser Arg Thr Ser Thr Thr Val Asp Leu Lys Ile
65                  70                  75                  80

Thr Ser Pro Thr Thr Glu Asp Thr Ala Thr Tyr Phe Cys Ala Arg Ala
                85                  90                  95

Tyr Gly Ser Asn Gly Asp Val Tyr Trp Gly Tyr Phe Asn Leu Trp Gly
                100                 105                 110

Gln Gly Thr Leu Val Thr Ile Ser Ser
        115                 120

<210> SEQ ID NO 27
<211> LENGTH: 110
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 27

Glu Leu Val Met Thr Gln Thr Pro Ser Ser Val Ser Glu Pro Val Gly
1               5                   10                  15

Gly Thr Val Thr Ile Lys Cys Gln Ala Ser Gln Ser Ile Gly Ser Asn
            20                  25                  30

Leu Ala Trp Tyr Gln Gln Arg Pro Gly Gln Pro Pro Lys Leu Leu Ile
        35                  40                  45

```
Tyr Ser Ala Ser Thr Leu Ala Ser Gly Val Ser Ser Arg Phe Lys Gly
     50                  55                  60

Ser Gly Ser Gly Thr Glu Ser Thr Leu Thr Ile Ser Gly Val Gln Ala
 65                  70                  75                  80

Ala Asp Ala Ala Thr Tyr Tyr Cys Gln Gln Gly Tyr Ser Ser Ser Asn
                 85                  90                  95

Val Asp Asn Val Phe Gly Gly Gly Thr Glu Leu Glu Ile Leu
            100                 105                 110
```

<210> SEQ ID NO 28
<211> LENGTH: 6
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 28

```
Ser Asn Tyr Ala Met Gly
 1               5
```

<210> SEQ ID NO 29
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 29

```
Thr Ile Asn Asp Gly Gly Thr Ala Phe Tyr Ala Lys Trp Leu Lys Gly
 1               5                  10                  15
```

<210> SEQ ID NO 30
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 30

```
Ala Tyr Gly Ser Asn Gly Asp Val Tyr Trp Gly Tyr Phe Asn Leu
 1               5                  10                  15
```

<210> SEQ ID NO 31
<211> LENGTH: 11
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 31

```
Gln Ala Ser Gln Ser Ile Gly Ser Asn Leu Ala
 1               5                  10
```

<210> SEQ ID NO 32
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 32

```
Ser Ala Ser Thr Leu Ala Ser
1               5
```

<210> SEQ ID NO 33
<211> LENGTH: 12
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 33

```
Gln Gln Gly Tyr Ser Ser Ser Asn Val Asp Asn Val
1               5                   10
```

<210> SEQ ID NO 34
<211> LENGTH: 252
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 34

```
Gln Glu Gln Leu Glu Glu Ser Gly Gly Gly Leu Val Thr Pro Gly Thr
1               5                   10                  15

Pro Leu Thr Leu Thr Cys Thr Ala Ser Gly Phe Ser Leu Ser Ser Tyr
            20                  25                  30

Ala Met Ile Trp Val Arg Gln Ala Pro Gly Lys Gly Leu Glu Trp Ile
        35                  40                  45

Gly Thr Ile Asn Asp Gly Gly Thr Ala Phe Tyr Ala Asn Trp Val Lys
    50                  55                  60

Gly Arg Phe Thr Ile Ser Arg Thr Ser Thr Thr Val Asp Leu Lys Met
65                  70                  75                  80

Thr Ser Pro Thr Thr Glu Asp Thr Ala Thr Tyr Phe Cys Ala Arg Ala
                85                  90                  95

Tyr Gly Ser Asn Gly Asp Val Tyr Trp Gly Tyr Val Asn Leu Trp Gly
            100                 105                 110

Gln Gly Thr Leu Val Thr Val Ser Ser Gly Gly Gly Ser Gly Gly
        115                 120                 125

Gly Gly Ser Gly Gly Gly Gly Ser Gly Gly Gly Ala Ser Glu Leu
    130                 135                 140

Val Met Thr Gln Thr Pro Ala Ser Val Ser Glu Pro Val Gly Gly Thr
145                 150                 155                 160

Val Thr Ile Lys Cys Gln Ala Ser Gln Ser Ile Gly Ser Asn Leu Ala
                165                 170                 175

Trp Tyr Gln Gln Lys Pro Gly Gln Pro Pro Lys Leu Leu Ile Tyr Ala
            180                 185                 190

Ala Ala Asn Leu Ala Ser Gly Val Ser Ser Arg Phe Lys Gly Ser Arg
        195                 200                 205

Ser Gly Thr Glu Tyr Thr Leu Thr Ile Ser Gly Val Gln Ala Ala Asp
    210                 215                 220

Ala Ala Thr Tyr Tyr Cys Gln Gln Gly Tyr Ser Ser Ser Asn Val Ala
225                 230                 235                 240

Asn Val Phe Gly Gly Gly Thr Glu Leu Glu Ile Leu
                245                 250
```

<210> SEQ ID NO 35
<211> LENGTH: 121

```
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 35

Gln Glu Gln Leu Glu Ser Gly Gly Gly Leu Val Thr Pro Gly Thr
1               5                   10                  15

Pro Leu Thr Leu Thr Cys Thr Ala Ser Gly Phe Ser Leu Ser Ser Tyr
                20                  25                  30

Ala Met Ile Trp Val Arg Gln Ala Pro Gly Lys Gly Leu Glu Trp Ile
            35                  40                  45

Gly Thr Ile Asn Asp Gly Gly Thr Ala Phe Tyr Ala Asn Trp Val Lys
        50                  55                  60

Gly Arg Phe Thr Ile Ser Arg Thr Ser Thr Thr Val Asp Leu Lys Met
65                  70                  75                  80

Thr Ser Pro Thr Thr Glu Asp Thr Ala Thr Tyr Phe Cys Ala Arg Ala
                85                  90                  95

Tyr Gly Ser Asn Gly Asp Val Tyr Trp Gly Tyr Val Asn Leu Trp Gly
                100                 105                 110

Gln Gly Thr Leu Val Thr Val Ser Ser
                115                 120

<210> SEQ ID NO 36
<211> LENGTH: 110
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 36

Glu Leu Val Met Thr Gln Thr Pro Ala Ser Val Ser Glu Pro Val Gly
1               5                   10                  15

Gly Thr Val Thr Ile Lys Cys Gln Ala Ser Gln Ser Ile Gly Ser Asn
                20                  25                  30

Leu Ala Trp Tyr Gln Gln Lys Pro Gly Gln Pro Pro Lys Leu Leu Ile
            35                  40                  45

Tyr Ala Ala Ala Asn Leu Ala Ser Gly Val Ser Ser Arg Phe Lys Gly
        50                  55                  60

Ser Arg Ser Gly Thr Glu Tyr Thr Leu Thr Ile Ser Gly Val Gln Ala
65                  70                  75                  80

Ala Asp Ala Ala Thr Tyr Tyr Cys Gln Gln Gly Tyr Ser Ser Ser Asn
                85                  90                  95

Val Ala Asn Val Phe Gly Gly Gly Thr Glu Leu Glu Ile Leu
                100                 105                 110

<210> SEQ ID NO 37
<211> LENGTH: 6
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 37

Ser Ser Tyr Ala Met Ile
1               5
```

```
<210> SEQ ID NO 38
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 38

Thr Ile Asn Asp Gly Gly Thr Ala Phe Tyr Ala Asn Trp Val Lys Gly
1               5                   10                  15

<210> SEQ ID NO 39
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 39

Ala Tyr Gly Ser Asn Gly Asp Val Tyr Trp Gly Tyr Val Asn Leu
1               5                   10                  15

<210> SEQ ID NO 40
<211> LENGTH: 11
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 40

Gln Ala Ser Gln Ser Ile Gly Ser Asn Leu Ala
1               5                   10

<210> SEQ ID NO 41
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 41

Ala Ala Ala Asn Leu Ala Ser
1               5

<210> SEQ ID NO 42
<211> LENGTH: 12
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 42

Gln Gln Gly Tyr Ser Ser Ser Asn Val Ala Asn Val
1               5                   10

<210> SEQ ID NO 43
<211> LENGTH: 252
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 43
```

Gln Glu Gln Leu Glu Glu Ser Gly Gly Gly Leu Val Thr Pro Gly Thr
1               5                   10                  15

Pro Leu Thr Leu Thr Cys Thr Ala Ser Gly Phe Ser Leu Ser Ser Tyr
            20                  25                  30

Ala Met Ile Trp Val Arg Gln Ala Pro Gly Lys Gly Leu Glu Trp Ile
        35                  40                  45

Gly Thr Ile Asn Asp Gly Gly Thr Ala Phe Tyr Ala Ser Trp Val Lys
    50                  55                  60

Gly Arg Phe Thr Ile Ser Arg Thr Ser Thr Thr Val Asp Leu Lys Ile
65                  70                  75                  80

Thr Ser Pro Thr Thr Glu Asp Thr Ala Thr Tyr Phe Cys Ala Arg Ala
                85                  90                  95

Tyr Gly Ser Asn Gly Asp Val Tyr Trp Gly Tyr Val Asn Leu Trp Gly
            100                 105                 110

Gln Gly Thr Leu Val Thr Ile Ser Ser Gly Gly Gly Ser Gly Gly
        115                 120                 125

Gly Gly Ser Gly Gly Gly Ser Gly Gly Gly Ala Ser Glu Leu
    130                 135                 140

Val Met Thr Gln Thr Pro Ser Ser Val Ser Ala Ala Val Gly Gly Thr
145                 150                 155                 160

Val Thr Ile Asn Cys Gln Ala Ser Gln Asn Ile Gly Ser Val Phe Ala
                165                 170                 175

Trp Tyr Gln Gln Lys Pro Gly Gln Pro Pro Lys Leu Leu Ile Tyr Lys
            180                 185                 190

Ala Ser Ser Leu Ala Ser Gly Val Pro Ser Arg Phe Lys Gly Ser Gly
        195                 200                 205

Ser Gly Thr Gln Phe Thr Leu Thr Ile Ser Gly Val Glu Ala Ala Asp
    210                 215                 220

Ala Ala Thr Tyr Tyr Cys Gln Gln Gly Ala Ser Ser Ser Asn Val Asp
225                 230                 235                 240

Asn Ile Phe Gly Gly Gly Thr Glu Val Val Val Lys
                245                 250

<210> SEQ ID NO 44
<211> LENGTH: 121
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 44

Gln Glu Gln Leu Glu Glu Ser Gly Gly Gly Leu Val Thr Pro Gly Thr
1               5                   10                  15

Pro Leu Thr Leu Thr Cys Thr Ala Ser Gly Phe Ser Leu Ser Ser Tyr
            20                  25                  30

Ala Met Ile Trp Val Arg Gln Ala Pro Gly Lys Gly Leu Glu Trp Ile
        35                  40                  45

Gly Thr Ile Asn Asp Gly Gly Thr Ala Phe Tyr Ala Ser Trp Val Lys
    50                  55                  60

Gly Arg Phe Thr Ile Ser Arg Thr Ser Thr Thr Val Asp Leu Lys Ile
65                  70                  75                  80

Thr Ser Pro Thr Thr Glu Asp Thr Ala Thr Tyr Phe Cys Ala Arg Ala
                85                  90                  95

Tyr Gly Ser Asn Gly Asp Val Tyr Trp Gly Tyr Val Asn Leu Trp Gly

```
                100              105               110
Gln Gly Thr Leu Val Thr Ile Ser Ser
        115                 120

<210> SEQ ID NO 45
<211> LENGTH: 110
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 45

Glu Leu Val Met Thr Gln Thr Pro Ser Ser Val Ser Ala Ala Val Gly
1               5                   10                  15

Gly Thr Val Thr Ile Asn Cys Gln Ala Ser Gln Asn Ile Gly Ser Val
            20                  25                  30

Phe Ala Trp Tyr Gln Gln Lys Pro Gly Gln Pro Pro Lys Leu Leu Ile
        35                  40                  45

Tyr Lys Ala Ser Ser Leu Ala Ser Gly Val Pro Ser Arg Phe Lys Gly
    50                  55                  60

Ser Gly Ser Gly Thr Gln Phe Thr Leu Thr Ile Ser Gly Val Glu Ala
65                  70                  75                  80

Ala Asp Ala Ala Thr Tyr Tyr Cys Gln Gln Gly Ala Ser Ser Ser Asn
                85                  90                  95

Val Asp Asn Ile Phe Gly Gly Gly Thr Glu Val Val Val Lys
                100                 105                 110

<210> SEQ ID NO 46
<211> LENGTH: 6
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 46

Ser Ser Tyr Ala Met Ile
1               5

<210> SEQ ID NO 47
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 47

Thr Ile Asn Asp Gly Gly Thr Ala Phe Tyr Ala Ser Trp Val Lys Gly
1               5                   10                  15

<210> SEQ ID NO 48
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 48

Ala Tyr Gly Ser Asn Gly Asp Val Tyr Trp Gly Tyr Val Asn Leu
1               5                   10                  15
```

<210> SEQ ID NO 49
<211> LENGTH: 11
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 49

Gln Ala Ser Gln Asn Ile Gly Ser Val Phe Ala
1               5                   10

<210> SEQ ID NO 50
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 50

Lys Ala Ser Ser Leu Ala Ser
1               5

<210> SEQ ID NO 51
<211> LENGTH: 12
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 51

Gln Gln Gly Ala Ser Ser Ser Asn Val Asp Asn Ile
1               5                   10

<210> SEQ ID NO 52
<211> LENGTH: 253
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 52

Gln Gln Gln Leu Glu Glu Ser Gly Gly Gly Leu Val Thr Pro Gly Thr
1               5                   10                  15

Pro Leu Thr Leu Thr Cys Thr Val Ser Gly Phe Ser Leu Ser Asn Tyr
            20                  25                  30

Ala Met Gly Trp Val Arg Gln Ala Pro Gly Lys Gly Leu Glu Trp Ile
        35                  40                  45

Gly Thr Ile Asn Asp Gly Gly Thr Ala Phe Tyr Ala Asn Trp Leu Lys
    50                  55                  60

Gly Arg Phe Thr Ile Ser Arg Thr Ser Thr Thr Val Asp Leu Lys Ile
65                  70                  75                  80

Thr Ser Pro Thr Thr Glu Asp Thr Ala Thr Tyr Phe Cys Ala Arg Ala
                85                  90                  95

Tyr Gly Ser Asn Gly Asp Val Tyr Trp Gly Tyr Phe Asn Leu Trp Gly
            100                 105                 110

Gln Gly Thr Leu Val Thr Val Ser Ser Gly Gly Gly Ser Gly Gly
        115                 120                 125

Gly Gly Ser Gly Gly Gly Gly Ser Gly Gly Gly Gly Ala Ser Glu Leu
    130                 135                 140

Val Met Thr Gln Thr Ala Ser Pro Val Ser Ala Ala Val Gly Gly Thr
145                 150                 155                 160

Val Thr Ile Asn Cys Gln Ala Ser Gln Ser Ile Ser Arg Ser Leu
            165                 170                 175

Ser Trp Tyr Gln Gln Lys Pro Gly Gln Pro Pro Lys Leu Leu Ile Tyr
            180                 185                 190

Glu Ala Ser Lys Leu Ala Ser Gly Val Pro Ser Arg Phe Ser Gly Ser
            195                 200                 205

Gly Ser Gly Thr Gln Phe Thr Leu Thr Ile Ser Gly Val Gln Ala Asp
            210                 215                 220

Asp Ala Ala Thr Tyr Tyr Cys Gln Gln Gly Tyr Ser Ser Ser Asn Val
225                 230                 235                 240

Asp Asn Val Phe Gly Gly Gly Thr Glu Val Val Val Lys
                245                 250

<210> SEQ ID NO 53
<211> LENGTH: 121
<212> TYPE: PRT
<213> ORGANISM: Artificial Sequence
<220> FEATURE:
<223> OTHER INFORMATION: Description of Artificial Sequence: Synthetic
    polypeptide

<400> SEQUENCE: 53

Gln Gln Gln Leu Glu Glu Ser Gly Gly Gly Leu Val Thr Pro Gly Thr
1               5                   10                  15

Pro Leu Thr Leu Thr Cys Thr Val Ser Gly Phe Ser Leu Ser Asn Tyr
            20                  25                  30

Ala Met Gly Trp Val Arg Gln Ala Pro Gly Lys Gly Leu Glu Trp Ile
        35                  40                  45

Gly Thr Ile Asn Asp Gly Gly Thr Ala Phe Tyr Ala Asn Trp Leu Lys
    50                  55                  60

Gly Arg Phe Thr Ile Ser Arg Thr Ser Thr Thr Val Asp Leu Lys Ile
65                  70                  75                  80

Thr Ser Pro Thr Thr Glu Asp Thr Ala Thr Tyr Phe Cys Ala Arg Ala
                85                  90                  95

Tyr Gly Ser Asn Gly Asp Val Tyr Trp Gly Tyr Phe Asn Leu Trp Gly
            100                 105                 110

Gln Gly Thr Leu Val Thr Val Ser Ser
        115                 120

<210> SEQ ID NO 54
<211> LENGTH: 111
<212> TYPE: PRT
<213> ORGANISM: Artificial Sequence
<220> FEATURE:
<223> OTHER INFORMATION: Description of Artificial Sequence: Synthetic
    polypeptide

<400> SEQUENCE: 54

Glu Leu Val Met Thr Gln Thr Ala Ser Pro Val Ser Ala Ala Val Gly
1               5                   10                  15

Gly Thr Val Thr Ile Asn Cys Gln Ala Ser Gln Ser Ile Ser Ser Arg
            20                  25                  30

Ser Leu Ser Trp Tyr Gln Gln Lys Pro Gly Gln Pro Pro Lys Leu Leu
        35                  40                  45

Ile Tyr Glu Ala Ser Lys Leu Ala Ser Gly Val Pro Ser Arg Phe Ser
    50                  55                  60

```
Gly Ser Gly Ser Gly Thr Gln Phe Thr Leu Thr Ile Ser Gly Val Gln
65                  70                  75                  80

Ala Asp Asp Ala Ala Thr Tyr Tyr Cys Gln Gln Gly Tyr Ser Ser Ser
                85                  90                  95

Asn Val Asp Asn Val Phe Gly Gly Gly Thr Glu Val Val Lys
            100                 105                 110

<210> SEQ ID NO 55
<211> LENGTH: 6
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 55

Ser Asn Tyr Ala Met Gly
1               5

<210> SEQ ID NO 56
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 56

Thr Ile Asn Asp Gly Gly Thr Ala Phe Tyr Ala Asn Trp Leu Lys Gly
1               5                   10                  15

<210> SEQ ID NO 57
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 57

Ala Tyr Gly Ser Asn Gly Asp Val Tyr Trp Gly Tyr Phe Asn Leu
1               5                   10                  15

<210> SEQ ID NO 58
<211> LENGTH: 12
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 58

Gln Ala Ser Gln Ser Ile Ser Ser Arg Ser Leu Ser
1               5                   10

<210> SEQ ID NO 59
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 59

Glu Ala Ser Lys Leu Ala Ser
1               5
```

<210> SEQ ID NO 60
<211> LENGTH: 12
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 60

Gln Gln Gly Tyr Ser Ser Ser Asn Val Asp Asn Val
1               5                   10

<210> SEQ ID NO 61
<211> LENGTH: 252
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 61

Gln Gln Gln Leu Val Glu Ser Gly Gly Gly Leu Val Thr Pro Gly Thr
1               5                   10                  15

Pro Leu Thr Leu Thr Cys Thr Val Ser Gly Phe Ser Leu Ser Asn Tyr
            20                  25                  30

Ala Met Gly Trp Val Arg Gln Ala Pro Gly Lys Gly Leu Glu Trp Ile
        35                  40                  45

Gly Thr Ile Asn Asp Gly Gly Thr Ala Phe Tyr Ala Asn Trp Leu Lys
    50                  55                  60

Gly Arg Phe Thr Ile Ser Arg Thr Ser Thr Thr Val Asp Leu Lys Ile
65                  70                  75                  80

Thr Ser Pro Thr Thr Glu Asp Thr Ala Thr Tyr Phe Cys Ala Arg Ala
                85                  90                  95

Tyr Gly Ser Asn Gly Asp Val Tyr Trp Gly Tyr Phe Asn Leu Trp Gly
            100                 105                 110

Gln Gly Thr Leu Val Thr Val Ser Ser Gly Gly Gly Ser Gly Gly
        115                 120                 125

Gly Gly Ser Gly Gly Gly Ser Gly Gly Gly Ala Ser Glu Leu
    130                 135                 140

Val Met Thr Gln Thr Ala Ser Pro Val Ser Ala Ala Val Gly Gly Thr
145                 150                 155                 160

Val Thr Ile Asn Cys Gln Ala Ser Gln Ser Ile Ser Ser Arg Ser Leu
                165                 170                 175

Ser Trp Tyr Gln Gln Lys Pro Gly Gln Pro Pro Lys Leu Leu Ile Tyr
            180                 185                 190

Glu Ala Ser Lys Leu Ala Ser Gly Val Pro Ser Arg Phe Ser Gly Ser
        195                 200                 205

Gly Ser Gly Thr Gln Phe Thr Leu Thr Ile Ser Gly Val Gln Ala Asp
    210                 215                 220

Asp Ala Ala Thr Tyr Tyr Cys Gln Gln Gly Tyr Ser Ser Ser Asn Val
225                 230                 235                 240

Asp Asn Phe Gly Gly Gly Thr Glu Val Val Val Lys
                245                 250

<210> SEQ ID NO 62
<211> LENGTH: 121
<212> TYPE: PRT
<213> ORGANISM: Artificial Sequence

```
<220> FEATURE:
<223> OTHER INFORMATION: Description of Artificial Sequence: Synthetic
      polypeptide

<400> SEQUENCE: 62

Gln Gln Gln Leu Val Glu Ser Gly Gly Gly Leu Val Thr Pro Gly Thr
1               5                   10                  15

Pro Leu Thr Leu Thr Cys Thr Val Ser Gly Phe Ser Leu Ser Asn Tyr
                20                  25                  30

Ala Met Gly Trp Val Arg Gln Ala Pro Gly Lys Gly Leu Glu Trp Ile
            35                  40                  45

Gly Thr Ile Asn Asp Gly Gly Thr Ala Phe Tyr Ala Asn Trp Leu Lys
        50                  55                  60

Gly Arg Phe Thr Ile Ser Arg Thr Ser Thr Thr Val Asp Leu Lys Ile
65                  70                  75                  80

Thr Ser Pro Thr Thr Glu Asp Thr Ala Thr Tyr Phe Cys Ala Arg Ala
                85                  90                  95

Tyr Gly Ser Asn Gly Asp Val Tyr Trp Gly Tyr Phe Asn Leu Trp Gly
            100                 105                 110

Gln Gly Thr Leu Val Thr Val Ser Ser
        115                 120

<210> SEQ ID NO 63
<211> LENGTH: 110
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 63

Glu Leu Val Met Thr Gln Thr Ala Ser Pro Val Ser Ala Ala Val Gly
1               5                   10                  15

Gly Thr Val Thr Ile Asn Cys Gln Ala Ser Gln Ser Ile Ser Ser Arg
                20                  25                  30

Ser Leu Ser Trp Tyr Gln Gln Lys Pro Gly Gln Pro Pro Lys Leu Leu
            35                  40                  45

Ile Tyr Glu Ala Ser Lys Leu Ala Ser Gly Val Pro Ser Arg Phe Ser
        50                  55                  60

Gly Ser Gly Ser Gly Thr Gln Phe Thr Leu Thr Ile Ser Gly Val Gln
65                  70                  75                  80

Ala Asp Asp Ala Ala Thr Tyr Tyr Cys Gln Gln Gly Tyr Ser Ser Ser
                85                  90                  95

Asn Val Asp Asn Phe Gly Gly Gly Thr Glu Val Val Val Lys
            100                 105                 110

<210> SEQ ID NO 64
<211> LENGTH: 6
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 64

Ser Asn Tyr Ala Met Gly
1               5

<210> SEQ ID NO 65
<211> LENGTH: 16
```

```
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 65

Thr Ile Asn Asp Gly Gly Thr Ala Phe Tyr Ala Asn Trp Leu Lys Gly
1               5                   10                  15

<210> SEQ ID NO 66
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 66

Ala Tyr Gly Ser Asn Gly Asp Val Tyr Trp Gly Tyr Phe Asn Leu
1               5                   10                  15

<210> SEQ ID NO 67
<211> LENGTH: 12
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 67

Gln Ala Ser Gln Ser Ile Ser Ser Arg Ser Leu Ser
1               5                   10

<210> SEQ ID NO 68
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 68

Glu Ala Ser Lys Leu Ala Ser
1               5

<210> SEQ ID NO 69
<211> LENGTH: 11
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 69

Gln Gln Gly Tyr Ser Ser Ser Asn Val Asp Asn
1               5                   10

<210> SEQ ID NO 70
<211> LENGTH: 251
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 70

Gln Ser Val Lys Glu Ser Trp Gly Arg Leu Val Thr Pro Gly Gly Ser
```

```
            1               5                  10                 15
          Leu Thr Leu Thr Cys Thr Val Ser Gly Ile Asp Leu Asn Asn Tyr Ala
                         20                  25                  30

Met Gly Trp Val Arg Gln Ala Pro Gly Lys Gly Leu Glu Trp Ile Gly
                         35                  40                  45

Thr Ile Asn Asn Asp Gly Ala Thr Tyr Tyr Pro Ser Trp Ala Arg Gly
                         50                  55                  60

Arg Phe Thr Ile Ser Lys Thr Ser Thr Thr Val Asp Leu Lys Ile Thr
           65                 70                  75                  80

Ser Pro Thr Thr Glu Asp Thr Ala Thr Tyr Phe Cys Ala Arg Thr Tyr
                         85                  90                  95

Gly Ser Asn Gly Asp Val Tyr Trp Gly Tyr Phe Asn Leu Trp Gly Gln
                        100                 105                 110

Gly Thr Leu Val Thr Val Ser Ser Gly Gly Gly Ser Gly Gly Gly
                        115                 120                 125

Gly Ser Gly Gly Gly Gly Ser Gly Gly Gly Ala Ser Ala Leu Glu
                        130                 135                 140

Leu Thr Gln Thr Pro Ala Ser Val Glu Val Ala Val Gly Gly Thr Val
          145                150                 155                 160

Thr Ile Asn Cys Gln Ala Ser Gln Ser Ile Gly Ala Leu Asn Trp
                        165                 170                 175

Tyr Gln Gln Lys Ser Gly Gln Pro Pro Lys Leu Leu Ile Tyr Leu Ala
                        180                 185                 190

Ser Thr Leu Ala Ser Gly Val Ser Ser Arg Phe Lys Gly Ser Gly Ser
                        195                 200                 205

Gly Thr Gln Phe Thr Leu Thr Ile Ser Gly Val Glu Ala Ala Asp Ala
                        210                 215                 220

Ala Thr Tyr Tyr Cys Gln Gln Gly Tyr Ser Ala Ser Asn Ile Asp Asn
          225                230                 235                 240

Ala Phe Gly Gly Gly Thr Glu Val Val Val Lys
                        245                 250

<210> SEQ ID NO 71
<211> LENGTH: 120
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 71

Gln Ser Val Lys Glu Ser Trp Gly Arg Leu Val Thr Pro Gly Gly Ser
          1               5                  10                 15

Leu Thr Leu Thr Cys Thr Val Ser Gly Ile Asp Leu Asn Asn Tyr Ala
                         20                  25                  30

Met Gly Trp Val Arg Gln Ala Pro Gly Lys Gly Leu Glu Trp Ile Gly
                         35                  40                  45

Thr Ile Asn Asn Asp Gly Ala Thr Tyr Tyr Pro Ser Trp Ala Arg Gly
                         50                  55                  60

Arg Phe Thr Ile Ser Lys Thr Ser Thr Thr Val Asp Leu Lys Ile Thr
           65                 70                  75                  80

Ser Pro Thr Thr Glu Asp Thr Ala Thr Tyr Phe Cys Ala Arg Thr Tyr
                         85                  90                  95

Gly Ser Asn Gly Asp Val Tyr Trp Gly Tyr Phe Asn Leu Trp Gly Gln
                        100                 105                 110
```

Gly Thr Leu Val Thr Val Ser Ser
        115             120

<210> SEQ ID NO 72
<211> LENGTH: 110
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 72

Ala Leu Glu Leu Thr Gln Thr Pro Ala Ser Val Glu Val Ala Val Gly
1               5                   10                  15

Gly Thr Val Thr Ile Asn Cys Gln Ala Ser Gln Ser Ile Gly Gly Ala
            20                  25                  30

Leu Asn Trp Tyr Gln Gln Lys Ser Gly Gln Pro Pro Lys Leu Leu Ile
        35                  40                  45

Tyr Leu Ala Ser Thr Leu Ala Ser Gly Val Ser Ser Arg Phe Lys Gly
50                  55                  60

Ser Gly Ser Gly Thr Gln Phe Thr Leu Thr Ile Ser Gly Val Glu Ala
65                  70                  75                  80

Ala Asp Ala Ala Thr Tyr Tyr Cys Gln Gln Gly Tyr Ser Ala Ser Asn
                85                  90                  95

Ile Asp Asn Ala Phe Gly Gly Gly Thr Glu Val Val Val Lys
            100                 105                 110

<210> SEQ ID NO 73
<211> LENGTH: 6
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 73

Asn Asn Tyr Ala Met Gly
1               5

<210> SEQ ID NO 74
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 74

Thr Ile Asn Asn Asp Gly Ala Thr Tyr Tyr Pro Ser Trp Ala Arg Gly
1               5                   10                  15

<210> SEQ ID NO 75
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 75

Thr Tyr Gly Ser Asn Gly Asp Val Tyr Trp Gly Tyr Phe Asn Leu
1               5                   10                  15

<210> SEQ ID NO 76

```
<211> LENGTH: 11
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 76

Gln Ala Ser Gln Ser Ile Gly Gly Ala Leu Asn
1               5                   10

<210> SEQ ID NO 77
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 77

Leu Ala Ser Thr Leu Ala Ser
1               5

<210> SEQ ID NO 78
<211> LENGTH: 12
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 78

Gln Gln Gly Tyr Ser Ala Ser Asn Ile Asp Asn Ala
1               5                   10

<210> SEQ ID NO 79
<211> LENGTH: 252
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 79

Gln Gln Gln Leu Glu Glu Ser Gly Gly Gly Leu Val Thr Pro Gly Thr
1               5                   10                  15

Pro Leu Thr Leu Thr Cys Thr Val Ser Gly Ile Asp Leu Ser Ser Tyr
                20                  25                  30

Ala Met Gly Trp Val Arg Gln Ala Pro Gly Lys Gly Leu Glu Trp Ile
            35                  40                  45

Gly Thr Ile Asn Asp Gly Gly Ser Ala Phe Tyr Ala Ser Trp Val Lys
        50                  55                  60

Gly Arg Phe Thr Ile Ser Arg Thr Ser Thr Val Asp Leu Lys Ile
65                  70                  75                  80

Thr Ser Pro Thr Ala Glu Asp Thr Ala Thr Tyr Phe Cys Ala Lys Thr
                85                  90                  95

Tyr Gly Thr Asn Gly Asp Val Tyr Trp Gly Tyr Phe Asn Leu Trp Gly
            100                 105                 110

Gln Gly Thr Leu Val Thr Ile Ser Ser Gly Gly Gly Gly Ser Gly Gly
        115                 120                 125

Gly Gly Ser Gly Gly Gly Gly Ser Gly Gly Gly Gly Ala Ser Glu Leu
    130                 135                 140

Val Met Thr Gln Thr Pro Ala Ser Val Ser Glu Pro Val Gly Gly Thr
```

```
                145                 150                 155                 160
Val Thr Ile Lys Cys Gln Ala Ser Gln Ser Ile Gly Ser Asn Leu Ala
                165                 170                 175

Trp Tyr Gln Gln Lys Pro Gly Gln Pro Pro Lys Leu Leu Ile Tyr Tyr
            180                 185                 190

Glu Ser Ile Leu Ala Ser Gly Val Pro Ser Arg Phe Ser Gly Ser Gly
        195                 200                 205

Ser Gly Thr Glu Tyr Thr Leu Thr Ile Ser Gly Ala Gln Ala Asp Asp
    210                 215                 220

Ala Ala Thr Tyr Tyr Cys Gln Gln Gly Tyr Ser Ser Ser Asn Ile Asp
225                 230                 235                 240

Asn Ala Phe Gly Gly Gly Thr Glu Val Val Val Lys
                245                 250

<210> SEQ ID NO 80
<211> LENGTH: 121
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 80

Gln Gln Gln Leu Glu Glu Ser Gly Gly Gly Leu Val Thr Pro Gly Thr
1               5                   10                  15

Pro Leu Thr Leu Thr Cys Thr Val Ser Gly Ile Asp Leu Ser Ser Tyr
            20                  25                  30

Ala Met Gly Trp Val Arg Gln Ala Pro Gly Lys Gly Leu Glu Trp Ile
        35                  40                  45

Gly Thr Ile Asn Asp Gly Gly Ser Ala Phe Tyr Ala Ser Trp Val Lys
    50                  55                  60

Gly Arg Phe Thr Ile Ser Arg Thr Ser Thr Thr Val Asp Leu Lys Ile
65                  70                  75                  80

Thr Ser Pro Thr Ala Glu Asp Thr Ala Thr Tyr Phe Cys Ala Lys Thr
                85                  90                  95

Tyr Gly Thr Asn Gly Asp Val Tyr Trp Gly Tyr Phe Asn Leu Trp Gly
            100                 105                 110

Gln Gly Thr Leu Val Thr Ile Ser Ser
        115                 120

<210> SEQ ID NO 81
<211> LENGTH: 110
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 81

Glu Leu Val Met Thr Gln Thr Pro Ala Ser Val Ser Glu Pro Val Gly
1               5                   10                  15

Gly Thr Val Thr Ile Lys Cys Gln Ala Ser Gln Ser Ile Gly Ser Asn
            20                  25                  30

Leu Ala Trp Tyr Gln Gln Lys Pro Gly Gln Pro Pro Lys Leu Leu Ile
        35                  40                  45

Tyr Tyr Glu Ser Ile Leu Ala Ser Gly Val Pro Ser Arg Phe Ser Gly
    50                  55                  60

Ser Gly Ser Gly Thr Glu Tyr Thr Leu Thr Ile Ser Gly Ala Gln Ala
```

```
                65                  70                  75                  80
Asp Asp Ala Ala Thr Tyr Tyr Cys Gln Gln Gly Tyr Ser Ser Ser Asn
                    85                  90                  95
Ile Asp Asn Ala Phe Gly Gly Gly Thr Glu Val Val Val Lys
                100                 105                 110

<210> SEQ ID NO 82
<211> LENGTH: 6
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 82

Ser Ser Tyr Ala Met Gly
1               5

<210> SEQ ID NO 83
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 83

Thr Ile Asn Asp Gly Gly Ser Ala Phe Tyr Ala Ser Trp Val Lys Gly
1               5                   10                  15

<210> SEQ ID NO 84
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 84

Thr Tyr Gly Thr Asn Gly Asp Val Tyr Trp Gly Tyr Phe Asn Leu
1               5                   10                  15

<210> SEQ ID NO 85
<211> LENGTH: 11
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 85

Gln Ala Ser Gln Ser Ile Gly Ser Asn Leu Ala
1               5                   10

<210> SEQ ID NO 86
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 86

Tyr Glu Ser Ile Leu Ala Ser
1               5
```

```
<210> SEQ ID NO 87
<211> LENGTH: 12
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 87

Gln Gln Gly Tyr Ser Ser Ser Asn Ile Asp Asn Ala
1               5                   10

<210> SEQ ID NO 88
<211> LENGTH: 252
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 88

Gln Gln Gln Leu Glu Glu Ser Gly Gly Gly Leu Val Thr Pro Gly Thr
1               5                   10                  15

Pro Leu Thr Leu Thr Cys Thr Val Ser Gly Ile Asp Leu Ser Ser Tyr
            20                  25                  30

Ala Met Gly Trp Val Arg Gln Ala Pro Gly Lys Gly Leu Glu Trp Ile
        35                  40                  45

Gly Thr Ile Asn Asp Gly Gly Ser Ala Phe Tyr Ala Ser Trp Val Lys
    50                  55                  60

Gly Arg Phe Thr Ile Ser Arg Thr Ser Thr Thr Val Asp Leu Lys Ile
65                  70                  75                  80

Thr Ser Pro Thr Ala Glu Asp Thr Ala Thr Tyr Phe Cys Ala Lys Thr
                85                  90                  95

Tyr Gly Thr Asn Gly Asp Val Tyr Trp Gly Tyr Phe Asn Leu Trp Gly
            100                 105                 110

Gln Gly Thr Leu Val Thr Ile Ser Ser Gly Gly Gly Ser Gly Gly
        115                 120                 125

Gly Gly Ser Gly Gly Gly Gly Ser Gly Gly Gly Ala Ser Glu Leu
    130                 135                 140

Val Met Thr Gln Thr Pro Ala Ser Val Ser Glu Pro Val Gly Gly Thr
145                 150                 155                 160

Val Thr Ile Lys Cys Gln Ala Ser Gln Ser Ile Gly Ser Asn Leu Ala
                165                 170                 175

Trp Tyr Gln Gln Lys Pro Gly Gln Pro Pro Lys Leu Leu Ile Tyr Tyr
            180                 185                 190

Glu Ser Ile Leu Ala Ser Gly Val Pro Ser Arg Phe Ser Gly Ser Gly
        195                 200                 205

Ser Gly Thr Glu Tyr Thr Leu Thr Ile Ser Gly Ala Gln Ala Asp Asp
    210                 215                 220

Ala Ala Thr Tyr Tyr Cys Gln Gln Gly Tyr Ser Ser Ser Asn Ile Leu
225                 230                 235                 240

Asn Ala Phe Gly Gly Gly Thr Glu Val Val Val Lys
                245                 250

<210> SEQ ID NO 89
<211> LENGTH: 121
<212> TYPE: PRT
<213> ORGANISM: Artificial Sequence
<220> FEATURE:
<223> OTHER INFORMATION: Description of Artificial Sequence: Synthetic
``` polypeptide

<400> SEQUENCE: 89

```
Gln Gln Gln Leu Glu Glu Ser Gly Gly Gly Leu Val Thr Pro Gly Thr
1               5                   10                  15

Pro Leu Thr Leu Thr Cys Thr Val Ser Gly Ile Asp Leu Ser Ser Tyr
            20                  25                  30

Ala Met Gly Trp Val Arg Gln Ala Pro Gly Lys Gly Leu Glu Trp Ile
        35                  40                  45

Gly Thr Ile Asn Asp Gly Gly Ser Ala Phe Tyr Ala Ser Trp Val Lys
    50                  55                  60

Gly Arg Phe Thr Ile Ser Arg Thr Ser Thr Thr Val Asp Leu Lys Ile
65                  70                  75                  80

Thr Ser Pro Thr Ala Glu Asp Thr Ala Thr Tyr Phe Cys Ala Lys Thr
                85                  90                  95

Tyr Gly Thr Asn Gly Asp Val Tyr Trp Gly Tyr Phe Asn Leu Trp Gly
            100                 105                 110

Gln Gly Thr Leu Val Thr Ile Ser Ser
        115                 120
```

<210> SEQ ID NO 90
<211> LENGTH: 110
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 90

```
Glu Leu Val Met Thr Gln Thr Pro Ala Ser Val Ser Glu Pro Val Gly
1               5                   10                  15

Gly Thr Val Thr Ile Lys Cys Gln Ala Ser Gln Ser Ile Gly Ser Asn
            20                  25                  30

Leu Ala Trp Tyr Gln Gln Lys Pro Gly Gln Pro Pro Lys Leu Leu Ile
        35                  40                  45

Tyr Tyr Glu Ser Ile Leu Ala Ser Gly Val Pro Ser Arg Phe Ser Gly
    50                  55                  60

Ser Gly Ser Gly Thr Glu Tyr Thr Leu Thr Ile Ser Gly Ala Gln Ala
65                  70                  75                  80

Asp Asp Ala Ala Thr Tyr Tyr Cys Gln Gln Gly Tyr Ser Ser Ser Asn
                85                  90                  95

Ile Leu Asn Ala Phe Gly Gly Gly Thr Glu Val Val Val Lys
            100                 105                 110
```

<210> SEQ ID NO 91
<211> LENGTH: 6
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 91

```
Ser Ser Tyr Ala Met Gly
1               5
```

<210> SEQ ID NO 92
<211> LENGTH: 16
<212> TYPE: PRT
<213> ORGANISM: Artificial Sequence

```
<220> FEATURE:
<223> OTHER INFORMATION: Description of Artificial Sequence: Synthetic
      peptide

<400> SEQUENCE: 92

Thr Ile Asn Asp Gly Gly Ser Ala Phe Tyr Ala Ser Trp Val Lys Gly
1               5                   10                  15

<210> SEQ ID NO 93
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 93

Thr Tyr Gly Thr Asn Gly Asp Val Tyr Trp Gly Tyr Phe Asn Leu
1               5                   10                  15

<210> SEQ ID NO 94
<211> LENGTH: 11
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 94

Gln Ala Ser Gln Ser Ile Gly Ser Asn Leu Ala
1               5                   10

<210> SEQ ID NO 95
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 95

Tyr Glu Ser Ile Leu Ala Ser
1               5

<210> SEQ ID NO 96
<211> LENGTH: 12
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 96

Gln Gln Gly Tyr Ser Ser Ser Asn Ile Leu Asn Ala
1               5                   10

<210> SEQ ID NO 97
<211> LENGTH: 250
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 97

Gln Gln Gln Leu Val Glu Ser Gly Gly Arg Leu Val Thr Pro Gly Thr
1               5                   10                  15
```

```
Pro Leu Thr Leu Thr Cys Thr Ala Ser Gly Ile Asp Leu Asn Ser Asn
            20                  25                  30

Ala Met Ser Trp Val Arg Gln Gly Pro Gly Lys Gly Leu Glu Trp Ile
        35                  40                  45

Gly Asp Ile Trp Ser Gly Gly Tyr Thr Asp Tyr Ala Ser Trp Ala Lys
    50                  55                  60

Gly Arg Phe Thr Ile Ser Lys Thr Ser Thr Thr Val Asp Leu Lys Met
65                  70                  75                  80

Thr Ser Leu Thr Ala Ala Asp Thr Ala Thr Tyr Phe Cys Ala Arg Asp
                85                  90                  95

Arg Leu Ala Gly Asp Gly Val Val Asp Tyr Asp Leu Trp Gly Gln Gly
            100                 105                 110

Thr Leu Val Thr Ile Ser Ser Gly Gly Gly Ser Gly Gly Gly Gly
        115                 120                 125

Ser Gly Gly Gly Gly Ser Gly Gly Gly Ala Ser Glu Leu Asp Met
    130                 135                 140

Thr Gln Thr Pro Ala Ser Val Glu Val Ala Val Gly Gly Thr Val Thr
145                 150                 155                 160

Ile Lys Cys Gln Ala Ser Gln Asn Ile Tyr Ser Asn Leu Ala Trp Tyr
                165                 170                 175

Gln Gln Lys Pro Gly Gln Arg Pro Lys Leu Leu Ile Tyr Gly Ala Ser
            180                 185                 190

Thr Leu Ala Ser Gly Val Pro Ser Arg Phe Lys Gly Ser Gly Ser Gly
        195                 200                 205

Thr Glu Tyr Thr Leu Thr Ile Asn Gly Val Gln Ala Ala Asp Ala Ala
    210                 215                 220

Thr Tyr Tyr Cys Gln Gln Gly Phe Ser Ser Asn Val Asp Asn Val
225                 230                 235                 240

Phe Gly Gly Gly Thr Glu Val Val Val Lys
                245                 250

<210> SEQ ID NO 98
<211> LENGTH: 119
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 98

Gln Gln Gln Leu Val Glu Ser Gly Gly Arg Leu Val Thr Pro Gly Thr
1               5                   10                  15

Pro Leu Thr Leu Thr Cys Thr Ala Ser Gly Ile Asp Leu Asn Ser Asn
            20                  25                  30

Ala Met Ser Trp Val Arg Gln Gly Pro Gly Lys Gly Leu Glu Trp Ile
        35                  40                  45

Gly Asp Ile Trp Ser Gly Gly Tyr Thr Asp Tyr Ala Ser Trp Ala Lys
    50                  55                  60

Gly Arg Phe Thr Ile Ser Lys Thr Ser Thr Thr Val Asp Leu Lys Met
65                  70                  75                  80

Thr Ser Leu Thr Ala Ala Asp Thr Ala Thr Tyr Phe Cys Ala Arg Asp
                85                  90                  95

Arg Leu Ala Gly Asp Gly Val Val Asp Tyr Asp Leu Trp Gly Gln Gly
            100                 105                 110

Thr Leu Val Thr Ile Ser Ser
        115
```

```
<210> SEQ ID NO 99
<211> LENGTH: 110
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 99

Glu Leu Asp Met Thr Gln Thr Pro Ala Ser Val Glu Val Ala Val Gly
1               5                   10                  15

Gly Thr Val Thr Ile Lys Cys Gln Ala Ser Gln Asn Ile Tyr Ser Asn
            20                  25                  30

Leu Ala Trp Tyr Gln Gln Lys Pro Gly Gln Arg Pro Lys Leu Leu Ile
        35                  40                  45

Tyr Gly Ala Ser Thr Leu Ala Ser Gly Val Pro Ser Arg Phe Lys Gly
    50                  55                  60

Ser Gly Ser Gly Thr Glu Tyr Thr Leu Thr Ile Asn Gly Val Gln Ala
65                  70                  75                  80

Ala Asp Ala Ala Thr Tyr Tyr Cys Gln Gln Gly Phe Ser Ser Ser Asn
                85                  90                  95

Val Asp Asn Val Phe Gly Gly Gly Thr Glu Val Val Val Lys
            100                 105                 110

<210> SEQ ID NO 100
<211> LENGTH: 6
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 100

Asn Ser Asn Ala Met Ser
1               5

<210> SEQ ID NO 101
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 101

Asp Ile Trp Ser Gly Gly Tyr Thr Asp Tyr Ala Ser Trp Ala Lys Gly
1               5                   10                  15

<210> SEQ ID NO 102
<211> LENGTH: 13
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 102

Asp Arg Leu Ala Gly Asp Gly Val Val Asp Tyr Asp Leu
1               5                   10

<210> SEQ ID NO 103
<211> LENGTH: 7
<212> TYPE: PRT
```

<213> ORGANISM: Artificial Sequence
<220> FEATURE:
<223> OTHER INFORMATION: Description of Artificial Sequence: Synthetic peptide

<400> SEQUENCE: 103

Gly Ala Ser Thr Leu Ala Ser
1               5

<210> SEQ ID NO 104
<211> LENGTH: 12
<212> TYPE: PRT
<213> ORGANISM: Artificial Sequence
<220> FEATURE:
<223> OTHER INFORMATION: Description of Artificial Sequence: Synthetic peptide

<400> SEQUENCE: 104

Gln Gln Gly Phe Ser Ser Ser Asn Val Asp Asn Val
1               5                   10

<210> SEQ ID NO 105
<211> LENGTH: 252
<212> TYPE: PRT
<213> ORGANISM: Artificial Sequence
<220> FEATURE:
<223> OTHER INFORMATION: Description of Artificial Sequence: Synthetic polypeptide

<400> SEQUENCE: 105

Gln Ser Val Glu Glu Ser Gly Gly Arg Leu Val Thr Pro Gly Thr Pro
1               5                   10                  15

Leu Thr Leu Thr Cys Thr Val Ser Gly Phe Ser Leu Ser Asn Tyr Ala
                20                  25                  30

Met Ser Trp Val Arg Gln Ala Pro Gly Lys Gly Leu Glu Tyr Ile Gly
            35                  40                  45

Ile Val Ser Ser Gly Gly Thr Thr Tyr Tyr Ala Ser Trp Ala Lys Gly
        50                  55                  60

Arg Phe Thr Ile Ser Lys Thr Ser Thr Thr Val Asp Leu Lys Ile Thr
65                  70                  75                  80

Ser Pro Thr Thr Glu Asp Thr Ala Thr Tyr Phe Cys Ala Lys Asp Leu
                85                  90                  95

Tyr Tyr Gly Pro Thr Thr Tyr Ser Ala Phe Asn Leu Trp Gly Gln Gly
            100                 105                 110

Thr Leu Val Thr Val Ser Ser Gly Gly Gly Ser Gly Gly Gly Gly
        115                 120                 125

Ser Gly Gly Gly Gly Ser Gly Gly Gly Ala Ser Glu Leu Val Leu
    130                 135                 140

Thr Gln Pro Gln Ser Val Ser Gly Ser Leu Gly Gln Thr Val Ser Ile
145                 150                 155                 160

Ser Cys Lys Arg Ala Arg Asn Asn Ile Glu Asp Tyr Tyr Val His Trp
                165                 170                 175

Tyr Gln Gln His Pro Gly Arg Ser Pro Thr Ile Val Ile His Lys Asp
            180                 185                 190

Asp Gln Arg Pro Ser Gly Val Pro Asp Arg Phe Ser Gly Ser Ile Asp
        195                 200                 205

Ser Thr Ser Asn Ser Ala Ser Leu Thr Ile Thr Gly Leu Leu Ala Glu
    210                 215                 220

Asp Glu Ala Asp Tyr Phe Cys Gln Ser Phe Asp Asn Asn Ala Asn Pro
225                 230                 235                 240

Val Phe Gly Gly Gly Thr Gln Leu Thr Val Thr Gly
                245                 250

<210> SEQ ID NO 106
<211> LENGTH: 119
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 106

Gln Ser Val Glu Glu Ser Gly Gly Arg Leu Val Thr Pro Gly Thr Pro
1               5                   10                  15

Leu Thr Leu Thr Cys Thr Val Ser Gly Phe Ser Leu Ser Asn Tyr Ala
            20                  25                  30

Met Ser Trp Val Arg Gln Ala Pro Gly Lys Gly Leu Glu Tyr Ile Gly
        35                  40                  45

Ile Val Ser Ser Gly Gly Thr Thr Tyr Tyr Ala Ser Trp Ala Lys Gly
    50                  55                  60

Arg Phe Thr Ile Ser Lys Thr Ser Thr Thr Val Asp Leu Lys Ile Thr
65                  70                  75                  80

Ser Pro Thr Thr Glu Asp Thr Ala Thr Tyr Phe Cys Ala Lys Asp Leu
                85                  90                  95

Tyr Tyr Gly Pro Thr Thr Tyr Ser Ala Phe Asn Leu Trp Gly Gln Gly
            100                 105                 110

Thr Leu Val Thr Val Ser Ser
        115

<210> SEQ ID NO 107
<211> LENGTH: 112
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 107

Glu Leu Val Leu Thr Gln Pro Gln Ser Val Ser Gly Ser Leu Gly Gln
1               5                   10                  15

Thr Val Ser Ile Ser Cys Lys Arg Ala Arg Asn Asn Ile Glu Asp Tyr
            20                  25                  30

Tyr Val His Trp Tyr Gln Gln His Pro Gly Arg Ser Pro Thr Ile Val
        35                  40                  45

Ile His Lys Asp Asp Gln Arg Pro Ser Gly Val Pro Asp Arg Phe Ser
    50                  55                  60

Gly Ser Ile Asp Ser Thr Ser Asn Ser Ala Ser Leu Thr Ile Thr Gly
65                  70                  75                  80

Leu Leu Ala Glu Asp Glu Ala Asp Tyr Phe Cys Gln Ser Phe Asp Asn
                85                  90                  95

Asn Ala Asn Pro Val Phe Gly Gly Gly Thr Gln Leu Thr Val Thr Gly
            100                 105                 110

<210> SEQ ID NO 108
<211> LENGTH: 6
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 108

Ser Asn Tyr Ala Met Ser
1               5

<210> SEQ ID NO 109
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 109

Ile Val Ser Ser Gly Gly Thr Thr Tyr Tyr Ala Ser Trp Ala Lys Gly
1               5                   10                  15

<210> SEQ ID NO 110
<211> LENGTH: 14
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 110

Asp Leu Tyr Tyr Gly Pro Thr Thr Tyr Ser Ala Phe Asn Leu
1               5                   10

<210> SEQ ID NO 111
<211> LENGTH: 13
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 111

Lys Arg Ala Arg Asn Asn Ile Glu Asp Tyr Tyr Val His
1               5                   10

<210> SEQ ID NO 112
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 112

Lys Asp Asp Gln Arg Pro Ser
1               5

<210> SEQ ID NO 113
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 113

Gln Ser Phe Asp Asn Asn Ala Asn Pro Val
1               5                   10

<210> SEQ ID NO 114
<211> LENGTH: 252

<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 114

Gln Ser Val Lys Glu Ser Gly Gly Arg Leu Val Thr Pro Gly Thr Pro
1               5                   10                  15

Leu Thr Leu Thr Cys Thr Val Ser Gly Phe Ser Leu Ser Asn Tyr Ala
            20                  25                  30

Met Ser Trp Val Arg Gln Ala Pro Gly Lys Gly Leu Glu Tyr Ile Gly
        35                  40                  45

Ile Val Ser Ser Gly Gly Thr Thr Tyr Tyr Ala Ser Trp Ala Lys Gly
50                  55                  60

Arg Phe Thr Ile Ser Lys Thr Ser Thr Thr Val Asp Leu Lys Ile Thr
65                  70                  75                  80

Ser Pro Thr Thr Glu Asp Thr Ala Thr Tyr Phe Cys Ala Lys Asp Leu
                85                  90                  95

Tyr Tyr Gly Pro Thr Thr Tyr Ser Ala Phe Asn Leu Trp Gly Gln Gly
            100                 105                 110

Thr Leu Val Thr Ile Ser Ser Gly Gly Gly Ser Gly Gly Gly
        115                 120                 125

Ser Gly Gly Gly Ser Gly Gly Gly Ala Ser Glu Leu Val Leu
    130                 135                 140

Thr Gln Pro Gln Ser Val Ser Gly Ser Leu Gly Gln Thr Val Ser Ile
145                 150                 155                 160

Ser Cys Lys Arg Ala Arg Asp Asn Ile Glu Asp Tyr Val His Trp
            165                 170                 175

Tyr Gln Gln His Pro Gly Lys Thr Pro Thr Ile Val Ile His Lys Asp
                180                 185                 190

Asp Gln Arg Pro Ser Gly Val Pro Asp Arg Phe Ser Gly Ser Ile Asp
            195                 200                 205

Ser Thr Ser Asn Ser Ala Ser Leu Thr Ile Thr Gly Leu Leu Ala Glu
    210                 215                 220

Asp Glu Ala Asp Tyr Phe Cys Gln Ser Phe Asp Asn Asp Ala Ser Pro
225                 230                 235                 240

Val Phe Gly Gly Gly Thr Gln Leu Thr Val Thr Gly
                245                 250

<210> SEQ ID NO 115
<211> LENGTH: 119
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 115

Gln Ser Val Lys Glu Ser Gly Gly Arg Leu Val Thr Pro Gly Thr Pro
1               5                   10                  15

Leu Thr Leu Thr Cys Thr Val Ser Gly Phe Ser Leu Ser Asn Tyr Ala
            20                  25                  30

Met Ser Trp Val Arg Gln Ala Pro Gly Lys Gly Leu Glu Tyr Ile Gly
        35                  40                  45

Ile Val Ser Ser Gly Gly Thr Thr Tyr Tyr Ala Ser Trp Ala Lys Gly
50                  55                  60

```
Arg Phe Thr Ile Ser Lys Thr Ser Thr Thr Val Asp Leu Lys Ile Thr
 65                  70                  75                  80

Ser Pro Thr Thr Glu Asp Thr Ala Thr Tyr Phe Cys Ala Lys Asp Leu
                 85                  90                  95

Tyr Tyr Gly Pro Thr Thr Tyr Ser Ala Phe Asn Leu Trp Gly Gln Gly
            100                 105                 110

Thr Leu Val Thr Ile Ser Ser
            115
```

<210> SEQ ID NO 116
<211> LENGTH: 112
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 116

```
Glu Leu Val Leu Thr Gln Pro Gln Ser Val Ser Gly Ser Leu Gly Gln
1               5                   10                  15

Thr Val Ser Ile Ser Cys Lys Arg Ala Arg Asp Asn Ile Glu Asp Tyr
            20                  25                  30

Tyr Val His Trp Tyr Gln Gln His Pro Gly Lys Thr Pro Thr Ile Val
        35                  40                  45

Ile His Lys Asp Asp Gln Arg Pro Ser Gly Val Pro Asp Arg Phe Ser
    50                  55                  60

Gly Ser Ile Asp Ser Thr Ser Asn Ser Ala Ser Leu Thr Ile Thr Gly
 65                  70                  75                  80

Leu Leu Ala Glu Asp Glu Ala Asp Tyr Phe Cys Gln Ser Phe Asp Asn
                 85                  90                  95

Asp Ala Ser Pro Val Phe Gly Gly Gly Thr Gln Leu Thr Val Thr Gly
            100                 105                 110
```

<210> SEQ ID NO 117
<211> LENGTH: 6
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 117

```
Ser Asn Tyr Ala Met Ser
1               5
```

<210> SEQ ID NO 118
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 118

```
Ile Val Ser Ser Gly Gly Thr Thr Tyr Tyr Ala Ser Trp Ala Lys Gly
1               5                   10                  15
```

<210> SEQ ID NO 119
<211> LENGTH: 14
<212> TYPE: PRT
<213> ORGANISM: Artificial Sequence
<220> FEATURE:
<223> OTHER INFORMATION: Description of Artificial Sequence: Synthetic -continued peptide

<400> SEQUENCE: 119

Asp Leu Tyr Tyr Gly Pro Thr Thr Tyr Ser Ala Phe Asn Leu
1               5                   10

<210> SEQ ID NO 120
<211> LENGTH: 13
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 120

Lys Arg Ala Arg Asp Asn Ile Glu Asp Tyr Tyr Val His
1               5                   10

<210> SEQ ID NO 121
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 121

Lys Asp Asp Gln Arg Pro Ser
1               5

<210> SEQ ID NO 122
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 122

Gln Ser Phe Asp Asn Asp Ala Ser Pro Val
1               5                   10

<210> SEQ ID NO 123
<211> LENGTH: 252
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 123

Gln Ser Val Lys Glu Ser Gly Gly Arg Leu Val Thr Pro Gly Thr Pro
1               5                   10                  15

Leu Thr Leu Thr Cys Thr Val Ser Gly Phe Ser Leu Ser Asn Tyr Ala
            20                  25                  30

Met Ser Trp Val Arg Gln Ala Pro Gly Lys Gly Leu Glu Tyr Ile Gly
        35                  40                  45

Ile Val Ser Ser Gly Gly Thr Thr Tyr Ala Ser Trp Ala Lys Gly
    50                  55                  60

Arg Phe Thr Ile Ser Lys Thr Ser Thr Thr Val Asp Leu Lys Ile Thr
65                  70                  75                  80

Ser Pro Thr Thr Glu Asp Thr Ala Thr Tyr Phe Cys Ala Lys Asp Leu
                85                  90                  95

Tyr Tyr Gly Pro Thr Thr Tyr Ser Ala Phe Asn Leu Trp Gly Gln Gly

```
                    100                 105                 110
Thr Leu Val Thr Ile Ser Ser Gly Gly Gly Ser Gly Gly Gly
            115                 120                 125

Ser Gly Gly Gly Ser Gly Gly Gly Ala Ser Glu Leu Val Leu
        130                 135                 140

Thr Gln Pro Gln Ser Val Ser Gly Ser Leu Gly Gln Thr Val Ser Ile
145                 150                 155                 160

Ser Cys Lys Arg Ala Arg Asp Asn Ile Glu Asp Tyr Tyr Val His Trp
                165                 170                 175

Tyr Gln Gln Tyr Pro Gly Lys Thr Pro Thr Ile Val Ile Tyr Lys Asp
                180                 185                 190

Asp Gln Arg Pro Ser Gly Val Pro Asp Arg Phe Ser Gly Ser Ile Asp
                195                 200                 205

Ser Thr Ser Asn Ser Ala Ser Leu Thr Ile Thr Gly Leu Leu Ala Glu
                210                 215                 220

Asp Glu Ala Asp Tyr Phe Cys Gln Ser Phe Asp Asn Asn Ala Asn Val
225                 230                 235                 240

Val Phe Gly Gly Gly Thr Gln Leu Thr Val Thr Gly
                245                 250

<210> SEQ ID NO 124
<211> LENGTH: 119
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 124

Gln Ser Val Lys Glu Ser Gly Gly Arg Leu Val Thr Pro Gly Thr Pro
1               5                   10                  15

Leu Thr Leu Thr Cys Thr Val Ser Gly Phe Ser Leu Ser Asn Tyr Ala
            20                  25                  30

Met Ser Trp Val Arg Gln Ala Pro Gly Lys Gly Leu Glu Tyr Ile Gly
        35                  40                  45

Ile Val Ser Ser Gly Gly Thr Thr Tyr Tyr Ala Ser Trp Ala Lys Gly
    50                  55                  60

Arg Phe Thr Ile Ser Lys Thr Ser Thr Thr Val Asp Leu Lys Ile Thr
65                  70                  75                  80

Ser Pro Thr Thr Glu Asp Thr Ala Thr Tyr Phe Cys Ala Lys Asp Leu
                85                  90                  95

Tyr Tyr Gly Pro Thr Thr Tyr Ser Ala Phe Asn Leu Trp Gly Gln Gly
            100                 105                 110

Thr Leu Val Thr Ile Ser Ser
        115

<210> SEQ ID NO 125
<211> LENGTH: 112
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 125

Glu Leu Val Leu Thr Gln Pro Gln Ser Val Ser Gly Ser Leu Gly Gln
1               5                   10                  15

Thr Val Ser Ile Ser Cys Lys Arg Ala Arg Asp Asn Ile Glu Asp Tyr
```

```
            20                  25                  30
Tyr Val His Trp Tyr Gln Gln Tyr Pro Gly Lys Thr Pro Thr Ile Val
                35                  40                  45
Ile Tyr Lys Asp Asp Gln Arg Pro Ser Gly Val Pro Asp Arg Phe Ser
            50                  55                  60
Gly Ser Ile Asp Ser Thr Ser Asn Ser Ala Ser Leu Thr Ile Thr Gly
65                  70                  75                  80
Leu Leu Ala Glu Asp Glu Ala Asp Tyr Phe Cys Gln Ser Phe Asp Asn
                85                  90                  95
Asn Ala Asn Val Val Phe Gly Gly Gly Thr Gln Leu Thr Val Thr Gly
            100                 105                 110
```

<210> SEQ ID NO 126
<211> LENGTH: 6
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 126

```
Ser Asn Tyr Ala Met Ser
1               5
```

<210> SEQ ID NO 127
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 127

```
Ile Val Ser Ser Gly Gly Thr Thr Tyr Tyr Ala Ser Trp Ala Lys Gly
1               5                   10                  15
```

<210> SEQ ID NO 128
<211> LENGTH: 14
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 128

```
Asp Leu Tyr Tyr Gly Pro Thr Thr Tyr Ser Ala Phe Asn Leu
1               5                   10
```

<210> SEQ ID NO 129
<211> LENGTH: 13
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 129

```
Lys Arg Ala Arg Asp Asn Ile Glu Asp Tyr Tyr Val His
1               5                   10
```

<210> SEQ ID NO 130
<211> LENGTH: 7
<212> TYPE: PRT
<213> ORGANISM: Artificial Sequence
<220> FEATURE:

<223> OTHER INFORMATION: Description of Artificial Sequence: Synthetic
    peptide

<400> SEQUENCE: 130

Lys Asp Asp Gln Arg Pro Ser
1               5

<210> SEQ ID NO 131
<211> LENGTH: 10
<212> TYPE: PRT
<213> ORGANISM: Artificial Sequence
<220> FEATURE:
<223> OTHER INFORMATION: Description of Artificial Sequence: Synthetic
    peptide

<400> SEQUENCE: 131

Gln Ser Phe Asp Asn Asn Ala Asn Val Val
1               5                   10

<210> SEQ ID NO 132
<211> LENGTH: 250
<212> TYPE: PRT
<213> ORGANISM: Artificial Sequence
<220> FEATURE:
<223> OTHER INFORMATION: Description of Artificial Sequence: Synthetic
    polypeptide

<400> SEQUENCE: 132

Gln Ser Val Lys Glu Ser Gly Gly Arg Leu Val Thr Pro Gly Thr Pro
1               5                   10                  15

Leu Thr Leu Thr Cys Thr Val Ser Gly Phe Ser Leu Ser Asn Tyr Ala
            20                  25                  30

Met Ser Trp Val Arg Gln Ala Pro Gly Lys Gly Leu Glu Tyr Ile Gly
        35                  40                  45

Ile Val Ser Ser Gly Gly Thr Thr Tyr Tyr Ala Ser Trp Ala Lys Gly
    50                  55                  60

Arg Phe Thr Ile Ser Lys Thr Ser Thr Thr Val Asp Leu Lys Ile Thr
65                  70                  75                  80

Ser Pro Thr Thr Glu Asp Thr Ala Thr Tyr Phe Cys Ala Lys Asp Leu
                85                  90                  95

Tyr Tyr Gly Pro Thr Thr Tyr Ser Ala Phe Asn Leu Trp Gly Gln Gly
            100                 105                 110

Thr Leu Val Thr Ile Ser Ser Gly Gly Gly Ser Gly Gly Gly Gly
        115                 120                 125

Ser Gly Gly Gly Ser Gly Gly Gly Ala Ser Glu Leu Val Leu
    130                 135                 140

Thr Gln Pro Ala Ser Val Gln Val Asn Leu Gly Gln Thr Val Ser Leu
145                 150                 155                 160

Thr Cys Thr Ala Asp Thr Leu Ser Arg Ser Tyr Ala Ser Trp Tyr Gln
                165                 170                 175

Leu Lys Pro Gly Gln Ala Pro Val Leu Leu Ile Tyr Arg Asp Thr Ser
            180                 185                 190

Arg Pro Ser Gly Val Pro Asp Arg Phe Ser Gly Ser Ser Ser Gly Asn
        195                 200                 205

Thr Ala Thr Leu Thr Ile Ser Gly Ala Gln Ala Gly Asp Glu Gly Asp
    210                 215                 220

Tyr Val Cys Ala Thr Ser Asp Gly Ser Gly Ser Asn Phe Gln Leu Phe
225                 230                 235                 240

Gly Gly Gly Thr Gln Leu Thr Val Thr Gly
            245                 250

245 250

<210> SEQ ID NO 133
<211> LENGTH: 119
<212> TYPE: PRT
<213> ORGANISM: Artificial Sequence
<220> FEATURE:
<223> OTHER INFORMATION: Description of Artificial Sequence: Synthetic
    polypeptide

<400> SEQUENCE: 133

Gln Ser Val Lys Glu Ser Gly Gly Arg Leu Val Thr Pro Gly Thr Pro
1               5                   10                  15

Leu Thr Leu Thr Cys Thr Val Ser Gly Phe Ser Leu Ser Asn Tyr Ala
            20                  25                  30

Met Ser Trp Val Arg Gln Ala Pro Gly Lys Gly Leu Glu Tyr Ile Gly
        35                  40                  45

Ile Val Ser Ser Gly Gly Thr Thr Tyr Tyr Ala Ser Trp Ala Lys Gly
    50                  55                  60

Arg Phe Thr Ile Ser Lys Thr Ser Thr Thr Val Asp Leu Lys Ile Thr
65                  70                  75                  80

Ser Pro Thr Thr Glu Asp Thr Ala Thr Tyr Phe Cys Ala Lys Asp Leu
                85                  90                  95

Tyr Tyr Gly Pro Thr Thr Tyr Ser Ala Phe Asn Leu Trp Gly Gln Gly
            100                 105                 110

Thr Leu Val Thr Ile Ser Ser
        115

<210> SEQ ID NO 134
<211> LENGTH: 110
<212> TYPE: PRT
<213> ORGANISM: Artificial Sequence
<220> FEATURE:
<223> OTHER INFORMATION: Description of Artificial Sequence: Synthetic
    polypeptide

<400> SEQUENCE: 134

Glu Leu Val Leu Thr Gln Pro Ala Ser Val Gln Val Asn Leu Gly Gln
1               5                   10                  15

Thr Val Ser Leu Thr Cys Thr Ala Asp Thr Leu Ser Arg Ser Tyr Ala
            20                  25                  30

Ser Trp Tyr Gln Leu Lys Pro Gly Gln Ala Pro Val Leu Leu Ile Tyr
        35                  40                  45

Arg Asp Thr Ser Arg Pro Ser Gly Val Pro Asp Arg Phe Ser Gly Ser
    50                  55                  60

Ser Ser Gly Asn Thr Ala Thr Leu Thr Ile Ser Gly Ala Gln Ala Gly
65                  70                  75                  80

Asp Glu Gly Asp Tyr Val Cys Ala Thr Ser Asp Gly Ser Gly Ser Asn
                85                  90                  95

Phe Gln Leu Phe Gly Gly Gly Thr Gln Leu Thr Val Thr Gly
            100                 105                 110

<210> SEQ ID NO 135
<211> LENGTH: 6
<212> TYPE: PRT
<213> ORGANISM: Artificial Sequence
<220> FEATURE:
<223> OTHER INFORMATION: Description of Artificial Sequence: Synthetic
    peptide

<400> SEQUENCE: 135

```
Ser Asn Tyr Ala Met Ser
1               5
```

<210> SEQ ID NO 136
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 136

```
Ile Val Ser Ser Gly Gly Thr Thr Tyr Tyr Ala Ser Trp Ala Lys Gly
1               5                   10                  15
```

<210> SEQ ID NO 137
<211> LENGTH: 14
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 137

```
Asp Leu Tyr Tyr Gly Pro Thr Thr Tyr Ser Ala Phe Asn Leu
1               5                   10
```

<210> SEQ ID NO 138
<211> LENGTH: 11
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 138

```
Thr Ala Asp Thr Leu Ser Arg Ser Tyr Ala Ser
1               5                   10
```

<210> SEQ ID NO 139
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 139

```
Arg Asp Thr Ser Arg Pro Ser
1               5
```

<210> SEQ ID NO 140
<211> LENGTH: 12
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 140

```
Ala Thr Ser Asp Gly Ser Gly Ser Asn Phe Gln Leu
1               5                   10
```

<210> SEQ ID NO 141
<211> LENGTH: 252
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 141

Pro Glu Gln Leu Met Glu Ser Gly Gly Gly Leu Val Thr Pro Gly Gly
1               5                   10                  15

Val Leu Thr Leu Thr Cys Thr Ala Ser Gly Phe Ser Phe Ser Ser Tyr
            20                  25                  30

Gly Val Asn Trp Val Arg Gln Ala Pro Gly Lys Gly Leu Glu Trp Ile
        35                  40                  45

Gly Phe Ile Phe Gly Asp Gly Thr Thr Tyr Tyr Ala Asn Trp Ala Lys
    50                  55                  60

Gly Arg Phe Thr Ile Ser Lys Thr Ser Thr Thr Val Asp Leu Lys Met
65                  70                  75                  80

Thr Ser Pro Thr Thr Glu Asp Thr Ala Thr Tyr Phe Cys Ala Arg Asp
                85                  90                  95

Gly Tyr Gly Gly Tyr Asp Tyr Ile Ile Asn Leu Trp Gly Gln Gly Thr
            100                 105                 110

Leu Val Thr Val Ser Ser Gly Gly Gly Gly Ser Gly Gly Gly Gly Ser
        115                 120                 125

Gly Gly Gly Gly Ser Gly Gly Gly Ala Ser Ala Gln Val Leu Thr
    130                 135                 140

Gln Thr Pro Ala Ser Val Ser Ala Ala Val Gly Gly Thr Val Ser Ile
145                 150                 155                 160

Ser Cys Gln Ser Ser Gln Ser Val Val Asn Asn Asn Trp Leu Ala Trp
                165                 170                 175

Tyr Gln Gln Lys Pro Gly Gln Pro Pro Lys Leu Leu Ile Tyr Lys Ala
            180                 185                 190

Ser Thr Leu Glu Ser Gly Val Pro Ser Arg Phe Lys Gly Ser Gly Ser
        195                 200                 205

Gly Thr Gln Phe Thr Leu Thr Ile Ser Gly Val Gln Ala Asp Asp Ala
    210                 215                 220

Ala Thr Tyr Tyr Cys Leu Gly Glu Phe Ser Cys Ser Ser Ala Asp Cys
225                 230                 235                 240

His Ala Phe Gly Gly Gly Thr Glu Leu Glu Ile Leu
                245                 250

<210> SEQ ID NO 142
<211> LENGTH: 118
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 142

Pro Glu Gln Leu Met Glu Ser Gly Gly Gly Leu Val Thr Pro Gly Gly
1               5                   10                  15

Val Leu Thr Leu Thr Cys Thr Ala Ser Gly Phe Ser Phe Ser Ser Tyr
            20                  25                  30

Gly Val Asn Trp Val Arg Gln Ala Pro Gly Lys Gly Leu Glu Trp Ile
        35                  40                  45

Gly Phe Ile Phe Gly Asp Gly Thr Thr Tyr Tyr Ala Asn Trp Ala Lys
    50                  55                  60

Gly Arg Phe Thr Ile Ser Lys Thr Ser Thr Thr Val Asp Leu Lys Met
65                  70                  75                  80

```
Thr Ser Pro Thr Thr Glu Asp Thr Ala Thr Tyr Phe Cys Ala Arg Asp
                85                  90                  95

Gly Tyr Gly Gly Tyr Asp Tyr Ile Ile Asn Leu Trp Gly Gln Gly Thr
            100                 105                 110

Leu Val Thr Val Ser Ser
        115

<210> SEQ ID NO 143
<211> LENGTH: 113
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 143

Ala Gln Val Leu Thr Gln Thr Pro Ala Ser Val Ser Ala Ala Val Gly
1               5                  10                  15

Gly Thr Val Ser Ile Ser Cys Gln Ser Ser Gln Ser Val Val Asn Asn
            20                  25                  30

Asn Trp Leu Ala Trp Tyr Gln Gln Lys Pro Gly Gln Pro Pro Lys Leu
        35                  40                  45

Leu Ile Tyr Lys Ala Ser Thr Leu Glu Ser Gly Val Pro Ser Arg Phe
    50                  55                  60

Lys Gly Ser Gly Ser Gly Thr Gln Phe Thr Leu Thr Ile Ser Gly Val
65                  70                  75                  80

Gln Ala Asp Asp Ala Ala Thr Tyr Tyr Cys Leu Gly Glu Phe Ser Cys
                85                  90                  95

Ser Ser Ala Asp Cys His Ala Phe Gly Gly Gly Thr Glu Leu Glu Ile
            100                 105                 110

Leu

<210> SEQ ID NO 144
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 144

Ser Tyr Gly Val Asn
1               5

<210> SEQ ID NO 145
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 145

Phe Ile Phe Gly Asp Gly Thr Thr Tyr Tyr Ala Asn Trp Ala Lys Gly
1               5                  10                  15

<210> SEQ ID NO 146
<211> LENGTH: 12
<212> TYPE: PRT
<213> ORGANISM: Artificial Sequence
<220> FEATURE:
<223> OTHER INFORMATION: Description of Artificial Sequence: Synthetic
```

```
                          peptide

<400> SEQUENCE: 146

Asp Gly Tyr Gly Gly Tyr Asp Tyr Ile Ile Asn Leu
1               5                   10

<210> SEQ ID NO 147
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 147

Gln Ser Ser Gln Ser Val Val Asn Asn Asn
1               5                   10

<210> SEQ ID NO 148
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 148

Lys Ala Ser Thr Leu Glu Ser
1               5

<210> SEQ ID NO 149
<211> LENGTH: 13
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 149

Leu Gly Glu Phe Ser Cys Ser Ser Ala Asp Cys His Ala
1               5                   10

<210> SEQ ID NO 150
<211> LENGTH: 251
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 150

Pro Glu Gln Leu Met Glu Ser Gly Gly Gly Leu Val Thr Pro Gly Gly
1               5                   10                  15

Val Leu Thr Leu Thr Cys Thr Ala Ser Gly Phe Ser Phe Ser Ser Tyr
            20                  25                  30

Gly Val Asn Trp Val Arg Gln Ala Pro Gly Lys Gly Leu Glu Trp Ile
        35                  40                  45

Gly Phe Ile Phe Gly Asp Gly Thr Thr Tyr Tyr Ala Asn Trp Ala Lys
    50                  55                  60

Gly Arg Phe Thr Ile Ser Lys Thr Ser Thr Thr Val Asp Leu Lys Met
65                  70                  75                  80

Thr Ser Pro Thr Thr Glu Asp Thr Ala Thr Tyr Phe Cys Ala Arg Asp
                85                  90                  95

Gly Tyr Gly Gly Tyr Asp Tyr Ile Ile Asn Leu Trp Gly Gln Gly Thr
```

```
                    100                 105                 110
Leu Val Thr Val Ser Gly Gly Gly Ser Gly Gly Gly Gly Ser
            115                 120                 125

Gly Gly Gly Gly Ser Gly Gly Gly Ala Ser Ala Gln Val Leu Thr
            130                 135                 140

Gln Thr Pro Ala Ser Val Ser Ala Ala Val Gly Gly Thr Val Ser Ile
145                 150                 155                 160

Ser Cys Gln Ser Ser Gln Ser Val Val Asn Asn Asn Trp Leu Ala Trp
                    165                 170                 175

Tyr Gln Gln Lys Pro Gly Gln Pro Pro Lys Leu Leu Ile Tyr Lys Ala
                    180                 185                 190

Ser Thr Leu Glu Ser Gly Val Pro Ser Arg Phe Lys Gly Ser Gly Ser
            195                 200                 205

Gly Thr Gln Phe Thr Leu Thr Ile Ser Gly Val Gln Ala Asp Asp Ala
            210                 215                 220

Ala Thr Tyr Tyr Cys Gln Gly Ala Tyr Ser Gly Asn Ile Tyr Tyr Asn
225                 230                 235                 240

Ala Phe Gly Gly Gly Thr Glu Val Val Val Lys
            245                 250

<210> SEQ ID NO 151
<211> LENGTH: 118
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 151

Pro Glu Gln Leu Met Glu Ser Gly Gly Gly Leu Val Thr Pro Gly Gly
1               5                   10                  15

Val Leu Thr Leu Thr Cys Thr Ala Ser Gly Phe Ser Phe Ser Ser Tyr
            20                  25                  30

Gly Val Asn Trp Val Arg Gln Ala Pro Gly Lys Gly Leu Glu Trp Ile
        35                  40                  45

Gly Phe Ile Phe Gly Asp Gly Thr Thr Tyr Tyr Ala Asn Trp Ala Lys
    50                  55                  60

Gly Arg Phe Thr Ile Ser Lys Thr Ser Thr Thr Val Asp Leu Lys Met
65                  70                  75                  80

Thr Ser Pro Thr Thr Glu Asp Thr Ala Thr Tyr Phe Cys Ala Arg Asp
                85                  90                  95

Gly Tyr Gly Gly Tyr Asp Tyr Ile Ile Asn Leu Trp Gly Gln Gly Thr
            100                 105                 110

Leu Val Thr Val Ser Ser
        115

<210> SEQ ID NO 152
<211> LENGTH: 112
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 152

Ala Gln Val Leu Thr Gln Thr Pro Ala Ser Val Ser Ala Ala Val Gly
1               5                   10                  15

Gly Thr Val Ser Ile Ser Cys Gln Ser Ser Gln Ser Val Val Asn Asn
```

```
                    20                  25                  30

Asn Trp Leu Ala Trp Tyr Gln Gln Lys Pro Gly Gln Pro Pro Lys Leu
         35                  40                  45

Leu Ile Tyr Lys Ala Ser Thr Leu Glu Ser Gly Val Pro Ser Arg Phe
         50                  55                  60

Lys Gly Ser Gly Ser Gly Thr Gln Phe Thr Leu Thr Ile Ser Gly Val
 65                  70                  75                  80

Gln Ala Asp Asp Ala Ala Thr Tyr Tyr Cys Gln Gly Ala Tyr Ser Gly
                     85                  90                  95

Asn Ile Tyr Tyr Asn Ala Phe Gly Gly Gly Thr Glu Val Val Val Lys
            100                 105                 110

<210> SEQ ID NO 153
<211> LENGTH: 6
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 153

Ser Ser Tyr Gly Val Asn
 1               5

<210> SEQ ID NO 154
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 154

Phe Ile Phe Gly Asp Gly Thr Thr Tyr Tyr Ala Asn Trp Ala Lys Gly
 1               5                   10                  15

<210> SEQ ID NO 155
<211> LENGTH: 12
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 155

Asp Gly Tyr Gly Gly Tyr Asp Tyr Ile Ile Asn Leu
 1               5                   10

<210> SEQ ID NO 156
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 156

Gln Ser Ser Gln Ser Val Val Asn Asn Asn
 1               5                   10

<210> SEQ ID NO 157
<211> LENGTH: 7
<212> TYPE: PRT
<213> ORGANISM: Artificial Sequence
<220> FEATURE:
```

<223> OTHER INFORMATION: Description of Artificial Sequence: Synthetic
      peptide

<400> SEQUENCE: 157

Lys Ala Ser Thr Leu Glu Ser
1               5

<210> SEQ ID NO 158
<211> LENGTH: 12
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 158

Gln Gly Ala Tyr Ser Gly Asn Ile Tyr Tyr Asn Ala
1               5                   10

<210> SEQ ID NO 159
<211> LENGTH: 245
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 159

Gln Ser Val Lys Glu Ser Gly Gly Gly Leu Val Thr Pro Gly Thr Pro
1               5                   10                  15

Leu Thr Leu Thr Cys Thr Val Ser Gly Phe Ser Leu Ser Thr Tyr Ala
            20                  25                  30

Ile Ser Trp Val Arg Gln Ala Pro Gly Lys Gly Leu Glu Trp Ile Gly
        35                  40                  45

Phe Ile Asp Thr Val Asp Ser Ala Tyr Tyr Ala Ser Trp Ala Lys Gly
    50                  55                  60

Arg Phe Thr Ile Ser Lys Thr Ser Ser Thr Thr Val Asp Leu Lys Met
65                  70                  75                  80

Thr Ser Pro Thr Thr Glu Asp Thr Ala Thr Tyr Phe Cys Ala Lys Leu
                85                  90                  95

Arg Tyr Gly Asp Tyr Gly Asp Tyr Thr Leu Trp Gly Gln Gly Thr Leu
            100                 105                 110

Val Thr Val Ser Ser Gly Gly Gly Gly Ser Gly Gly Gly Gly Ser Gly
        115                 120                 125

Gly Gly Ser Gly Gly Gly Gly Ala Ser Glu Leu Val Met Thr Gln
    130                 135                 140

Thr Pro Ser Pro Val Ser Gly Ala Val Gly Thr Val Thr Ile Lys
145                 150                 155                 160

Cys Gln Ala Ser Gln Asn Ile Tyr Ser Tyr Leu Ala Trp Tyr Gln Gln
                165                 170                 175

Lys Pro Gly Gln Pro Pro Lys Leu Leu Ile Tyr Lys Ala Ser Thr Leu
            180                 185                 190

Ala Ser Gly Val Pro Ser Arg Val Lys Gly Ser Gly Ser Gly Thr Glu
        195                 200                 205

Tyr Thr Leu Thr Ile Ser Gly Val Gln Ala Ala Asp Ala Ala Thr Tyr
    210                 215                 220

Tyr Cys Gln Cys Thr Tyr Tyr Asp Ser Asn Thr Phe Gly Gly Gly Thr
225                 230                 235                 240

Glu Val Val Val Lys
            245

<210> SEQ ID NO 160
<211> LENGTH: 117
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 160

Gln Ser Val Lys Glu Ser Gly Gly Gly Leu Val Thr Pro Gly Thr Pro
1               5                   10                  15

Leu Thr Leu Thr Cys Thr Val Ser Gly Phe Ser Leu Ser Thr Tyr Ala
            20                  25                  30

Ile Ser Trp Val Arg Gln Ala Pro Gly Lys Gly Leu Glu Trp Ile Gly
        35                  40                  45

Phe Ile Asp Thr Val Asp Ser Ala Tyr Tyr Ala Ser Trp Ala Lys Gly
    50                  55                  60

Arg Phe Thr Ile Ser Lys Thr Ser Ser Thr Thr Val Asp Leu Lys Met
65                  70                  75                  80

Thr Ser Pro Thr Thr Glu Asp Thr Ala Thr Tyr Phe Cys Ala Lys Leu
                85                  90                  95

Arg Tyr Gly Asp Tyr Gly Asp Tyr Thr Leu Trp Gly Gln Gly Thr Leu
            100                 105                 110

Val Thr Val Ser Ser
        115

<210> SEQ ID NO 161
<211> LENGTH: 107
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 161

Glu Leu Val Met Thr Gln Thr Pro Ser Pro Val Ser Ala Val Gly
1               5                   10                  15

Gly Thr Val Thr Ile Lys Cys Gln Ala Ser Gln Asn Ile Tyr Ser Tyr
            20                  25                  30

Leu Ala Trp Tyr Gln Gln Lys Pro Gly Gln Pro Lys Leu Leu Ile
        35                  40                  45

Tyr Lys Ala Ser Thr Leu Ala Ser Gly Val Pro Ser Arg Val Lys Gly
    50                  55                  60

Ser Gly Ser Gly Thr Glu Tyr Thr Leu Thr Ile Ser Gly Val Gln Ala
65                  70                  75                  80

Ala Asp Ala Ala Thr Tyr Tyr Cys Gln Cys Thr Tyr Tyr Asp Ser Asn
                85                  90                  95

Thr Phe Gly Gly Gly Thr Glu Val Val Val Lys
            100                 105

<210> SEQ ID NO 162
<211> LENGTH: 6
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 162

Ser Thr Tyr Ala Ile Ser
1               5

<210> SEQ ID NO 163
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 163

Phe Ile Asp Thr Val Asp Ser Ala Tyr Tyr Ala Ser Trp Ala Lys Gly
1               5                   10                  15

<210> SEQ ID NO 164
<211> LENGTH: 11
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 164

Leu Arg Tyr Gly Asp Tyr Gly Asp Tyr Thr Leu
1               5                   10

<210> SEQ ID NO 165
<211> LENGTH: 11
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 165

Gln Ala Ser Gln Asn Ile Tyr Ser Tyr Leu Ala
1               5                   10

<210> SEQ ID NO 166
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 166

Lys Ala Ser Thr Leu Ala Ser
1               5

<210> SEQ ID NO 167
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 167

Gln Cys Thr Tyr Tyr Asp Ser Asn Thr
1               5

<210> SEQ ID NO 168
<211> LENGTH: 249
<212> TYPE: PRT
<213> ORGANISM: Artificial Sequence

```
<220> FEATURE:
<223> OTHER INFORMATION: Description of Artificial Sequence: Synthetic
      polypeptide

<400> SEQUENCE: 168

Pro Ala Ala Leu Met Glu Ser Gly Gly Arg Leu Val Thr Pro Gly Thr
1               5                   10                  15

Pro Leu Thr Leu Thr Cys Thr Val Ser Gly Ile Asp Leu Ser Thr Phe
                20                  25                  30

Ala Met Thr Trp Val Arg Gln Ala Pro Gly Lys Gly Leu Glu Trp Leu
            35                  40                  45

Gly Ile Ile Asn Thr Gly Gly Ser Ala Tyr Tyr Thr Ser Trp Ala Lys
        50                  55                  60

Gly Arg Phe Thr Ile Ser Arg Thr Ser Thr Thr Val Asp Leu Lys Ile
65                  70                  75                  80

Thr Ser Pro Thr Thr Glu Asp Thr Ala Thr Tyr Phe Cys Ala Arg Gly
                85                  90                  95

Asp Trp Ser Ser Ala Thr Asp Leu Trp Gly Gln Gly Thr Leu Val Thr
            100                 105                 110

Ile Ser Ser Gly Gly Gly Gly Ser Gly Gly Gly Ser Gly Gly Gly
        115                 120                 125

Gly Ser Gly Gly Gly Ala Ser Asp Pro Asp Met Thr Gln Thr Pro
    130                 135                 140

Ser Ser Val Ser Ala Ala Val Gly Gly Thr Val Thr Ile Asn Cys Gln
145                 150                 155                 160

Ala Ser Gln Ser Val Tyr Asp Asn Lys Val Leu Ala Trp Tyr Arg Gln
                165                 170                 175

Lys Pro Gly Gln Pro Pro Lys Leu Leu Ile Tyr Lys Ala Ser Thr Leu
            180                 185                 190

Ala Ser Gly Val Pro Ser Arg Phe Lys Gly Arg Gly Ser Gly Thr Gln
        195                 200                 205

Phe Thr Leu Thr Ile Ser Gly Val Gln Ala Asp Asp Ala Ala Thr Tyr
    210                 215                 220

Tyr Cys Leu Gly Glu Phe Ser Cys Ser Ser Ala Asp Cys His Ala Phe
225                 230                 235                 240

Gly Gly Gly Thr Glu Leu Glu Ile Leu
                245

<210> SEQ ID NO 169
<211> LENGTH: 115
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 169

Pro Ala Ala Leu Met Glu Ser Gly Gly Arg Leu Val Thr Pro Gly Thr
1               5                   10                  15

Pro Leu Thr Leu Thr Cys Thr Val Ser Gly Ile Asp Leu Ser Thr Phe
                20                  25                  30

Ala Met Thr Trp Val Arg Gln Ala Pro Gly Lys Gly Leu Glu Trp Leu
            35                  40                  45

Gly Ile Ile Asn Thr Gly Gly Ser Ala Tyr Tyr Thr Ser Trp Ala Lys
        50                  55                  60

Gly Arg Phe Thr Ile Ser Arg Thr Ser Thr Thr Val Asp Leu Lys Ile
65                  70                  75                  80
```

```
Thr Ser Pro Thr Thr Glu Asp Thr Ala Thr Tyr Phe Cys Ala Arg Gly
                85                  90                  95

Asp Trp Ser Ser Ala Thr Asp Leu Trp Gly Gln Gly Thr Leu Val Thr
            100                 105                 110

Ile Ser Ser
        115

<210> SEQ ID NO 170
<211> LENGTH: 113
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 170

Asp Pro Asp Met Thr Gln Thr Pro Ser Ser Val Ser Ala Ala Val Gly
1               5                   10                  15

Gly Thr Val Thr Ile Asn Cys Gln Ala Ser Gln Ser Val Tyr Asp Asn
            20                  25                  30

Lys Val Leu Ala Trp Tyr Arg Gln Lys Pro Gly Gln Pro Pro Lys Leu
        35                  40                  45

Leu Ile Tyr Lys Ala Ser Thr Leu Ala Ser Gly Val Pro Ser Arg Phe
    50                  55                  60

Lys Gly Arg Gly Ser Gly Thr Gln Phe Thr Leu Thr Ile Ser Gly Val
65                  70                  75                  80

Gln Ala Asp Asp Ala Ala Thr Tyr Tyr Cys Leu Gly Glu Phe Ser Cys
                85                  90                  95

Ser Ser Ala Asp Cys His Ala Phe Gly Gly Gly Thr Glu Leu Glu Ile
            100                 105                 110

Leu

<210> SEQ ID NO 171
<211> LENGTH: 6
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 171

Ser Thr Phe Ala Met Thr
1               5

<210> SEQ ID NO 172
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 172

Ile Ile Asn Thr Gly Gly Ser Ala Tyr Tyr Thr Ser Trp Ala Lys Gly
1               5                   10                  15

<210> SEQ ID NO 173
<211> LENGTH: 9
<212> TYPE: PRT
<213> ORGANISM: Artificial Sequence
<220> FEATURE:
<223> OTHER INFORMATION: Description of Artificial Sequence: Synthetic
``` peptide

<400> SEQUENCE: 173

Gly Asp Trp Ser Ser Ala Thr Asp Leu
1               5

<210> SEQ ID NO 174
<211> LENGTH: 13
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 174

Gln Ala Ser Gln Ser Val Tyr Asp Asn Lys Val Leu Ala
1               5                   10

<210> SEQ ID NO 175
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 175

Lys Ala Ser Thr Leu Ala Ser
1               5

<210> SEQ ID NO 176
<211> LENGTH: 13
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 176

Leu Gly Glu Phe Ser Cys Ser Ser Ala Asp Cys His Ala
1               5                   10

<210> SEQ ID NO 177
<211> LENGTH: 249
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 177

Gln Ser Val Lys Glu Ser Gly Gly Arg Leu Val Thr Pro Gly Thr Pro
1               5                   10                  15

Leu Thr Leu Thr Cys Thr Ala Ser Gly Phe Thr Ile Ser Ser Ser Ala
                20                  25                  30

Ile Ser Trp Val Arg Gln Ala Pro Gly Lys Gly Leu Glu Tyr Ile Gly
            35                  40                  45

Ile Ile Arg Ser Gly Gly Thr Thr Asp Tyr Ala Ser Trp Ala Lys Gly
        50                  55                  60

Arg Phe Ala Ile Ser Lys Thr Ser Thr Thr Val Asp Leu Lys Ile Thr
65                  70                  75                  80

Ser Pro Thr Thr Glu Asp Thr Ala Thr Tyr Phe Cys Ala Arg Asp Pro
                85                  90                  95

Pro Tyr Ile Thr Ser Thr Tyr Phe Asp Leu Trp Gly Gln Gly Thr Leu

```
                100             105             110
Val Thr Val Ser Ser Gly Gly Gly Ser Gly Gly Gly Ser Gly
        115             120             125

Gly Gly Gly Ser Gly Gly Gly Ala Ser Glu Leu Val Leu Thr Gln
        130             135             140

Pro Gln Ser Val Ser Gly Ser Leu Gly Gln Thr Val Ser Ile Ser Cys
145             150             155             160

Lys Arg Ala Arg Asp Ser Val Glu Ser Tyr Asp Val His Trp Tyr Gln
                165             170             175

Gln His Pro Gly Lys Thr Pro Thr Ile Val Ile Tyr Lys Asp Asp Gln
                180             185             190

Arg Pro Ser Gly Val Pro Asp Arg Phe Ser Gly Ser Ile Asp Ser Thr
                195             200             205

Ser Asn Ser Ala Ser Leu Thr Ile Thr Gly Leu Leu Ala Glu Asp Glu
                210             215             220

Ala Asp Tyr Phe Cys Gln Ser Phe Asp Gly Asp Ala Val Val Phe Gly
225             230             235             240

Gly Gly Thr Gln Leu Thr Val Thr Gly
                245

<210> SEQ ID NO 178
<211> LENGTH: 117
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 178

Gln Ser Val Lys Glu Ser Gly Gly Arg Leu Val Thr Pro Gly Thr Pro
1               5               10              15

Leu Thr Leu Thr Cys Thr Ala Ser Gly Phe Thr Ile Ser Ser Ser Ala
                20              25              30

Ile Ser Trp Val Arg Gln Ala Pro Gly Lys Gly Leu Glu Tyr Ile Gly
                35              40              45

Ile Ile Arg Ser Gly Gly Thr Thr Asp Tyr Ala Ser Trp Ala Lys Gly
        50              55              60

Arg Phe Ala Ile Ser Lys Thr Ser Thr Thr Val Asp Leu Lys Ile Thr
65              70              75              80

Ser Pro Thr Thr Glu Asp Thr Ala Thr Tyr Phe Cys Ala Arg Asp Pro
                85              90              95

Pro Tyr Ile Thr Ser Thr Tyr Phe Asp Leu Trp Gly Gln Gly Thr Leu
                100             105             110

Val Thr Val Ser Ser
        115

<210> SEQ ID NO 179
<211> LENGTH: 111
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 179

Glu Leu Val Leu Thr Gln Pro Gln Ser Val Ser Gly Ser Leu Gly Gln
1               5               10              15

Thr Val Ser Ile Ser Cys Lys Arg Ala Arg Asp Ser Val Glu Ser Tyr
```

```
                    20                  25                  30
Asp Val His Trp Tyr Gln Gln His Pro Gly Lys Thr Pro Thr Ile Val
            35                  40                  45
Ile Tyr Lys Asp Asp Gln Arg Pro Ser Gly Val Pro Asp Arg Phe Ser
        50                  55                  60
Gly Ser Ile Asp Ser Thr Ser Asn Ser Ala Ser Leu Thr Ile Thr Gly
65                  70                  75                  80
Leu Leu Ala Glu Asp Glu Ala Asp Tyr Phe Cys Gln Ser Phe Asp Gly
                85                  90                  95
Asp Ala Val Val Phe Gly Gly Gly Thr Gln Leu Thr Val Thr Gly
            100                 105                 110
```

<210> SEQ ID NO 180
<211> LENGTH: 6
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 180

```
Ser Ser Ser Ala Ile Ser
1               5
```

<210> SEQ ID NO 181
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 181

```
Ile Ile Arg Ser Gly Gly Thr Thr Asp Tyr Ala Ser Trp Ala Lys Gly
1               5                   10                  15
```

<210> SEQ ID NO 182
<211> LENGTH: 12
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 182

```
Asp Pro Pro Tyr Ile Thr Ser Thr Tyr Phe Asp Leu
1               5                   10
```

<210> SEQ ID NO 183
<211> LENGTH: 13
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 183

```
Lys Arg Ala Arg Asp Ser Val Glu Ser Tyr Asp Val His
1               5                   10
```

<210> SEQ ID NO 184
<211> LENGTH: 8
<212> TYPE: PRT
<213> ORGANISM: Artificial Sequence
<220> FEATURE:

```
<223> OTHER INFORMATION: Description of Artificial Sequence: Synthetic
      peptide

<400> SEQUENCE: 184

Lys Asp Asp Gln Arg Pro Ser Gly
1               5

<210> SEQ ID NO 185
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 185

Gln Ser Phe Asp Gly Asp Ala Val Val
1               5

<210> SEQ ID NO 186
<211> LENGTH: 107
<212> TYPE: PRT
<213> ORGANISM: Homo sapiens

<400> SEQUENCE: 186

Arg Thr Val Ala Ala Pro Ser Val Phe Ile Phe Pro Pro Ser Asp Glu
1               5                   10                  15

Gln Leu Lys Ser Gly Thr Ala Ser Val Val Cys Leu Leu Asn Asn Phe
            20                  25                  30

Tyr Pro Arg Glu Ala Lys Val Gln Trp Lys Val Asp Asn Ala Leu Gln
        35                  40                  45

Ser Gly Asn Ser Gln Glu Ser Val Thr Glu Gln Asp Ser Lys Asp Ser
    50                  55                  60

Thr Tyr Ser Leu Ser Ser Thr Leu Thr Leu Ser Lys Ala Asp Tyr Glu
65                  70                  75                  80

Lys His Lys Val Tyr Ala Cys Glu Val Thr His Gln Gly Leu Ser Ser
                85                  90                  95

Pro Val Thr Lys Ser Phe Asn Arg Gly Glu Cys
            100                 105

<210> SEQ ID NO 187
<211> LENGTH: 103
<212> TYPE: PRT
<213> ORGANISM: Homo sapiens

<400> SEQUENCE: 187

Ala Ser Thr Lys Gly Pro Ser Val Phe Pro Leu Ala Pro Ser Ser Lys
1               5                   10                  15

Ser Thr Ser Gly Gly Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
        35                  40                  45

Gly Val His Thr Phe Pro Ala Val Leu Gln Ser Ser Gly Leu Tyr Ser
    50                  55                  60

Leu Ser Ser Val Val Thr Val Pro Ser Ser Ser Leu Gly Thr Gln Thr
65                  70                  75                  80

Tyr Ile Cys Asn Val Asn His Lys Pro Ser Asn Thr Lys Val Asp Lys
                85                  90                  95

Lys Val Glu Pro Lys Ser Cys
            100
```

<210> SEQ ID NO 188
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 188

Gly Gly Gly Gly Ser
1               5

<210> SEQ ID NO 189
<211> LENGTH: 254
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 189

Ala Val Val Thr Gln Glu Pro Ser Leu Thr Val Ser Pro Gly Gly Thr
1               5                   10                  15

Val Thr Leu Thr Cys Gly Ser Ser Thr Gly Ala Val Thr Thr Ser Asn
            20                  25                  30

Tyr Ala Asn Trp Val Gln Gln Lys Pro Gly Lys Ser Pro Arg Gly Leu
        35                  40                  45

Ile Gly Gly Thr Asn Lys Arg Ala Pro Gly Val Pro Ala Arg Phe Ser
    50                  55                  60

Gly Ser Leu Leu Gly Gly Lys Ala Ala Leu Thr Ile Ser Gly Ala Gln
65                  70                  75                  80

Pro Glu Asp Glu Ala Asp Tyr Tyr Cys Ala Leu Trp Tyr Ser Asn His
                85                  90                  95

Trp Val Phe Gly Gly Gly Thr Lys Leu Thr Val Leu Gly Gly Gly Gly
            100                 105                 110

Gly Ser Gly Gly Gly Gly Ser Gly Gly Gly Ser Gly Gly Gly Gly
        115                 120                 125

Ser Glu Val Gln Leu Val Glu Ser Gly Gly Gly Ser Val Gln Pro Gly
    130                 135                 140

Gly Ser Leu Arg Leu Ser Cys Ala Ala Ser Gly Phe Thr Phe Ser Thr
145                 150                 155                 160

Tyr Ala Met Asn Trp Val Arg Gln Ala Pro Gly Lys Gly Leu Glu Trp
                165                 170                 175

Val Gly Arg Ile Arg Ser Lys Ala Asn Asn Tyr Ala Thr Tyr Tyr Ala
            180                 185                 190

Asp Ser Val Lys Gly Arg Phe Thr Ile Ser Arg Asp Asp Ser Lys Asn
        195                 200                 205

Thr Leu Tyr Leu Gln Met Asn Ser Leu Arg Ala Glu Asp Thr Ala Thr
    210                 215                 220

Tyr Tyr Cys Val Arg His Gly Asn Phe Gly Asp Ser Tyr Val Ser Trp
225                 230                 235                 240

Phe Ala Tyr Trp Gly Gln Gly Thr Thr Val Thr Val Ser Ser
                245                 250

<210> SEQ ID NO 190
<211> LENGTH: 224
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 190

```
Gln Glu Gln Leu Val Glu Ser Gly Gly Gly Leu Val Thr Pro Gly Thr
1               5                   10                  15

Pro Leu Thr Leu Thr Cys Thr Val Ser Gly Phe Ser Leu Ser Ser Tyr
            20                  25                  30

Ala Met Gly Trp Val Arg Gln Ala Pro Gly Lys Gly Leu Glu Trp Ile
        35                  40                  45

Gly Thr Ile Asn Asp Gly Gly Thr Ala Phe Tyr Ala Ser Trp Val Lys
50                  55                  60

Gly Arg Phe Thr Ile Ser Arg Thr Ser Thr Thr Val Asp Leu Arg Val
65                  70                  75                  80

Thr Ser Pro Thr Thr Glu Asp Thr Ala Thr Tyr Phe Cys Ala Arg Ala
                85                  90                  95

Tyr Gly Ser Asn Gly Asp Val Tyr Trp Gly Tyr Phe Asn Leu Trp Gly
            100                 105                 110

Gln Gly Thr Leu Val Thr Val Ser Ser Ala Ser Thr Lys Gly Pro Ser
        115                 120                 125

Val Phe Pro Leu Ala Pro Ser Ser Lys Ser Thr Ser Gly Gly Thr Ala
130                 135                 140

Ala Leu Gly Cys Leu Val Lys Asp Tyr Phe Pro Glu Pro Val Thr Val
145                 150                 155                 160

Ser Trp Asn Ser Gly Ala Leu Thr Ser Gly Val His Thr Phe Pro Ala
                165                 170                 175

Val Leu Gln Ser Ser Gly Leu Tyr Ser Leu Ser Ser Val Val Thr Val
            180                 185                 190

Pro Ser Ser Ser Leu Gly Thr Gln Thr Tyr Ile Cys Asn Val Asn His
        195                 200                 205

Lys Pro Ser Asn Thr Lys Val Asp Lys Lys Val Glu Pro Lys Ser Cys
210                 215                 220
```

<210> SEQ ID NO 191
<211> LENGTH: 219
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 191

```
Ala Ser Glu Leu Asp Leu Thr Gln Thr Pro Ala Ser Val Glu Val Ala
1               5                   10                  15

Val Gly Gly Thr Val Thr Ile Lys Cys Gln Ala Ser Gln Ser Ile Gly
            20                  25                  30

Ser Tyr Leu Ser Trp Tyr Gln Gln Lys Pro Gly Gln Arg Pro Lys Leu
        35                  40                  45

Leu Ile Phe Arg Ala Ser Thr Leu Ala Ser Gly Val Ser Ser Arg Phe
50                  55                  60

Lys Gly Ser Gly Ser Gly Thr Gln Phe Thr Leu Thr Ile Ser Gly Val
65                  70                  75                  80

Glu Cys Ala Asp Ala Ala Thr Tyr Tyr Cys Gln Gln Gly Tyr Ser Ser
                85                  90                  95

Thr Asn Leu Asp Asn Val Phe Gly Gly Gly Thr Glu Val Val Val Lys
            100                 105                 110
```

```
Arg Thr Val Ala Ala Pro Ser Val Phe Ile Phe Pro Pro Ser Asp Glu
            115                 120                 125

Gln Leu Lys Ser Gly Thr Ala Ser Val Val Cys Leu Leu Asn Asn Phe
130                 135                 140

Tyr Pro Arg Glu Ala Lys Val Gln Trp Lys Val Asp Asn Ala Leu Gln
145                 150                 155                 160

Ser Gly Asn Ser Gln Glu Ser Val Thr Glu Gln Asp Ser Lys Asp Ser
                165                 170                 175

Thr Tyr Ser Leu Ser Ser Thr Leu Thr Leu Ser Lys Ala Asp Tyr Glu
            180                 185                 190

Lys His Lys Val Tyr Ala Cys Glu Val Thr His Gln Gly Leu Ser Ser
            195                 200                 205

Pro Val Thr Lys Ser Phe Asn Arg Gly Glu Cys
        210                 215

<210> SEQ ID NO 192
<211> LENGTH: 121
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 192

Gln Glu Gln Leu Val Glu Ser Gly Gly Gly Leu Val Thr Pro Gly Thr
1               5                   10                  15

Pro Leu Thr Leu Thr Cys Thr Val Ser Gly Phe Ser Leu Ser Ser Tyr
            20                  25                  30

Ala Met Gly Trp Val Arg Gln Ala Pro Gly Lys Gly Leu Glu Trp Ile
        35                  40                  45

Gly Thr Ile Asn Asp Gly Gly Thr Ala Phe Tyr Ala Ser Trp Val Lys
    50                  55                  60

Gly Arg Phe Thr Ile Ser Arg Thr Ser Thr Thr Val Asp Leu Arg Val
65                  70                  75                  80

Thr Ser Pro Thr Thr Glu Asp Thr Ala Thr Tyr Phe Cys Ala Arg Ala
                85                  90                  95

Tyr Gly Ser Asn Gly Asp Val Tyr Trp Gly Tyr Phe Asn Leu Trp Gly
            100                 105                 110

Gln Gly Thr Leu Val Thr Val Ser Ser
        115                 120

<210> SEQ ID NO 193
<211> LENGTH: 112
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 193

Ala Ser Glu Leu Asp Leu Thr Gln Thr Pro Ala Ser Val Glu Val Ala
1               5                   10                  15

Val Gly Gly Thr Val Thr Ile Lys Cys Gln Ala Ser Gln Ser Ile Gly
            20                  25                  30

Ser Tyr Leu Ser Trp Tyr Gln Gln Lys Pro Gly Gln Arg Pro Lys Leu
        35                  40                  45

Leu Ile Phe Arg Ala Ser Thr Leu Ala Ser Gly Val Ser Ser Arg Phe
    50                  55                  60
```

-continued

Lys Gly Ser Gly Ser Gly Thr Gln Phe Thr Leu Thr Ile Ser Gly Val
65                  70                  75                  80

Glu Cys Ala Asp Ala Ala Thr Tyr Tyr Cys Gln Gln Gly Tyr Ser Ser
                85                  90                  95

Thr Asn Leu Asp Asn Val Phe Gly Gly Gly Thr Glu Val Val Val Lys
            100                 105                 110

<210> SEQ ID NO 194
<211> LENGTH: 224
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 194

Gln Glu Gln Leu Glu Glu Ser Gly Gly Gly Leu Val Thr Pro Gly Gly
1               5                   10                  15

Thr Leu Thr Leu Thr Cys Thr Val Ser Gly Phe Ser Leu Ser Asn Tyr
            20                  25                  30

Ala Met Gly Trp Val Arg Gln Ala Pro Gly Lys Gly Leu Glu Trp Ile
        35                  40                  45

Gly Thr Ile Asn Asp Gly Gly Thr Ala Phe Tyr Ala Lys Trp Leu Lys
    50                  55                  60

Gly Arg Phe Thr Ile Ser Arg Thr Ser Thr Thr Val Asp Leu Lys Ile
65                  70                  75                  80

Thr Ser Pro Thr Thr Glu Asp Thr Ala Thr Tyr Phe Cys Ala Arg Ala
                85                  90                  95

Tyr Gly Ser Asn Gly Asp Val Tyr Trp Gly Tyr Phe Asn Leu Trp Gly
            100                 105                 110

Gln Gly Thr Leu Val Thr Val Ser Ser Ala Ser Thr Lys Gly Pro Ser
        115                 120                 125

Val Phe Pro Leu Ala Pro Ser Ser Lys Ser Thr Ser Gly Gly Thr Ala
    130                 135                 140

Ala Leu Gly Cys Leu Val Lys Asp Tyr Phe Pro Glu Pro Val Thr Val
145                 150                 155                 160

Ser Trp Asn Ser Gly Ala Leu Thr Ser Gly Val His Thr Phe Pro Ala
                165                 170                 175

Val Leu Gln Ser Ser Gly Leu Tyr Ser Leu Ser Ser Val Val Thr Val
            180                 185                 190

Pro Ser Ser Ser Leu Gly Thr Gln Thr Tyr Ile Cys Asn Val Asn His
        195                 200                 205

Lys Pro Ser Asn Thr Lys Val Asp Lys Lys Val Glu Pro Lys Ser Cys
    210                 215                 220

<210> SEQ ID NO 195
<211> LENGTH: 219
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 195

Ala Ser Glu Leu Val Met Thr Gln Thr Pro Ser Ser Val Ser Glu Pro
1               5                   10                  15

Val Gly Gly Thr Val Thr Ile Lys Cys Gln Ala Ser Gln Ser Ile Gly
            20                  25                  30

```
Ser Asn Leu Ala Trp Tyr Gln Gln Arg Pro Gly Gln Pro Pro Lys Leu
            35                  40                  45

Leu Ile Tyr Ser Ala Ser Thr Leu Ala Ser Gly Val Ser Ser Arg Phe
 50                  55                  60

Lys Gly Ser Gly Ser Gly Thr Glu Ser Thr Leu Thr Ile Ser Gly Val
 65                  70                  75                  80

Gln Ala Ala Asp Ala Ala Thr Tyr Tyr Cys Gln Gln Gly Tyr Ser Ser
                 85                  90                  95

Ser Asn Val Asp Asn Val Phe Gly Gly Gly Thr Glu Leu Glu Ile Leu
                100                 105                 110

Arg Thr Val Ala Ala Pro Ser Val Phe Ile Phe Pro Pro Ser Asp Glu
            115                 120                 125

Gln Leu Lys Ser Gly Thr Ala Ser Val Val Cys Leu Leu Asn Asn Phe
130                 135                 140

Tyr Pro Arg Glu Ala Lys Val Gln Trp Lys Val Asp Asn Ala Leu Gln
145                 150                 155                 160

Ser Gly Asn Ser Gln Glu Ser Val Thr Glu Gln Asp Ser Lys Asp Ser
                165                 170                 175

Thr Tyr Ser Leu Ser Ser Thr Leu Thr Leu Ser Lys Ala Asp Tyr Glu
                180                 185                 190

Lys His Lys Val Tyr Ala Cys Glu Val Thr His Gln Gly Leu Ser Ser
            195                 200                 205

Pro Val Thr Lys Ser Phe Asn Arg Gly Glu Cys
            210                 215
```

<210> SEQ ID NO 196
<211> LENGTH: 121
<212> TYPE: PRT
<213> ORGANISM: Artificial Sequence
<220> FEATURE:
<223> OTHER INFORMATION: Description of Artificial Sequence: Synthetic polypeptide

<400> SEQUENCE: 196

```
Gln Glu Gln Leu Glu Glu Ser Gly Gly Gly Leu Val Thr Pro Gly Gly
 1               5                  10                  15

Thr Leu Thr Leu Thr Cys Thr Val Ser Gly Phe Ser Leu Ser Asn Tyr
             20                  25                  30

Ala Met Gly Trp Val Arg Gln Ala Pro Gly Lys Gly Leu Glu Trp Ile
             35                  40                  45

Gly Thr Ile Asn Asp Gly Gly Thr Ala Phe Tyr Ala Lys Trp Leu Lys
 50                  55                  60

Gly Arg Phe Thr Ile Ser Arg Thr Ser Thr Thr Val Asp Leu Lys Ile
 65                  70                  75                  80

Thr Ser Pro Thr Thr Glu Asp Thr Ala Thr Tyr Phe Cys Ala Arg Ala
                 85                  90                  95

Tyr Gly Ser Asn Gly Asp Val Tyr Trp Gly Tyr Phe Asn Leu Trp Gly
                100                 105                 110

Gln Gly Thr Leu Val Thr Val Ser Ser
            115                 120
```

<210> SEQ ID NO 197
<211> LENGTH: 112
<212> TYPE: PRT
<213> ORGANISM: Artificial Sequence
<220> FEATURE:
<223> OTHER INFORMATION: Description of Artificial Sequence: Synthetic polypeptide

<400> SEQUENCE: 197

```
Ala Ser Glu Leu Val Met Thr Gln Thr Pro Ser Ser Val Ser Glu Pro
1               5                   10                  15

Val Gly Gly Thr Val Thr Ile Lys Cys Gln Ala Ser Gln Ser Ile Gly
            20                  25                  30

Ser Asn Leu Ala Trp Tyr Gln Gln Arg Pro Gly Gln Pro Pro Lys Leu
        35                  40                  45

Leu Ile Tyr Ser Ala Ser Thr Leu Ala Ser Gly Val Ser Ser Arg Phe
    50                  55                  60

Lys Gly Ser Gly Ser Gly Thr Glu Ser Thr Leu Thr Ile Ser Gly Val
65                  70                  75                  80

Gln Ala Ala Asp Ala Ala Thr Tyr Tyr Cys Gln Gln Gly Tyr Ser Ser
                85                  90                  95

Ser Asn Val Asp Asn Val Phe Gly Gly Gly Thr Glu Leu Glu Ile Leu
                100                 105                 110
```

<210> SEQ ID NO 198
<211> LENGTH: 224
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 198

```
Gln Glu Gln Leu Glu Glu Ser Gly Gly Gly Leu Val Thr Pro Gly Thr
1               5                   10                  15

Pro Leu Thr Leu Thr Cys Thr Ala Ser Gly Phe Ser Leu Ser Ser Tyr
            20                  25                  30

Ala Met Ile Trp Val Arg Gln Ala Pro Gly Lys Gly Leu Glu Trp Ile
        35                  40                  45

Gly Thr Ile Asn Asp Gly Gly Thr Ala Phe Tyr Ala Asn Trp Val Lys
    50                  55                  60

Gly Arg Phe Thr Ile Ser Arg Thr Ser Thr Thr Val Asp Leu Lys Met
65                  70                  75                  80

Thr Ser Pro Thr Thr Glu Asp Thr Ala Thr Tyr Phe Cys Ala Arg Ala
                85                  90                  95

Tyr Gly Ser Asn Gly Asp Val Tyr Trp Gly Tyr Val Asn Leu Trp Gly
                100                 105                 110

Gln Gly Thr Leu Val Thr Val Ser Ser Ala Ser Thr Lys Gly Pro Ser
            115                 120                 125

Val Phe Pro Leu Ala Pro Ser Ser Lys Ser Thr Ser Gly Gly Thr Ala
        130                 135                 140

Ala Leu Gly Cys Leu Val Lys Asp Tyr Phe Pro Glu Pro Val Thr Val
145                 150                 155                 160

Ser Trp Asn Ser Gly Ala Leu Thr Ser Gly Val His Thr Phe Pro Ala
                165                 170                 175

Val Leu Gln Ser Ser Gly Leu Tyr Ser Leu Ser Ser Val Val Thr Val
                180                 185                 190

Pro Ser Ser Leu Gly Thr Gln Thr Tyr Ile Cys Asn Val Asn His
            195                 200                 205

Lys Pro Ser Asn Thr Lys Val Asp Lys Val Glu Pro Lys Ser Cys
        210                 215                 220
```

```
<210> SEQ ID NO 199
<211> LENGTH: 219
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 199

Ala Ser Glu Leu Val Met Thr Gln Thr Pro Ala Ser Val Ser Glu Pro
1               5                   10                  15

Val Gly Gly Thr Val Thr Ile Lys Cys Gln Ala Ser Gln Ser Ile Gly
            20                  25                  30

Ser Asn Leu Ala Trp Tyr Gln Lys Pro Gly Gln Pro Pro Lys Leu
        35                  40                  45

Leu Ile Tyr Ala Ala Ala Asn Leu Ala Ser Gly Val Ser Ser Arg Phe
50                  55                  60

Lys Gly Ser Arg Ser Gly Thr Glu Tyr Thr Leu Thr Ile Ser Gly Val
65                  70                  75                  80

Gln Ala Ala Asp Ala Ala Thr Tyr Tyr Cys Gln Gln Gly Tyr Ser Ser
                85                  90                  95

Ser Asn Val Ala Asn Val Phe Gly Gly Gly Thr Glu Leu Glu Ile Leu
            100                 105                 110

Arg Thr Val Ala Ala Pro Ser Val Phe Ile Phe Pro Pro Ser Asp Glu
        115                 120                 125

Gln Leu Lys Ser Gly Thr Ala Ser Val Val Cys Leu Leu Asn Asn Phe
130                 135                 140

Tyr Pro Arg Glu Ala Lys Val Gln Trp Lys Val Asp Asn Ala Leu Gln
145                 150                 155                 160

Ser Gly Asn Ser Gln Glu Ser Val Thr Glu Gln Asp Ser Lys Asp Ser
                165                 170                 175

Thr Tyr Ser Leu Ser Ser Thr Leu Thr Leu Ser Lys Ala Asp Tyr Glu
            180                 185                 190

Lys His Lys Val Tyr Ala Cys Glu Val Thr His Gln Gly Leu Ser Ser
        195                 200                 205

Pro Val Thr Lys Ser Phe Asn Arg Gly Glu Cys
210                 215

<210> SEQ ID NO 200
<211> LENGTH: 121
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 200

Gln Glu Gln Leu Glu Glu Ser Gly Gly Gly Leu Val Thr Pro Gly Thr
1               5                   10                  15

Pro Leu Thr Leu Thr Cys Thr Ala Ser Gly Phe Ser Leu Ser Ser Tyr
            20                  25                  30

Ala Met Ile Trp Val Arg Gln Ala Pro Gly Lys Gly Leu Glu Trp Ile
        35                  40                  45

Gly Thr Ile Asn Asp Gly Gly Thr Ala Phe Tyr Ala Asn Trp Val Lys
50                  55                  60

Gly Arg Phe Thr Ile Ser Arg Thr Ser Thr Thr Val Asp Leu Lys Met
65                  70                  75                  80

Thr Ser Pro Thr Thr Glu Asp Thr Ala Thr Tyr Phe Cys Ala Arg Ala
```

```
            85                   90                  95
Tyr Gly Ser Asn Gly Asp Val Tyr Trp Gly Tyr Val Asn Leu Trp Gly
            100                  105                 110

Gln Gly Thr Leu Val Thr Val Ser Ser
            115                 120

<210> SEQ ID NO 201
<211> LENGTH: 112
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 201

Ala Ser Glu Leu Val Met Thr Gln Thr Pro Ala Ser Val Ser Glu Pro
1               5                   10                  15

Val Gly Gly Thr Val Thr Ile Lys Cys Gln Ala Ser Gln Ser Ile Gly
            20                  25                  30

Ser Asn Leu Ala Trp Tyr Gln Gln Lys Pro Gly Gln Pro Pro Lys Leu
        35                  40                  45

Leu Ile Tyr Ala Ala Ala Asn Leu Ala Ser Gly Val Ser Ser Arg Phe
    50                  55                  60

Lys Gly Ser Arg Ser Gly Thr Glu Tyr Thr Leu Thr Ile Ser Gly Val
65                  70                  75                  80

Gln Ala Ala Asp Ala Ala Thr Tyr Tyr Cys Gln Gln Gly Tyr Ser Ser
                85                  90                  95

Ser Asn Val Ala Asn Val Phe Gly Gly Gly Thr Glu Leu Glu Ile Leu
            100                 105                 110

<210> SEQ ID NO 202
<211> LENGTH: 224
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 202

Gln Glu Gln Leu Glu Glu Ser Gly Gly Gly Leu Val Thr Pro Gly Thr
1               5                   10                  15

Pro Leu Thr Leu Thr Cys Thr Ala Ser Gly Phe Ser Leu Ser Ser Tyr
            20                  25                  30

Ala Met Ile Trp Val Arg Gln Ala Pro Gly Lys Gly Leu Glu Trp Ile
        35                  40                  45

Gly Thr Ile Asn Asp Gly Gly Thr Ala Phe Tyr Ala Ser Trp Val Lys
    50                  55                  60

Gly Arg Phe Thr Ile Ser Arg Thr Ser Thr Thr Val Asp Leu Lys Ile
65                  70                  75                  80

Thr Ser Pro Thr Thr Glu Asp Thr Ala Thr Tyr Phe Cys Ala Arg Ala
                85                  90                  95

Tyr Gly Ser Asn Gly Asp Val Tyr Trp Gly Tyr Val Asn Leu Trp Gly
            100                 105                 110

Gln Gly Thr Leu Val Thr Val Ser Ser Ala Ser Thr Lys Gly Pro Ser
        115                 120                 125

Val Phe Pro Leu Ala Pro Ser Ser Lys Ser Thr Ser Gly Gly Thr Ala
    130                 135                 140

Ala Leu Gly Cys Leu Val Lys Asp Tyr Phe Pro Glu Pro Val Thr Val
```

```
145                 150                 155                 160
Ser Trp Asn Ser Gly Ala Leu Thr Ser Gly Val His Thr Phe Pro Ala
                165                 170                 175

Val Leu Gln Ser Ser Gly Leu Tyr Ser Leu Ser Ser Val Val Thr Val
                180                 185                 190

Pro Ser Ser Leu Gly Thr Gln Thr Tyr Ile Cys Asn Val Asn His
                195                 200                 205

Lys Pro Ser Asn Thr Lys Val Asp Lys Val Glu Pro Lys Ser Cys
                210                 215                 220

<210> SEQ ID NO 203
<211> LENGTH: 219
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 203

Ala Ser Glu Leu Val Met Thr Gln Thr Pro Ser Ser Val Ser Ala Ala
1               5                   10                  15

Val Gly Gly Thr Val Thr Ile Asn Cys Gln Ala Ser Gln Asn Ile Gly
                20                  25                  30

Ser Val Phe Ala Trp Tyr Gln Gln Lys Pro Gly Gln Pro Pro Lys Leu
            35                  40                  45

Leu Ile Tyr Lys Ala Ser Ser Leu Ala Ser Gly Val Pro Ser Arg Phe
        50                  55                  60

Lys Gly Ser Gly Ser Gly Thr Gln Phe Thr Leu Thr Ile Ser Gly Val
65                  70                  75                  80

Glu Ala Ala Asp Ala Ala Thr Tyr Tyr Cys Gln Gln Gly Ala Ser Ser
                85                  90                  95

Ser Asn Val Asp Asn Ile Phe Gly Gly Gly Thr Glu Val Val Val Lys
                100                 105                 110

Arg Thr Val Ala Ala Pro Ser Val Phe Ile Phe Pro Pro Ser Asp Glu
            115                 120                 125

Gln Leu Lys Ser Gly Thr Ala Ser Val Val Cys Leu Leu Asn Asn Phe
        130                 135                 140

Tyr Pro Arg Glu Ala Lys Val Gln Trp Lys Val Asp Asn Ala Leu Gln
145                 150                 155                 160

Ser Gly Asn Ser Gln Glu Ser Val Thr Glu Gln Asp Ser Lys Asp Ser
                165                 170                 175

Thr Tyr Ser Leu Ser Ser Thr Leu Thr Leu Ser Lys Ala Asp Tyr Glu
                180                 185                 190

Lys His Lys Val Tyr Ala Cys Glu Val Thr His Gln Gly Leu Ser Ser
            195                 200                 205

Pro Val Thr Lys Ser Phe Asn Arg Gly Glu Cys
        210                 215

<210> SEQ ID NO 204
<211> LENGTH: 121
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 204

Gln Glu Gln Leu Glu Glu Ser Gly Gly Gly Leu Val Thr Pro Gly Thr
```

```
            1               5                  10                 15
Pro Leu Thr Leu Thr Cys Thr Ala Ser Gly Phe Ser Leu Ser Ser Tyr
                20                 25                 30

Ala Met Ile Trp Val Arg Gln Ala Pro Gly Lys Gly Leu Glu Trp Ile
                35                 40                 45

Gly Thr Ile Asn Asp Gly Gly Thr Ala Phe Tyr Ala Ser Trp Val Lys
 50                 55                 60

Gly Arg Phe Thr Ile Ser Arg Thr Ser Thr Val Asp Leu Lys Ile
 65                 70                 75                 80

Thr Ser Pro Thr Thr Glu Asp Thr Ala Thr Tyr Phe Cys Ala Arg Ala
                85                 90                 95

Tyr Gly Ser Asn Gly Asp Val Tyr Trp Gly Tyr Val Asn Leu Trp Gly
                100                105                110

Gln Gly Thr Leu Val Thr Val Ser Ser
                115                120
```

<210> SEQ ID NO 205
<211> LENGTH: 112
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 205

```
Ala Ser Glu Leu Val Met Thr Gln Thr Pro Ser Ser Val Ser Ala Ala
 1               5                  10                 15

Val Gly Gly Thr Val Thr Ile Asn Cys Gln Ala Ser Gln Asn Ile Gly
                20                 25                 30

Ser Val Phe Ala Trp Tyr Gln Gln Lys Pro Gly Gln Pro Pro Lys Leu
                35                 40                 45

Leu Ile Tyr Lys Ala Ser Ser Leu Ala Ser Gly Val Pro Ser Arg Phe
 50                 55                 60

Lys Gly Ser Gly Ser Gly Thr Gln Phe Thr Leu Thr Ile Ser Gly Val
 65                 70                 75                 80

Glu Ala Ala Asp Ala Ala Thr Tyr Tyr Cys Gln Gln Gly Ala Ser Ser
                85                 90                 95

Ser Asn Val Asp Asn Ile Phe Gly Gly Gly Thr Glu Val Val Val Lys
                100                105                110
```

<210> SEQ ID NO 206
<211> LENGTH: 224
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 206

```
Gln Gln Gln Leu Glu Glu Ser Gly Gly Gly Leu Val Thr Pro Gly Thr
 1               5                  10                 15

Pro Leu Thr Leu Thr Cys Thr Val Ser Gly Ile Asp Leu Ser Ser Tyr
                20                 25                 30

Ala Met Gly Trp Val Arg Gln Ala Pro Gly Lys Gly Leu Glu Trp Ile
                35                 40                 45

Gly Thr Ile Asn Asp Gly Gly Ser Ala Phe Tyr Ala Ser Trp Val Lys
 50                 55                 60

Gly Arg Phe Thr Ile Ser Arg Thr Ser Thr Thr Val Asp Leu Lys Ile
```

```
                65                  70                  75                  80
Thr Ser Pro Thr Ala Glu Asp Thr Ala Thr Tyr Phe Cys Ala Lys Thr
                    85                  90                  95

Tyr Gly Thr Asn Gly Asp Val Tyr Trp Gly Tyr Phe Asn Leu Trp Gly
                100                 105                 110

Gln Gly Thr Leu Val Thr Val Ser Ser Ala Ser Thr Lys Gly Pro Ser
                115                 120                 125

Val Phe Pro Leu Ala Pro Ser Ser Lys Ser Thr Ser Gly Gly Thr Ala
                130                 135                 140

Ala Leu Gly Cys Leu Val Lys Asp Tyr Phe Pro Glu Pro Val Thr Val
145                 150                 155                 160

Ser Trp Asn Ser Gly Ala Leu Thr Ser Gly Val His Thr Phe Pro Ala
                165                 170                 175

Val Leu Gln Ser Ser Gly Leu Tyr Ser Leu Ser Ser Val Val Thr Val
                180                 185                 190

Pro Ser Ser Ser Leu Gly Thr Gln Thr Tyr Ile Cys Asn Val Asn His
                195                 200                 205

Lys Pro Ser Asn Thr Lys Val Asp Lys Lys Val Glu Pro Lys Ser Cys
210                 215                 220

<210> SEQ ID NO 207
<211> LENGTH: 219
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 207

Ala Ser Glu Leu Val Met Thr Gln Thr Pro Ala Ser Val Ser Glu Pro
1               5                   10                  15

Val Gly Gly Thr Val Thr Ile Lys Cys Gln Ala Ser Gln Ser Ile Gly
                20                  25                  30

Ser Asn Leu Ala Trp Tyr Gln Gln Lys Pro Gly Gln Pro Pro Lys Leu
                35                  40                  45

Leu Ile Tyr Tyr Glu Ser Ile Leu Ala Ser Gly Val Pro Ser Arg Phe
50                  55                  60

Ser Gly Ser Gly Ser Gly Thr Glu Tyr Thr Leu Thr Ile Ser Gly Ala
65                  70                  75                  80

Gln Ala Asp Asp Ala Ala Thr Tyr Tyr Cys Gln Gln Gly Tyr Ser Ser
                85                  90                  95

Ser Asn Ile Asp Asn Ala Phe Gly Gly Thr Glu Val Val Val Lys
                100                 105                 110

Arg Thr Val Ala Ala Pro Ser Val Phe Ile Phe Pro Pro Ser Asp Glu
                115                 120                 125

Gln Leu Lys Ser Gly Thr Ala Ser Val Val Cys Leu Leu Asn Asn Phe
                130                 135                 140

Tyr Pro Arg Glu Ala Lys Val Gln Trp Lys Val Asp Asn Ala Leu Gln
145                 150                 155                 160

Ser Gly Asn Ser Gln Glu Ser Val Thr Glu Gln Asp Ser Lys Asp Ser
                165                 170                 175

Thr Tyr Ser Leu Ser Ser Thr Leu Thr Leu Ser Lys Ala Asp Tyr Glu
                180                 185                 190

Lys His Lys Val Tyr Ala Cys Glu Val Thr His Gln Gly Leu Ser Ser
                195                 200                 205
```

-continued

```
Pro Val Thr Lys Ser Phe Asn Arg Gly Glu Cys
    210                 215

<210> SEQ ID NO 208
<211> LENGTH: 121
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 208

Gln Gln Gln Leu Glu Glu Ser Gly Gly Gly Leu Val Thr Pro Gly Thr
1               5                   10                  15

Pro Leu Thr Leu Thr Cys Thr Val Ser Gly Ile Asp Leu Ser Ser Tyr
            20                  25                  30

Ala Met Gly Trp Val Arg Gln Ala Pro Gly Lys Gly Leu Glu Trp Ile
        35                  40                  45

Gly Thr Ile Asn Asp Gly Gly Ser Ala Phe Tyr Ala Ser Trp Val Lys
    50                  55                  60

Gly Arg Phe Thr Ile Ser Arg Thr Ser Thr Thr Val Asp Leu Lys Ile
65                  70                  75                  80

Thr Ser Pro Thr Ala Glu Asp Thr Ala Thr Tyr Phe Cys Ala Lys Thr
                85                  90                  95

Tyr Gly Thr Asn Gly Asp Val Tyr Trp Gly Tyr Phe Asn Leu Trp Gly
            100                 105                 110

Gln Gly Thr Leu Val Thr Val Ser Ser
        115                 120

<210> SEQ ID NO 209
<211> LENGTH: 112
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 209

Ala Ser Glu Leu Val Met Thr Gln Thr Pro Ala Ser Val Ser Glu Pro
1               5                   10                  15

Val Gly Gly Thr Val Thr Ile Lys Cys Gln Ala Ser Gln Ser Ile Gly
            20                  25                  30

Ser Asn Leu Ala Trp Tyr Gln Gln Lys Pro Gly Gln Pro Pro Lys Leu
        35                  40                  45

Leu Ile Tyr Tyr Glu Ser Ile Leu Ala Ser Gly Val Pro Ser Arg Phe
    50                  55                  60

Ser Gly Ser Gly Ser Gly Thr Glu Tyr Thr Leu Thr Ile Ser Gly Ala
65                  70                  75                  80

Gln Ala Asp Asp Ala Ala Thr Tyr Tyr Cys Gln Gln Gly Tyr Ser Ser
                85                  90                  95

Ser Asn Ile Asp Asn Ala Phe Gly Gly Gly Thr Glu Val Val Val Lys
            100                 105                 110

<210> SEQ ID NO 210
<211> LENGTH: 222
<212> TYPE: PRT
<213> ORGANISM: Artificial Sequence
<220> FEATURE:
<223> OTHER INFORMATION: Description of Artificial Sequence: Synthetic
      polypeptide
```

<400> SEQUENCE: 210

```
Gln Gln Gln Leu Val Glu Ser Gly Gly Arg Leu Val Thr Pro Gly Thr
1               5                   10                  15
Pro Leu Thr Leu Thr Cys Thr Ala Ser Gly Ile Asp Leu Asn Ser Asn
            20                  25                  30
Ala Met Ser Trp Val Arg Gln Gly Pro Gly Lys Gly Leu Glu Trp Ile
        35                  40                  45
Gly Asp Ile Trp Ser Gly Gly Tyr Thr Asp Tyr Ala Ser Trp Ala Lys
    50                  55                  60
Gly Arg Phe Thr Ile Ser Lys Thr Ser Thr Thr Val Asp Leu Lys Met
65                  70                  75                  80
Thr Ser Leu Thr Ala Ala Asp Thr Ala Thr Tyr Phe Cys Ala Arg Asp
                85                  90                  95
Arg Leu Ala Gly Asp Gly Val Val Asp Tyr Asp Leu Trp Gly Gln Gly
            100                 105                 110
Thr Leu Val Thr Val Ser Ser Ala Ser Thr Lys Gly Pro Ser Val Phe
        115                 120                 125
Pro Leu Ala Pro Ser Ser Lys Ser Thr Ser Gly Gly Thr Ala Ala Leu
    130                 135                 140
Gly Cys Leu Val Lys Asp Tyr Phe Pro Glu Pro Val Thr Val Ser Trp
145                 150                 155                 160
Asn Ser Gly Ala Leu Thr Ser Gly Val His Thr Phe Pro Ala Val Leu
                165                 170                 175
Gln Ser Ser Gly Leu Tyr Ser Leu Ser Ser Val Val Thr Val Pro Ser
            180                 185                 190
Ser Ser Leu Gly Thr Gln Thr Tyr Ile Cys Asn Val Asn His Lys Pro
        195                 200                 205
Ser Asn Thr Lys Val Asp Lys Lys Val Glu Pro Lys Ser Cys
    210                 215                 220
```

<210> SEQ ID NO 211
<211> LENGTH: 219
<212> TYPE: PRT
<213> ORGANISM: Artificial Sequence
<220> FEATURE:
<223> OTHER INFORMATION: Description of Artificial Sequence: Synthetic polypeptide

<400> SEQUENCE: 211

```
Ala Ser Glu Leu Asp Met Thr Gln Thr Pro Ala Ser Val Glu Val Ala
1               5                   10                  15
Val Gly Gly Thr Val Thr Ile Lys Cys Gln Ala Ser Gln Asn Ile Tyr
            20                  25                  30
Ser Asn Leu Ala Trp Tyr Gln Gln Lys Pro Gly Gln Arg Pro Lys Leu
        35                  40                  45
Leu Ile Tyr Gly Ala Ser Thr Leu Ala Ser Gly Val Pro Ser Arg Phe
    50                  55                  60
Lys Gly Ser Gly Ser Gly Thr Glu Tyr Thr Leu Thr Ile Asn Gly Val
65                  70                  75                  80
Gln Ala Ala Asp Ala Ala Thr Tyr Tyr Cys Gln Gln Gly Phe Ser Ser
                85                  90                  95
Ser Asn Val Asp Asn Val Phe Gly Gly Gly Thr Glu Val Val Val Lys
            100                 105                 110
Arg Thr Val Ala Ala Pro Ser Val Phe Ile Phe Pro Pro Ser Asp Glu
        115                 120                 125
```

Gln Leu Lys Ser Gly Thr Ala Ser Val Val Cys Leu Leu Asn Asn Phe
130                 135                 140

Tyr Pro Arg Glu Ala Lys Val Gln Trp Lys Val Asp Asn Ala Leu Gln
145                 150                 155                 160

Ser Gly Asn Ser Gln Glu Ser Val Thr Glu Gln Asp Ser Lys Asp Ser
            165                 170                 175

Thr Tyr Ser Leu Ser Ser Thr Leu Thr Leu Ser Lys Ala Asp Tyr Glu
            180                 185                 190

Lys His Lys Val Tyr Ala Cys Glu Val Thr His Gln Gly Leu Ser Ser
            195                 200                 205

Pro Val Thr Lys Ser Phe Asn Arg Gly Glu Cys
210                 215

<210> SEQ ID NO 212
<211> LENGTH: 119
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 212

Gln Gln Gln Leu Val Glu Ser Gly Gly Arg Leu Val Thr Pro Gly Thr
1               5                   10                  15

Pro Leu Thr Leu Thr Cys Thr Ala Ser Gly Ile Asp Leu Asn Ser Asn
            20                  25                  30

Ala Met Ser Trp Val Arg Gln Gly Pro Gly Lys Gly Leu Glu Trp Ile
        35                  40                  45

Gly Asp Ile Trp Ser Gly Gly Tyr Thr Asp Tyr Ala Ser Trp Ala Lys
50                  55                  60

Gly Arg Phe Thr Ile Ser Lys Thr Ser Thr Val Asp Leu Lys Met
65                  70                  75                  80

Thr Ser Leu Thr Ala Ala Asp Thr Ala Thr Tyr Phe Cys Ala Arg Asp
            85                  90                  95

Arg Leu Ala Gly Asp Gly Val Val Asp Tyr Asp Leu Trp Gly Gln Gly
            100                 105                 110

Thr Leu Val Thr Val Ser Ser
            115

<210> SEQ ID NO 213
<211> LENGTH: 112
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 213

Ala Ser Glu Leu Asp Met Thr Gln Thr Pro Ala Ser Val Glu Val Ala
1               5                   10                  15

Val Gly Gly Thr Val Thr Ile Lys Cys Gln Ala Ser Gln Asn Ile Tyr
            20                  25                  30

Ser Asn Leu Ala Trp Tyr Gln Gln Lys Pro Gly Gln Arg Pro Lys Leu
        35                  40                  45

Leu Ile Tyr Gly Ala Ser Thr Leu Ala Ser Gly Val Pro Ser Arg Phe
    50                  55                  60

Lys Gly Ser Gly Ser Gly Thr Glu Tyr Thr Leu Thr Ile Asn Gly Val
65                  70                  75                  80

Gln Ala Ala Asp Ala Ala Thr Tyr Tyr Cys Gln Gln Gly Phe Ser Ser
                85                  90                  95

Ser Asn Val Asp Asn Val Phe Gly Gly Gly Thr Glu Val Val Lys
            100                 105                 110

<210> SEQ ID NO 214
<211> LENGTH: 224
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 214

Gln Gln Gln Leu Glu Glu Ser Gly Gly Gly Leu Val Thr Pro Gly Thr
1               5                   10                  15

Pro Leu Thr Leu Thr Cys Thr Val Ser Gly Phe Ser Leu Ser Asn Tyr
            20                  25                  30

Ala Met Gly Trp Val Arg Gln Ala Pro Gly Lys Gly Leu Glu Trp Ile
        35                  40                  45

Gly Thr Ile Asn Asp Gly Gly Thr Ala Phe Tyr Ala Asn Trp Leu Lys
    50                  55                  60

Gly Arg Phe Thr Ile Ser Arg Thr Ser Thr Thr Val Asp Leu Lys Ile
65                  70                  75                  80

Thr Ser Pro Thr Thr Glu Asp Thr Ala Thr Tyr Phe Cys Ala Arg Ala
                85                  90                  95

Tyr Gly Ser Asn Gly Asp Val Tyr Trp Gly Tyr Phe Asn Leu Trp Gly
            100                 105                 110

Gln Gly Thr Leu Val Thr Val Ser Ser Ala Ser Thr Lys Gly Pro Ser
        115                 120                 125

Val Phe Pro Leu Ala Pro Ser Ser Lys Ser Thr Ser Gly Gly Thr Ala
    130                 135                 140

Ala Leu Gly Cys Leu Val Lys Asp Tyr Phe Pro Glu Pro Val Thr Val
145                 150                 155                 160

Ser Trp Asn Ser Gly Ala Leu Thr Ser Gly Val His Thr Phe Pro Ala
                165                 170                 175

Val Leu Gln Ser Ser Gly Leu Tyr Ser Leu Ser Ser Val Val Thr Val
            180                 185                 190

Pro Ser Ser Leu Gly Thr Gln Thr Tyr Ile Cys Asn Val Asn His
        195                 200                 205

Lys Pro Ser Asn Thr Lys Val Asp Lys Lys Val Glu Pro Lys Ser Cys
    210                 215                 220

<210> SEQ ID NO 215
<211> LENGTH: 220
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 215

Ala Ser Glu Leu Val Met Thr Gln Thr Ala Ser Pro Val Ser Ala Ala
1               5                   10                  15

Val Gly Gly Thr Val Thr Ile Asn Cys Gln Ala Ser Gln Ser Ile Ser
            20                  25                  30

Ser Arg Ser Leu Ser Trp Tyr Gln Gln Lys Pro Gly Gln Pro Pro Lys
        35                  40                  45

```
Leu Leu Ile Tyr Glu Ala Ser Lys Leu Ala Ser Gly Val Pro Ser Arg
 50                  55                  60

Phe Ser Gly Ser Gly Ser Gly Thr Gln Phe Thr Leu Thr Ile Ser Gly
 65                  70                  75                  80

Val Gln Ala Asp Asp Ala Ala Thr Tyr Tyr Cys Gln Gln Gly Tyr Ser
                 85                  90                  95

Ser Ser Asn Val Asp Asn Val Phe Gly Gly Gly Thr Glu Val Val Val
            100                 105                 110

Lys Arg Thr Val Ala Ala Pro Ser Val Phe Ile Phe Pro Pro Ser Asp
            115                 120                 125

Glu Gln Leu Lys Ser Gly Thr Ala Ser Val Val Cys Leu Leu Asn Asn
130                 135                 140

Phe Tyr Pro Arg Glu Ala Lys Val Gln Trp Lys Val Asp Asn Ala Leu
145                 150                 155                 160

Gln Ser Gly Asn Ser Gln Glu Ser Val Thr Glu Gln Asp Ser Lys Asp
                165                 170                 175

Ser Thr Tyr Ser Leu Ser Ser Thr Leu Thr Leu Ser Lys Ala Asp Tyr
            180                 185                 190

Glu Lys His Lys Val Tyr Ala Cys Glu Val Thr His Gln Gly Leu Ser
            195                 200                 205

Ser Pro Val Thr Lys Ser Phe Asn Arg Gly Glu Cys
210                 215                 220

<210> SEQ ID NO 216
<211> LENGTH: 121
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 216

Gln Gln Gln Leu Glu Glu Ser Gly Gly Gly Leu Val Thr Pro Gly Thr
 1               5                  10                  15

Pro Leu Thr Leu Thr Cys Thr Val Ser Gly Phe Ser Leu Ser Asn Tyr
             20                  25                  30

Ala Met Gly Trp Val Arg Gln Ala Pro Gly Lys Gly Leu Glu Trp Ile
         35                  40                  45

Gly Thr Ile Asn Asp Gly Gly Thr Ala Phe Tyr Ala Asn Trp Leu Lys
 50                  55                  60

Gly Arg Phe Thr Ile Ser Arg Thr Ser Thr Thr Val Asp Leu Lys Ile
 65                  70                  75                  80

Thr Ser Pro Thr Thr Glu Asp Thr Ala Thr Tyr Phe Cys Ala Arg Ala
                 85                  90                  95

Tyr Gly Ser Asn Gly Asp Val Tyr Trp Gly Tyr Phe Asn Leu Trp Gly
            100                 105                 110

Gln Gly Thr Leu Val Thr Val Ser Ser
        115                 120

<210> SEQ ID NO 217
<211> LENGTH: 113
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 217
```

Ala Ser Glu Leu Val Met Thr Gln Thr Ala Ser Pro Val Ser Ala Ala
1               5                   10                  15

Val Gly Gly Thr Val Thr Ile Asn Cys Gln Ala Ser Gln Ser Ile Ser
            20                  25                  30

Ser Arg Ser Leu Ser Trp Tyr Gln Gln Lys Pro Gly Gln Pro Pro Lys
            35                  40                  45

Leu Leu Ile Tyr Glu Ala Ser Lys Leu Ala Ser Gly Val Pro Ser Arg
        50                  55                  60

Phe Ser Gly Ser Gly Ser Gly Thr Gln Phe Thr Leu Thr Ile Ser Gly
65                  70                  75                  80

Val Gln Ala Asp Asp Ala Ala Thr Tyr Tyr Cys Gln Gln Gly Tyr Ser
            85                  90                  95

Ser Ser Asn Val Asp Asn Val Phe Gly Gly Gly Thr Glu Val Val Val
            100                 105                 110

Lys

<210> SEQ ID NO 218
<211> LENGTH: 224
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 218

Gln Gln Gln Leu Glu Glu Ser Gly Gly Gly Leu Val Thr Pro Gly Thr
1               5                   10                  15

Pro Leu Thr Leu Thr Cys Thr Val Ser Gly Ile Asp Leu Ser Ser Tyr
            20                  25                  30

Ala Met Gly Trp Val Arg Gln Ala Pro Gly Lys Gly Leu Glu Trp Ile
            35                  40                  45

Gly Thr Ile Asn Asp Gly Gly Ser Ala Phe Tyr Ala Ser Trp Val Lys
        50                  55                  60

Gly Arg Phe Thr Ile Ser Arg Thr Ser Thr Thr Val Asp Leu Lys Ile
65                  70                  75                  80

Thr Ser Pro Thr Ala Glu Asp Thr Ala Thr Tyr Phe Cys Ala Lys Thr
            85                  90                  95

Tyr Gly Thr Asn Gly Asp Val Tyr Trp Gly Tyr Phe Asn Leu Trp Gly
            100                 105                 110

Gln Gly Thr Leu Val Thr Val Ser Ala Ser Thr Lys Gly Pro Ser
            115                 120                 125

Val Phe Pro Leu Ala Pro Ser Ser Lys Ser Thr Ser Gly Gly Thr Ala
        130                 135                 140

Ala Leu Gly Cys Leu Val Lys Asp Tyr Phe Pro Glu Pro Val Thr Val
145                 150                 155                 160

Ser Trp Asn Ser Gly Ala Leu Thr Ser Gly Val His Thr Phe Pro Ala
            165                 170                 175

Val Leu Gln Ser Ser Gly Leu Tyr Ser Leu Ser Ser Val Val Thr Val
            180                 185                 190

Pro Ser Ser Ser Leu Gly Thr Gln Thr Tyr Ile Cys Asn Val Asn His
            195                 200                 205

Lys Pro Ser Asn Thr Lys Val Asp Lys Lys Val Glu Pro Lys Ser Cys
        210                 215                 220

<210> SEQ ID NO 219
<211> LENGTH: 219

<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 219

Ala Ser Glu Leu Val Met Thr Gln Thr Pro Ala Ser Val Ser Glu Pro
1               5                   10                  15

Val Gly Gly Thr Val Thr Ile Lys Cys Gln Ala Ser Gln Ser Ile Gly
            20                  25                  30

Ser Asn Leu Ala Trp Tyr Gln Gln Lys Pro Gly Gln Pro Pro Lys Leu
        35                  40                  45

Leu Ile Tyr Tyr Glu Ser Ile Leu Ala Ser Gly Val Pro Ser Arg Phe
    50                  55                  60

Ser Gly Ser Gly Ser Gly Thr Glu Tyr Thr Leu Thr Ile Ser Gly Ala
65                  70                  75                  80

Gln Ala Asp Asp Ala Ala Thr Tyr Tyr Cys Gln Gln Gly Tyr Ser Ser
                85                  90                  95

Ser Asn Ile Leu Asn Ala Phe Gly Gly Gly Thr Glu Val Val Val Lys
            100                 105                 110

Arg Thr Val Ala Ala Pro Ser Val Phe Ile Phe Pro Pro Ser Asp Glu
        115                 120                 125

Gln Leu Lys Ser Gly Thr Ala Ser Val Val Cys Leu Leu Asn Asn Phe
130                 135                 140

Tyr Pro Arg Glu Ala Lys Val Gln Trp Lys Val Asp Asn Ala Leu Gln
145                 150                 155                 160

Ser Gly Asn Ser Gln Glu Ser Val Thr Glu Gln Asp Ser Lys Asp Ser
                165                 170                 175

Thr Tyr Ser Leu Ser Ser Thr Leu Thr Leu Ser Lys Ala Asp Tyr Glu
            180                 185                 190

Lys His Lys Val Tyr Ala Cys Glu Val Thr His Gln Gly Leu Ser Ser
        195                 200                 205

Pro Val Thr Lys Ser Phe Asn Arg Gly Glu Cys
    210                 215

<210> SEQ ID NO 220
<211> LENGTH: 121
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 220

Gln Gln Gln Leu Glu Glu Ser Gly Gly Gly Leu Val Thr Pro Gly Thr
1               5                   10                  15

Pro Leu Thr Leu Thr Cys Thr Val Ser Gly Ile Asp Leu Ser Ser Tyr
            20                  25                  30

Ala Met Gly Trp Val Arg Gln Ala Pro Gly Lys Gly Leu Glu Trp Ile
        35                  40                  45

Gly Thr Ile Asn Asp Gly Gly Ser Ala Phe Tyr Ala Ser Trp Val Lys
    50                  55                  60

Gly Arg Phe Thr Ile Ser Arg Thr Ser Thr Val Asp Leu Lys Ile
65                  70                  75                  80

Thr Ser Pro Thr Ala Glu Asp Thr Ala Thr Tyr Phe Cys Ala Lys Thr
                85                  90                  95

Tyr Gly Thr Asn Gly Asp Val Tyr Trp Gly Tyr Phe Asn Leu Trp Gly
            100                 105                 110

Gln Gly Thr Leu Val Thr Val Ser Ser
        115                 120

<210> SEQ ID NO 221
<211> LENGTH: 112
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 221

Ala Ser Glu Leu Val Met Thr Gln Thr Pro Ala Ser Val Ser Glu Pro
1               5                   10                  15

Val Gly Gly Thr Val Thr Ile Lys Cys Gln Ala Ser Gln Ser Ile Gly
            20                  25                  30

Ser Asn Leu Ala Trp Tyr Gln Gln Lys Pro Gly Gln Pro Pro Lys Leu
        35                  40                  45

Leu Ile Tyr Tyr Glu Ser Ile Leu Ala Ser Gly Val Pro Ser Arg Phe
    50                  55                  60

Ser Gly Ser Gly Ser Gly Thr Glu Tyr Thr Leu Thr Ile Ser Gly Ala
65                  70                  75                  80

Gln Ala Asp Asp Ala Ala Thr Tyr Tyr Cys Gln Gln Gly Tyr Ser Ser
                85                  90                  95

Ser Asn Ile Leu Asn Ala Phe Gly Gly Gly Thr Glu Val Val Val Lys
            100                 105                 110

<210> SEQ ID NO 222
<211> LENGTH: 222
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 222

Gln Ser Val Glu Glu Ser Gly Gly Arg Leu Val Thr Pro Gly Thr Pro
1               5                   10                  15

Leu Thr Leu Thr Cys Thr Val Ser Gly Phe Ser Leu Ser Asn Tyr Ala
            20                  25                  30

Met Ser Trp Val Arg Gln Ala Pro Gly Lys Gly Leu Glu Tyr Ile Gly
        35                  40                  45

Ile Val Ser Ser Gly Gly Thr Thr Tyr Tyr Ala Ser Trp Ala Lys Gly
    50                  55                  60

Arg Phe Thr Ile Ser Lys Thr Ser Thr Thr Val Asp Leu Lys Ile Thr
65                  70                  75                  80

Ser Pro Thr Thr Glu Asp Thr Ala Thr Tyr Phe Cys Ala Lys Asp Leu
                85                  90                  95

Tyr Tyr Gly Pro Thr Thr Tyr Ser Ala Phe Asn Leu Trp Gly Gln Gly
            100                 105                 110

Thr Leu Val Thr Val Ser Ser Ala Ser Thr Lys Gly Pro Ser Val Phe
        115                 120                 125

Pro Leu Ala Pro Ser Ser Lys Ser Thr Ser Gly Gly Thr Ala Ala Leu
    130                 135                 140

Gly Cys Leu Val Lys Asp Tyr Phe Pro Glu Pro Val Thr Val Ser Trp
145                 150                 155                 160

```
Asn Ser Gly Ala Leu Thr Ser Gly Val His Thr Phe Pro Ala Val Leu
            165                 170                 175

Gln Ser Ser Gly Leu Tyr Ser Leu Ser Ser Val Val Thr Val Pro Ser
            180                 185                 190

Ser Ser Leu Gly Thr Gln Thr Tyr Ile Cys Asn Val Asn His Lys Pro
            195                 200                 205

Ser Asn Thr Lys Val Asp Lys Lys Val Glu Pro Lys Ser Cys
210             215                 220

<210> SEQ ID NO 223
<211> LENGTH: 221
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 223

Ala Ser Glu Leu Val Leu Thr Gln Pro Gln Ser Val Ser Gly Ser Leu
1               5                   10                  15

Gly Gln Thr Val Ser Ile Ser Cys Lys Arg Ala Arg Asn Asn Ile Glu
            20                  25                  30

Asp Tyr Tyr Val His Trp Tyr Gln Gln His Pro Gly Arg Ser Pro Thr
        35                  40                  45

Ile Val Ile His Lys Asp Asp Gln Arg Pro Ser Gly Val Pro Asp Arg
50                  55                  60

Phe Ser Gly Ser Ile Asp Ser Thr Ser Asn Ser Ala Ser Leu Thr Ile
65                  70                  75                  80

Thr Gly Leu Leu Ala Glu Asp Glu Ala Asp Tyr Phe Cys Gln Ser Phe
                85                  90                  95

Asp Asn Asn Ala Asn Pro Val Phe Gly Gly Thr Gln Leu Thr Val
            100                 105                 110

Thr Gly Arg Thr Val Ala Ala Pro Ser Val Phe Ile Phe Pro Pro Ser
            115                 120                 125

Asp Glu Gln Leu Lys Ser Gly Thr Ala Ser Val Val Cys Leu Leu Asn
130                 135                 140

Asn Phe Tyr Pro Arg Glu Ala Lys Val Gln Trp Lys Val Asp Asn Ala
145                 150                 155                 160

Leu Gln Ser Gly Asn Ser Gln Glu Ser Val Thr Glu Gln Asp Ser Lys
                165                 170                 175

Asp Ser Thr Tyr Ser Leu Ser Ser Thr Leu Thr Leu Ser Lys Ala Asp
            180                 185                 190

Tyr Glu Lys His Lys Val Tyr Ala Cys Glu Val Thr His Gln Gly Leu
        195                 200                 205

Ser Ser Pro Val Thr Lys Ser Phe Asn Arg Gly Glu Cys
210                 215                 220

<210> SEQ ID NO 224
<211> LENGTH: 119
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 224

Gln Ser Val Glu Glu Ser Gly Gly Arg Leu Val Thr Pro Gly Thr Pro
1               5                   10                  15
```

```
Leu Thr Leu Thr Cys Thr Val Ser Gly Phe Ser Leu Ser Asn Tyr Ala
            20                  25                  30

Met Ser Trp Val Arg Gln Ala Pro Gly Lys Gly Leu Glu Tyr Ile Gly
        35                  40                  45

Ile Val Ser Ser Gly Gly Thr Thr Tyr Tyr Ala Ser Trp Ala Lys Gly
    50                  55                  60

Arg Phe Thr Ile Ser Lys Thr Ser Thr Thr Val Asp Leu Lys Ile Thr
65                  70                  75                  80

Ser Pro Thr Thr Glu Asp Thr Ala Thr Tyr Phe Cys Ala Lys Asp Leu
                85                  90                  95

Tyr Tyr Gly Pro Thr Thr Tyr Ser Ala Phe Asn Leu Trp Gly Gln Gly
            100                 105                 110

Thr Leu Val Thr Val Ser Ser
            115

<210> SEQ ID NO 225
<211> LENGTH: 114
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 225

Ala Ser Glu Leu Val Leu Thr Gln Pro Gln Ser Val Ser Gly Ser Leu
1               5                   10                  15

Gly Gln Thr Val Ser Ile Ser Cys Lys Arg Ala Arg Asn Asn Ile Glu
            20                  25                  30

Asp Tyr Tyr Val His Trp Tyr Gln Gln His Pro Gly Arg Ser Pro Thr
        35                  40                  45

Ile Val Ile His Lys Asp Asp Gln Arg Pro Ser Gly Val Pro Asp Arg
    50                  55                  60

Phe Ser Gly Ser Ile Asp Ser Thr Ser Asn Ser Ala Ser Leu Thr Ile
65                  70                  75                  80

Thr Gly Leu Leu Ala Glu Asp Glu Ala Asp Tyr Phe Cys Gln Ser Phe
                85                  90                  95

Asp Asn Asn Ala Asn Pro Val Phe Gly Gly Thr Gln Leu Thr Val
            100                 105                 110

Thr Gly

<210> SEQ ID NO 226
<211> LENGTH: 222
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 226

Gln Ser Val Lys Glu Ser Gly Gly Arg Leu Val Thr Pro Gly Thr Pro
1               5                   10                  15

Leu Thr Leu Thr Cys Thr Val Ser Gly Phe Ser Leu Ser Asn Tyr Ala
            20                  25                  30

Met Ser Trp Val Arg Gln Ala Pro Gly Lys Gly Leu Glu Tyr Ile Gly
        35                  40                  45

Ile Val Ser Ser Gly Gly Thr Thr Tyr Tyr Ala Ser Trp Ala Lys Gly
    50                  55                  60

Arg Phe Thr Ile Ser Lys Thr Ser Thr Thr Val Asp Leu Lys Ile Thr
```

```
              65                  70                  75                  80
Ser Pro Thr Thr Glu Asp Thr Ala Thr Tyr Phe Cys Ala Lys Asp Leu
                    85                  90                  95

Tyr Tyr Gly Pro Thr Thr Tyr Ser Ala Phe Asn Leu Trp Gly Gln Gly
                100                 105                 110

Thr Leu Val Thr Val Ser Ser Ala Ser Thr Lys Gly Pro Ser Val Phe
                115                 120                 125

Pro Leu Ala Pro Ser Ser Lys Ser Thr Ser Gly Gly Thr Ala Ala Leu
            130                 135                 140

Gly Cys Leu Val Lys Asp Tyr Phe Pro Glu Pro Val Thr Val Ser Trp
145                 150                 155                 160

Asn Ser Gly Ala Leu Thr Ser Gly Val His Thr Phe Pro Ala Val Leu
                165                 170                 175

Gln Ser Ser Gly Leu Tyr Ser Leu Ser Ser Val Val Thr Val Pro Ser
                180                 185                 190

Ser Ser Leu Gly Thr Gln Thr Tyr Ile Cys Asn Val Asn His Lys Pro
            195                 200                 205

Ser Asn Thr Lys Val Asp Lys Lys Val Glu Pro Lys Ser Cys
            210                 215                 220
```

<210> SEQ ID NO 227
<211> LENGTH: 221
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 227

```
Ala Ser Glu Leu Val Leu Thr Gln Pro Gln Ser Val Ser Gly Ser Leu
1               5                   10                  15

Gly Gln Thr Val Ser Ile Ser Cys Lys Arg Ala Arg Asp Asn Ile Glu
                20                  25                  30

Asp Tyr Tyr Val His Trp Tyr Gln Gln His Pro Gly Lys Thr Pro Thr
            35                  40                  45

Ile Val Ile His Lys Asp Asp Gln Arg Pro Ser Gly Val Pro Asp Arg
        50                  55                  60

Phe Ser Gly Ser Ile Asp Ser Thr Ser Asn Ser Ala Ser Leu Thr Ile
65                  70                  75                  80

Thr Gly Leu Leu Ala Glu Asp Glu Ala Asp Tyr Phe Cys Gln Ser Phe
                85                  90                  95

Asp Asn Asp Ala Ser Pro Val Phe Gly Gly Thr Gln Leu Thr Val
                100                 105                 110

Thr Gly Arg Thr Val Ala Ala Pro Ser Val Phe Ile Phe Pro Pro Ser
            115                 120                 125

Asp Glu Gln Leu Lys Ser Gly Thr Ala Ser Val Val Cys Leu Leu Asn
        130                 135                 140

Asn Phe Tyr Pro Arg Glu Ala Lys Val Gln Trp Lys Val Asp Asn Ala
145                 150                 155                 160

Leu Gln Ser Gly Asn Ser Gln Glu Ser Val Thr Glu Gln Asp Ser Lys
                165                 170                 175

Asp Ser Thr Tyr Ser Leu Ser Ser Thr Leu Thr Leu Ser Lys Ala Asp
            180                 185                 190

Tyr Glu Lys His Lys Val Tyr Ala Cys Glu Val Thr His Gln Gly Leu
        195                 200                 205
```

```
Ser Ser Pro Val Thr Lys Ser Phe Asn Arg Gly Glu Cys
    210                 215                 220
```

<210> SEQ ID NO 228
<211> LENGTH: 119
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 228

```
Gln Ser Val Lys Glu Ser Gly Gly Arg Leu Val Thr Pro Gly Thr Pro
1               5                   10                  15

Leu Thr Leu Thr Cys Thr Val Ser Gly Phe Ser Leu Ser Asn Tyr Ala
            20                  25                  30

Met Ser Trp Val Arg Gln Ala Pro Gly Lys Gly Leu Glu Tyr Ile Gly
        35                  40                  45

Ile Val Ser Ser Gly Gly Thr Thr Tyr Tyr Ala Ser Trp Ala Lys Gly
    50                  55                  60

Arg Phe Thr Ile Ser Lys Thr Ser Thr Thr Val Asp Leu Lys Ile Thr
65                  70                  75                  80

Ser Pro Thr Thr Glu Asp Thr Ala Thr Tyr Phe Cys Ala Lys Asp Leu
                85                  90                  95

Tyr Tyr Gly Pro Thr Thr Tyr Ser Ala Phe Asn Leu Trp Gly Gln Gly
            100                 105                 110

Thr Leu Val Thr Val Ser Ser
        115
```

<210> SEQ ID NO 229
<211> LENGTH: 114
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 229

```
Ala Ser Glu Leu Val Leu Thr Gln Pro Gln Ser Val Ser Gly Ser Leu
1               5                   10                  15

Gly Gln Thr Val Ser Ile Ser Cys Lys Arg Ala Arg Asp Asn Ile Glu
            20                  25                  30

Asp Tyr Tyr Val His Trp Tyr Gln Gln His Pro Gly Lys Thr Pro Thr
        35                  40                  45

Ile Val Ile His Lys Asp Asp Gln Arg Pro Ser Gly Val Pro Asp Arg
    50                  55                  60

Phe Ser Gly Ser Ile Asp Ser Thr Ser Asn Ser Ala Ser Leu Thr Ile
65                  70                  75                  80

Thr Gly Leu Leu Ala Glu Asp Glu Ala Asp Tyr Phe Cys Gln Ser Phe
                85                  90                  95

Asp Asn Asp Ala Ser Pro Val Phe Gly Gly Gly Thr Gln Leu Thr Val
            100                 105                 110

Thr Gly
```

<210> SEQ ID NO 230
<211> LENGTH: 222
<212> TYPE: PRT
<213> ORGANISM: Artificial Sequence
<220> FEATURE:
<223> OTHER INFORMATION: Description of Artificial Sequence: Synthetic -continued

```
      polypeptide

<400> SEQUENCE: 230

Gln Ser Val Lys Glu Ser Gly Gly Arg Leu Val Thr Pro Gly Thr Pro
1               5                   10                  15

Leu Thr Leu Thr Cys Thr Val Ser Gly Phe Ser Leu Ser Asn Tyr Ala
            20                  25                  30

Met Ser Trp Val Arg Gln Ala Pro Gly Lys Gly Leu Glu Tyr Ile Gly
        35                  40                  45

Ile Val Ser Ser Gly Gly Thr Thr Tyr Tyr Ala Ser Trp Ala Lys Gly
    50                  55                  60

Arg Phe Thr Ile Ser Lys Thr Ser Thr Thr Val Asp Leu Lys Ile Thr
65                  70                  75                  80

Ser Pro Thr Thr Glu Asp Thr Ala Thr Tyr Phe Cys Ala Lys Asp Leu
                85                  90                  95

Tyr Tyr Gly Pro Thr Thr Tyr Ser Ala Phe Asn Leu Trp Gly Gln Gly
            100                 105                 110

Thr Leu Val Thr Val Ser Ser Ala Ser Thr Lys Gly Pro Ser Val Phe
        115                 120                 125

Pro Leu Ala Pro Ser Ser Lys Ser Thr Ser Gly Gly Thr Ala Ala Leu
    130                 135                 140

Gly Cys Leu Val Lys Asp Tyr Phe Pro Glu Pro Val Thr Val Ser Trp
145                 150                 155                 160

Asn Ser Gly Ala Leu Thr Ser Gly Val His Thr Phe Pro Ala Val Leu
                165                 170                 175

Gln Ser Ser Gly Leu Tyr Ser Leu Ser Ser Val Val Thr Val Pro Ser
            180                 185                 190

Ser Ser Leu Gly Thr Gln Thr Tyr Ile Cys Asn Val Asn His Lys Pro
        195                 200                 205

Ser Asn Thr Lys Val Asp Lys Lys Val Glu Pro Lys Ser Cys
    210                 215                 220

<210> SEQ ID NO 231
<211> LENGTH: 221
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 231

Ala Ser Glu Leu Val Leu Thr Gln Pro Gln Ser Val Ser Gly Ser Leu
1               5                   10                  15

Gly Gln Thr Val Ser Ile Ser Cys Lys Arg Ala Arg Asp Asn Ile Glu
            20                  25                  30

Asp Tyr Tyr Val His Trp Tyr Gln Gln Tyr Pro Gly Lys Thr Pro Thr
        35                  40                  45

Ile Val Ile Tyr Lys Asp Asp Gln Arg Pro Ser Gly Val Pro Asp Arg
    50                  55                  60

Phe Ser Gly Ser Ile Asp Ser Thr Ser Asn Ser Ala Ser Leu Thr Ile
65                  70                  75                  80

Thr Gly Leu Leu Ala Glu Asp Glu Ala Asp Tyr Phe Cys Gln Ser Phe
                85                  90                  95

Asp Asn Asn Ala Asn Val Val Phe Gly Gly Gly Thr Gln Leu Thr Val
            100                 105                 110

Thr Gly Arg Thr Val Ala Ala Pro Ser Val Phe Ile Phe Pro Pro Ser
```

```
                115                 120                 125

Asp Glu Gln Leu Lys Ser Gly Thr Ala Ser Val Val Cys Leu Leu Asn
    130                 135                 140

Asn Phe Tyr Pro Arg Glu Ala Lys Val Gln Trp Lys Val Asp Asn Ala
145                 150                 155                 160

Leu Gln Ser Gly Asn Ser Gln Glu Ser Val Thr Glu Gln Asp Ser Lys
                165                 170                 175

Asp Ser Thr Tyr Ser Leu Ser Ser Thr Leu Thr Leu Ser Lys Ala Asp
                180                 185                 190

Tyr Glu Lys His Lys Val Tyr Ala Cys Glu Val Thr His Gln Gly Leu
                195                 200                 205

Ser Ser Pro Val Thr Lys Ser Phe Asn Arg Gly Glu Cys
    210                 215                 220

<210> SEQ ID NO 232
<211> LENGTH: 119
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 232

Gln Ser Val Lys Glu Ser Gly Gly Arg Leu Val Thr Pro Gly Thr Pro
1               5                   10                  15

Leu Thr Leu Thr Cys Thr Val Ser Gly Phe Ser Leu Ser Asn Tyr Ala
                20                  25                  30

Met Ser Trp Val Arg Gln Ala Pro Gly Lys Gly Leu Glu Tyr Ile Gly
            35                  40                  45

Ile Val Ser Ser Gly Gly Thr Thr Tyr Tyr Ala Ser Trp Ala Lys Gly
    50                  55                  60

Arg Phe Thr Ile Ser Lys Thr Ser Thr Val Asp Leu Lys Ile Thr
65                  70                  75                  80

Ser Pro Thr Thr Glu Asp Thr Ala Thr Tyr Phe Cys Ala Lys Asp Leu
                85                  90                  95

Tyr Tyr Gly Pro Thr Thr Tyr Ser Ala Phe Asn Leu Trp Gly Gln Gly
                100                 105                 110

Thr Leu Val Thr Val Ser Ser
        115

<210> SEQ ID NO 233
<211> LENGTH: 114
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 233

Ala Ser Glu Leu Val Leu Thr Gln Pro Gln Ser Val Ser Gly Ser Leu
1               5                   10                  15

Gly Gln Thr Val Ser Ile Ser Cys Lys Arg Ala Arg Asp Asn Ile Glu
                20                  25                  30

Asp Tyr Tyr Val His Trp Tyr Gln Gln Tyr Pro Gly Lys Thr Pro Thr
            35                  40                  45

Ile Val Ile Tyr Lys Asp Asp Gln Arg Pro Ser Gly Val Pro Asp Arg
    50                  55                  60

Phe Ser Gly Ser Ile Asp Ser Thr Ser Asn Ser Ala Ser Leu Thr Ile
```

```
                65                  70                  75                  80
Thr Gly Leu Leu Ala Glu Asp Glu Ala Asp Tyr Phe Cys Gln Ser Phe
                    85                  90                  95
Asp Asn Asn Ala Asn Val Val Phe Gly Gly Thr Gln Leu Thr Val
                100                 105                 110
Thr Gly
```

<210> SEQ ID NO 234
<211> LENGTH: 220
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 234

```
Gln Ser Val Lys Glu Ser Gly Gly Arg Leu Val Thr Pro Gly Thr Pro
1               5                   10                  15
Leu Thr Leu Thr Cys Thr Ala Ser Gly Phe Thr Ile Ser Ser Ala
                20                  25                  30
Ile Ser Trp Val Arg Gln Ala Pro Gly Lys Gly Leu Glu Tyr Ile Gly
                35                  40                  45
Ile Ile Arg Ser Gly Gly Thr Thr Asp Tyr Ala Ser Trp Ala Lys Gly
    50                  55                  60
Arg Phe Ala Ile Ser Lys Thr Ser Thr Thr Val Asp Leu Lys Ile Thr
65                  70                  75                  80
Ser Pro Thr Thr Glu Asp Thr Ala Thr Tyr Phe Cys Ala Arg Asp Pro
                85                  90                  95
Pro Tyr Ile Thr Ser Thr Tyr Phe Asp Leu Trp Gly Gln Gly Thr Leu
                100                 105                 110
Val Thr Val Ser Ser Ala Ser Thr Lys Gly Pro Ser Val Phe Pro Leu
                115                 120                 125
Ala Pro Ser Ser Lys Ser Thr Ser Gly Gly Thr Ala Ala Leu Gly Cys
    130                 135                 140
Leu Val Lys Asp Tyr Phe Pro Glu Pro Val Thr Val Ser Trp Asn Ser
145                 150                 155                 160
Gly Ala Leu Thr Ser Gly Val His Thr Phe Pro Ala Val Leu Gln Ser
                165                 170                 175
Ser Gly Leu Tyr Ser Leu Ser Ser Val Val Thr Val Pro Ser Ser Ser
                180                 185                 190
Leu Gly Thr Gln Thr Tyr Ile Cys Asn Val Asn His Lys Pro Ser Asn
    195                 200                 205
Thr Lys Val Asp Lys Lys Val Glu Pro Lys Ser Cys
    210                 215                 220
```

<210> SEQ ID NO 235
<211> LENGTH: 220
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 235

```
Ala Ser Glu Leu Val Leu Thr Gln Pro Gln Ser Val Ser Gly Ser Leu
1               5                   10                  15
Gly Gln Thr Val Ser Ile Ser Cys Lys Arg Ala Arg Asp Ser Val Glu
                20                  25                  30
```

```
Ser Tyr Asp Val His Trp Tyr Gln Gln His Pro Gly Lys Thr Pro Thr
            35                  40                  45

Ile Val Ile Tyr Lys Asp Asp Gln Arg Pro Ser Gly Val Pro Asp Arg
 50                  55                  60

Phe Ser Gly Ser Ile Asp Ser Thr Ser Asn Ser Ala Ser Leu Thr Ile
 65                  70                  75                  80

Thr Gly Leu Leu Ala Glu Asp Glu Ala Asp Tyr Phe Cys Gln Ser Phe
                 85                  90                  95

Asp Gly Asp Ala Val Val Phe Gly Gly Gly Thr Gln Leu Thr Val Thr
                100                 105                 110

Gly Arg Thr Val Ala Ala Pro Ser Val Phe Ile Phe Pro Pro Ser Asp
            115                 120                 125

Glu Gln Leu Lys Ser Gly Thr Ala Ser Val Val Cys Leu Leu Asn Asn
130                 135                 140

Phe Tyr Pro Arg Glu Ala Lys Val Gln Trp Lys Val Asp Asn Ala Leu
145                 150                 155                 160

Gln Ser Gly Asn Ser Gln Glu Ser Val Thr Glu Gln Asp Ser Lys Asp
                165                 170                 175

Ser Thr Tyr Ser Leu Ser Ser Thr Leu Thr Leu Ser Lys Ala Asp Tyr
            180                 185                 190

Glu Lys His Lys Val Tyr Ala Cys Glu Val Thr His Gln Gly Leu Ser
            195                 200                 205

Ser Pro Val Thr Lys Ser Phe Asn Arg Gly Glu Cys
            210                 215                 220

<210> SEQ ID NO 236
<211> LENGTH: 117
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 236

Gln Ser Val Lys Glu Ser Gly Gly Arg Leu Val Thr Pro Gly Thr Pro
1               5                   10                  15

Leu Thr Leu Thr Cys Thr Ala Ser Gly Phe Thr Ile Ser Ser Ser Ala
            20                  25                  30

Ile Ser Trp Val Arg Gln Ala Pro Gly Lys Gly Leu Glu Tyr Ile Gly
            35                  40                  45

Ile Ile Arg Ser Gly Gly Thr Thr Asp Tyr Ala Ser Trp Ala Lys Gly
 50                  55                  60

Arg Phe Ala Ile Ser Lys Thr Ser Thr Thr Val Asp Leu Lys Ile Thr
 65                  70                  75                  80

Ser Pro Thr Thr Glu Asp Thr Ala Thr Tyr Phe Cys Ala Arg Asp Pro
                 85                  90                  95

Pro Tyr Ile Thr Ser Thr Tyr Phe Asp Leu Trp Gly Gln Gly Thr Leu
                100                 105                 110

Val Thr Val Ser Ser
        115

<210> SEQ ID NO 237
<211> LENGTH: 113
<212> TYPE: PRT
<213> ORGANISM: Artificial Sequence
<220> FEATURE:
<223> OTHER INFORMATION: Description of Artificial Sequence: Synthetic
``` polypeptide

<400> SEQUENCE: 237

Ala Ser Glu Leu Val Leu Thr Gln Pro Gln Ser Val Ser Gly Ser Leu
1               5                   10                  15

Gly Gln Thr Val Ser Ile Ser Cys Lys Arg Ala Arg Asp Ser Val Glu
            20                  25                  30

Ser Tyr Asp Val His Trp Tyr Gln Gln His Pro Gly Lys Thr Pro Thr
        35                  40                  45

Ile Val Ile Tyr Lys Asp Asp Gln Arg Pro Ser Gly Val Pro Asp Arg
    50                  55                  60

Phe Ser Gly Ser Ile Asp Ser Thr Ser Asn Ser Ala Ser Leu Thr Ile
65                  70                  75                  80

Thr Gly Leu Leu Ala Glu Asp Glu Ala Asp Tyr Phe Cys Gln Ser Phe
                85                  90                  95

Asp Gly Asp Ala Val Val Phe Gly Gly Gly Thr Gln Leu Thr Val Thr
            100                 105                 110

Gly

<210> SEQ ID NO 238
<211> LENGTH: 222
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 238

Gln Ser Val Lys Glu Ser Gly Gly Arg Leu Val Thr Pro Gly Thr Pro
1               5                   10                  15

Leu Thr Leu Thr Cys Thr Val Ser Gly Phe Ser Leu Ser Asn Tyr Ala
            20                  25                  30

Met Ser Trp Val Arg Gln Ala Pro Gly Lys Gly Leu Glu Tyr Ile Gly
        35                  40                  45

Ile Val Ser Ser Gly Gly Thr Thr Tyr Tyr Ala Ser Trp Ala Lys Gly
    50                  55                  60

Arg Phe Thr Ile Ser Lys Thr Ser Thr Thr Val Asp Leu Lys Ile Thr
65                  70                  75                  80

Ser Pro Thr Thr Glu Asp Thr Ala Thr Tyr Phe Cys Ala Lys Asp Leu
                85                  90                  95

Tyr Tyr Gly Pro Thr Thr Tyr Ser Ala Phe Asn Leu Trp Gly Gln Gly
            100                 105                 110

Thr Leu Val Thr Val Ser Ser Ala Ser Thr Lys Gly Pro Ser Val Phe
        115                 120                 125

Pro Leu Ala Pro Ser Ser Lys Ser Thr Ser Gly Gly Thr Ala Ala Leu
    130                 135                 140

Gly Cys Leu Val Lys Asp Tyr Phe Pro Glu Pro Val Thr Val Ser Trp
145                 150                 155                 160

Asn Ser Gly Ala Leu Thr Ser Gly Val His Thr Phe Pro Ala Val Leu
                165                 170                 175

Gln Ser Ser Gly Leu Tyr Ser Leu Ser Ser Val Val Thr Val Pro Ser
            180                 185                 190

Ser Ser Leu Gly Thr Gln Thr Tyr Ile Cys Asn Val Asn His Lys Pro
        195                 200                 205

Ser Asn Thr Lys Val Asp Lys Lys Val Glu Pro Lys Ser Cys
    210                 215                 220

```
<210> SEQ ID NO 239
<211> LENGTH: 219
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 239

Ala Ser Glu Leu Val Leu Thr Gln Pro Ala Ser Val Gln Val Asn Leu
1               5                   10                  15

Gly Gln Thr Val Ser Leu Thr Cys Thr Ala Asp Thr Leu Ser Arg Ser
            20                  25                  30

Tyr Ala Ser Trp Tyr Gln Leu Lys Pro Gly Gln Ala Pro Val Leu Leu
        35                  40                  45

Ile Tyr Arg Asp Thr Ser Arg Pro Ser Gly Val Pro Asp Arg Phe Ser
    50                  55                  60

Gly Ser Ser Ser Gly Asn Thr Ala Thr Leu Thr Ile Ser Gly Ala Gln
65                  70                  75                  80

Ala Gly Asp Glu Gly Asp Tyr Val Cys Ala Thr Ser Asp Gly Ser Gly
                85                  90                  95

Ser Asn Phe Gln Leu Phe Gly Gly Thr Gln Leu Thr Val Thr Gly
            100                 105                 110

Arg Thr Val Ala Ala Pro Ser Val Phe Ile Phe Pro Pro Ser Asp Glu
            115                 120                 125

Gln Leu Lys Ser Gly Thr Ala Ser Val Val Cys Leu Leu Asn Asn Phe
    130                 135                 140

Tyr Pro Arg Glu Ala Lys Val Gln Trp Lys Val Asp Asn Ala Leu Gln
145                 150                 155                 160

Ser Gly Asn Ser Gln Glu Ser Val Thr Glu Gln Asp Ser Lys Asp Ser
                165                 170                 175

Thr Tyr Ser Leu Ser Ser Thr Leu Thr Leu Ser Lys Ala Asp Tyr Glu
            180                 185                 190

Lys His Lys Val Tyr Ala Cys Glu Val Thr His Gln Gly Leu Ser Ser
        195                 200                 205

Pro Val Thr Lys Ser Phe Asn Arg Gly Glu Cys
    210                 215

<210> SEQ ID NO 240
<211> LENGTH: 119
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 240

Gln Ser Val Lys Glu Ser Gly Gly Arg Leu Val Thr Pro Gly Thr Pro
1               5                   10                  15

Leu Thr Leu Thr Cys Thr Val Ser Gly Phe Ser Leu Ser Asn Tyr Ala
            20                  25                  30

Met Ser Trp Val Arg Gln Ala Pro Gly Lys Gly Leu Glu Tyr Ile Gly
        35                  40                  45

Ile Val Ser Ser Gly Gly Thr Thr Tyr Tyr Ala Ser Trp Ala Lys Gly
    50                  55                  60

Arg Phe Thr Ile Ser Lys Thr Ser Thr Thr Val Asp Leu Lys Ile Thr
65                  70                  75                  80
```

```
Ser Pro Thr Thr Glu Asp Thr Ala Thr Tyr Phe Cys Ala Lys Asp Leu
                85                  90                  95

Tyr Tyr Gly Pro Thr Thr Tyr Ser Ala Phe Asn Leu Trp Gly Gln Gly
            100                 105                 110

Thr Leu Val Thr Val Ser Ser
        115

<210> SEQ ID NO 241
<211> LENGTH: 112
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 241

Ala Ser Glu Leu Val Leu Thr Gln Pro Ala Ser Val Gln Val Asn Leu
1               5                   10                  15

Gly Gln Thr Val Ser Leu Thr Cys Thr Ala Asp Thr Leu Ser Arg Ser
            20                  25                  30

Tyr Ala Ser Trp Tyr Gln Leu Lys Pro Gly Gln Ala Pro Val Leu Leu
        35                  40                  45

Ile Tyr Arg Asp Thr Ser Arg Pro Ser Gly Val Pro Asp Arg Phe Ser
    50                  55                  60

Gly Ser Ser Ser Gly Asn Thr Ala Thr Leu Thr Ile Ser Gly Ala Gln
65                  70                  75                  80

Ala Gly Asp Glu Gly Asp Tyr Val Cys Ala Thr Ser Asp Gly Ser Gly
                85                  90                  95

Ser Asn Phe Gln Leu Phe Gly Gly Gly Thr Gln Leu Thr Val Thr Gly
            100                 105                 110

<210> SEQ ID NO 242
<211> LENGTH: 224
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 242

Gln Gln Gln Leu Glu Glu Ser Gly Gly Gly Leu Val Thr Pro Gly Thr
1               5                   10                  15

Pro Leu Thr Leu Thr Cys Thr Val Ser Gly Phe Ser Leu Ser Asn Tyr
            20                  25                  30

Ala Met Gly Trp Val Arg Gln Ala Pro Gly Lys Gly Leu Glu Trp Ile
        35                  40                  45

Gly Thr Ile Asn Asp Gly Gly Thr Ala Phe Tyr Ala Asn Trp Leu Lys
    50                  55                  60

Gly Arg Phe Thr Ile Ser Arg Thr Ser Thr Thr Val Asp Leu Lys Ile
65                  70                  75                  80

Thr Ser Pro Thr Thr Glu Asp Thr Ala Thr Tyr Phe Cys Ala Arg Ala
                85                  90                  95

Tyr Gly Ser Asn Gly Asp Val Tyr Trp Gly Tyr Phe Asn Leu Trp Gly
            100                 105                 110

Gln Gly Thr Leu Val Thr Val Ser Ser Ala Ser Thr Lys Gly Pro Ser
        115                 120                 125

Val Phe Pro Leu Ala Pro Ser Ser Lys Ser Thr Ser Gly Gly Thr Ala
    130                 135                 140
```

```
Ala Leu Gly Cys Leu Val Lys Asp Tyr Phe Pro Glu Pro Val Thr Val
145                 150                 155                 160

Ser Trp Asn Ser Gly Ala Leu Thr Ser Gly Val His Thr Phe Pro Ala
                165                 170                 175

Val Leu Gln Ser Ser Gly Leu Tyr Ser Leu Ser Ser Val Val Thr Val
            180                 185                 190

Pro Ser Ser Ser Leu Gly Thr Gln Thr Tyr Ile Cys Asn Val Asn His
        195                 200                 205

Lys Pro Ser Asn Thr Lys Val Asp Lys Lys Val Glu Pro Lys Ser Cys
    210                 215                 220

<210> SEQ ID NO 243
<211> LENGTH: 219
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 243

Ala Ser Glu Leu Val Met Thr Gln Thr Ala Ser Pro Val Ser Ala Ala
1               5                   10                  15

Val Gly Gly Thr Val Thr Ile Asn Cys Gln Ala Ser Gln Ser Ile Ser
            20                  25                  30

Ser Arg Ser Leu Ser Trp Tyr Gln Gln Lys Pro Gly Gln Pro Pro Lys
        35                  40                  45

Leu Leu Ile Tyr Glu Ala Ser Lys Leu Ala Ser Gly Val Pro Ser Arg
50                  55                  60

Phe Ser Gly Ser Gly Ser Gly Thr Gln Phe Thr Leu Thr Ile Ser Gly
65                  70                  75                  80

Val Gln Ala Asp Asp Ala Ala Thr Tyr Tyr Cys Gln Gln Gly Tyr Ser
                85                  90                  95

Ser Ser Asn Val Asp Asn Phe Gly Gly Gly Thr Glu Val Val Val Lys
            100                 105                 110

Arg Thr Val Ala Ala Pro Ser Val Phe Ile Phe Pro Pro Ser Asp Glu
        115                 120                 125

Gln Leu Lys Ser Gly Thr Ala Ser Val Val Cys Leu Leu Asn Asn Phe
    130                 135                 140

Tyr Pro Arg Glu Ala Lys Val Gln Trp Lys Val Asp Asn Ala Leu Gln
145                 150                 155                 160

Ser Gly Asn Ser Gln Glu Ser Val Thr Glu Gln Asp Ser Lys Asp Ser
                165                 170                 175

Thr Tyr Ser Leu Ser Ser Thr Leu Thr Leu Ser Lys Ala Asp Tyr Glu
            180                 185                 190

Lys His Lys Val Tyr Ala Cys Glu Val Thr His Gln Gly Leu Ser Ser
        195                 200                 205

Pro Val Thr Lys Ser Phe Asn Arg Gly Glu Cys
    210                 215

<210> SEQ ID NO 244
<211> LENGTH: 121
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 244
```

```
Gln Gln Gln Leu Glu Glu Ser Gly Gly Gly Leu Val Thr Pro Gly Thr
1               5                   10                  15

Pro Leu Thr Leu Thr Cys Thr Val Ser Gly Phe Ser Leu Ser Asn Tyr
                20                  25                  30

Ala Met Gly Trp Val Arg Gln Ala Pro Gly Lys Gly Leu Glu Trp Ile
            35                  40                  45

Gly Thr Ile Asn Asp Gly Gly Thr Ala Phe Tyr Ala Asn Trp Leu Lys
        50                  55                  60

Gly Arg Phe Thr Ile Ser Arg Thr Ser Thr Thr Val Asp Leu Lys Ile
65              70                  75                  80

Thr Ser Pro Thr Thr Glu Asp Thr Ala Thr Tyr Phe Cys Ala Arg Ala
                85                  90                  95

Tyr Gly Ser Asn Gly Asp Val Tyr Trp Gly Tyr Phe Asn Leu Trp Gly
            100                 105                 110

Gln Gly Thr Leu Val Thr Val Ser Ser
        115                 120
```

<210> SEQ ID NO 245
<211> LENGTH: 112
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 245

```
Ala Ser Glu Leu Val Met Thr Gln Thr Ala Ser Pro Val Ser Ala Ala
1               5                   10                  15

Val Gly Gly Thr Val Thr Ile Asn Cys Gln Ala Ser Gln Ser Ile Ser
                20                  25                  30

Ser Arg Ser Leu Ser Trp Tyr Gln Gln Lys Pro Gly Gln Pro Pro Lys
            35                  40                  45

Leu Leu Ile Tyr Glu Ala Ser Lys Leu Ala Ser Gly Val Pro Ser Arg
        50                  55                  60

Phe Ser Gly Ser Gly Ser Gly Thr Gln Phe Thr Leu Thr Ile Ser Gly
65              70                  75                  80

Val Gln Ala Asp Asp Ala Ala Thr Tyr Tyr Cys Gln Gln Gly Tyr Ser
                85                  90                  95

Ser Ser Asn Val Asp Asn Phe Gly Gly Gly Thr Glu Val Val Val Lys
            100                 105                 110
```

<210> SEQ ID NO 246
<211> LENGTH: 223
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 246

```
Gln Ser Val Lys Glu Ser Trp Gly Arg Leu Val Thr Pro Gly Gly Ser
1               5                   10                  15

Leu Thr Leu Thr Cys Thr Val Ser Gly Ile Asp Leu Asn Asn Tyr Ala
                20                  25                  30

Met Gly Trp Val Arg Gln Ala Pro Gly Lys Gly Leu Glu Trp Ile Gly
            35                  40                  45

Thr Ile Asn Asn Asp Gly Ala Thr Tyr Tyr Pro Ser Trp Ala Arg Gly
        50                  55                  60
```

Arg Phe Thr Ile Ser Lys Ser Thr Thr Val Asp Leu Lys Ile Thr
65                  70                  75                  80

Ser Pro Thr Thr Glu Asp Thr Ala Thr Tyr Phe Cys Ala Arg Thr Tyr
                85                  90                  95

Gly Ser Asn Gly Asp Val Tyr Trp Gly Tyr Phe Asn Leu Trp Gly Gln
            100                 105                 110

Gly Thr Leu Val Thr Val Ser Ser Ala Ser Thr Lys Gly Pro Ser Val
        115                 120                 125

Phe Pro Leu Ala Pro Ser Ser Lys Ser Thr Ser Gly Gly Thr Ala Ala
130                 135                 140

Leu Gly Cys Leu Val Lys Asp Tyr Phe Pro Glu Pro Val Thr Val Ser
145                 150                 155                 160

Trp Asn Ser Gly Ala Leu Thr Ser Gly Val His Thr Phe Pro Ala Val
                165                 170                 175

Leu Gln Ser Ser Gly Leu Tyr Ser Leu Ser Ser Val Val Thr Val Pro
            180                 185                 190

Ser Ser Ser Leu Gly Thr Gln Thr Tyr Ile Cys Asn Val Asn His Lys
        195                 200                 205

Pro Ser Asn Thr Lys Val Asp Lys Lys Val Glu Pro Lys Ser Cys
210                 215                 220

<210> SEQ ID NO 247
<211> LENGTH: 219
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 247

Ala Ser Ala Leu Glu Leu Thr Gln Thr Pro Ala Ser Val Glu Val Ala
1               5                   10                  15

Val Gly Gly Thr Val Thr Ile Asn Cys Gln Ala Ser Gln Ser Ile Gly
            20                  25                  30

Gly Ala Leu Asn Trp Tyr Gln Gln Lys Ser Gly Gln Pro Pro Lys Leu
        35                  40                  45

Leu Ile Tyr Leu Ala Ser Thr Leu Ala Ser Gly Val Ser Ser Arg Phe
50                  55                  60

Lys Gly Ser Gly Ser Gly Thr Gln Phe Thr Leu Thr Ile Ser Gly Val
65                  70                  75                  80

Glu Ala Ala Asp Ala Ala Thr Tyr Tyr Cys Gln Gln Gly Tyr Ser Ala
                85                  90                  95

Ser Asn Ile Asp Asn Ala Phe Gly Gly Gly Thr Glu Val Val Val Lys
            100                 105                 110

Arg Thr Val Ala Ala Pro Ser Val Phe Ile Phe Pro Pro Ser Asp Glu
        115                 120                 125

Gln Leu Lys Ser Gly Thr Ala Ser Val Val Cys Leu Leu Asn Asn Phe
130                 135                 140

Tyr Pro Arg Glu Ala Lys Val Gln Trp Lys Val Asp Asn Ala Leu Gln
145                 150                 155                 160

Ser Gly Asn Ser Gln Glu Ser Val Thr Glu Gln Asp Ser Lys Asp Ser
                165                 170                 175

Thr Tyr Ser Leu Ser Ser Thr Leu Thr Leu Ser Lys Ala Asp Tyr Glu
            180                 185                 190

Lys His Lys Val Tyr Ala Cys Glu Val Thr His Gln Gly Leu Ser Ser

```
            195                 200                 205
Pro Val Thr Lys Ser Phe Asn Arg Gly Glu Cys
    210                 215

<210> SEQ ID NO 248
<211> LENGTH: 120
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 248

Gln Ser Val Lys Glu Ser Trp Gly Arg Leu Val Thr Pro Gly Gly Ser
1               5                   10                  15

Leu Thr Leu Thr Cys Thr Val Ser Gly Ile Asp Leu Asn Asn Tyr Ala
            20                  25                  30

Met Gly Trp Val Arg Gln Ala Pro Gly Lys Gly Leu Glu Trp Ile Gly
        35                  40                  45

Thr Ile Asn Asn Asp Gly Ala Thr Tyr Tyr Pro Ser Trp Ala Arg Gly
    50                  55                  60

Arg Phe Thr Ile Ser Lys Thr Ser Thr Thr Val Asp Leu Lys Ile Thr
65                  70                  75                  80

Ser Pro Thr Thr Glu Asp Thr Ala Thr Tyr Phe Cys Ala Arg Thr Tyr
                85                  90                  95

Gly Ser Asn Gly Asp Val Tyr Trp Gly Tyr Phe Asn Leu Trp Gly Gln
            100                 105                 110

Gly Thr Leu Val Thr Val Ser Ser
        115                 120

<210> SEQ ID NO 249
<211> LENGTH: 112
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 249

Ala Ser Ala Leu Glu Leu Thr Gln Thr Pro Ala Ser Val Glu Val Ala
1               5                   10                  15

Val Gly Gly Thr Val Thr Ile Asn Cys Gln Ala Ser Gln Ser Ile Gly
            20                  25                  30

Gly Ala Leu Asn Trp Tyr Gln Gln Lys Ser Gly Gln Pro Pro Lys Leu
        35                  40                  45

Leu Ile Tyr Leu Ala Ser Thr Leu Ala Ser Gly Val Ser Ser Arg Phe
    50                  55                  60

Lys Gly Ser Gly Ser Gly Thr Gln Phe Thr Leu Thr Ile Ser Gly Val
65                  70                  75                  80

Glu Ala Ala Asp Ala Ala Thr Tyr Tyr Cys Gln Gln Gly Tyr Ser Ala
                85                  90                  95

Ser Asn Ile Asp Asn Ala Phe Gly Gly Gly Thr Glu Val Val Val Lys
            100                 105                 110

<210> SEQ ID NO 250
<211> LENGTH: 221
<212> TYPE: PRT
<213> ORGANISM: Artificial Sequence
<220> FEATURE:
<223> OTHER INFORMATION: Description of Artificial Sequence: Synthetic
```

-continued polypeptide

<400> SEQUENCE: 250

Pro Glu Gln Leu Glu Ser Gly Gly Gly Leu Val Thr Pro Gly Gly
1               5                   10                  15

Val Leu Thr Leu Thr Cys Thr Ala Ser Gly Phe Ser Phe Ser Ser Tyr
            20                  25                  30

Gly Val Asn Trp Val Arg Gln Ala Pro Gly Lys Gly Leu Glu Trp Ile
        35                  40                  45

Gly Phe Ile Phe Gly Asp Gly Thr Thr Tyr Tyr Ala Asn Trp Ala Lys
    50                  55                  60

Gly Arg Phe Thr Ile Ser Lys Thr Ser Thr Thr Val Asp Leu Lys Met
65                  70                  75                  80

Thr Ser Pro Thr Thr Glu Asp Thr Ala Thr Tyr Phe Cys Ala Arg Asp
                85                  90                  95

Gly Tyr Gly Gly Tyr Asp Tyr Ile Ile Asn Leu Trp Gly Gln Gly Thr
            100                 105                 110

Leu Val Thr Val Ser Ser Ala Ser Thr Lys Gly Pro Ser Val Phe Pro
        115                 120                 125

Leu Ala Pro Ser Ser Lys Ser Thr Ser Gly Gly Thr Ala Ala Leu Gly
    130                 135                 140

Cys Leu Val Lys Asp Tyr Phe Pro Glu Pro Val Thr Val Ser Trp Asn
145                 150                 155                 160

Ser Gly Ala Leu Thr Ser Gly Val His Thr Phe Pro Ala Val Leu Gln
                165                 170                 175

Ser Ser Gly Leu Tyr Ser Leu Ser Ser Val Val Thr Val Pro Ser Ser
            180                 185                 190

Ser Leu Gly Thr Gln Thr Tyr Ile Cys Asn Val Asn His Lys Pro Ser
        195                 200                 205

Asn Thr Lys Val Asp Lys Lys Val Glu Pro Lys Ser Cys
    210                 215                 220

<210> SEQ ID NO 251
<211> LENGTH: 222
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 251

Ala Ser Ala Gln Val Leu Thr Gln Thr Pro Ser Val Ser Ala Ala
1               5                   10                  15

Val Gly Gly Thr Val Ser Ile Ser Cys Gln Ser Ser Gln Ser Val Val
            20                  25                  30

Asn Asn Asn Trp Leu Ala Trp Tyr Gln Gln Lys Pro Gly Gln Pro Pro
        35                  40                  45

Lys Leu Leu Ile Tyr Lys Ala Ser Thr Leu Glu Ser Gly Val Pro Ser
    50                  55                  60

Arg Phe Lys Gly Ser Gly Ser Gly Thr Gln Phe Thr Leu Thr Ile Ser
65                  70                  75                  80

Gly Val Gln Ala Asp Asp Ala Ala Thr Tyr Tyr Cys Leu Gly Glu Phe
                85                  90                  95

Ser Cys Ser Ser Ala Asp Cys His Ala Phe Gly Gly Gly Thr Glu Leu
            100                 105                 110

Glu Ile Leu Arg Thr Val Ala Ala Pro Ser Val Phe Ile Phe Pro Pro

```
                    115                 120                 125
Ser Asp Glu Gln Leu Lys Ser Gly Thr Ala Ser Val Val Cys Leu Leu
130                 135                 140

Asn Asn Phe Tyr Pro Arg Glu Ala Lys Val Gln Trp Lys Val Asp Asn
145                 150                 155                 160

Ala Leu Gln Ser Gly Asn Ser Gln Glu Ser Val Thr Glu Gln Asp Ser
                165                 170                 175

Lys Asp Ser Thr Tyr Ser Leu Ser Ser Thr Leu Thr Leu Ser Lys Ala
            180                 185                 190

Asp Tyr Glu Lys His Lys Val Tyr Ala Cys Glu Val Thr His Gln Gly
        195                 200                 205

Leu Ser Ser Pro Val Thr Lys Ser Phe Asn Arg Gly Glu Cys
210                 215                 220

<210> SEQ ID NO 252
<211> LENGTH: 118
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 252

Pro Glu Gln Leu Glu Glu Ser Gly Gly Gly Leu Val Thr Pro Gly Gly
1               5                   10                  15

Val Leu Thr Leu Thr Cys Thr Ala Ser Gly Phe Ser Phe Ser Ser Tyr
            20                  25                  30

Gly Val Asn Trp Val Arg Gln Ala Pro Gly Lys Gly Leu Glu Trp Ile
        35                  40                  45

Gly Phe Ile Phe Gly Asp Gly Thr Thr Tyr Tyr Ala Asn Trp Ala Lys
    50                  55                  60

Gly Arg Phe Thr Ile Ser Lys Thr Ser Thr Thr Val Asp Leu Lys Met
65                  70                  75                  80

Thr Ser Pro Thr Thr Glu Asp Thr Ala Thr Tyr Phe Cys Ala Arg Asp
                85                  90                  95

Gly Tyr Gly Gly Tyr Asp Tyr Ile Ile Asn Leu Trp Gly Gln Gly Thr
            100                 105                 110

Leu Val Thr Val Ser Ser
        115

<210> SEQ ID NO 253
<211> LENGTH: 115
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 253

Ala Ser Ala Gln Val Leu Thr Gln Thr Pro Ala Ser Val Ser Ala Ala
1               5                   10                  15

Val Gly Gly Thr Val Ser Ile Ser Cys Gln Ser Ser Gln Ser Val Val
            20                  25                  30

Asn Asn Asn Trp Leu Ala Trp Tyr Gln Gln Lys Pro Gly Gln Pro Pro
        35                  40                  45

Lys Leu Leu Ile Tyr Lys Ala Ser Thr Leu Glu Ser Gly Val Pro Ser
    50                  55                  60

Arg Phe Lys Gly Ser Gly Ser Gly Thr Gln Phe Thr Leu Thr Ile Ser
```

```
                65                  70                  75                  80
Gly Val Gln Ala Asp Asp Ala Thr Tyr Tyr Cys Leu Gly Glu Phe
                    85                  90                  95

Ser Cys Ser Ser Ala Asp Cys His Ala Phe Gly Gly Gly Thr Glu Leu
                100                 105                 110

Glu Ile Leu
        115

<210> SEQ ID NO 254
<211> LENGTH: 221
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 254

Pro Glu Gln Leu Glu Glu Ser Gly Gly Gly Leu Val Thr Pro Gly Gly
1               5                   10                  15

Val Leu Thr Leu Thr Cys Thr Ala Ser Gly Phe Ser Phe Ser Ser Tyr
                20                  25                  30

Gly Val Asn Trp Val Arg Gln Ala Pro Gly Lys Gly Leu Glu Trp Ile
                35                  40                  45

Gly Phe Ile Phe Gly Asp Gly Thr Thr Tyr Tyr Ala Asn Trp Ala Lys
        50                  55                  60

Gly Arg Phe Thr Ile Ser Lys Thr Ser Thr Thr Val Asp Leu Lys Met
65                  70                  75                  80

Thr Ser Pro Thr Thr Glu Asp Thr Ala Thr Tyr Phe Cys Ala Arg Asp
                85                  90                  95

Gly Tyr Gly Gly Tyr Asp Tyr Ile Ile Asn Leu Trp Gly Gln Gly Thr
                100                 105                 110

Leu Val Thr Val Ser Ser Ala Ser Thr Lys Gly Pro Ser Val Phe Pro
        115                 120                 125

Leu Ala Pro Ser Ser Lys Ser Thr Ser Gly Gly Thr Ala Ala Leu Gly
        130                 135                 140

Cys Leu Val Lys Asp Tyr Phe Pro Glu Pro Val Thr Val Ser Trp Asn
145                 150                 155                 160

Ser Gly Ala Leu Thr Ser Gly Val His Thr Phe Pro Ala Val Leu Gln
                165                 170                 175

Ser Ser Gly Leu Tyr Ser Leu Ser Ser Val Val Thr Val Pro Ser Ser
                180                 185                 190

Ser Leu Gly Thr Gln Thr Tyr Ile Cys Asn Val Asn His Lys Pro Ser
        195                 200                 205

Asn Thr Lys Val Asp Lys Lys Val Glu Pro Lys Ser Cys
        210                 215                 220

<210> SEQ ID NO 255
<211> LENGTH: 221
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 255

Ala Ser Ala Gln Val Leu Thr Gln Thr Pro Ala Ser Val Ser Ala Ala
1               5                   10                  15

Val Gly Gly Thr Val Ser Ile Ser Cys Gln Ser Ser Gln Ser Val Val
```

```
                20                  25                  30
Asn Asn Asn Trp Leu Ala Trp Tyr Gln Gln Lys Pro Gly Gln Pro Pro
                35                  40                  45
Lys Leu Leu Ile Tyr Lys Ala Ser Thr Leu Glu Ser Gly Val Pro Ser
     50                  55                  60
Arg Phe Lys Gly Ser Gly Ser Gly Thr Gln Phe Thr Leu Thr Ile Ser
 65                  70                  75                  80
Gly Val Gln Ala Asp Asp Ala Ala Thr Tyr Tyr Cys Gln Gly Ala Tyr
                 85                  90                  95
Ser Gly Asn Ile Tyr Tyr Asn Ala Phe Gly Gly Gly Thr Glu Val Val
                100                 105                 110
Val Lys Arg Thr Val Ala Ala Pro Ser Val Phe Ile Phe Pro Pro Ser
            115                 120                 125
Asp Glu Gln Leu Lys Ser Gly Thr Ala Ser Val Val Cys Leu Leu Asn
        130                 135                 140
Asn Phe Tyr Pro Arg Glu Ala Lys Val Gln Trp Lys Val Asp Asn Ala
145                 150                 155                 160
Leu Gln Ser Gly Asn Ser Gln Glu Ser Val Thr Glu Gln Asp Ser Lys
                165                 170                 175
Asp Ser Thr Tyr Ser Leu Ser Ser Thr Leu Thr Leu Ser Lys Ala Asp
            180                 185                 190
Tyr Glu Lys His Lys Val Tyr Ala Cys Glu Val Thr His Gln Gly Leu
        195                 200                 205
Ser Ser Pro Val Thr Lys Ser Phe Asn Arg Gly Glu Cys
    210                 215                 220

<210> SEQ ID NO 256
<211> LENGTH: 118
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 256

Pro Glu Gln Leu Glu Glu Ser Gly Gly Gly Leu Val Thr Pro Gly Gly
 1               5                  10                  15
Val Leu Thr Leu Thr Cys Thr Ala Ser Gly Phe Ser Phe Ser Ser Tyr
                20                  25                  30
Gly Val Asn Trp Val Arg Gln Ala Pro Gly Lys Gly Leu Glu Trp Ile
            35                  40                  45
Gly Phe Ile Phe Gly Asp Gly Thr Thr Tyr Tyr Ala Asn Trp Ala Lys
    50                  55                  60
Gly Arg Phe Thr Ile Ser Lys Thr Ser Thr Thr Val Asp Leu Lys Met
 65                  70                  75                  80
Thr Ser Pro Thr Thr Glu Asp Thr Ala Thr Tyr Phe Cys Ala Arg Asp
                 85                  90                  95
Gly Tyr Gly Gly Tyr Asp Tyr Ile Ile Asn Leu Trp Gly Gln Gly Thr
                100                 105                 110
Leu Val Thr Val Ser Ser
            115

<210> SEQ ID NO 257
<211> LENGTH: 114
<212> TYPE: PRT
<213> ORGANISM: Artificial Sequence
<220> FEATURE:
```

<223> OTHER INFORMATION: Description of Artificial Sequence: Synthetic
       polypeptide

<400> SEQUENCE: 257

Ala Ser Ala Gln Val Leu Thr Gln Thr Pro Ala Ser Val Ser Ala Ala
1               5                   10                  15

Val Gly Gly Thr Val Ser Ile Ser Cys Gln Ser Ser Gln Ser Val Val
            20                  25                  30

Asn Asn Asn Trp Leu Ala Trp Tyr Gln Gln Lys Pro Gly Gln Pro Pro
        35                  40                  45

Lys Leu Leu Ile Tyr Lys Ala Ser Thr Leu Glu Ser Gly Val Pro Ser
    50                  55                  60

Arg Phe Lys Gly Ser Gly Ser Gly Thr Gln Phe Thr Leu Thr Ile Ser
65                  70                  75                  80

Gly Val Gln Ala Asp Asp Ala Ala Thr Tyr Tyr Cys Gln Gly Ala Tyr
                85                  90                  95

Ser Gly Asn Ile Tyr Tyr Asn Ala Phe Gly Gly Gly Thr Glu Val Val
            100                 105                 110

Val Lys

<210> SEQ ID NO 258
<211> LENGTH: 220
<212> TYPE: PRT
<213> ORGANISM: Artificial Sequence
<220> FEATURE:
<223> OTHER INFORMATION: Description of Artificial Sequence: Synthetic
       polypeptide

<400> SEQUENCE: 258

Gln Ser Val Lys Glu Ser Gly Gly Gly Leu Val Thr Pro Gly Thr Pro
1               5                   10                  15

Leu Thr Leu Thr Cys Thr Val Ser Gly Phe Ser Leu Ser Thr Tyr Ala
            20                  25                  30

Ile Ser Trp Val Arg Gln Ala Pro Gly Lys Gly Leu Glu Trp Ile Gly
        35                  40                  45

Phe Ile Asp Thr Val Asp Ser Ala Tyr Tyr Ala Ser Trp Ala Lys Gly
    50                  55                  60

Arg Phe Thr Ile Ser Lys Thr Ser Ser Thr Thr Val Asp Leu Lys Met
65                  70                  75                  80

Thr Ser Pro Thr Thr Glu Asp Thr Ala Thr Tyr Phe Cys Ala Lys Leu
                85                  90                  95

Arg Tyr Gly Asp Tyr Gly Asp Tyr Thr Leu Trp Gly Gln Gly Thr Leu
            100                 105                 110

Val Thr Val Ser Ser Ala Ser Thr Lys Gly Pro Ser Val Phe Pro Leu
        115                 120                 125

Ala Pro Ser Ser Lys Ser Thr Ser Gly Gly Thr Ala Ala Leu Gly Cys
    130                 135                 140

Leu Val Lys Asp Tyr Phe Pro Glu Pro Val Thr Val Ser Trp Asn Ser
145                 150                 155                 160

Gly Ala Leu Thr Ser Gly Val His Thr Phe Pro Ala Val Leu Gln Ser
                165                 170                 175

Ser Gly Leu Tyr Ser Leu Ser Ser Val Val Thr Val Pro Ser Ser Ser
            180                 185                 190

Leu Gly Thr Gln Thr Tyr Ile Cys Asn Val Asn His Lys Pro Ser Asn
        195                 200                 205

Thr Lys Val Asp Lys Lys Val Glu Pro Lys Ser Cys

<210> SEQ ID NO 259
<211> LENGTH: 216
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 259

Ala Ser Glu Leu Val Met Thr Gln Thr Pro Ser Pro Val Ser Gly Ala
1               5                   10                  15

Val Gly Gly Thr Val Thr Ile Lys Cys Gln Ala Ser Gln Asn Ile Tyr
            20                  25                  30

Ser Tyr Leu Ala Trp Tyr Gln Gln Lys Pro Gly Gln Pro Pro Lys Leu
        35                  40                  45

Leu Ile Tyr Lys Ala Ser Thr Leu Ala Ser Gly Val Pro Ser Arg Val
    50                  55                  60

Lys Gly Ser Gly Ser Gly Thr Glu Tyr Thr Leu Thr Ile Ser Gly Val
65                  70                  75                  80

Gln Ala Ala Asp Ala Ala Thr Tyr Tyr Cys Gln Cys Thr Tyr Tyr Asp
                85                  90                  95

Ser Asn Thr Phe Gly Gly Gly Thr Glu Val Val Val Lys Arg Thr Val
            100                 105                 110

Ala Ala Pro Ser Val Phe Ile Phe Pro Pro Ser Asp Glu Gln Leu Lys
        115                 120                 125

Ser Gly Thr Ala Ser Val Val Cys Leu Leu Asn Asn Phe Tyr Pro Arg
    130                 135                 140

Glu Ala Lys Val Gln Trp Lys Val Asp Asn Ala Leu Gln Ser Gly Asn
145                 150                 155                 160

Ser Gln Glu Ser Val Thr Glu Gln Asp Ser Lys Asp Ser Thr Tyr Ser
                165                 170                 175

Leu Ser Ser Thr Leu Thr Leu Ser Lys Ala Asp Tyr Glu Lys His Lys
            180                 185                 190

Val Tyr Ala Cys Glu Val Thr His Gln Gly Leu Ser Ser Pro Val Thr
        195                 200                 205

Lys Ser Phe Asn Arg Gly Glu Cys
    210                 215

<210> SEQ ID NO 260
<211> LENGTH: 117
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 260

Gln Ser Val Lys Glu Ser Gly Gly Gly Leu Val Thr Pro Gly Thr Pro
1               5                   10                  15

Leu Thr Leu Thr Cys Thr Val Ser Gly Phe Ser Leu Ser Thr Tyr Ala
            20                  25                  30

Ile Ser Trp Val Arg Gln Ala Pro Gly Lys Gly Leu Glu Trp Ile Gly
        35                  40                  45

Phe Ile Asp Thr Val Asp Ser Ala Tyr Tyr Ala Ser Trp Ala Lys Gly
    50                  55                  60

Arg Phe Thr Ile Ser Lys Thr Ser Ser Thr Thr Val Asp Leu Lys Met

```
                 65                  70                  75                  80
Thr Ser Pro Thr Thr Glu Asp Thr Ala Thr Tyr Phe Cys Ala Lys Leu
                85                  90                  95

Arg Tyr Gly Asp Tyr Gly Asp Tyr Thr Leu Trp Gly Gln Gly Thr Leu
                100                 105                 110

Val Thr Val Ser Ser
            115

<210> SEQ ID NO 261
<211> LENGTH: 109
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 261

Ala Ser Glu Leu Val Met Thr Gln Thr Pro Ser Pro Val Ser Gly Ala
1               5                   10                  15

Val Gly Gly Thr Val Thr Ile Lys Cys Gln Ala Ser Gln Asn Ile Tyr
                20                  25                  30

Ser Tyr Leu Ala Trp Tyr Gln Gln Lys Pro Gly Gln Pro Pro Lys Leu
            35                  40                  45

Leu Ile Tyr Lys Ala Ser Thr Leu Ala Ser Gly Val Pro Ser Arg Val
        50                  55                  60

Lys Gly Ser Gly Ser Gly Thr Glu Tyr Thr Leu Thr Ile Ser Gly Val
65                  70                  75                  80

Gln Ala Ala Asp Ala Ala Thr Tyr Tyr Cys Gln Cys Thr Tyr Tyr Asp
                85                  90                  95

Ser Asn Thr Phe Gly Gly Gly Thr Glu Val Val Val Lys
                100                 105

<210> SEQ ID NO 262
<211> LENGTH: 218
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 262

Pro Ala Ala Leu Glu Glu Ser Gly Gly Arg Leu Val Thr Pro Gly Thr
1               5                   10                  15

Pro Leu Thr Leu Thr Cys Thr Val Ser Gly Ile Asp Leu Ser Thr Phe
                20                  25                  30

Ala Met Thr Trp Val Arg Gln Ala Pro Gly Lys Gly Leu Glu Trp Leu
            35                  40                  45

Gly Ile Ile Asn Thr Gly Gly Ser Ala Tyr Tyr Thr Ser Trp Ala Lys
        50                  55                  60

Gly Arg Phe Thr Ile Ser Arg Thr Ser Thr Thr Val Asp Leu Lys Ile
65                  70                  75                  80

Thr Ser Pro Thr Thr Glu Asp Thr Ala Thr Tyr Phe Cys Ala Arg Gly
                85                  90                  95

Asp Trp Ser Ser Ala Thr Asp Leu Trp Gly Gln Gly Thr Leu Val Thr
                100                 105                 110

Val Ser Ser Ala Ser Thr Lys Gly Pro Ser Val Phe Pro Leu Ala Pro
            115                 120                 125

Ser Ser Lys Ser Thr Ser Gly Gly Thr Ala Ala Leu Gly Cys Leu Val
```

Lys Asp Tyr Phe Pro Glu Pro Val Thr Val Ser Trp Asn Ser Gly Ala
145                 150                 155                 160

Leu Thr Ser Gly Val His Thr Phe Pro Ala Val Leu Gln Ser Ser Gly
                165                 170                 175

Leu Tyr Ser Leu Ser Ser Val Val Thr Val Pro Ser Ser Ser Leu Gly
            180                 185                 190

Thr Gln Thr Tyr Ile Cys Asn Val Asn His Lys Pro Ser Asn Thr Lys
                195                 200                 205

Val Asp Lys Lys Val Glu Pro Lys Ser Cys
210                 215

<210> SEQ ID NO 263
<211> LENGTH: 222
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 263

Ala Ser Asp Pro Asp Met Thr Gln Thr Pro Ser Ser Val Ser Ala Ala
1               5                   10                  15

Val Gly Gly Thr Val Thr Ile Asn Cys Gln Ala Ser Gln Ser Val Tyr
            20                  25                  30

Asp Asn Lys Val Leu Ala Trp Tyr Arg Gln Lys Pro Gly Gln Pro Pro
        35                  40                  45

Lys Leu Leu Ile Tyr Lys Ala Ser Thr Leu Ala Ser Gly Val Pro Ser
50                  55                  60

Arg Phe Lys Gly Arg Gly Ser Gly Thr Gln Phe Thr Leu Thr Ile Ser
65                  70                  75                  80

Gly Val Gln Ala Asp Asp Ala Ala Thr Tyr Tyr Cys Leu Gly Glu Phe
                85                  90                  95

Ser Cys Ser Ser Ala Asp Cys His Ala Phe Gly Gly Gly Thr Glu Leu
            100                 105                 110

Glu Ile Leu Arg Thr Val Ala Ala Pro Ser Val Phe Ile Phe Pro Pro
        115                 120                 125

Ser Asp Glu Gln Leu Lys Ser Gly Thr Ala Ser Val Val Cys Leu Leu
130                 135                 140

Asn Asn Phe Tyr Pro Arg Glu Ala Lys Val Gln Trp Lys Val Asp Asn
145                 150                 155                 160

Ala Leu Gln Ser Gly Asn Ser Gln Glu Ser Val Thr Glu Gln Asp Ser
                165                 170                 175

Lys Asp Ser Thr Tyr Ser Leu Ser Ser Thr Leu Thr Leu Ser Lys Ala
            180                 185                 190

Asp Tyr Glu Lys His Lys Val Tyr Ala Cys Glu Val Thr His Gln Gly
        195                 200                 205

Leu Ser Ser Pro Val Thr Lys Ser Phe Asn Arg Gly Glu Cys
210                 215                 220

<210> SEQ ID NO 264
<211> LENGTH: 115
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 264

Pro Ala Ala Leu Glu Glu Ser Gly Gly Arg Leu Val Thr Pro Gly Thr
1               5                   10                  15

Pro Leu Thr Leu Thr Cys Thr Val Ser Gly Ile Asp Leu Ser Thr Phe
            20                  25                  30

Ala Met Thr Trp Val Arg Gln Ala Pro Gly Lys Gly Leu Glu Trp Leu
        35                  40                  45

Gly Ile Ile Asn Thr Gly Ser Ala Tyr Tyr Thr Ser Trp Ala Lys
    50                  55                  60

Gly Arg Phe Thr Ile Ser Arg Thr Ser Thr Val Asp Leu Lys Ile
65              70                  75                  80

Thr Ser Pro Thr Thr Glu Asp Thr Ala Thr Tyr Phe Cys Ala Arg Gly
                85                  90                  95

Asp Trp Ser Ser Ala Thr Asp Leu Trp Gly Gln Gly Thr Leu Val Thr
            100                 105                 110

Val Ser Ser
        115

<210> SEQ ID NO 265
<211> LENGTH: 115
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 265

Ala Ser Asp Pro Asp Met Thr Gln Thr Pro Ser Ser Val Ser Ala Ala
1               5                   10                  15

Val Gly Gly Thr Val Thr Ile Asn Cys Gln Ala Ser Gln Ser Val Tyr
            20                  25                  30

Asp Asn Lys Val Leu Ala Trp Tyr Arg Gln Lys Pro Gly Gln Pro Pro
        35                  40                  45

Lys Leu Leu Ile Tyr Lys Ala Ser Thr Leu Ala Ser Gly Val Pro Ser
    50                  55                  60

Arg Phe Lys Gly Arg Gly Ser Gly Thr Gln Phe Thr Leu Thr Ile Ser
65              70                  75                  80

Gly Val Gln Ala Asp Asp Ala Ala Thr Tyr Tyr Cys Leu Gly Glu Phe
                85                  90                  95

Ser Cys Ser Ser Ala Asp Cys His Ala Phe Gly Gly Gly Thr Glu Leu
            100                 105                 110

Glu Ile Leu
        115

<210> SEQ ID NO 266
<211> LENGTH: 222
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 266

Gln Ser Val Glu Glu Ser Gly Gly Arg Leu Val Thr Pro Gly Thr Pro
1               5                   10                  15

Leu Thr Leu Thr Cys Thr Val Ser Gly Phe Ser Leu Ser Asn Tyr Ala
            20                  25                  30

Met Ser Trp Val Arg Gln Ala Pro Gly Lys Gly Leu Glu Tyr Ile Gly

```
                35                  40                  45
Ile Val Ser Ser Gly Gly Thr Thr Tyr Tyr Ala Ser Trp Ala Lys Gly
 50                  55                  60

Arg Phe Thr Ile Ser Lys Thr Ser Thr Thr Val Asp Leu Lys Ile Thr
 65                  70                  75                  80

Ser Pro Thr Thr Glu Asp Thr Ala Thr Tyr Phe Cys Ala Lys Asp Leu
                 85                  90                  95

Tyr Tyr Gly Pro Thr Thr Tyr Ser Ala Phe Asn Leu Trp Gly Gln Gly
            100                 105                 110

Thr Leu Val Thr Val Ser Ser Ala Ser Thr Lys Gly Pro Ser Val Phe
        115                 120                 125

Pro Leu Ala Pro Ser Ser Lys Ser Thr Ser Gly Gly Thr Ala Ala Leu
    130                 135                 140

Gly Cys Leu Val Lys Asp Tyr Phe Pro Glu Pro Val Thr Val Ser Trp
145                 150                 155                 160

Asn Ser Gly Ala Leu Thr Ser Gly Val His Thr Phe Pro Ala Val Leu
                165                 170                 175

Gln Ser Ser Gly Leu Tyr Ser Leu Ser Ser Val Val Thr Val Pro Ser
            180                 185                 190

Ser Ser Leu Gly Thr Gln Thr Tyr Ile Cys Asn Val Asn His Lys Pro
        195                 200                 205

Ser Asn Thr Lys Val Asp Lys Lys Val Glu Pro Lys Ser Cys
    210                 215                 220

<210> SEQ ID NO 267
<211> LENGTH: 480
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 267

Ala Ser Glu Leu Val Leu Thr Gln Pro Gln Ser Val Ser Gly Ser Leu
 1                5                  10                  15

Gly Gln Thr Val Ser Ile Ser Cys Lys Arg Ala Arg Asn Asn Ile Glu
                 20                  25                  30

Asp Tyr Tyr Val His Trp Tyr Gln Gln His Pro Gly Arg Ser Pro Thr
             35                  40                  45

Ile Val Ile His Lys Asp Asp Gln Arg Pro Ser Gly Val Pro Asp Arg
 50                  55                  60

Phe Ser Gly Ser Ile Asp Ser Thr Ser Asn Ser Ala Ser Leu Thr Ile
 65                  70                  75                  80

Thr Gly Leu Leu Ala Glu Asp Glu Ala Asp Tyr Phe Cys Gln Ser Phe
                 85                  90                  95

Asp Asn Asn Ala Asn Pro Val Phe Gly Gly Gly Thr Gln Leu Thr Val
            100                 105                 110

Thr Gly Arg Thr Val Ala Ala Pro Ser Val Phe Ile Phe Pro Pro Ser
        115                 120                 125

Asp Glu Gln Leu Lys Ser Gly Thr Ala Ser Val Val Cys Leu Leu Asn
    130                 135                 140

Asn Phe Tyr Pro Arg Glu Ala Lys Val Gln Trp Lys Val Asp Asn Ala
145                 150                 155                 160

Leu Gln Ser Gly Asn Ser Gln Glu Ser Val Thr Glu Gln Asp Ser Lys
                165                 170                 175
```

```
Asp Ser Thr Tyr Ser Leu Ser Ser Leu Thr Leu Ser Lys Ala Asp
            180                 185                 190

Tyr Glu Lys His Lys Val Tyr Ala Cys Glu Val Thr His Gln Gly Leu
        195                 200                 205

Ser Ser Pro Val Thr Lys Ser Phe Asn Arg Gly Glu Cys Gly Gly Gly
    210                 215                 220

Gly Ser Ala Val Val Thr Gln Glu Pro Ser Leu Thr Val Ser Pro Gly
225                 230                 235                 240

Gly Thr Val Thr Leu Thr Cys Gly Ser Ser Thr Gly Ala Val Thr Thr
                245                 250                 255

Ser Asn Tyr Ala Asn Trp Val Gln Gln Lys Pro Gly Lys Ser Pro Arg
        260                 265                 270

Gly Leu Ile Gly Gly Thr Asn Lys Arg Ala Pro Gly Val Pro Ala Arg
    275                 280                 285

Phe Ser Gly Ser Leu Leu Gly Gly Lys Ala Ala Leu Thr Ile Ser Gly
290                 295                 300

Ala Gln Pro Glu Asp Glu Ala Asp Tyr Tyr Cys Ala Leu Trp Tyr Ser
305                 310                 315                 320

Asn His Trp Val Phe Gly Gly Gly Thr Lys Leu Thr Val Leu Gly Gly
                325                 330                 335

Gly Gly Gly Ser Gly Gly Gly Gly Ser Gly Gly Gly Gly Ser Gly Gly
            340                 345                 350

Gly Gly Ser Glu Val Gln Leu Val Glu Ser Gly Gly Gly Ser Val Gln
        355                 360                 365

Pro Gly Gly Ser Leu Arg Leu Ser Cys Ala Ala Ser Gly Phe Thr Phe
    370                 375                 380

Ser Thr Tyr Ala Met Asn Trp Val Arg Gln Ala Pro Gly Lys Gly Leu
385                 390                 395                 400

Glu Trp Val Gly Arg Ile Arg Ser Lys Ala Asn Asn Tyr Ala Thr Tyr
                405                 410                 415

Tyr Ala Asp Ser Val Lys Gly Arg Phe Thr Ile Ser Arg Asp Asp Ser
            420                 425                 430

Lys Asn Thr Leu Tyr Leu Gln Met Asn Ser Leu Arg Ala Glu Asp Thr
        435                 440                 445

Ala Thr Tyr Tyr Cys Val Arg His Gly Asn Phe Gly Asp Ser Tyr Val
    450                 455                 460

Ser Trp Phe Ala Tyr Trp Gly Gln Gly Thr Thr Val Thr Val Ser Ser
465                 470                 475                 480

<210> SEQ ID NO 268
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 268

Gly Val Arg Gly Arg Val Glu Glu Ile
1               5

<210> SEQ ID NO 269
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide
```

<400> SEQUENCE: 269

Ala Val Leu Asp Gly Leu Leu Ser Leu
1               5

<210> SEQ ID NO 270
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 270

Phe Leu Tyr Asp Asp Asn Gln Arg Val
1               5

<210> SEQ ID NO 271
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 271

Tyr Met Leu Asp Leu Gln Pro Glu Thr Thr
1               5                   10

<210> SEQ ID NO 272
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 272

Glu Leu Ala Gly Ile Gly Ile Leu Thr Val
1               5                   10

<210> SEQ ID NO 273
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 273

Glu Ala Ala Gly Ile Gly Ile Leu Thr Val
1               5                   10

<210> SEQ ID NO 274
<211> LENGTH: 8
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 274

Leu Leu Gly Asp Leu Phe Gly Val
1               5

<210> SEQ ID NO 275
<211> LENGTH: 9

```
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 275

Phe Leu Trp Gly Pro Arg Ala Leu Val
1               5

<210> SEQ ID NO 276
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 276

Ser Leu Tyr Asn Thr Val Ala Thr Leu
1               5

<210> SEQ ID NO 277
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 277

Ser Leu Tyr Ser Tyr Phe Gln Lys Val
1               5

<210> SEQ ID NO 278
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 278

Gly Leu Cys Thr Leu Val Ala Met Leu
1               5

<210> SEQ ID NO 279
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 279

Gly Ile Leu Gly Phe Val Phe Thr Leu
1               5

<210> SEQ ID NO 280
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 280

Val Leu Ala Gly Gly Phe Phe Leu Leu
```

```
1               5

<210> SEQ ID NO 281
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 281

Phe Val Gly Glu Phe Phe Thr Asp Val
1               5

<210> SEQ ID NO 282
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 282

Phe Leu Tyr Ala Leu Ala Leu Leu Leu
1               5

<210> SEQ ID NO 283
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 283

Tyr Met Asp Asp Val Val Leu Gly Val
1               5

<210> SEQ ID NO 284
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 284

Ala Leu Leu Thr Ser Arg Leu Arg Phe Ile
1               5                   10

<210> SEQ ID NO 285
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 285

Phe Leu Pro Ser Asp Phe Phe Pro Ser Val
1               5                   10

<210> SEQ ID NO 286
<211> LENGTH: 9
<212> TYPE: PRT
<213> ORGANISM: Artificial Sequence
<220> FEATURE:
<223> OTHER INFORMATION: Description of Artificial Sequence: Synthetic
``` peptide

<400> SEQUENCE: 286

Lys Ile Phe Gly Ser Leu Ala Phe Leu
1               5

<210> SEQ ID NO 287
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 287

Ser Leu Leu Met Trp Ile Thr Gln Val
1               5

<210> SEQ ID NO 288
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 288

Arg Met Phe Pro Asn Ala Pro Tyr Leu
1               5

<210> SEQ ID NO 289
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 289

Tyr Met Asp Gly Thr Met Ser Gln Val
1               5

<210> SEQ ID NO 290
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 290

Val Leu Phe Gly Leu Gly Phe Ala Ile
1               5

<210> SEQ ID NO 291
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 291

Ser Leu Pro Pro Pro Gly Thr Arg Val
1               5

<210> SEQ ID NO 292

```
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 292

Val Leu Glu Glu Thr Ser Val Met Leu
1               5

<210> SEQ ID NO 293
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 293

Arg Met Pro Glu Ala Ala Pro Pro Val
1               5

<210> SEQ ID NO 294
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 294

Ile Leu Lys Glu Pro Val His Gly Val
1               5

<210> SEQ ID NO 295
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 295

Lys Thr Trp Gly Gln Tyr Trp Gln Val
1               5

<210> SEQ ID NO 296
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 296

Ser Leu Leu Pro Ile Met Trp Gln Leu
1               5

<210> SEQ ID NO 297
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 297
```

```
Asn Leu Val Pro Met Val Ala Thr Val
1               5

<210> SEQ ID NO 298
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 298

Val Leu Gln Glu Leu Asn Val Thr Val
1               5

<210> SEQ ID NO 299
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 299

Cys Ile Asn Gly Val Cys Trp Thr Val
1               5

<210> SEQ ID NO 300
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 300

Leu Met Leu Gly Glu Phe Leu Lys Leu
1               5

<210> SEQ ID NO 301
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 301

Val Leu Asp Phe Ala Pro Pro Gly Ala
1               5

<210> SEQ ID NO 302
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 302

Leu Thr Leu Gly Glu Phe Leu Lys Leu
1               5

<210> SEQ ID NO 303
<211> LENGTH: 9
<212> TYPE: PRT
<213> ORGANISM: Artificial Sequence
<220> FEATURE:
```

<223> OTHER INFORMATION: Description of Artificial Sequence: Synthetic
      peptide

<400> SEQUENCE: 303

Ile Met Asp Gln Val Pro Phe Ser Val
1               5

<210> SEQ ID NO 304
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 304

Cys Leu Gly Gly Leu Leu Thr Met Val
1               5

<210> SEQ ID NO 305
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 305

Val Thr Glu His Asp Thr Leu Leu Tyr
1               5

<210> SEQ ID NO 306
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 306

Phe Leu Leu Thr Lys Ile Leu Thr Ile
1               5

<210> SEQ ID NO 307
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 307

Trp Leu Ser Leu Leu Val Gln Phe Val
1               5

<210> SEQ ID NO 308
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 308

Leu Leu Leu Leu Thr Val Leu Thr Val
1               5

```
<210> SEQ ID NO 309
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 309

Phe Leu Leu Thr Arg Ile Leu Thr Ile
1               5

<210> SEQ ID NO 310
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 310

Ile Thr Asp Gln Val Pro Phe Ser Val
1               5

<210> SEQ ID NO 311
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 311

Tyr Met Cys Ser Phe Leu Phe Asn Leu
1               5

<210> SEQ ID NO 312
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 312

Ile Leu Ser Leu Glu Leu Met Lys Leu
1               5

<210> SEQ ID NO 313
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 313

Tyr Leu Glu Tyr Arg Gln Val Pro Val
1               5

<210> SEQ ID NO 314
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 314
```

```
Arg Leu Pro Leu Val Leu Pro Ala Val
1               5

<210> SEQ ID NO 315
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 315

Lys Leu Gln Val Phe Leu Ile Val Leu
1               5

<210> SEQ ID NO 316
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 316

Tyr Leu Gly Ser Tyr Gly Phe Arg Leu
1               5

<210> SEQ ID NO 317
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 317

Gly Leu Ala Asp Gly Arg Thr His Thr Val
1               5                   10

<210> SEQ ID NO 318
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 318

Gly Leu Tyr Asp Gly Pro Val His Glu Val
1               5                   10

<210> SEQ ID NO 319
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 319

Gly Val Phe Asp Gly Leu His Thr Val
1               5

<210> SEQ ID NO 320
<211> LENGTH: 11
<212> TYPE: PRT
<213> ORGANISM: Artificial Sequence
```

```
<220> FEATURE:
<223> OTHER INFORMATION: Description of Artificial Sequence: Synthetic
      peptide

<400> SEQUENCE: 320

Gln Ala Ser Gln Asn Ile Tyr Ser Asn Leu Ala
1               5                   10

<210> SEQ ID NO 321
<211> LENGTH: 85
<212> TYPE: DNA
<213> ORGANISM: Artificial Sequence
<220> FEATURE:
<223> OTHER INFORMATION: Description of Artificial Sequence: Synthetic
      oligonucleotide
<220> FEATURE:
<221> NAME/KEY: modified_base
<222> LOCATION: (85)..(85)
<223> OTHER INFORMATION: a, c, t, or g

<400> SEQUENCE: 321
ggttcaaagg cagtggatct gggacacagt tcactctcac catcagcggc gtgcagtgtg    60
acgatgctgc cacttactac tgtcn                                         85

<210> SEQ ID NO 322
<211> LENGTH: 85
<212> TYPE: DNA
<213> ORGANISM: Oryctolagus sp.

<400> SEQUENCE: 322
ggttcaaagg cagtggatct gggacacagt tcactctcac catcagtggc gtggagtgtg    60
acgatgctgc cacttactac tgtgc                                         85

<210> SEQ ID NO 323
<211> LENGTH: 85
<212> TYPE: DNA
<213> ORGANISM: Oryctolagus sp.

<400> SEQUENCE: 323
ggttcagcgg cagtggatct gggacacagt tcactctcac catcagtggc gtacagtgtg    60
acgatgctgc cacttactac tgtca                                         85

<210> SEQ ID NO 324
<211> LENGTH: 85
<212> TYPE: DNA
<213> ORGANISM: Oryctolagus sp.

<400> SEQUENCE: 324
ggttcaaagg cagtggatct gggacagagt acactcttac catcagcggt gtgcagtgtg    60
acgatgctgc cacttactac tgtca                                         85

<210> SEQ ID NO 325
<211> LENGTH: 85
<212> TYPE: DNA
<213> ORGANISM: Oryctolagus sp.

<400> SEQUENCE: 325
ggttcagtgg cagtggatct gggacacagt tcactctcac catcagcggc gtgcagtgtg    60
acgatgctgc cacttactac tgtca                                         85

<210> SEQ ID NO 326
<211> LENGTH: 85
```

```
<212> TYPE: DNA
<213> ORGANISM: Oryctolagus sp.

<400> SEQUENCE: 326
ggttcagcgg cagtggatct gggaaacagt tcactctcac catcagtggc gtgcagtgtg      60
acgatgctgc cacttactac tgtgc                                           85

<210> SEQ ID NO 327
<211> LENGTH: 85
<212> TYPE: DNA
<213> ORGANISM: Oryctolagus sp.

<400> SEQUENCE: 327
ggttcaacgg cagtggatct gggacacagt ttactctcac catcagcggc gtgcagtgtg      60
acgatgctgc cacttactac tgtca                                           85

<210> SEQ ID NO 328
<211> LENGTH: 85
<212> TYPE: DNA
<213> ORGANISM: Oryctolagus sp.

<400> SEQUENCE: 328
ggttcagcgg cagtggatct gggacacagt ttactctcac catcagcggc gtgcagtgtg      60
acgatgctgc cacttactac tgtca                                           85

<210> SEQ ID NO 329
<211> LENGTH: 85
<212> TYPE: DNA
<213> ORGANISM: Oryctolagus sp.

<400> SEQUENCE: 329
ggttcaaagg cagtggatct gggacacagt tcactctcac catcaacggc gtgcagtgtg      60
acgatgctgc cacttactac tgtca                                           85

<210> SEQ ID NO 330
<211> LENGTH: 85
<212> TYPE: DNA
<213> ORGANISM: Oryctolagus sp.

<400> SEQUENCE: 330
ggttcaaagg cagtggatct gggacacagt tcactctcac catcagtggc gtgcagtgtg      60
acgatgctgc cacttactac tgtct                                           85

<210> SEQ ID NO 331
<211> LENGTH: 85
<212> TYPE: DNA
<213> ORGANISM: Oryctolagus sp.

<400> SEQUENCE: 331
ggttcaaagg cagtggatct gggacacagt tcactctcac catcagcgac ctggagtgtg      60
ccgatgctgc cacttactac tgtca                                           85

<210> SEQ ID NO 332
<211> LENGTH: 85
<212> TYPE: DNA
<213> ORGANISM: Oryctolagus sp.

<400> SEQUENCE: 332
ggttcaaagg cagtggatct gggacacagt tcactctcac catcaacggc gtgcagtgtg      60
```
acgatgctgc cacttactac tgtgc        85

<210> SEQ ID NO 333
<211> LENGTH: 85
<212> TYPE: DNA
<213> ORGANISM: Oryctolagus sp.

<400> SEQUENCE: 333
ggttcaaagg cagtggatct gggacacagt tcactctcac catcagtggc gtgcagtgtg        60
acgatgctgc cacttactac tgtca        85

<210> SEQ ID NO 334
<211> LENGTH: 85
<212> TYPE: DNA
<213> ORGANISM: Oryctolagus sp.

<400> SEQUENCE: 334
ggttcaaagg cagtggattt gggacacagt tcactctcac catcagcggt gcacagtgtg        60
acgatgctgc cacttactac tgtgc        85

<210> SEQ ID NO 335
<211> LENGTH: 85
<212> TYPE: DNA
<213> ORGANISM: Oryctolagus sp.

<400> SEQUENCE: 335
ggttcaaagg cagtggatct gggacacagt tcactctcac catcagcgac gtgcagtgtg        60
acgatgctgc cacttactac tgtca        85

<210> SEQ ID NO 336
<211> LENGTH: 85
<212> TYPE: DNA
<213> ORGANISM: Oryctolagus sp.

<400> SEQUENCE: 336
ggttcaaagg cagtggatct gggacagagt acactctcac catcagtggc gtgcagtgtg        60
ccgatgctgc cacttactac tgtca        85

<210> SEQ ID NO 337
<211> LENGTH: 85
<212> TYPE: DNA
<213> ORGANISM: Oryctolagus sp.

<400> SEQUENCE: 337
ggttcagcgg cagtggatct gggacacagt tcactctcac catcagcggc gtgcagtgtg        60
acgatgctgc cacttactac tgtct        85

<210> SEQ ID NO 338
<211> LENGTH: 85
<212> TYPE: DNA
<213> ORGANISM: Oryctolagus sp.

<400> SEQUENCE: 338
ggttccgtgg cagtggatct gggacacagt tcactcttac catcagcggc atgaaggctg        60
aagatgttgc cacctattac tgtca        85

<210> SEQ ID NO 339
<211> LENGTH: 85
<212> TYPE: DNA
<213> ORGANISM: Oryctolagus sp.

<400> SEQUENCE: 339
ggttcaaagg cagtggatct gggacacagt tcactctcac catcagcggc gtgcagtgtg    60
acgatgctgc cacttactac tgtca                                         85

<210> SEQ ID NO 340
<211> LENGTH: 85
<212> TYPE: DNA
<213> ORGANISM: Oryctolagus sp.

<400> SEQUENCE: 340
ggttcaaagg cagtggatct gggacagagt acactctcac catcagcggt gtgcagtgtg    60
acgatgctgc cacttactac tgtct                                         85

<210> SEQ ID NO 341
<211> LENGTH: 85
<212> TYPE: DNA
<213> ORGANISM: Oryctolagus sp.

<400> SEQUENCE: 341
ggttcagcgg cagtggatct gggacagagt tcactctcac catcagcgac ctggagtgtg    60
ccgatgctgc cacttactac tgtca                                         85

<210> SEQ ID NO 342
<211> LENGTH: 85
<212> TYPE: DNA
<213> ORGANISM: Oryctolagus sp.

<400> SEQUENCE: 342
ggttcaaagg cagtagatct gggacagagt tcactctcac catcagcgac ctggagtgtg    60
ccgatgctgc cacttactac tgtca                                         85

<210> SEQ ID NO 343
<211> LENGTH: 85
<212> TYPE: DNA
<213> ORGANISM: Oryctolagus sp.

<400> SEQUENCE: 343
ggttcaaagg cagtggatct gggacacagt tcactctcac catcagtggt gtgcagtgtg    60
acgatgctgc cacttactac tgtct                                         85

<210> SEQ ID NO 344
<211> LENGTH: 85
<212> TYPE: DNA
<213> ORGANISM: Oryctolagus sp.

<400> SEQUENCE: 344
ggttcaaagg cagtggatct gggacagagt tcactctcac catcagcgac ctggagtgtg    60
ccgatgctgc cacttactac tgtca                                         85

<210> SEQ ID NO 345
<211> LENGTH: 85
<212> TYPE: DNA
<213> ORGANISM: Oryctolagus sp.

<400> SEQUENCE: 345
ggttcagcgg cagtggatct gggacagagt acactctcac catcagcggc gtgcagtgtg    60
acgatgctgc cacttactac tgtca                                         85

<210> SEQ ID NO 346
<211> LENGTH: 85
<212> TYPE: DNA
<213> ORGANISM: Oryctolagus sp.

<400> SEQUENCE: 346
ggttcaaagg cagtggatct gggacacagt tcactctcac catcagcggg gtgcagcctg    60
gagatgctgc cacttactac tgtct                                         85

<210> SEQ ID NO 347
<211> LENGTH: 85
<212> TYPE: DNA
<213> ORGANISM: Oryctolagus sp.

<400> SEQUENCE: 347
ggttcaaagg cagtggatct gggacacagt tcactctcac catcagtggc gtgcagtgtg    60
acgatgctgc cacttactac tgtgc                                         85

<210> SEQ ID NO 348
<211> LENGTH: 85
<212> TYPE: DNA
<213> ORGANISM: Oryctolagus sp.

<400> SEQUENCE: 348
ggttcaaagg cagtggatct gggacagagt acactctcac catcagcgac ctggagtgtg    60
ccgatgctgc cacttactac tgtca                                         85

<210> SEQ ID NO 349
<211> LENGTH: 85
<212> TYPE: DNA
<213> ORGANISM: Oryctolagus sp.

<400> SEQUENCE: 349
gggtcagcag cagtggatca gggacagagt tcactctcac catcagcggg gtgcagcctg    60
gagatgctgc cacttactac tgtct                                         85

<210> SEQ ID NO 350
<211> LENGTH: 83
<212> TYPE: DNA
<213> ORGANISM: Oryctolagus sp.

<400> SEQUENCE: 350
ggttcagcgg cagtggatct gggacacagt ttactctcac catcagcggc gtgcagtgtg    60
acgatgctgc cacttactac tgt                                           83

<210> SEQ ID NO 351
<211> LENGTH: 85
<212> TYPE: DNA
<213> ORGANISM: Oryctolagus sp.

<400> SEQUENCE: 351
ggttcaaagg cagtggatct gggacacagt tcactctcac catcaacggc gtgcagtgtg    60
acgatgctgc cacttactac tgtct                                         85

<210> SEQ ID NO 352
<211> LENGTH: 85
<212> TYPE: DNA
<213> ORGANISM: Oryctolagus sp.

<400> SEQUENCE: 352

```
ggttccgtgg cagtggatct gggacacagt tcactctcac catcaacggc gtgcagtgtg    60
acgatgctgc cacttactac tgtgc                                          85
```

```
<210> SEQ ID NO 353
<211> LENGTH: 70
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 353
gggacacagt tcactctcac catcagcgac gtggagtgtg acgatgctgc cacttactac    60
tgtcaaggct                                                           70
```

```
<210> SEQ ID NO 354
<211> LENGTH: 70
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 354
gggacacagt tcactctcac catcagcgaa gtgcagtgtg acgatgctgc cacttattat    60
tgtcaaggcg                                                           70
```

```
<210> SEQ ID NO 355
<211> LENGTH: 70
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 355
gggacatatt tcactctcac catcagcgac ctggagtgtg ccgatgctgc cacttactac    60
tgtcaaagct                                                           70
```

```
<210> SEQ ID NO 356
<211> LENGTH: 70
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 356
gggacagact acactctcac catcagcgac ctggagtgtg ccgatgctgc cacttactac    60
tgtcaaagta                                                           70
```

```
<210> SEQ ID NO 357
<211> LENGTH: 70
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 357
gggacacagt tcactctcac catcagcggc gtgcagtgtg acgatgctgc cacatacttc    60
tgtctaggcg                                                           70
```

<210> SEQ ID NO 358
<211> LENGTH: 70
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 358
gggacacagt tcactctcac catcagcgac ctggagtgtg acgatgctgc cacttattat      60
tgcctaggcg                                                            70

<210> SEQ ID NO 359
<211> LENGTH: 70
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 359
gggacacagt tcactctcac catcagcgat gtggtgtgtg acgatgctgc cacttactac      60
tgtgcagcct                                                            70

<210> SEQ ID NO 360
<211> LENGTH: 70
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 360
gggacagaat tcactctcac cattagcggc gtgcagtgtg acgatgctgc cacttactac      60
tgtcaaagct                                                            70

<210> SEQ ID NO 361
<211> LENGTH: 70
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 361
gggacasact tcactctcac satcagcgac ctggagtgtg ctgatgctgc crcttattat      60
tgtctaaaca                                                            70

<210> SEQ ID NO 362
<211> LENGTH: 70
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 362
gggacacagt tcactctcac catcagcggc gtgcagtgtg acgatgctgc cacttactac      60
tgtcaaaatt                                                            70

<210> SEQ ID NO 363
<211> LENGTH: 70

```
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 363
gggacacagt tcactctcac catcagcgac ctggagtgtg ccgatgctgc cgcttactac      60
tgtcaaacct                                                             70

<210> SEQ ID NO 364
<211> LENGTH: 70
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 364
gggacacagt tcactctcac catcagcgac gtgcagtgtg acgatgctgc cacttactac      60
tgtgcaggcg                                                             70

<210> SEQ ID NO 365
<211> LENGTH: 70
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 365
gggacacagt tcactctcgc catcagcggc gtgcaatgtg atgatgctgc cacttactac      60
tgcctaggcg                                                             70

<210> SEQ ID NO 366
<211> LENGTH: 70
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 366
gggacacagt tcattctcac catcagcgat gtggtgtgtg acgatgctgc cacttactac      60
tgtgcaggat                                                             70

<210> SEQ ID NO 367
<211> LENGTH: 70
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 367
gggacacagt tcaatctcac catcagtggc gtgcagtgtg acgatgctgc cacttactac      60
tgtcaaggct                                                             70

<210> SEQ ID NO 368
<211> LENGTH: 70
<212> TYPE: DNA
<213> ORGANISM: Artificial Sequence
<220> FEATURE:
<223> OTHER INFORMATION: Description of Artificial Sequence: Synthetic
``` oligonucleotide

<400> SEQUENCE: 368
gggacacagt tcactctcac catcagcggc gtgcagtgtg acgatgctgc cacttactac    60
tgtcaagcct    70

<210> SEQ ID NO 369
<211> LENGTH: 70
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 369
gggacacagt tcactctcac catcagcgac ctggagtgtg ccgatgctgc cacttactac    60
tgtctagccg    70

<210> SEQ ID NO 370
<211> LENGTH: 70
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 370
gggacacagt tcactctcac catcagcgac ctggagtgtg ccgatgctgc cacttactac    60
tgtcaatgtt    70

<210> SEQ ID NO 371
<211> LENGTH: 70
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 371
gggacacagt tcactctcac catcagcgac ttggagtgtg acgatgctgc cacttactac    60
tgtgcaggcc    70

<210> SEQ ID NO 372
<211> LENGTH: 64
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 372
cagttcactc tcaccattag cggcctggag tgtgttgatg ctgccaccta ctactgtcaa    60
ggct    64

<210> SEQ ID NO 373
<211> LENGTH: 8
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: SITE
<222> LOCATION: (1)..(8)

```
<223> OTHER INFORMATION: This sequence may encompass 1-8 residues

<400> SEQUENCE: 373

Gly Gly Gly Gly Gly Gly Gly Gly
1               5

<210> SEQ ID NO 374
<211> LENGTH: 72
<212> TYPE: PRT
<213> ORGANISM: Artificial Sequence
<220> FEATURE:
<223> OTHER INFORMATION: Description of Artificial Sequence: Synthetic
      polypeptide
<220> FEATURE:
<221> NAME/KEY: SITE
<222> LOCATION: (1)..(8)
<223> OTHER INFORMATION: This region may encompass 1-8 residues
<220> FEATURE:
<221> NAME/KEY: SITE
<222> LOCATION: (10)..(17)
<223> OTHER INFORMATION: This region may encompass 1-8 residues
<220> FEATURE:
<221> NAME/KEY: SITE
<222> LOCATION: (19)..(26)
<223> OTHER INFORMATION: This region may encompass 1-8 residues
<220> FEATURE:
<221> NAME/KEY: SITE
<222> LOCATION: (28)..(35)
<223> OTHER INFORMATION: This region may encompass 1-8 residues
<220> FEATURE:
<221> NAME/KEY: SITE
<222> LOCATION: (37)..(44)
<223> OTHER INFORMATION: This region may encompass 1-8 residues
<220> FEATURE:
<221> NAME/KEY: SITE
<222> LOCATION: (46)..(53)
<223> OTHER INFORMATION: This region may encompass 1-8 residues
<220> FEATURE:
<221> NAME/KEY: SITE
<222> LOCATION: (55)..(62)
<223> OTHER INFORMATION: This region may encompass 1-8 residues
<220> FEATURE:
<221> NAME/KEY: SITE
<222> LOCATION: (64)..(71)
<223> OTHER INFORMATION: This region may encompass 1-8 residues
<220> FEATURE:
<221> NAME/KEY: SITE
<222> LOCATION: (1)..(72)
<223> OTHER INFORMATION: This sequence may encompass 1-8 "(Gly)n-Ser"
      repeating units where n=1-8
<220> FEATURE:
<223> OTHER INFORMATION: See specification as filed for detailed
      description of substitutions and preferred embodiments

<400> SEQUENCE: 374

Gly Gly Gly Gly Gly Gly Gly Ser Gly Gly Gly Gly Gly Gly Gly
1               5                   10                  15

Gly Ser Gly Gly Gly Gly Gly Gly Gly Ser Gly Gly Gly Gly Gly
            20                  25                  30

Gly Gly Gly Ser Gly Gly Gly Gly Gly Gly Gly Ser Gly Gly Gly
        35                  40                  45

Gly Gly Gly Gly Ser Gly Gly Gly Gly Gly Gly Gly Ser Gly
    50                  55                  60

Gly Gly Gly Gly Gly Gly Gly Ser
65                  70

<210> SEQ ID NO 375
<211> LENGTH: 20
<212> TYPE: PRT
<213> ORGANISM: Artificial Sequence
<220> FEATURE:
```

```
<223> OTHER INFORMATION: Description of Artificial Sequence: Synthetic
      peptide

<400> SEQUENCE: 375

Gly Gly Gly Gly Ser Gly Gly Gly Ser Gly Gly Gly Ser Gly
1               5                   10                  15

Gly Gly Gly Ser
            20

<210> SEQ ID NO 376
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 376

Asp Gly Gly Gly Ser
1               5

<210> SEQ ID NO 377
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 377

Thr Gly Glu Lys Pro
1               5

<210> SEQ ID NO 378
<211> LENGTH: 4
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 378

Gly Gly Arg Arg
1

<210> SEQ ID NO 379
<211> LENGTH: 25
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: SITE
<222> LOCATION: (1)..(25)
<223> OTHER INFORMATION: This sequence may encompass 1-5 "Gly Gly Gly
      Gly Ser" repeating units

<400> SEQUENCE: 379

Gly Gly Gly Gly Ser Gly Gly Gly Ser Gly Gly Gly Ser Gly
1               5                   10                  15

Gly Gly Gly Ser Gly Gly Gly Gly Ser
            20                  25

<210> SEQ ID NO 380
<211> LENGTH: 14
<212> TYPE: PRT
```

```
<213> ORGANISM: Artificial Sequence
<220> FEATURE:
<223> OTHER INFORMATION: Description of Artificial Sequence: Synthetic
      peptide

<400> SEQUENCE: 380

Glu Gly Lys Ser Ser Gly Ser Gly Ser Glu Ser Lys Val Asp
1               5                   10

<210> SEQ ID NO 381
<211> LENGTH: 18
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 381

Lys Glu Ser Gly Ser Val Ser Ser Glu Gln Leu Ala Gln Phe Arg Ser
1               5                   10                  15

Leu Asp

<210> SEQ ID NO 382
<211> LENGTH: 8
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 382

Gly Gly Arg Arg Gly Gly Gly Ser
1               5

<210> SEQ ID NO 383
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 383

Leu Arg Gln Arg Asp Gly Glu Arg Pro
1               5

<210> SEQ ID NO 384
<211> LENGTH: 12
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 384

Leu Arg Gln Lys Asp Gly Gly Gly Ser Glu Arg Pro
1               5                   10

<210> SEQ ID NO 385
<211> LENGTH: 18
```

```
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 385

Gly Ser Thr Ser Gly Ser Gly Lys Pro Gly Ser Gly Glu Gly Ser Thr
1               5                   10                  15

Lys Gly
```

RABBIT-DERIVED ANTIGEN BINDING PROTEIN NUCLEIC ACID LIBRARIES AND METHODS OF MAKING THE SAME

RELATED APPLICATIONS

This application claims the benefit of U.S. Provisional Application Ser. No. 63/158,689, filed Mar. 9, 2021, U.S. Provisional Application Ser. No. 63/172,863, filed Apr. 9, 2021, and U.S. Provisional Application Ser. No. 63/292,095, filed Dec. 21, 2021, the entire disclosures of which are hereby incorporated herein by reference.

SEQUENCE LISTING

The instant application contains a Sequence Listing which has been submitted electronically in ASCII format and is hereby incorporated by reference in its entirety. Said ASCII copy, created on Jun. 30, 2022, is named 727172_CDR9-005_ST25.txt and is 282,930 bytes in size.

FIELD OF THE INVENTION

This disclosure relates to rabbit-derived antigen binding protein nucleic acid libraries, said antigen binding proteins with binding specificity to a target antigen (e.g., a peptide-MHC) and methods of making the same.

BACKGROUND

Targeted immunotherapies like bispecific antibodies and chimeric antigen receptor (CAR) T-cell therapies represent a promising alternative to treat cancer, however such therapies are limited to target cell surface proteins which oftentimes are not restricted to cancer cells. Inside the cancer cells there are many more proteins that are suitable as cancer-specific targets, such as mutated oncogene products, sufficiently overexpressed proteins in the tumor relative to healthy tissue, proteins normally expressed only in germline cells and thus novel to the adult immune system, and other nontraditional targets which are not accessible to conventional immunotherapies.

Part of the intracellular antigen proteins are degraded into peptides (typically 9-10 amino acids in length for MHC class I complexes) by cytosolic proteases and these peptides are eventually presented on the cell surface by the major histocompatibility complex (MHC) molecule. To date hundreds of MHC-peptide antigens have been identified and characterized as novel tumor-associated antigens. T cell receptors (TCR) can specifically recognize target antigens in the form of peptides presented on MHC class I or class II molecules. This has motivated the use of engineered TCRs to target intracellular proteins presented as peptide MHC complexes. However, TCRs generally exhibit affinities in the range of 1-100 UM after thymic selection and do not exist in nature as soluble proteins. Challenges associated with expression of TCRs as soluble proteins, poor stability and low target affinity have hampered their use.

Rabbits may represent an ideal source for the generation of TCR-Like antibodies. The rabbit immune response is characterized by generation of a highly diverse B-lymphocyte repertoire, high variability in length and sequence of the CDRs provides rabbit antibodies with very high specificity and the ability to recognize small epitopes. Therefore, rabbit antibodies may recognize the peptides in context of the HLA complex in a highly specific manner. In addition, a two steps mechanism for affinity maturation results in very high affinity, typically 10- to 100-fold higher affinity values than mice and other monoclonal antibodies. High affinity is crucial for TCR-Like antibodies in order to deal with the natural presentation levels of pMHCs antigens which can be very low, as low as 10 copies per cell.

Isolation of rabbit antibodies is practically constrained to hybridoma generation and antigen-specific B cell sorting strategies. These technologies are characterized by low survival of B cells and a short time window to screen or immortalize the B cells resulting in loss of antibody diversity and therefore in reduced probability to find a TCR-Like antibody with the desired specificity.

Targeting pMHCs require a more efficient process to explore the whole antibody repertoire in order to increase the probability for isolating antibodies with the right specificity. Immune libraries for phage display selection poses several advantages over conventional hybridoma or B cell sorting technologies. In such libraries the B-cells are isolated from the spleen of immunized animals and the genes encoding for the variable light and heavy chain domains of the antibody repertoire are cloned into phage library vectors. This is advantageous for different reasons. First, the antibody genetic information of the B cell repertoire is rapidly preserved in the library, therefore less losses in antibody diversity due to poor survival of b cells; second, unlimited time window for isolation of antibodies with the right properties; and third the antibodies are screened and selected in monovalent format eliminating artifacts due to avidity effects.

Accordingly, there is a need in the art for novel rabbit antigen binding protein nucleic acid libraries, said rabbit antigen binding proteins specifically recognizing a target antigen (e.g., a peptide-MHC) with high affinity, and methods for producing said nucleic acid libraries. The nucleic acid libraries are useful for identifying antigen binding proteins useful as therapeutic agents to target cells (e.g., cancer cells or virally-infected cells) in a subject.

SUMMARY

Most rabbit light chains of the K1 isotype have an unusual additional disulfide bridge between variable and constant domains through cysteine residues at positions 80 and 171 not present in other species. For the generation of phage libraries derived from immunized rabbits, the variable kappa light chain domains containing cysteine 80 results in a free thiol group, which is disadvantageous for the display and selection of antibody scFv fragments. Therefore, the free thiol group from cysteine 80 may significantly restrict the selectable diversity of the rabbit libraries coming from rabbits immunized with a target antigen (e.g., pMHC), thereby reducing the chances for isolating antibodies with the desired specificity and affinity. In the instant disclosure, Applicant has surprisingly discovered that the diversity of the rabbit variable domain gene repertoire can be significantly expanded by mutating the C80 position. The nucleic acid libraries and methods of producing described herein mutate the C80 position without substantial loss of the full complement of rabbit kappa genes.

In one aspect, the disclosure provides a nucleic acid library comprising a plurality of polynucleotide sequences, each polynucleotide sequence in the plurality encoding for a rabbit antigen binding protein comprising a kappa variable light chain (VL), wherein the kappa VL comprises an amino acid substitution at position C80, according to Kabat numbering, and wherein at least a portion of the plurality of polynucleotide sequences encode for a rabbit antigen binding protein that specifically recognizes a target antigen.

In certain embodiments, the kappa VL comprises a C80A amino acid substitution, according to Kabat numbering.

In certain embodiments, the plurality of polynucleotide sequences are obtained from a rabbit immunized with the target antigen.

In certain embodiments, the target antigen comprises a peptide MHC (pMHC).

In certain embodiments, the pMHC comprises a MAGE-A4 230-239 amino acid sequence of GVYDGREHTV (SEQ ID NO: 3).

In certain embodiments, the pMHC comprises one or both of an HLA-A*02:01 extracellular domain amino acid sequence set forth in SEQ ID NO: 1, and a human β2m amino acid sequence set forth in SEQ ID NO: 2.

In certain embodiments, the C80 amino acid substitution is introduced with a polymerase chain reaction (PCR).

In certain embodiments, multiple PCRs with different pairs of primers specific for rabbit VL sequences are performed. In certain embodiments, the multiple PCRs are performed in multiple reaction vessels. In certain embodiments, the multiple PCRs are performed in one reaction vessel.

In certain embodiments, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67 or 68 PCRs are performed, each with a different pair of primers.

In certain embodiments, the said pairs of primers comprises a first primer introducing a C80 substitution and a second primer. In certain embodiments, the second primer anneals with a conserved sequence stretch of a rabbit VL germline sequence.

In certain embodiments, the PCR is performed with one or more primer pairs selected from F1/R1, F1/R2, F1/R3, F1/R4, F1/R5, F1/R6, F1/R7, F1/R8, F1/R9, F1/R10, F2/R1, F2/R2, F2/R3, F2/R4, F2/R5, F2/R6, F2/R7, F2/R8, F2/R9, and F2/R10, as recited in Table 3.

In certain embodiments, the PCR is performed with one or more primer pairs derived from the sequences of the group consisting of F1/R1, F1/R2, F1/R3, F1/R4, F1/R5, F1/R6, F1/R7, F1/R8, F1/R9, F1/R10, F2/R1, F2/R2, F2/R3, F2/R4, F2/R5, F2/R6, F2/R7, F2/R8, F2/R9, and F2/R10, as recited in Table 3.

In certain embodiments, each of said polynucleotide sequence encoding for a rabbit antigen binding protein is present in a circular DNA construct, e.g., a phagemid or a plasmid.

In certain embodiments, the rabbit antigen binding protein comprises a variable light chain (VL) and variable heavy chain (VH).

In certain embodiments, the VL and VH are operatively linked with an amino acid linker.

In certain embodiments, the VL is operatively linked to a CL domain and the VH is operatively linked to a CH1 domain.

In certain embodiments, the nucleic acid library further comprises a plurality of polynucleotide sequences, wherein each polynucleotide sequence of said plurality encodes for a rabbit lambda VL.

In certain embodiments, the library comprises a diversity of at least about $10^2$, $10^3$, $10^4$, $10^5$, $10^6$, $10^7$, $10^8$, $10^9$, $10^{10}$, $10^{11}$, $10^{12}$, $10^{13}$, $10^{14}$, or $10^{15}$ unique polynucleotide sequences.

In certain embodiments, the library comprises a diversity of at least about $10^2$, $10^3$, $10^4$, $10^5$, $10^6$, $10^7$, $10^8$, $10^9$, $10^{10}$, $10^{11}$, $10^{12}$, $10^{13}$, $10^{14}$, or $10^{15}$ unique polynucleotide sequences encoding rabbit kappa VL.

In certain embodiments, the library comprises a diversity of at least about $10^2$, $10^3$, $10^4$, $10^5$, $10^6$, $10^7$, $10^8$, $10^9$, $10^{10}$, $10^{11}$, $10^{12}$, $10^{13}$, $10^{14}$, or $10^{15}$ unique polynucleotide sequences encoding rabbit lambda VL.

In certain embodiments, the library comprises polynucleotide sequences encoding one or more of rabbit kappa VL genes IGKV1S1 to IGKV1S68, as recited in FIG. 1.

In certain embodiments, the library comprises polynucleotide sequences encoding about 20%, about 30%, about 40%, about 50%, about 60%, about 70%, about 80%, about 90%, about 95%, or 100% of rabbit kappa VL genes IGKV1S1 to IGKV1S68, as recited in FIG. 1.

In certain embodiments, the library comprises polynucleotide sequences encoding rabbit VH CDRH3 amino acids with a length distribution of 5 amino acids to 25 amino acids.

In certain embodiments, the library comprises polynucleotide sequences encoding rabbit VH CDRH3 amino acids with an average length of about 8 amino acids to about 19 amino acids.

In certain embodiments, the library comprises polynucleotide sequences encoding rabbit kappa VL CDRL3 amino acids with a length distribution of 5 amino acids to 16 amino acids.

In certain embodiments, the library comprises polynucleotide sequences encoding rabbit kappa VL CDRL3 amino acids with an average length of about 8 amino acids to about 14 amino acids.

In certain embodiments, the library comprises polynucleotide sequences encoding rabbit lambda VL CDRL3 amino acids with a length distribution of 5 amino acids to 16 amino acids.

In certain embodiments, the library comprises polynucleotide sequences encoding rabbit lambda VL CDRL3 amino acids with an average length of about 8 amino acids to about 14 amino acids.

In one aspect, the disclosure provides a host cell population comprising the nucleic acid library recited above.

In one aspect, the disclosure provides a method of producing a nucleic acid library encoding for a plurality of antigen binding proteins that specifically recognize a target antigen, the method comprising the steps of: (i) immunizing a rabbit with the target antigen; (ii) isolating antigen binding protein encoding polynucleotide sequences from a B cell population from the rabbit, wherein the antigen binding protein encoding polynucleotide sequences encode for at least kappa VL; (iii) cloning the polynucleotide sequences into a nucleic acid library; and (iv) mutagenizing the nucleic acid library to introduce an amino acid substitution at position C80 of the kappa VL, according to Kabat numbering, thereby producing a nucleic acid library encoding for a plurality of antigen binding proteins that specifically recognize a target antigen.

In certain embodiments, the method comprises introducing a C80A amino acid substitution in the kappa VL, according to Kabat numbering.

In certain embodiments, the amino acid substitution is introduced with a polymerase chain reaction (PCR).

In certain embodiments, multiple PCRs with different pairs of primers specific for rabbit VL sequences are performed.

In certain embodiments, multiple PCRs with different pairs of primers specific for rabbit VL sequences are performed.

In certain embodiments, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67 or 68 PCRs are performed, each with a different pair of primers.

In certain embodiments, the said of primers comprises a first primer introducing a C80 substitution and a second primer.

In certain embodiments, the second primer anneals with a conserved sequence stretch of a rabbit VL germline sequence.

In certain embodiments, each of said polynucleotide sequence is present in a circular DNA construct, e.g., a phagemid or a plasmid.

In certain embodiments, the PCR is performed with one or more primer pairs selected from F1/R1, F1/R2, F1/R3, F1/R4, F1/R5, F1/R6, F1/R7, F1/R8, F1/R9, F1/R10, F2/R1, F2/R2, F2/R3, F2/R4, F2/R5, F2/R6, F2/R7, F2/R8, F2/R9, and F2/R10, as recited in Table 3.

In certain embodiments, the PCR is performed with one or more primer pairs derived from the sequences of the group consisting of F1/R1, F1/R2, F1/R3, F1/R4, F1/R5, F1/R6, F1/R7, F1/R8, F1/R9, F1/R10, F2/R1, F2/R2, F2/R3, F2/R4, F2/R5, F2/R6, F2/R7, F2/R8, F2/R9, and F2/R10, as recited in Table 3.

In certain embodiments, the target antigen comprises a pMHC.

In certain embodiments, the antigen binding protein encoding polynucleotide sequences further encode for one or both of lambda VL and VH.

In certain embodiments, the kappa VL or lambda VL are operatively linked to the VH with an amino acid linker.

In certain embodiments, the kappa VL and lambda VL is operatively linked to a CL domain and the VH is operatively linked to a CH1 domain.

In certain embodiments, the library comprises a diversity of at least about $10^2$, $10^3$, $10^4$, $10^5$, $10^6$, $10^7$, $10^8$, $10^9$, $10^{10}$, $10^{11}$, $10^{12}$, $10^{13}$, $10^{14}$, or $10^{15}$ unique polynucleotide sequences.

In certain embodiments, the library comprises a diversity of at least about $10^2$, $10^3$, $10^4$, $10^5$, $10^6$, $10^7$, $10^8$, $10^9$, $10^{10}$, $10^{11}$, $10^{12}$, $10^{13}$, $10^{14}$, or $10^{15}$ unique polynucleotide sequences encoding rabbit kappa VL.

In certain embodiments, the library comprises a diversity of at least about $10^2$, $10^3$, $10^4$, $10^5$, $10^6$, $10^7$, $10^8$, $10^9$, $10^{10}$, $10^{11}$, $10^{12}$, $10^{13}$, $10^{14}$, or $10^{15}$ unique polynucleotide sequences encoding rabbit lambda VL.

In certain embodiments, the library comprises polynucleotide sequences encoding one or more of rabbit kappa VL genes IGKV1S1 to IGKVIS68, as recited in FIG. 1.

In certain embodiments, the library comprises polynucleotide sequences encoding about 20%, about 30%, about 40%, about 50%, about 60%, about 70%, about 80%, about 90%, about 95%, or 100% of rabbit kappa VL genes IGKV1S1 to IGKVIS68, as recited in FIG. 1.

In certain embodiments, the library comprises polynucleotide sequences encoding rabbit VH CDRH3 amino acids with a length distribution of 5 amino acids to 25 amino acids.

In certain embodiments, the library comprises polynucleotide sequences encoding rabbit VH CDRH3 amino acids with an average length of about 8 amino acids to about 19 amino acids.

In certain embodiments, the library comprises polynucleotide sequences encoding rabbit kappa VL CDRL3 amino acids with a length distribution of 5 amino acids to 16 amino acids.

In certain embodiments, the library comprises polynucleotide sequences encoding rabbit kappa VL CDRL3 amino acids with an average length of about 8 amino acids to about 14 amino acids.

In certain embodiments, the library comprises polynucleotide sequences encoding rabbit lambda VL CDRL3 amino acids with a length distribution of 5 amino acids to 16 amino acids.

In certain embodiments, the library comprises polynucleotide sequences encoding rabbit lambda VL CDRL3 amino acids with an average length of about 8 amino acids to about 14 amino acids.

In another aspect, the disclosure provides a method of producing an antigen binding protein that specifically recognizes a target antigen, the method comprising the steps of: (i) immunizing a rabbit with the target antigen; (ii) isolating a plurality of antigen binding protein encoding polynucleotide sequences from the rabbit, wherein the antigen binding protein encoding polynucleotide sequences encode for at least kappa VL; (iii) cloning the polynucleotide sequences into a nucleic acid library; (iv) mutagenizing the nucleic acid library to introduce an amino acid substitution at position C80 of the kappa VL, according to Kabat numbering; and (v) selecting the antigen binding protein that specifically recognizes a target antigen.

In certain embodiments, the method comprises introducing a C80A amino acid substitution in the kappa VL, according to Kabat numbering.

In certain embodiments, the amino acid substitution is introduced with a polymerase chain reaction (PCR).

In certain embodiments, the PCR is performed with one or more primer pairs selected from F1/R1, F1/R2, F1/R3, F1/R4, F1/R5, F1/R6, F1/R7, F1/R8, F1/R9, F1/R10, F2/R1, F2/R2, F2/R3, F2/R4, F2/R5, F2/R6, F2/R7, F2/R8, F2/R9, and F2/R10, as recited in Table 3.

In certain embodiments, the target antigen comprises a pMHC.

In certain embodiments, the antigen binding protein encoding polynucleotide sequences are isolated from a B cell population, such as a peripheral blood mononuclear cell (PBMC) population, a B cell population from spleen, a B cell population from lymph nodes, or a combination thereof.

In certain embodiments, the antigen binding protein encoding polynucleotide sequences further encode for one or both of lambda VL and VH.

In certain embodiments, the kappa VL or lambda VL are operatively linked to the VH with an amino acid linker.

In certain embodiments, the kappa VL and lambda VL is operatively linked to a CL domain and the VH is operatively linked to a CH1 domain.

In certain embodiments, the selecting step (v) is performed through biopanning against the target antigen.

In certain embodiments, the antigen binding protein specifically binds to a tumor antigen.

In certain embodiments, the tumor antigen is selected from the group consisting of: a melanoma-associated antigen A (MAGE-A), such as MAGE-A1, MAGE-A3 and MAGE-A4, New York esophageal squamous cell carcinoma-1 (NY-ESO-1), synovial sarcoma X (SSX), carcinoembryonic antigen (CEA), preferentially expressed antigen in melanoma (PRAME), melanoma antigen recognized by T cells 1 (MART-1), Kirsten rat sarcoma viral oncogene (K-ras), kinetochore NDC80 protein homolog (NDC80), Kita-Kyushu lung cancer antigen (KK-LC-1), and Wilms tumor 1 (WT1).

In certain embodiments, the antigen binding protein specifically binds to a viral antigen.

In certain embodiments, the viral antigen is selected from the group consisting of: Epstein-Barr virus derived EBNA1, EBNA2, EBNA3, LMP1, or LMP2; hepatitis B virus derived HBX; hepatitis C virus derived NS3 or NS5A; human papillomavirus derived type E5, E6, and E7 proteins; cytomegalovirus derived PP65; human immunodeficiency virus derived gag; and Kaposi sarcoma-associated herpesvirus derived vGPCR or vIRF-1.

In one aspect, the disclosure provides an antigen binding protein that specifically recognizes a target antigen, prepared by the method recited above.

In certain embodiments, the nucleic acid library is selected from the group consisting of a ribosome display library, a phage display library, a yeast cell display library, a mammalian cell display library, and a DNA display library.

In certain embodiments, the nucleic acid library is a phage display library.

In certain embodiments, the nucleic acid library comprises a diversity of at least $10^2$, $10^3$, $10^4$, $10^5$, $10^6$, $10^7$, $10^8$, $10^9$, $10^{10}$, $10^{11}$, $10^{12}$, $10^{13}$, $10^{14}$, or $10^{15}$.

In another aspect, the disclosure provides a host cell population comprising the nucleic acid library recited above.

In one aspect, the disclosure provides nucleic acid library comprising a plurality of polynucleotide sequences, each polynucleotide sequence in the plurality encoding for a rabbit antigen binding protein, wherein at least a portion of the plurality of polynucleotide sequences encode for a rabbit antigen binding protein that specifically recognizes a target peptide-MHC (pMHC).

In certain embodiments, the rabbit antigen binding protein comprises a variable light chain (VL).

In certain embodiments, the VL is a kappa VL or lambda VL.

In certain embodiments, the kappa VL further comprises an amino acid substitution at position C80, according to Kabat numbering.

In certain embodiments, the kappa VL further comprises a C80A amino acid substitution, according to Kabat numbering.

In certain embodiments, the plurality of polynucleotide sequences are obtained from a rabbit immunized with the target pMHC.

In certain embodiments, the rabbit antigen binding protein comprises a variable light chain (VL) and variable heavy chain (VH).

In certain embodiments, the VL and VH are operatively linked with an amino acid linker.

In certain embodiments, the library comprises a diversity of at least about $10^2$, $10^3$, $10^4$, $10^5$, $10^6$, $10^7$, $10^8$, $10^9$, $10^{10}$, $10^{11}$, $10^{12}$, $10^{13}$, $10^{14}$, or $10^{15}$ unique polynucleotide sequences.

In certain embodiments, the library comprises a diversity of at least about $10^2$, $10^3$, $10^4$, $10^5$, $10^6$, $10^7$, $10^8$, $10^9$, $10^{10}$, $10^{11}$, $10^{12}$, $10^{13}$, $10^{14}$, or $10^{15}$ unique polynucleotide sequences encoding rabbit kappa VL.

In certain embodiments, the library comprises a diversity of at least about $10^2$, $10^3$, $10^4$, $10^5$, $10^6$, $10^7$, $10^8$, $10^9$, $10^{10}$, $10^{11}$, $10^{12}$, $10^{13}$, $10^{14}$, or $10^{15}$ unique polynucleotide sequences encoding rabbit lambda VL.

In certain embodiments, the library comprises polynucleotide sequences encoding one or more of rabbit kappa VL genes IGKVIS1 to IGKVIS68, as recited in FIG. 1.

In certain embodiments, the library comprises polynucleotide sequences encoding about 20%, about 30%, about 40%, about 50%, about 60%, about 70%, about 80%, about 90%, about 95%, or 100% of rabbit kappa VL genes IGKVIS1 to IGKVIS68, as recited in FIG. 1.

In certain embodiments, the library comprises polynucleotide sequences encoding rabbit VH CDRH3 amino acids with a length distribution of 5 amino acids to 25 amino acids.

In certain embodiments, the library comprises polynucleotide sequences encoding rabbit VH CDRH3 amino acids with an average length of about 8 amino acids to about 19 amino acids.

In certain embodiments, the library comprises polynucleotide sequences encoding rabbit kappa VL CDRL3 amino acids with a length distribution of 5 amino acids to 16 amino acids.

In certain embodiments, the library comprises polynucleotide sequences encoding rabbit kappa VL CDRL3 amino acids with an average length of about 8 amino acids to about 14 amino acids.

In certain embodiments, the library comprises polynucleotide sequences encoding rabbit lambda VL CDRL3 amino acids with a length distribution of 5 amino acids to 16 amino acids.

In certain embodiments, the library comprises polynucleotide sequences encoding rabbit lambda VL CDRL3 amino acids with an average length of about 8 amino acids to about 14 amino acids.

In one aspect, the disclosure provides a host cell population comprising the nucleic acid library recited above.

In one aspect, the disclosure provides a method of producing a nucleic acid library encoding for a plurality of antigen binding proteins that specifically recognize a target peptide-MHC (pMHC), the method comprising the steps of: (i) immunizing a rabbit with the target pMHC; (ii) isolating antigen binding protein encoding polynucleotide sequences from a B cell population from the rabbit; and (iii) cloning the polynucleotide sequences into a nucleic acid library, thereby producing a nucleic acid library encoding for a plurality of antigen binding proteins that specifically recognize a target pMHC.

In certain embodiments, the method comprises immunizing a rabbit with the target pMHC.

In certain embodiments, the polynucleotide sequences encode a variable light chain (VL).

In certain embodiments, the VL is a kappa VL or lambda VL.

In certain embodiments, the method further comprises introducing an amino acid substitution at position C80 of the kappa VL, according to Kabat numbering.

In certain embodiments, the method further comprises introducing a C80A amino acid substitution in the kappa VL, according to Kabat numbering.

In certain embodiments, the amino acid substitution is introduced with a polymerase chain reaction (PCR).

In certain embodiments, the PCR is performed with one or more primer pairs selected from F1/R1, F1/R2, F1/R3, F1/R4, F1/R5, F1/R6, F1/R7, F1/R8, F1/R9, F1/R10, F2/R1, F2/R2, F2/R3, F2/R4, F2/R5, F2/R6, F2/R7, F2/R8, F2/R9, and F2/R10, as recited in Table 3.

In certain embodiments, the polynucleotide sequences encode a variable light chain (VL) and a variable heavy chain (VH).

In certain embodiments, the VL and VH are operatively linked with an amino acid linker.

In certain embodiments, the VL is operatively linked to a CL domain and the VH is operatively linked to a CH1 domain.

In certain embodiments, the library comprises a diversity of at least about $10^2$, $10^3$, $10^4$, $10^5$, $10^6$, $10^7$, $10^8$, $10^9$, $10^{10}$, $10^{11}$, $10^{12}$, $10^{13}$, $10^{14}$, or $10^{15}$ unique polynucleotide sequences.

In certain embodiments, the library comprises a diversity of at least about $10^2$, $10^3$, $10^4$, $10^5$, $10^6$, $10^7$, $10^8$, $10^9$, $10^{10}$, $10^{11}$, $10^{12}$, $10^{13}$, $10^{14}$, or $10^{15}$ unique polynucleotide sequences encoding rabbit kappa VL.

In certain embodiments, the library comprises a diversity of at least about $10^2$, $10^3$, $10^4$, $10^5$, $10^6$, $10^7$, $10^8$, $10^9$, $10^{10}$, $10^{11}$, $10^{12}$, $10^{13}$, $10^{14}$, or $10^{15}$ unique polynucleotide sequences encoding rabbit lambda VL.

In certain embodiments, the library comprises polynucleotide sequences encoding one or more of rabbit kappa VL genes IGKV1S1 to IGKV1S68, as recited in FIG. 1.

In certain embodiments, the library comprises polynucleotide sequences encoding about 20%, about 30%, about 40%, about 50%, about 60%, about 70%, about 80%, about 90%, about 95%, or 100% of rabbit kappa VL genes IGKV1S1 to IGKVIS68, as recited in FIG. 1.

In certain embodiments, the library comprises polynucleotide sequences encoding rabbit VH CDRH3 amino acids with a length distribution of 5 amino acids to 25 amino acids.

In certain embodiments, the library comprises polynucleotide sequences encoding rabbit VH CDRH3 amino acids with an average length of about 8 amino acids to about 19 amino acids.

In certain embodiments, the library comprises polynucleotide sequences encoding rabbit kappa VL CDRL3 amino acids with a length distribution of 5 amino acids to 16 amino acids.

In certain embodiments, the library comprises polynucleotide sequences encoding rabbit kappa VL CDRL3 amino acids with an average length of about 8 amino acids to about 14 amino acids.

In certain embodiments, the library comprises polynucleotide sequences encoding rabbit lambda VL CDRL3 amino acids with a length distribution of 5 amino acids to 16 amino acids.

In certain embodiments, the library comprises polynucleotide sequences encoding rabbit lambda VL CDRL3 amino acids with an average length of about 8 amino acids to about 14 amino acids.

In one aspect, the disclosure provides a method of producing an antigen binding protein that specifically recognizes a target peptide-MHC (pMHC), the method comprising the steps of: (i) immunizing a rabbit with the target pMHC; (ii) isolating a plurality of antigen binding protein encoding polynucleotide sequences from the rabbit; (iii) cloning the plurality of polynucleotide sequences into a nucleic acid library; and (iv) selecting the antigen binding protein that specifically recognizes a target pMHC.

In certain embodiments, the antigen binding protein encoding polynucleotide sequences are isolated from a B cell population, such as a peripheral blood mononuclear cell (PBMC) population, a B cell population from spleen, a B cell population from lymph nodes, or a combination thereof.

In certain embodiments, the plurality of polynucleotide sequences encode variable light chains (VLs).

In certain embodiments, the VLs are one or both of kappa VLs or lambda VLs.

In certain embodiments, the method further comprises introducing an amino acid substitution at position C80 of the kappa VLs, according to Kabat numbering.

In certain embodiments, the method further comprises introducing a C80A amino acid substitution in the kappa VL, according to Kabat numbering.

In certain embodiments, the amino acid substitution is introduced with a polymerase chain reaction (PCR).

In certain embodiments, the PCR is performed with one or more primer pairs selected from F1/R1, F1/R2, F1/R3, F1/R4, F1/R5, F1/R6, F1/R7, F1/R8, F1/R9, F1/R10, F2/R1, F2/R2, F2/R3, F2/R4, F2/R5, F2/R6, F2/R7, F2/R8, F2/R9, and F2/R10, as recited in Table 3.

In certain embodiments, the plurality of polynucleotide sequences encode variable light chains (VLs) and variable heavy chains (VHs).

In certain embodiments, the VL and VH are operatively linked with an amino acid linker.

In certain embodiments, the VL is operatively linked to a CL domain and the VH is operatively linked to a CH1 domain.

In certain embodiments, the selecting step (iv) is performed through biopanning against the target pMHC.

In certain embodiments, the antigen binding protein specifically binds to a tumor antigen.

In certain embodiments, the tumor antigen is selected from the group consisting of: a melanoma-associated antigen A (MAGE-A), such as MAGE-A1, MAGE-A3 and MAGE-A4, New York esophageal squamous cell carcinoma-1 (NY-ESO-1), synovial sarcoma X (SSX), carcinoembryonic antigen (CEA), preferentially expressed antigen in melanoma (PRAME), melanoma antigen recognized by T cells 1 (MART-1), Kirsten rat sarcoma viral oncogene (K-ras), kinetochore NDC80 protein homolog (NDC80), Kita-Kyushu lung cancer antigen (KK-LC-1), and Wilms tumor 1 (WT1).

In certain embodiments, the antigen binding protein specifically binds to a viral antigen.

In certain embodiments, the viral antigen is selected from the group consisting of: Epstein-Barr virus derived EBNA1, EBNA2, EBNA3, LMP1, or LMP2; hepatitis B virus derived HBX; hepatitis C virus derived NS3 or NS5A; human papillomavirus derived type E5, E6, and E7 proteins; cytomegalovirus derived PP65; human immunodeficiency virus derived gag; and Kaposi sarcoma-associated herpesvirus derived vGPCR or vIRF-1.

In another aspect, the disclosure provides an antigen binding protein that specifically recognizes a target pMHC, prepared by the method recited above.

In certain embodiments, the nucleic acid library is selected from the group consisting of a ribosome display library, a phage display library, a yeast cell display library, a mammalian cell display library, and a DNA display library.

In certain embodiments, the nucleic acid library is a phage display library.

In certain embodiments, the nucleic acid library comprises a diversity of at least $10^2$, $10^3$, $10^4$, $10^5$, $10^6$, $10^7$, $10^8$, $10^9$, $10^{10}$, $10^{11}$, $10^{12}$, $10^{13}$, $10^{14}$, or $10^{15}$.

In another aspect, the disclosure provides a host cell population comprising the nucleic acid library recited above.

In another aspect, the disclosure provides a phage-displayed rabbit antigen binding protein library comprising a plurality of phage-displayed rabbit antigen binding proteins, each antigen binding protein comprising a variable heavy chain (VH) and variable light chain (VL), wherein at least a portion of the plurality of phage-displayed rabbit antigen binding proteins specifically recognize a target peptide-MHC (pMHC).

In another aspect, primers specific for rabbit kappa VL polynucleotide sequences are provided, wherein said primers introduce a substitution for the cysteine at Kabat position 80 encoded by said polynucleotide sequence.

In another aspect, kits are provided, comprising the nucleic acid library, the antigen binding proteins and/or primers provided herein.

In certain embodiments, the VL is a kappa VL.

In certain embodiments, the kappa VL further comprises an amino acid substitution at position C80, according to Kabat numbering.

In one aspect, the disclosure provides a pair of primers annealing specifically to rabbit kappa VL sequences, comprising a first and a second primer, wherein the first primer introduces an amino acid substitution at Kabat position 80 and the 5' ends of both primers anneal back-to-back on the template.

In certain embodiments, the primers hybridize with one or more, such as 2, 3, 4, 5, 6, 7, 8, 9 or more allelic variant of rabbit kappa VL germline sequences of the IMGT databases.

In certain embodiments, the substitution is selected from the group consisting of C80A, C80S, C80P and a germline amino acid.

In certain embodiments, the first primer encodes for a C80 substitution in the center of its sequence and includes at least 10, 11, 12, 13, 14 or 15 complementary nucleotides on the 3' side of the mutation.

In certain embodiments, the first primer has a length of at least 11 nucleotides, such as about 11 to about 30 nucleotides (e.g., 11, 12, 13, 14, 15, 16, 17, 18, 19, 20, 21, 22, 23, 24, 25, 26, 27, 28, 29, or 30 nucleotides).

In certain embodiments, the second primer has a length of at least 11 nucleotides, such as about 11 to about 30 nucleotides (e.g., 11, 12, 13, 14, 15, 16, 17, 18, 19, 20, 21, 22, 23, 24, 25, 26, 27, 28, 29, or 30 nucleotides).

In certain embodiments, the first primer comprises the sequence of F1 or F2, as recited in Table 3.

In certain embodiments, the second primer comprises the sequence of R1, R2, R3, R4, R5, R6, R7, R8, R9 or R10, as recited in Table 3.

In certain embodiments, the first primer comprises a sequence derived from F1 or F2, as recited in Table 3.

In certain embodiments, the second primer comprises a sequence derived from R1, R2, R3, R4, R5, R6, R7, R8, R9 or R10, as recited in Table 3.

In certain embodiments, the pair of primers are selected from the group consisting of F1/R1, F1/R2, F1/R3, F1/R4, F1/R5, F1/R6, F1/R7, F1/R8, F1/R9, F1/R10, F2/R1, F2/R2, F2/R3, F2/R4, F2/R5, F2/R6, F2/R7, F2/R8, F2/R9, and F2/R10, as recited in Table 3.

In one aspect, the disclosure provides a kit comprising: (i) at least one nucleic acid library as described above; (ii) at least one antigen binding protein as described above; or (iii) at least one primer or primer pair as described above.

In certain embodiments, the kit comprises one or more pair of primers, such as F1/R1, F1/R2, F1/R3, F1/R4, F1/R5, F1/R6, F1/R7, F1/R8, F1/R9, F1/R10, F2/R1, F2/R2, F2/R3, F2/R4, F2/R5, F2/R6, F2/R7, F2/R8, F2/R9, and F2/R10 (as recited in Table 3), or an oligonucleotide sequence derived thereof.

BRIEF DESCRIPTION OF THE DRAWINGS

The foregoing and other features and advantages of the present invention will be more fully understood from the following detailed description of illustrative embodiments taken in conjunction with the accompanying drawings.

FIG. 1 depicts the DNA sequence alignment of the rabbit kappa light chain sequences of all 68 alleles retrieved from the IMGT database. The flanking regions around the codon coding for relevant cysteine 80 (marked with an asterisk) show a high sequence conservation. Figure discloses SEQ ID NOS 321-334, 333, 335, 330, 336, 330, 337, 333, 338-339, 332, 329, 333, 332, 340, 328, 332, 329, 332, 339, 328, 341, 338, 342, 331, 328, 330, 343-346, 330, 332, 347-348, 333, 332, 332, 332, 333, 328, 332, 349-350, 330, 330, 330, 351, 332, 332, 352, 332, 332, and 332, respectively, in order of appearance.

FIG. 2 depicts the DNA sequence alignment of the randomly selected control antibodies from a rabbit immune library which have been used to qualify the designed primer set by identifying mismatches. The relevant cysteine is marked with an asterisk. Figure discloses SEQ ID NOS 353-372, respectively in order of appearance.

DETAILED DESCRIPTION

Figure 3:
FIG. 3 depicts the phylogenetic tree of 62 sequences from the optimized rabbit immune library. A high coverage of the sequence diversity is depicted.

Generally, nomenclature used in connection with cell and tissue culture, molecular biology, immunology, microbiology, genetics and protein and nucleic acid chemistry and hybridization described herein is well-known and commonly used in the art. The methods and techniques provided herein are generally performed according to conventional methods well known in the art and as described in various general and more specific references that are cited and discussed throughout the present specification unless otherwise indicated. Enzymatic reactions and purification techniques are performed according to manufacturer's specifications, as commonly accomplished in the art or as described herein. The nomenclature used in connection with, and the laboratory procedures and techniques of, analytical chemistry, synthetic organic chemistry, and medicinal and pharmaceutical chemistry described herein is well-known and commonly used in the art. Standard techniques are used for chemical syntheses, chemical analyses, pharmaceutical preparation, formulation, and delivery, and treatment of patients.

Unless otherwise defined herein, scientific and technical terms used herein have the meanings that are commonly understood by those of ordinary skill in the art. In the event of any latent ambiguity, definitions provided herein take precedent over any dictionary or extrinsic definition. Unless otherwise required by context, singular terms shall include pluralities and plural terms shall include the singular. The use of "or" means "and/or" unless stated otherwise. The use of the term "including," as well as other forms, such as "includes" and "included," is not limiting.

So that the invention may be more readily understood, certain terms are first defined.

Antigen Binding Proteins

As used herein, the term "antibody" or "antigen binding protein" refers to an immunoglobulin molecule or immunoglobulin derived molecule that specifically binds to, or is immunologically reactive with an antigen or epitope, and includes both polyclonal and monoclonal antibodies, as well as functional antibody fragments, including but not limited to fragment antigen-binding (Fab) fragments, F(ab')$_2$ fragments, Fab' fragments, Fv fragments, recombinant IgG (rIgG) fragments, single chain variable fragments (scFv) and single domain antibodies (e.g., sdAb, sdFv, nanobody, VHH) fragments. The antibody may thus be a single domain antibody or comprise at least one variable light and at least one variable heavy chain. In one embodiment, the at least one variable light and at least one variable heavy chain are displayed as a single polypeptide chain. The term "antibody" or "antigen binding protein" includes germline derived antibodies. The term "antibody" or "antigen binding protein" includes genetically engineered or otherwise modified forms of immunoglobulins, such as intrabodies, peptibodies, chimeric antibodies, fully human antibodies, humanized antibodies, heteroconjugate antibodies (e.g., bispecific antibodies, diabodies, triabodies, tetrabodies, tandem di-scFv, tandem tri-scFv) and the like. Unless otherwise stated, the term "antibody" or "antigen binding protein" should be understood to encompass functional antibody fragments thereof. In certain embodiments, the antigen binding protein is multispecific (i.e., binds to two or more different target molecules or to two or more epitopes on the same target molecule). In certain embodiments, the antigen binding protein is bispecific and e.g., binds to two different target molecules or to two epitopes on the same target molecule. In certain embodiments, the antibody is trispecific and e.g., binds to at least three different target molecules.

The antigen binding protein may be monovalent or multivalent, i.e., having one or more antigen binding sites. Non-limiting examples of monovalent antigen binding proteins include scFv, Fab, scFab, dAb, VHH, V (NAR), DARPins, affilins and nanobodies. A multivalent antigen binding protein can have two, three, four or more antigen binding sites. Non-limiting examples of multivalent antigen binding proteins include full-length immunoglobulins, F(ab')$_2$ fragments, bis-scFv (or tandem scFv or BiTE), DART, diabodies, scDb, DVD-Ig, IgG-scFab, scFab-Fc-scFab, IgG-scFv, scFv-Fc, scFv-fc-scFv, Fv2-Fc, FynomABs, quadroma, CrossMab, DuoBody, triabodies and tetrabodies. In some embodiments, the multivalent antigen binding protein is bivalent, i.e., two binding sites are present. In some embodiments, the multivalent antigen binding protein is bispecific, i.e., the antigen binding protein is directed against two different targets or two different target sites on one target molecule. In some embodiments, the multivalent antigen binding protein includes more than two, e.g., three or four different binding sites for three or four, respectively, different antigens. Such antigen binding protein is multivalent and multispecific, in particular tri- or tetra-specific, respectively.

In some embodiments, the antigen binding proteins are multispecific (e.g., bispecific), such as, without being limited to, diabodies, single-chain diabodies, DARTs, BiTEs, tandem scFvs or IgG-like asymmetric heterobispecific antibodies. In certain embodiments, one of the binding specificities of the multispecific antigen binding protein is an immune cell engager (i.e., comprising binding affinity to a cell surface protein of an immune cell). Examples of immune cells that may be recruited include, but are not limited to, T cells, B cells, natural killer (NK) cells, natural killer T (NKT) cells, neutrophil cells, monocytes, and macrophages. Examples of surface proteins that may be used to recruit immune cells includes, but are limited to, CD3, TCRα, TCRβ, CD16, NKG2D, CD89, CD64, and CD32. Such immune cell redirecting multispecific antigen binding proteins may in some embodiments comprise a Fc domain.

In certain embodiments, the immune cell target antigen is CD3. An exemplary CD3 antigen binding domain is recited below in Table 7 and in WO2016086196 and WO2017201493, incorporated herein by reference.

As used herein, a "single-chain variable fragment" (scFv) is an antigen binding protein comprising a heavy chain variable domain (VH) linked to a light chain variable domain (VL). The VH and VL domains of the scFv are linked via any appropriate art recognized linker. Such linkers include, but are not limited to, repeated GGGGS (SEQ ID NO: 188) amino acid sequences or variants thereof. The scFv is generally free of antibody constant domain regions, although an scFv of the disclosure may be linked or attached to antibody constant domain regions (e.g., antibody Fc domain) to alter various properties of the scFv, including, but not limited to, increased serum or tissue half-life. An scFv generally has a molecular weight of about 25 kDa and a hydrodynamic radius of about 2.5 nm.

As used herein, a "Fab fragment" or "Fab" is an antibody fragment comprising a light chain fragment comprising a variable light (VL) domain and a constant domain of the light chain (CL), and variable heavy (VH) domain and a first constant domain (CH1) of the heavy chain.

As used herein, a "VHH", "nanobody", or "heavy-chain only antibody" is an antigen binding protein comprising a single heavy chain variable domain derived from the species of the Camelidae family, which includes camels, llama, alpaca. A VHH generally has a molecular weight of about 15 kDa.

In one embodiment, the antigen binding protein comprises an Fc domain. The presence of an Fc domain may be advantageous to induce cytotoxic immune responses and/or activate complement (e.g., ADCC/ADCP or CDC effector function). Exemplary antibody formats including an Fc domain, without being limited to, are full-length immunoglobulins, DVD-Ig, scFv-Fc and scFv-Fc. scFv fusions, IgG-scFab, scFab-dsscFv, Fv2-Fc, IgG-scFv fusions (such as e.g., bsAb, Bs1Ab, Bs2Ab, Bs3Ab, Ts1Ab, Ts2Ab, Knob-into-Holes (KiHs)), DuoBody and/or CrossMabs. An active Fc domain may increase the likelihood of pro-inflammatory cytokine release by T cells and other effector cells in the tumor microenvironment which is believed to be part of the therapeutic mechanism of action. The Fc domain may be fully active or partly silenced to avoid over-stimulation of the immune system. In some embodiments, the Fc domain is inactive and does not stimulate pro-inflammatory cytokine release but does still improve half-life and/or stability of the antigen binding protein. In some embodiments, the antigen binding protein comprises a constant region selected from the group consisting of human IgG1, IgG2, IgG3 or IgG4 isotype. In other embodiments, the antigen binding protein comprises a constant region selected from the group consisting of murine IgG1, IgG2A, IgG2B or IgG3 isotype.

The antigen binding proteins of the disclosure may comprise one or more linkers for linking the domains of the antigen binding protein (e.g., linking a VH and VL to form a scFv, or linking multiple binding domains to form a multispecific antigen binding protein).

Illustrative examples of linkers include glycine polymers (Gly)$_n$ (SEQ ID NO: 373); glycine-serine polymers (Gly$_n$Ser)$_n$ (SEQ ID NO: 374), where n is an integer of at least one, two, three, four, five, six, seven, or eight; glycine-alanine polymers; alanine-serine polymers; and other flexible linkers known in the art.

Glycine and glycine-serine polymers are relatively unstructured, and therefore may be able to serve as a neutral tether between domains of fusion proteins such as the antigen binding proteins described herein. Glycine accesses significantly more phi-psi space than other small side chain amino acids, and is much less restricted than residues with longer side chains (Scheraga, Rev. Computational Chem. 1:1173-142 (1992)). A person skilled in the art will recognize that design of a antigen binding protein in particular embodiments can include linkers that are all or partially flexible, such that the linker can include flexible linker stretches as well as one or more stretches that confer less flexibility to provide a desired structure.

Linker sequences can however be chosen to resemble natural linker sequences, for example, using the amino acid stretches corresponding to the beginning of human CH1 and Cκ sequences or amino acid stretches corresponding to the lower portion of the hinge region of human IgG.

The design of the peptide linkers connecting VL and VH domains in the scFv moieties are flexible linkers generally composed of small, non-polar or polar residues such as, e.g., Gly, Ser and Thr. A particularly exemplary linker connecting the variable domains of the scFv moieties is the (Gly$_4$Ser)$_4$ linker (SEQ ID NO: 375), where 4 is the exemplary number of repeats of the motif.

Other exemplary linkers include, but are not limited to the following amino acid sequences: GGG; DGGGS (SEQ ID NO: 376); TGEKP (SEQ ID NO: 377) (Liu et al, Proc. Natl. Acad. Sci. 94:5525-5530 (1997)); GGRR (SEQ ID NO: 378); (GGGGS)$_n$ (SEQ ID NO: 379) wherein n=1, 2, 3, 4 or 5 (Kim et al, Proc. Natl. Acad. Sci.93:1156-1160 (1996)); EGKSSGSGSESKVD (SEQ ID NO: 380) (Chaudhary et al., Proc. Natl. Acad. Sci. 87:1066-1070 (1990)); KESGSVSSE-QLAQFRSLD (SEQ ID NO: 381) (Bird et al., Science 242:423-426 (1988)), GGRRGGGS (SEQ ID NO: 382); LRQRDGERP (SEQ ID NO: 383); LRQKDGGGSERP (SEQ ID NO: 384); and GSTSGSGKPGSGEGSTKG (SEQ ID NO: 385) (Cooper et al, Blood, 101(4): 1637-1644 (2003)). Alternatively, flexible linkers can be rationally designed using a computer program capable of modeling the 3D structure of proteins and peptides or by phage display methods.

The antibodies may comprise a variable light (VL) domain and a variable heavy (VH) domain. Each VL and VH domain typically comprises a set of three CDRs.

As used herein, the term "complementarity determining region" or "CDR" refers to non-contiguous sequences of amino acids within antibody variable regions, which confer antigen specificity and binding affinity. In general, there are three CDRs in each heavy chain variable domain (CDRH1, CDRH2, CDRH3) and three CDRs in each light chain variable domain (CDRL1, CDRL2, CDRL3). "Framework regions" or "FRs" are known in the art to refer to the non-CDR portions of the variable domains of the heavy and light chains. In general, there are four FRs in each heavy chain variable domain (HFR1, HFR2, HFR3, and HFR4), and four FRs in each light chain variable domain (LFR1, LFR2, LFR3, and LFR4). Accordingly, an antibody variable region amino acid sequence can be represented by the formula FR1-CDR1-FR2-CDR2-FR3-CDR3-FR4. Each segment of the formula, i.e., FR1, CDR1, FR2, CDR2, FR3, CDR3, and FR4, represents a discrete amino acid sequence (or a polynucleotide sequence encoding the same) that can be mutated, including one or more amino acid substitutions, deletions, and insertions. In certain embodiments, an antibody variable light chain amino acid sequence can be represented by the formula LFR1-CDRL1-LFR2-CDRL2-LFR3-CDRL3-LFR4. In certain embodiments, an antibody variable heavy chain amino acid sequence can be represented by the formula HFR1-CDRH1-HFR2-CDRH2-HFR3-CDRH3-HFR4.

The precise amino acid sequence boundaries of a given CDR or FR can be readily determined using any of a number of well-known schemes, including those described by Kabat et al. (1991), "Sequences of Proteins of Immunological Interest," 5th Ed. Public Health Service, National Institutes of Health, Bethesda, Md. ("Kabat" numbering scheme), Al-Lazikani et al., (1997) JMB 273, 927-948 ("Chothia" numbering scheme), MacCallum et al., J. Mol. Biol. 262: 732-745 (1996), "Antibody-antigen interactions: Contact analysis and binding site topography," J. Mol. Biol. 262, 732-745. ("Contact" numbering scheme), Lefranc M P et al., "IMGT unique numbering for immunoglobulin and T cell receptor variable domains and Ig superfamily V-like domains," Dev Comp Immunol, 2003 January; 27(1): 55-77

("IMGT" numbering scheme), and Honegger A and Pluckthun A, "Yet another numbering scheme for immunoglobulin variable domains: an automatic modeling and analysis tool," J Mol Biol, 2001 Jun. 8; 309(3): 657-70, ("AHo" numbering scheme).

The boundaries of a given CDR or FR may vary depending on the scheme used for identification. For example, the Kabat scheme is based structural alignments, while the Chothia scheme is based on structural information. Numbering for both the Kabat and Chothia schemes is based upon the most common antibody region sequence lengths, with insertions accommodated by insertion letters, for example, "30a," and deletions appearing in some antibodies. The two schemes place certain insertions and deletions ("indels") at different positions, resulting in differential numbering. The Contact scheme is based on analysis of complex crystal structures and is similar in many respects to the Chothia numbering scheme.

Table 1, below, lists exemplary position boundaries of CDRL1, CDRL2, CDRL3 and CDRH1, CDRH2, CDRH3 of an antibody, as identified by Kabat, Chothia, and Contact schemes, respectively. For CDRH1, residue numbering is listed using both the Kabat and Chothia numbering schemes. CDRs are located between FRs, for example, with CDRL1 located between LFR1 and LFR2, and so forth. It is noted that because the shown Kabat numbering scheme places insertions at H35A and H35B, the end of the Chothia CDRH1 loop when numbered using the shown Kabat numbering convention varies between H32 and H34, depending on the length of the loop.

TABLE 1

Exemplary Position Boundaries of CDRs

| CDR | Kabat | Chothia | Contact |
| --- | --- | --- | --- |
| LCDR1 | L24--L34 | L24--L34 | L30--L36 |
| LCDR2 | L50--L56 | L50--L56 | L46--L55 |
| LCDR3 | L89--L97 | L89--L97 | L89--L96 |
| HCDR1 (Kabat Numbering[1]) | H31--H35B | H26--H32 . . . 34 | H30--H35B |
| HCDR1 (Chothia Numbering[2]) | H31--H35 | H26--H32 | H30--H35 |
| HCDR2 | H50--H65 | H52--H56 | H47--H58 |
| HCDR3 | H95--H102 | H95--H102 | H93--H101 |

[1]Kabat et al. (1991), "Sequences of Proteins of Immunological Interest," 5th Ed. Public Health Service, National Institutes of Health, Bethesda, MD
[2]Al-Lazikani et al. (1997), J. Mol. Biol. 273:927-948

Thus, unless otherwise specified, a "CDR" or "complementary determining region," or individual specified CDRs (e.g., CDRH1, CDRH2), of a given antibody or fragment thereof, such as a variable domain thereof, should be understood to encompass a (or the specific) complementary determining region as defined by any of the known schemes. Likewise, unless otherwise specified, an "FR" or "framework region," or individual specified FRs (e.g., "HFR1," "HFR2") of a given antibody or fragment thereof, such as a variable domain thereof, should be understood to encompass a (or the specific) framework region as defined by any of the known schemes. In some instances, the scheme for identification of a particular CDR or FR is specified, such as the CDR as defined by the Kabat, Chothia, or Contact method. In other cases, the particular amino acid sequence of a CDR or FR is given.

In certain embodiments, the rabbit antigen binding proteins disclosed here are humanized. As used herein, the term "humanized" or "humanization" refers to an antigen binding protein that has been altered to make it more like a human antibody. Non-human antigen binding proteins, such as the rabbit antigen binding proteins encoded in the nucleic acid libraries disclosed herein, would elicit a negative immune reaction if administered to a human for therapy. It is therefore advantageous to humanize the rabbit antigen binding proteins for later therapeutic use.

In certain embodiments, the antigen binding proteins are humanized through resurfacing (i.e., remodel the solvent-accessible residues of the non-human framework such that they become more human-like). Resurfacing strategies are described in more detail in WO2004/016740, WO2008/144757, and WO2005/016950, each of which is incorporated herein by reference.

In certain embodiments, the antigen binding proteins are humanized through CDR grafting (i.e., inserting the rabbit antigen binding protein CDRs into a human antibody acceptor framework). Grafting strategies and human acceptor frameworks are described in more detail in WO2009/155726, incorporated herein by reference.

As used herein, the term "affinity" refers to the strength of the interaction between an antibody's antigen binding site and the epitope to which it binds. As readily understood by those skilled in the art, an antibody or antigen binding protein affinity may be reported as a dissociation constant (KD) in molarity (M). The antibodies of the disclosure may have KD values in the range of $10^{-8}$ to $10^{-14}$ M. High affinity antibodies have KD values of $10^{-9}$ M (1 nanomolar, nM) and lower. For example, a high affinity antibody may have a KD value in the range of about 1 nM to about 0.01 nM. A high affinity antibody may have KD value of about 1 nM, about 0.9 nM, about 0.8 nM, about 0.7 nM, about 0.6 nM, about 0.5 nM, about 0.4 nM, about 0.3 nM, about 0.2 nM, or about 0.1 nM. Very high affinity antibodies have KD values of $10^{-12}$ M (1 picomolar, pM) and lower. Weak, or low, affinity antibodies may have KD values in the range of $10^{-1}$ to $10^{-4}$ M. Low affinity antibodies may have KD values of $10^{-4}$ M and higher, such as $10^{-4}$ M, $10^{-3}$ M, $10^{-2}$ M, or $10^{-1}$ M.

The ability of an antibody to bind to a specific antigenic determinant (e.g., a target peptide-MHC) can be measured either through an enzyme-linked immunosorbent assay (ELISA) or other techniques familiar to one of skill in the art, e.g., surface plasmon resonance (SPR) technique (analyzed on a BIAcore instrument) (Liljeblad et al., Glyco J 17, 323-329 (2000)), and traditional binding assays (Heeley, Endocr Res 28, 217-229 (2002)).

As used herein, the term "T cell receptor" or "TCR" refers to a heterodimeric protein comprised of two different chains (TCRα and TCRβ), which structurally belong to the immunoglobulin (Ig) superfamily. The extracellular portion of each chain is composed of variable ("Vα" and "Vβ") and constant ("Cα" and "Cβ") domains, and a hinge region, where the formation of a stabilizing disulfide bond occurs. The intracellular region forms a non-covalent interaction with another trans-membrane protein, CD3, which in the case of the correct target recognition leads to a series of conformational changes and a first T cell activation signal. Recognition and binding of peptide-MHC (pMHC) by a TCR is governed by the six hypervariable loops, termed complementarity determining regions (CDRs), located on the variable domains of the TCRα (CDRα1, CDRα2, CDRα3) and TCRβ (CDRB1, CDRβ2, CDRβ3). CDR3 loops (CDRα3 and CDRβ3) lead the recognition of the processed antigen with the support of CDRα1 and CDRβ1, that have been implicated in the recognition of the N- and C-terminal amino acids of the presented peptide, respectively (Rudolph et al. Annu Rev Immunol. 24:419-66. 2006). Recognition of the MHC is typically achieved through the interaction with CDRα2 and CDRβ2. The high sequence diversity of the TCR is achieved through V(D)J recombination process, in which the variable domain is generated from a combination of genes: V (variable) and J (joining) for both TCRα and TCRβ, and an additional D (diversity) gene for TCRβ. The high antigen specificity of the TCR is controlled by the thymic maturation process, in which the self-reacting T cells are negatively selected. TCR affinity towards the specific pMHC and the functional avidity are the key factors controlling T-cell activation. A critical role in antigen recognition, however, is played by the affinity, i.e., the strength of binding between the TCR and the cell-displayed pMHC (Tian et al. J Immunol. 179:2952-2960. 2007). The physiological affinities of TCRs range from 1 μM to 100 μM (Davis et al. Annu Rev Immunol. 16:523-544. 1998), which, in comparison to antibodies, is relatively low.

As used herein, the term "peptide-MHC" refers to a major histocompatibility complex (MHC) molecule (MHC-I or -II) with an antigenic peptide bound in a peptide binding pocket of the MHC. In certain embodiments, the MHC is a human MHC.

Nucleic Acid Libraries

Provided herein are nucleic acid libraries encoding rabbit derived antigen binding proteins. The rabbit antibody nucleic acid libraries described herein possess several advantages over other antibody discovery platforms.

Rabbits represent an ideal source for the generation of high affinity antibodies. The rabbit immune response is characterized by generation of a highly diverse B-lymphocyte repertoire, high variability in length and sequence of the CDRs provides rabbit antibodies with high specificity and the ability to recognize small epitopes, such as peptides. Therefore, rabbit antibodies may recognize the peptides in context of the HLA complex in a highly specific manner. Furthermore, rabbit antibodies possess very high affinity, typically 10- to 100-fold higher affinity values than mice and other monoclonal antibodies. This high affinity makes rabbit antibodies useful for targets that have low expression levels or amounts in a cell. The high affinity is particularly useful for targeting pMHC antigens, with natural presentation levels as low as 10 copies per cell.

Isolation of rabbit antibodies is practically constrained to hybridoma generation and antigen-specific B cell sorting strategies. These technologies are characterized by low survival of B cells and a short time window to screen or immortalize the B cells resulting in loss of antibody diversity and therefore a reduced probability to find an antibody with the desired specificity and binding affinity (e.g., high specificity and binding affinity for a target pMHC). Furthermore, the antibodies produced through hybridoma technology or B cell culture are bivalent IgG isotype antibodies which during the screening process may exhibit an apparent increased affinity due to avidity (functional affinity) which is undesirable when targeting epitopes that may be expressed at low densities, such as epitopes on tumor-associated peptide-MHCs.

Targeting pMHCs or other low density targets requires a more efficient process to explore the whole antibody repertoire in order to increase the probability for isolating antibodies with the right specificity. Immune libraries for phage display selection poses several advantages over conventional hybridoma or B cell sorting technologies. In such libraries the B-cells are isolated from the spleen of immunized animals and the genes encoding for the variable light and heavy chain domains of the antibody repertoire are cloned into a nucleic acid library (e.g., phage library vectors). This is advantageous for different reasons. First, the antibody genetic information of the B cell repertoire is instantly preserved in the library, therefore less losses in antibody diversity due to poor survival of B cells occur; second, it provides an unlimited time window for isolation of antibodies with the right properties; and third, the antibodies are screened and selected in monovalent format eliminating artifacts due to avidity effects.

Most rabbit light chains of the K1 isotype have an additional disulfide bridge between variable and constant domains through cysteine residues at positions 80 and 171 which is unusual in other species. For the generation of nucleic acid libraries for display (e.g., phage display libraries) derived from immunized rabbits, the variable kappa light chain domains containing cysteine 80 results in a free thiol group, which is disadvantageous for the display and selection of antibody scFv fragments. Therefore, the free thiol group from cysteine 80 may significantly restrict the selectable diversity of the rabbit libraries coming from rabbits immunized with a target antigen (e.g., pMHC), thus reducing the chances for isolating antibodies with the desired specificity and affinity, more so, as the majority of total rabbit antibodies comprise a K1 light chain.

To increase the probability of identifying high affinity and high specificity antibodies with the desired function, it is necessary to enable full access to the complete antibody repertoire of rabbits immunized with a target antigen (e.g., pMHCs). The present disclosure provides rabbit-derived nucleic acid libraries (and methods of producing the same) with the desired diversity, in part through eliminating the cysteine via genetic manipulation of nucleic acid libraries derived from the genes encoding for the variable light and heavy chain domains of the antibody repertoire of immunized rabbits. Therefore, the antibody libraries of the disclosure enable the display and thus the access to the complete rabbit antibody repertoire. This allows for isolation of larger amount and diversity of antibodies to the target antigen (e.g., the peptide target on the epitope surface on the pMHC). Such an approach increases the probability of isolating antibodies with more diverse properties, such as distinct affinities and specificities for the peptide target.

The present disclosure solves the major challenges in the discovery of antibodies with high specificity and affinity to target pMHC by combining the strong immune response of rabbits, an antigen-based library construction and an optimized nucleic acid display system (e.g., a phage display system) that allows a complete access to the rabbit antibody gene repertoire.

In one aspect, the disclosure provides a nucleic acid library comprising a plurality of polynucleotide sequences, each polynucleotide sequence in the plurality encoding for a rabbit antigen binding protein comprising a kappa variable light chain (VL), wherein the kappa VL comprises an amino acid substitution at position C80, according to Kabat numbering, and wherein at least a portion of the plurality of polynucleotide sequences encode for a rabbit antigen binding protein that specifically recognizes a target antigen (e.g., a peptide-MHC).

In certain embodiments, the substitution at position C80, according to Kabat numbering, removes a free thiol from the kappa VL without substantially reducing binding affinity or stability of the kappa VL.

Said cysteine amino acid residue at Kabat position 80 of the VL may e.g., be substituted by serine (Ser or S), alanine (Ala or A), proline (Pro or P) or a germline residue, such as the residue at the corresponding rabbit or human germline position, or any other amino residue other than cysteine.

In certain embodiments, the kappa VL comprises a C80A, a C80P or a C80S amino acid substitution, according to Kabat numbering.

In certain embodiments, the plurality of polynucleotide sequences are obtained from a rabbit immunized with the target antigen (e.g., a peptide-MHC).

In certain embodiments, the target antigen comprises a peptide MHC (pMHC).

In certain embodiments, the pMHC comprises a MAGE-A4 230-239 amino acid sequence of GVYDGREHTV (SEQ ID NO: 3).

In certain embodiments, the pMHC comprises one or both of an HLA-A*02:01 extracellular domain amino acid sequence set forth in SEQ ID NO: 1, and a human β2m amino acid sequence set forth in SEQ ID NO: 2.

In certain embodiments, the C80 amino acid substitution is introduced with a polymerase chain reaction (PCR).

Figure 1:
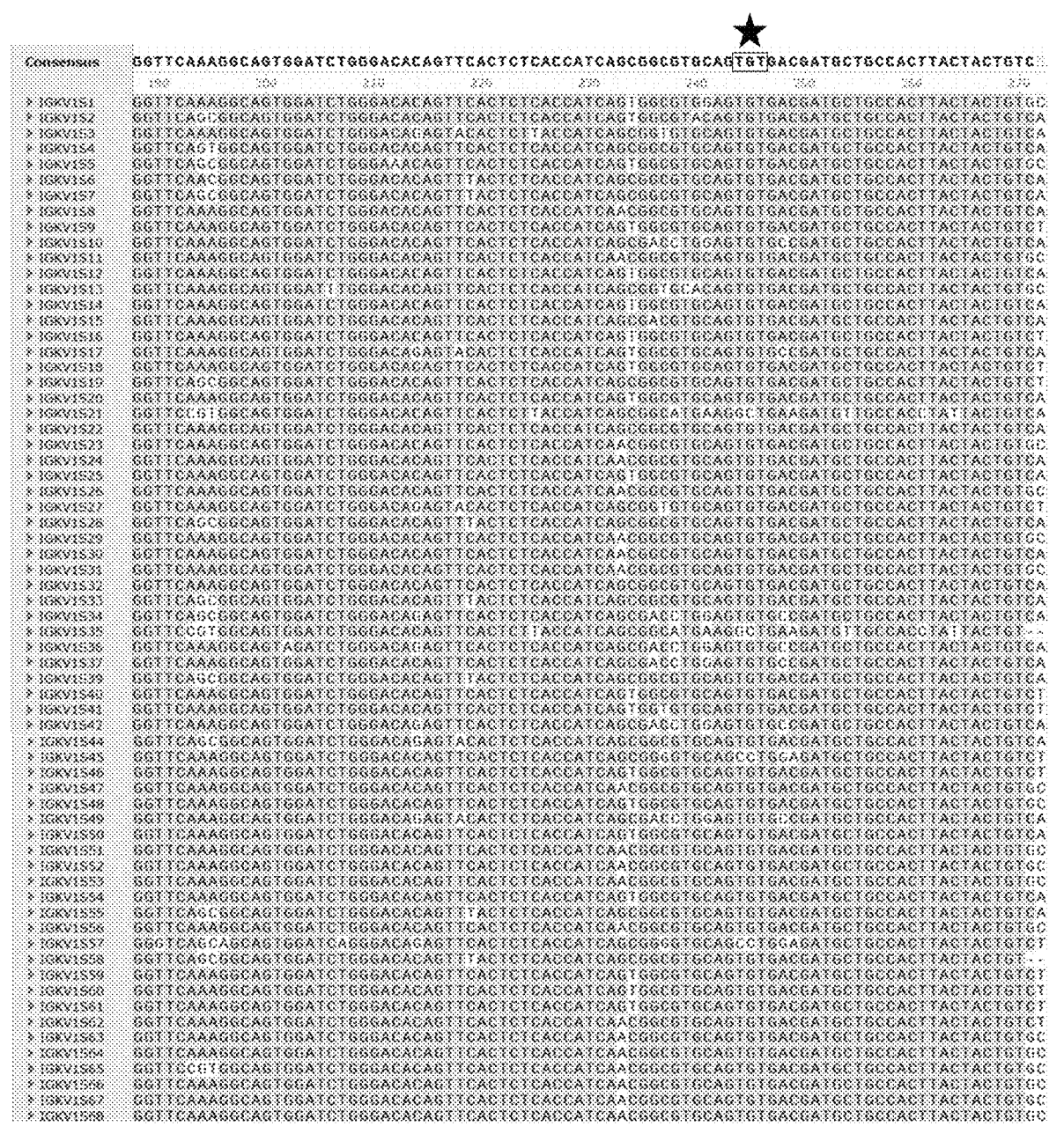

In certain embodiments, multiple PCR reactions with different sets of primers are performed as to cover as many rabbit VL sequences as possible. In certain embodiments, each pair of primers comprises one primer introducing a C80 substitution. The second primer may e.g., align with a conserved sequence stretch of a rabbit VL germline sequence, e.g., as selected from IGKV1S1 to IGKV1S68 (see FIG. 1).

In certain embodiments, the PCR is performed with one or more primer pairs selected from F1/R1, F1/R2, F1/R3, F1/R4, F1/R5, F1/R6, F1/R7, F1/R8, F1/R9, F1/R10, F2/R1, F2/R2, F2/R3, F2/R4, F2/R5, F2/R6, F2/R7, F2/R8, F2/R9, and F2/R10, as recited in Table 3.

In certain embodiments, each polynucleotide sequence in the plurality encodes for a rabbit antigen binding protein (e.g., an antibody or fragment thereof comprising a variable light chain (VL) and a variable heavy chain (VH)). In certain embodiments, each polynucleotide sequence in the plurality encodes for one or both of a rabbit VL or a rabbit VH. For example, but in no way limiting, an individual polynucleotide sequence may only encode for a rabbit VL, a rabbit VH, or both a rabbit VL and rabbit VH, such as an scFv with the VH and VL linked.

In certain embodiments, the rabbit antigen binding protein comprises a variable light chain (VL) and variable heavy chain (VH).

In certain embodiments, the VL and VH are operatively linked with an amino acid linker (e.g., the VL and VH are operatively linked to form an scFv).

In certain embodiments, the VL is operatively linked to a CL domain and the VH is operatively linked to a CH1 domain.

In certain embodiments, the nucleic acid library further comprises a plurality of polynucleotide sequences, wherein each polynucleotide sequence in the plurality encodes for a rabbit lambda VL.

In certain embodiments, the library comprises a diversity of at least about $10^2$, $10^3$, $10^4$, $10^5$, $10^6$, $10^7$, $10^8$, $10^9$, $10^{10}$, $10^{11}$, $10^{12}$, $10^{13}$, $10^{14}$, or $10^{15}$ unique polynucleotide sequences.

In certain embodiments, the library comprises a diversity of at least about $10^2$, $10^3$, $10^4$, $10^5$, $10^6$, $10^7$, $10^8$, $10^9$, $10^{10}$, $10^{11}$, $10^{12}$, $10^{13}$, $10^{14}$, or $10^{15}$ unique polynucleotide sequences encoding rabbit kappa VL.

In certain embodiments, the library comprises a diversity of at least about $10^2$, $10^3$, $10^4$, $10^5$, $10^6$, $10^7$, $10^8$, $10^9$, $10^{10}$, $10^{11}$, $10^{12}$, $10^{13}$, $10^{14}$, or $10^{15}$ unique polynucleotide sequences encoding rabbit lambda VL.

In certain embodiments, the library comprises polynucleotide sequences encoding matured rabbit kappa VL sequences derived from one or more (e.g., 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, or all 68) rabbit kappa VL germline genes selected from IGKV1S1 to IGKVIS68, as recited in FIG. 1. As used herein, a "matured rabbit kappa VL sequence" refers to a rabbit kappa VL sequence that has gone through the somatic hypermutation process, as well as the sequence rearrangement within the immune response of the rabbits.

In certain embodiments, the library comprises at least one polynucleotide sequence encoding a matured rabbit kappa VL sequence derived from the parental sequence IGKV1S1, IGKV1S2, IGKV1S3, IGKV1S4, IGKV1S5, IGKV1S6, IGKV1S7, IGKVIS8, IGKVIS9, IGKV1S10, IGKVIS11, IGKVIS12, IGKVIS13, IGKVIS14, IGKVIS15, IGKVIS16, IGKVIS17, IGKVIS18, IGKVIS19, IGKV1S20, IGKVIS21, IGKV1S22, IGKVIS23, IGKV1S24, IGKV1S25, IGKV1S26, IGKV1S27, IGKV1S28, IGKV1S29, IGKVIS30, IGKV1S31, IGKV1S32, IGKVIS33, IGKVIS34, IGKVIS35, IGKV1S36, IGKVIS37, IGKV1S38, IGKV1S39, IGKVIS40, IGKV1S41, IGKVIS42, IGKV1S43, IGKVIS44, IGKVIS45, IGKV1S46, IGKV1S47, IGKV1S48, IGKVIS49, IGKVIS50, IGKVIS51, IGKVIS52, IGKVIS53, IGKVIS54, IGKVIS55, IGKVIS56, IGKVIS57, IGKVIS58, IGKV1S59, IGKV1S60, IGKVIS61, IGKVIS62, IGKVIS63, IGKVIS64, IGKV1S65, IGKV1S66, IGKV1S67, or IGKVIS68.

In certain embodiments, the library comprises a plurality of polynucleotide sequences encoding matured rabbit kappa VL sequences derived from the parental sequence IGKV1S1, IGKV1S2, IGKVIS3, IGKV1S4, IGKVIS5, IGKV1S6, IGKV1S7, IGKVIS8, IGKVIS9, IGKVIS10, IGKVIS11, IGKVIS12, IGKVIS13, IGKVIS14, IGKV1S15, IGKV1S16, IGKVIS17, IGKV1S18, IGKV1S19, IGKV1S20, IGKV1S21, IGKV1S22, IGKVIS23, IGKV1S24, IGKV1S25, IGKV1S26, IGKV1S27, IGKV1S28, IGKV1S29, IGKVIS30, IGKV1S31, IGKV1S32, IGKVIS33, IGKVIS34, IGKV1S35, IGKVIS36, IGKV1S37, IGKV1S38, IGKV1S39, IGKVIS40, IGKV1S41, IGKVIS42, IGKVIS43, IGKVIS44, IGKV1S45, IGKVIS46, IGKVIS47, IGKV1S48, IGKVIS49, IGKVIS50, IGKVIS51, IGKV1S52, IGKVIS53, IGKVIS54, IGKVIS55, IGKVIS56, IGKV1S57, IGKVIS58, IGKV1S59, IGKV1S60, IGKVIS61, IGKVIS62, IGKVIS63, IGKVIS64, IGKV1S65, IGKVIS66, IGKV1S67, IGKVIS68, or a combination thereof.

In certain embodiments, the library comprises a plurality of polynucleotide sequences encoding matured rabbit kappa VL sequences derived from the parental sequence IGKV1S1, IGKVIS2, IGKV1S3, IGKV1S4, IGKVIS5, IGKVIS6, IGKVIS7, IGKV1S8, IGKVIS9, IGKV1S10, IGKV1S11, IGKVIS12, IGKVIS13, IGKVIS14, IGKV1S15, IGKVIS16, IGKV1S17, IGKVIS18, IGKVIS19, IGKV1S20, IGKV1S21, IGKVIS22, IGKVIS23, IGKV1S24, IGKV1S25, IGKV1S26, IGKV1S27, IGKV1S28, IGKV1S29, IGKVIS30, IGKV1S31, IGKV1S32, IGKVIS33, IGKV1S34, IGKVIS35, IGKVIS36, IGKV1S37, IGKVIS38, IGKV1S39, IGKVIS40, IGKV1S41, IGKVIS42, IGKV1S43, IGKVIS44, IGKV1S45, IGKV1S46, IGKV1S47, IGKV1S48, IGKVIS49, IGKV1S50, IGKVIS51, IGKV1S52, IGKVIS53, IGKVIS54, IGKV1S55, IGKVIS56, IGKV1S57, IGK- VIS58, IGKVIS59, IGKV1S60, IGKV1S61, IGKV1S62, IGKV1S63, IGKV1S64, IGKV1S65, IGKV1S66, IGKV1S67, and IGKVIS68.

In certain embodiments, the library comprises polynucleotide sequences encoding about 20%, about 30%, about 40%, about 50%, about 60%, about 70%, about 80%, about 90%, about 95%, or 100% of rabbit kappa VL genes derived from the parental IGKV1S1 to IGKV1S68, as recited in FIG. 1.

In certain embodiments, the library comprises polynucleotide sequences encoding rabbit VH CDRH3 amino acids with a length distribution of 5 amino acids to 25 amino acids.

In certain embodiments, the library comprises polynucleotide sequences encoding rabbit VH CDRH3 amino acids with an average length of about 8 amino acids to about 19 amino acids (e.g., an average length of 8, 9, 10, 11, 12, 13, 14, 15, 16, 17, 18, or 19 amino acids).

In certain embodiments, the library comprises polynucleotide sequences encoding rabbit kappa VL CDRL3 amino acids with a length distribution of 3 amino acids to 20 amino acids. In certain embodiments, the library comprises polynucleotide sequences encoding rabbit kappa VL CDRL3 amino acids with a length distribution of 5 amino acids to 16 amino acids. In certain embodiments, the library comprises polynucleotide sequences encoding rabbit kappa VL CDRL3 amino acids with a length distribution of 5 amino acids to 17 amino acids.

In certain embodiments, the library comprises polynucleotide sequences encoding rabbit kappa VL CDRL3 amino acids with an average length of about 8 amino acids to about 14 amino acids (e.g., an average length of 8, 9, 10, 11, 12, 13, or 14 amino acids).

In certain embodiments, the library comprises polynucleotide sequences encoding rabbit lambda VL CDRL3 amino acids with a length distribution of 5 amino acids to 16 amino acids.

In certain embodiments, the library comprises polynucleotide sequences encoding rabbit lambda VL CDRL3 amino acids with an average length of about 8 amino acids to about 14 amino acids (e.g., an average length of 8, 9, 10, 11, 12, 13, or 14 amino acids).

In certain embodiments, the nucleic acid library is selected from the group consisting of a ribosome display library, a phage display library, a yeast cell display library, a mammalian cell display library, and a DNA display library.

In certain embodiments, the nucleic acid library is a phage display library.

In one aspect, the disclosure provides a host cell population comprising the nucleic acid library described above. In certain embodiments, the host cell population is an *E. coli* cell population. In certain embodiments, the nucleic acid library is a phage display library introduced into an *E. coli* cell population.

The library provided herein may be a nucleic acid library comprising a plurality of polynucleotide sequences, each polynucleotide sequence in the plurality encoding for a rabbit antigen binding protein, wherein at least a portion of the plurality of polynucleotide sequences encode for a rabbit antigen binding protein that specifically recognizes a target peptide-MHC (pMHC).

The library provided herein may be a phage-displayed rabbit antigen binding protein library comprising a plurality of phage-displayed rabbit antigen binding proteins, each antigen binding protein comprising a variable heavy chain (VH) and variable light chain (VL), wherein at least a portion of the plurality of phage-displayed rabbit antigen binding proteins specifically recognize a target peptide-MHC (pMHC).

As outlined above, in certain embodiments, the VL is a kappa VL. In certain embodiments, the kappa VL further comprises an amino acid substitution at position C80, according to Kabat numbering.

Also provided is an antibody capable of binding to an antigen of interest, wherein at least one heavy chain or light chain CDR is derived from an antibody identified from a nucleic acid library comprising a plurality of polynucleotide sequences, such as the libraries described above, wherein each polynucleotide sequence in the plurality encodes for a rabbit antigen binding protein comprising a kappa variable light chain (VL), wherein the kappa VL comprises an amino acid substitution at position C80 (e.g., a C80A amino acid substitution), according to Kabat numbering, and wherein at least a portion of the plurality of polynucleotide sequences encode for a rabbit antigen binding protein that specifically recognizes a target antigen (e.g., a target pMHC).

Methods of Producing Nucleic Acid Libraries

In another aspect, the disclosure provides a method of producing a nucleic acid library encoding for a plurality of antigen binding proteins that specifically recognize a target antigen, the method comprising the steps of:
(i) immunizing a rabbit with the target antigen;
(ii) isolating antigen binding protein encoding polynucleotide sequences from a B cell population from the rabbit, wherein the antigen binding protein encoding polynucleotide sequences encode for at least kappa VL;
(iii) cloning the polynucleotide sequences into a nucleic acid library; and
(iv) mutagenizing the nucleic acid library to introduce an amino acid substitution at position C80 of the kappa VL, according to Kabat numbering, thereby producing a nucleic acid library encoding for a plurality of antigen binding proteins that specifically recognize a target antigen.

In certain embodiments, the B cell population comprises a peripheral blood mononuclear cell (PBMC) population, a B cell population from spleen, a B cell population from lymph nodes, or a combination thereof.

In some embodiments, the method involves isolating all lambda and kappa VL and VH from the B cell population.

In certain embodiments, scFv libraries comprising lambda VL-VH and kappa VL-VH are constructed.

The amino acid residue replacing C80 can be any amino acid residue. In certain embodiments, the method comprises introducing an amino acid substitution in the kappa VL (according to Kabat numbering) selected from the group consisting of C80A, C80S, C80P or a corresponding germline amino acid. A "corresponding germline amino acid" is an amino acid found at Kabat position 80 of a germline kappa VL sequence, e.g., as encoded by the germline genes selected from IGKV1S1 to IGKVIS68, as recited in FIG. 1. In some embodiments, the corresponding germline amino acid is a human germline amino acid.

Amino acid substitutions can be introduced with a polymerase chain reaction (PCR). Advantageously, multiple PCRs with different pairs of primers are performed on the sample comprising rabbit derived antigen binding protein encoding polynucleotide sequences. Each pair of primers is preferably specific for an allelic family. Performing multiple PCRs with different pairs of primers will thus allow to capture a bigger sequence diversity of antigen binding protein encoding polynucleotide sequences generated in the immunization procedure. The primers may e.g., be based on the rabbit germline sequences of the IMGT database. The more different PCRs will be performed, the higher the potential to grasp polynucleotide sequences encoding for highly specific antigen binding proteins with binding affinity. For example, 5, 10, 15, 20, 25, 30, 35, 40, 45, 50, 55, 60, 65 or 68 PCRs can be performed, each with a different pair of primers.

In certain embodiments, the rabbit derived antigen binding protein encoding polynucleotide sequences are present in a circular DNA construct such as a phagemid or a plasmid. Such circular DNA constructs then serve as template for the PCR amplification.

In certain embodiments, each pair of primers comprises a first primer introducing the C80 amino acid substitution and a second primer annealing closely to the first primer, optionally back-to-back. Accordingly, when the polynucleotide sequences are present in a closed circular DNA construct, a linear strand of DNA is produced by the PCR reaction. In some embodiments, the first primer is a reverse primer and the second primer is a forward primer. In other embodiments, the first primer is a forward primer and the second primer is a reverse primer.

The primers may be designed such that they anneal back-to-back without overlap or gap. Upon re-circularization, the generated DNA construct will thus correspond to the template but having the C80 substitution. In some embodiments, the first primer (e.g., the forward primer) incorporates the C80 substitution in the center of the first primer, including at least 10, 11, 12, 13, 14 or 15 complementary nucleotides on the 3' side of the mutation, whereas the second primer (e.g., the reversed primer) is designed such that the 5' ends of the two primers anneal back-to-back.

The linear strand of DNA may be circularized after the amplification step, either in a single-step DNA assembly and circulation reaction or in separate steps which may involve one or more of dephosphorylation, end repair and polishing, and ligation. Conveniently, the KLD Enzyme Mix (New England Biolabs) which comprises a kinase, a ligase and DpnI, may be used to perform these steps in a single reaction.

In certain embodiments, the PCR is performed with one or more primer pairs selected from F1/R1, F1/R2, F1/R3, F1/R4, F1/R5, F1/R6, F1/R7, F1/R8, F1/R9, F1/R10, F2/R1, F2/R2, F2/R3, F2/R4, F2/R5, F2/R6, F2/R7, F2/R8, F2/R9, and F2/R10, as recited in Table 3.

The antigen binding protein encoding polynucleotide sequences may further encode for one or both of lambda VL and VH. The kappa VL or lambda VL may be operatively linked to a VH with an amino acid linker. The kappa VL and lambda VL may be operatively linked to a CL domain and the VH operatively linked to a CH1 domain.

Libraries of the invention have been described in detail above. Thus, in certain embodiments, the library comprises a diversity of at least about $10^2$, $10^3$, $10^4$, $10^5$, $10^6$, $10^7$, $10^8$, $10^9$, $10^{10}$, $10^{11}$, $10^{12}$, $10^{13}$, $10^{14}$, or $10^{15}$ unique polynucleotide sequences.

In certain embodiments, the library comprises a diversity of at least about $10^2$, $10^3$, $10^4$, $10^5$, $10^6$, $10^7$, $10^8$, $10^9$, $10^{10}$, $10^{11}$, $10^{12}$, $10^{13}$, $10^{14}$, or $10^{15}$ unique polynucleotide sequences encoding rabbit kappa VL.

In certain embodiments, the library comprises a diversity of at least about $10^2$, $10^3$, $10^4$, $10^5$, $10^6$, $10^7$, $10^8$, $10^9$, $10^{10}$, $10^{11}$, $10^{12}$, $10^{13}$, $10^{14}$, or $10^{15}$ unique polynucleotide sequences encoding rabbit lambda VL.

In certain embodiments, the library comprises polynucleotide sequences derived from one or more of parental rabbit kappa VL genes IGKV1S1 to IGKV1S68, as recited in FIG. 1.

In certain embodiments, the library comprises polynucleotide sequences encoding about 20%, about 30%, about 40%, about 50%, about 60%, about 70%, about 80%, about 90%, about 95%, or 100% of parental rabbit kappa VL protein sequences IGKVIS1 to IGKVIS68, as recited in FIG. 1.

The library may comprise polynucleotide sequences encoding rabbit VH CDRH3 amino acids with a length distribution of 5 amino acids to 25 amino acids, such as having an average length of about 8 amino acids to about 19 amino acids.

Alternatively or additionally, the library may comprise polynucleotide sequences encoding rabbit kappa VL CDRL3 amino acids with a length distribution of 3 amino acids to 20 amino acids, e.g., 5 amino acids to 16 amino acids or 5 amino acids to 16 amino acids, such as having an average length of about 8 amino acids to about 14 amino acids. In other embodiments, the library comprises polynucleotide sequences encoding rabbit lambda VL CDRL3 amino acids with a length distribution of 5 amino acids to 16 amino acids, such as having an average length of about 8 amino acids to about 14 amino acids.

As described above, the nucleic acid library may be selected from the group consisting of a ribosome display library, a phage display library, a yeast cell display library, a mammalian cell display library, and a DNA display library, preferably a phage display library. In certain embodiments, the nucleic acid library is a phage display library introduced into an *E. coli* cell population.

As outlined above, the target antigen may comprise a pMHC. Thus, in specific embodiments, the disclosure provides a method of producing a nucleic acid library encoding for a plurality of antigen binding proteins that specifically recognize a target peptide-MHC (pMHC), the method comprising the steps of:
  (i) immunizing a rabbit with the target pMHC;
  (ii) isolating antigen binding protein encoding polynucleotide sequences from a B cell population from the rabbit; and
  (iii) cloning the polynucleotide sequences into a nucleic acid library, thereby producing a nucleic acid library encoding for a plurality of antigen binding proteins that specifically recognize a target pMHC.

Methods of Producing an Antigen Binding Protein

In another aspect, the disclosure provides a method of producing an antigen binding protein that specifically recognizes a target antigen which involves the creation of a library of the disclosure, the method comprising the steps of:
  (i) immunizing a rabbit with the target antigen;
  (ii) isolating a plurality of antigen binding protein encoding polynucleotide sequences from the rabbit, wherein the antigen binding protein encoding polynucleotide sequences encode for at least kappa VL;
  (iii) cloning the polynucleotide sequences into a nucleic acid library;
  (iv) mutagenizing the nucleic acid library to introduce an amino acid substitution at position C80 of the kappa VL, according to Kabat numbering; and
  (v) selecting the antigen binding protein that specifically recognizes a target antigen.

The method may further comprise step (vi) comprising sequencing the polynucleotide sequence that encodes the antigen binding protein that specifically recognizes the target antigen.

In certain embodiments, the method further comprises step (vii) comprising humanizing the antigen binding protein that specifically recognizes the target antigen. Humanizing may comprise grafting the CDR sequences of the antigen binding protein into an acceptable acceptor framework (e.g., a human antibody framework suitable for grafting rabbit antibody-derived CDR sequences).

The method may comprise introducing an amino acid substitution selected from the group consisting of C80A, C80S, C80P and a corresponding germline amino acid in the kappa VL, according to Kabat numbering.

The amino acid substitution may be introduced with a polymerase chain reaction (PCR). As outlined for the methods above, multiple PCRs are advantageously performed with different pairs of primers. Primer design and PCR amplifications are outlined in detail above for the methods of producing nucleic acid libraries and do also apply here. Thus, in some embodiments, the PCR is performed with one or more primer pairs selected from F1/R1, F1/R2, F1/R3, F1/R4, F1/R5, F1/R6, F1/R7, F1/R8, F1/R9, F1/R10, F2/R1, F2/R2, F2/R3, F2/R4, F2/R5, F2/R6, F2/R7, F2/R8, F2/R9, and F2/R10, as recited in Table 3.

The antigen binding protein encoding polynucleotide sequences may be isolated from a B cell population, such as a peripheral blood mononuclear cell (PBMC) population, a B cell population from spleen, a B cell population from lymph nodes, or a combination thereof.

The antigen binding protein encoding polynucleotide sequences may further encode for one or both of lambda VL and VH. The kappa VL or lambda VL may be operatively linked to the VH with an amino acid linker. The kappa VL and lambda VL may be operatively linked to a CL domain and the VH operatively linked to a CH1 domain.

In certain embodiments, the selecting step (v) is performed through biopanning against the target antigen.

Biopanning is a process which typically involves the step of preparing a display library, such as a phage display library. With respect to phage display, this involves providing a bacteriophage genome and inserting segments of a gene of interest therein. Upon protein expression, the resulting peptide product will be displayed on the surface of the bacteriophage virion. In the following panning step, the phage library is exposed to the desired target which may e.g., be bound to a solid surface and allowing the expressed peptide and the target to interact. Unbound phages are washed away; only the phages displaying the properly folded binding entity with good affinity are kept. Finally, in the elution step, the bound phages are eluted through changing of pH or other environment conditions.

In one aspect, the disclosure provides an antigen binding protein that specifically recognizes a target antigen (e.g., a target pMHC), prepared by the methods described above. Such antigen binding protein may specifically recognize the target pMHC at a ratio of at least about 10:1 target pMHC: control (e.g., at least about 20:1, at least about 50:1, at least about 100:1, at least about 500:1, at least about 1000:1, or at least 10'000:1). In some embodiments, the target peptide complex comprises the peptide of SEQ ID NO: 3. Said peptide may be presented by an HLA-A2 complex, as e.g., comprising SEQ ID NO: 1 and SEQ ID NO: 3. The control can be a non-target peptide-MHC complex, such as HLA-A2/Topoisomerase II a-b. Preferably, the antigen binding protein does not bind to the control. In some embodiments, the control is a peptide-MHC complex having the same HLA subtype as the peptide-MHC complex of interest. In some embodiments, the control peptide-MHC complex comprises a multitude of unrelated peptides.

Thus, in specific embodiments, the disclosure provides a method of producing an antigen binding protein that specifically recognizes a target peptide-MHC (pMHC), the method comprising the steps of:
(i) immunizing a rabbit with the target pMHC;
(ii) isolating a plurality of antigen binding protein encoding polynucleotide sequences from the rabbit;
(iii) cloning the plurality of polynucleotide sequences into a nucleic acid library; and
(iv) selecting the antigen binding protein that specifically recognizes a target pMHC.

PCR Primers

Provided herein are primers specific for rabbit kappa VL sequences, such as of kappa 1 (k1) isotype. As detailed in various passages above, the primers introduce an amino acid substitution in the rabbit kappa VL sequences, more specifically, substituting the cysteine at Kabat position 80. Said substitution may be selected from the group consisting of alanine (C80A), serine (C80S), proline (C80P), and a corresponding germline amino acid, such as the residue at the corresponding rabbit or human germline position. The primers can be used in any of the methods described herein.

The primers provided herein may have a length of at least 11 nucleotides, such as about 11 to about 30 nucleotides (e.g., 11, 12, 13, 14, 15, 16, 17, 18, 19, 20, 21, 22, 23, 24, 25, 26, 27, 28, 29, or 30 nucleotides).

In certain embodiments, the primer is selected from the group consisting of F1, F2, R1, R2, R3, R4, R5, R6, R7, R8, R9 and R10, as recited in Table 3. A primer may comprise a sequence as recited in any one of F1, F2, R1, R2, R3, R4, R5, R6, R7, R8, R9 or R10, as recited in Table 3.

Primers F1 and F2 introduce a C80A substitution; in some embodiments, a primer comprises a sequence derived from F1 or F2, as recited in Table 3 with a nucleotide modification introducing a C80S, C80P or a germline residue at C80 (according to Kabat) in the kappa VL. Such primer may incorporate the C80 substitution in the center of its sequence and may include at least 10, 11, 12, 13, 14 or 15 complementary nucleotides on the 3' side of the mutation.

A pair of primers typically includes a forward primer and a reverse primer. The pair may be designed such that both are specific for one allelic variant of rabbit kappa VL germline sequences of the IMGT databases. A first primer of said pair is designed such that it introduces the C80 substitution in the VL kappa sequence. A second primer of said pair may or may not span over a conserved area of such rabbit kappa VL germline sequence. The first or the second primer may be a universal primer which anneals with several or all rabbit kappa VL germline sequences. In some embodiments, the primer pair hybridizes with one or more, such as 2, 3, 4, 5, 6, 7, 8, 9 or more allelic variant of rabbit kappa VL germline sequences of the IMGT databases. Such allelic variants include IGKVIS1 to IGKV1S68, as recited in FIG. 1.

In certain embodiments, the first and second primer are designed such that they anneal closely to each other on the template, preferably back-to-back, i.e., the 5' ends of the two primers anneal back-to-back on the template, without overlap or gap. This is advantageous when a circular DNA construct is used as template, so that the linear strand of DNA produced by the PCR reaction can be recirculated without gap or insertion.

In some embodiments, the first primer is a reverse primer and the second primer is a forward primer. In other embodiments, the first primer is a forward primer and the second primer is a reverse primer.

Expression of Antigen Binding Proteins

In one aspect, polynucleotides or nucleic acids encoding the antigen binding proteins disclosed herein are provided. Methods of making an antigen binding protein comprising expressing these polynucleotides are also provided.

Polynucleotides encoding the antigen binding proteins disclosed herein are typically inserted in an expression vector for introduction into host cells that may be used to produce the desired quantity of the antigen binding proteins. Accordingly, in certain aspects, the invention provides expression vectors comprising polynucleotides disclosed herein and host cells comprising these vectors and polynucleotides.

The term "vector" or "expression vector" is used herein to mean vectors used in accordance with the present invention as a vehicle for introducing into and expressing a desired gene in a cell. As known to those skilled in the art, such vectors may readily be selected from the group consisting of plasmids, phages, viruses and retroviruses. In general, vectors compatible with the instant invention will comprise a selection marker, appropriate restriction sites to facilitate cloning of the desired gene and the ability to enter and/or replicate in eukaryotic or prokaryotic cells.

Numerous expression vector systems may be employed for the purposes of this invention. For example, one class of vector utilizes DNA elements which are derived from animal viruses such as bovine papilloma virus, polyoma virus, adenovirus, vaccinia virus, baculovirus, retroviruses (e.g., RSV, MMTV, MOMLV or the like), or SV40 virus. Others involve the use of polycistronic systems with internal ribosome binding sites. Additionally, cells which have integrated the DNA into their chromosomes may be selected by introducing one or more markers which allow selection of transfected host cells. The marker may provide for prototrophy to an auxotrophic host, biocide resistance (e.g., antibiotics) or resistance to heavy metals such as copper. The selectable marker gene can either be directly linked to the DNA sequences to be expressed or introduced into the same cell by co-transformation. Additional elements may also be needed for optimal synthesis of mRNA. These elements may include signal sequences, splice signals, as well as transcriptional promoters, enhancers, and termination signals. In some embodiments, the cloned variable region genes are inserted into an expression vector along with the heavy and light chain constant region genes (e.g., human constant region genes) synthesized as discussed above.

In other embodiments, the antigen binding proteins may be expressed using polycistronic constructs. In such expression systems, multiple gene products of interest such as heavy and light chains of antibodies may be produced from a single polycistronic construct. These systems advantageously use an internal ribosome entry site (IRES) to provide relatively high levels of polypeptides in eukaryotic host cells. Compatible IRES sequences are disclosed in U.S. Pat. No. 6,193,980, which is incorporated by reference herein in its entirety for all purposes. Those skilled in the art will appreciate that such expression systems may be used to effectively produce the full range of polypeptides disclosed in the instant application.

More generally, once a vector or DNA sequence encoding an antibody, or fragment thereof, has been prepared, the expression vector may be introduced into an appropriate host cell. That is, the host cells may be transformed. Introduction of the plasmid into the host cell can be accomplished by various techniques well known to those of skill in the art. These include, but are not limited to, transfection (including electrophoresis and electroporation), protoplast fusion, calcium phosphate precipitation, cell fusion with enveloped DNA, microinjection, and infection with intact virus. See, Ridgway, A. A. G. "Mammalian Expression Vectors" Chapter 24.2, pp. 470-472 Vectors, Rodriguez and Denhardt, Eds. (Butterworths, Boston, Mass. 1988). Plasmid introduction into the host can be by electroporation. The transformed cells are grown under conditions appropriate to the production of the light chains and heavy chains, and assayed for heavy and/or light chain protein synthesis. Exemplary assay techniques include enzyme-linked immunosorbent assay (ELISA), radioimmunoassay (RIA), fluorescence-activated cell sorter analysis (FACS), immunohistochemistry and the like.

As used herein, the term "transformation" shall be used in a broad sense to refer to the introduction of DNA into a recipient host cell that changes the genotype and consequently results in a change in the recipient cell.

Along those same lines, "host cells" refers to cells that have been transformed with vectors constructed using recombinant DNA techniques and encoding at least one heterologous gene. In descriptions of processes for isolation of polypeptides from recombinant hosts, the terms "cell" and "cell culture" are used interchangeably to denote the source of antibody unless it is clearly specified otherwise. In other words, recovery of polypeptide from the "cells" may mean either from spun down whole cells, or from the cell culture containing both the medium and the suspended cells.

In one embodiment, a host cell line used for antibody expression is of mammalian origin. Those skilled in the art can determine particular host cell lines which are best suited for the desired gene product to be expressed therein. Exemplary host cell lines include, but are not limited to, DG44 and DUXB11 (Chinese hamster ovary lines, DHFR minus), HELA (human cervical carcinoma), CV-1 (monkey kidney line), COS (a derivative of CV-1 with SV40 T antigen), R1610 (Chinese hamster fibroblast) BALBC/3T3 (mouse fibroblast), HAK (hamster kidney line), SP2/O (mouse myeloma), BFA-1c1BPT (bovine endothelial cells), RAJI (human lymphocyte), 293 (human kidney) and the like. In one embodiment, the cell line provides for altered glycosylation, e.g., afucosylation, of the antibody expressed therefrom (e.g., PER.C6® (Crucell) or FUT8-knock-out CHO cell lines (Potelligent® cells) (Biowa, Princeton, N.J.)). Host cell lines are typically available from commercial services, e.g., the American Tissue Culture Collection, or from published literature.

In vitro production allows scale-up to give large amounts of the desired polypeptides. Techniques for mammalian cell cultivation under tissue culture conditions are known in the art and include homogeneous suspension culture, e.g., in an airlift reactor or in a continuous stirrer reactor, or immobilized or entrapped cell culture, e.g., in hollow fibers, microcapsules, on agarose microbeads or ceramic cartridges. If necessary and/or desired, the solutions of polypeptides can be purified by the customary chromatography methods, for example gel filtration, ion-exchange chromatography, chromatography over DEAE-cellulose and/or (immuno-) affinity chromatography.

Genes encoding the antigen binding proteins featured in the invention can also be expressed non-mammalian cells such as bacteria or yeast or plant cells. In this regard it will be appreciated that various unicellular non-mammalian microorganisms such as bacteria can also be transformed, i.e., those capable of being grown in cultures or fermentation. Bacteria, which are susceptible to transformation, include members of the enterobacteriaceae, such as strains of *Escherichia coli* or *Salmonella*; Bacillaceae, such as *Bacillus subtilis*; Pneumococcus; Streptococcus, and *Haemophilus influenzae*. It will further be appreciated that, when expressed in bacteria, the proteins can become part of inclusion bodies. The proteins must be isolated, purified and then assembled into functional molecules.

In addition to prokaryotes, eukaryotic microbes may also be used. *Saccharomyces cerevisiae*, or common baker's yeast, is the most commonly used among eukaryotic microorganisms, although a number of other strains are commonly available. For expression in *Saccharomyces*, the plasmid YRp7, for example (Stinchcomb et al., Nature, 282:39 (1979); Kingsman et al., Gene, 7:141 (1979); Tschemper et al., Gene, 10:157 (1980)), is commonly used. This plasmid already contains the TRP1 gene which provides a selection marker for a mutant strain of yeast lacking the ability to grow in tryptophan, for example ATCC No. 44076 or PEP4-1 (Jones, Genetics, 85:12 (1977)). The presence of the trp1 lesion as a characteristic of the yeast host cell genome then provides an effective environment for detecting transformation by growth in the absence of tryptophan.

Target Peptide-MHC

The antigen binding proteins described herein possess binding specificity to a variety of disease-relevant antigens presented on the surface of cells as peptide-MHC. Disease-relevant antigens include, but are not limited to, tumor antigens and viral antigens.

Examples of tumor antigens include melanoma-associated antigen A (MAGE-A), such as MAGE-A1, MAGE-A3 and MAGE-A4, New York esophageal squamous cell carcinoma-1 (NY-ESO-1), synovial sarcoma X (SSX), carcinoembryonic antigen (CEA), preferentially expressed antigen in melanoma (PRAME), melanoma antigen recognized by T cells 1 (MART-1), Kirsten rat sarcoma viral oncogene (K-ras), kinetochore NDC80 protein homolog (NDC80), Kita-Kyushu lung cancer antigen (KK-LC-1), and Wilms tumor 1 (WT1).

Examples of viral antigens include Epstein-Barr virus derived EBNA1, EBNA2, EBNA3, LMP1, or LMP2; hepatitis B virus derived HBX; hepatitis C virus derived NS3 or NS5A; human papillomavirus derived type E5, E6, and E7 proteins; cytomegalovirus derived PP65; human immunodeficiency virus derived gag; and Kaposi sarcoma-associated herpesvirus derived vGPCR or vIRF-1.

The target peptide may be presented on a MHC class I complex (such as of serotype HLA-A, HLA-B, HLA-C, HLA-E, HLA-F, HLA-G, HLA-K or HLA-L, or their respective subtypes) or an MHC class II complex (such as the serotypes HLA-DP, HLA-DQ, HLA-DR, DM or DO, or their respective subtypes). Each of the serotypes comprise different subtypes. In one embodiment, the antigen binding protein targets a peptide bound to an HLA-A2-MHC complex, also termed HLA-A*02, in particular HLA-A*02:01 comprising the extracellular domain of SEQ ID NO: 1.

Engineering and Optimization of Antigen Binding Proteins

The antigen binding proteins of the disclosure may be engineered or optimized. As used herein, "optimized" or "optimization" refers to the alteration of an antigen binding protein to improve one or more functional properties. Alteration includes, but is not limited to, deletions, substitutions, additions, and/or modifications of one or more amino acids within an antigen binding protein.

As used herein, the term "functional property" is a property of an antigen binding protein for which an improvement (e.g., relative to a conventional antigen binding protein, such as an antibody) is desirable and/or advantageous to one of skill in the art, e.g., in order to improve the manufacturing properties or therapeutic efficacy of an antigen binding protein. In one embodiment, the functional property is stability (e.g., thermal stability). In another embodiment, the functional property is solubility (e.g., under cellular conditions). In yet another embodiment, the functional property is aggregation behavior. In still another embodiment, the functional property is protein expression (e.g., in a prokaryotic cell). In yet another embodiment the functional property is refolding behavior following inclusion body solubilization in a manufacturing process. In certain embodiments, the functional property is not an improvement in antigen binding affinity. In another embodiment, the improvement of one or more functional properties has no substantial effect on the binding affinity of the antigen binding protein.

In certain embodiments, the antigen binding protein of the disclosure is an scFv and is optimized by identifying preferred amino acid residues to be substituted, deleted, and/or added at amino acid positions of interest (e.g., amino acid positions identified by comparing a database of scFv sequences having at least one desirable property, e.g., as selected with Quality Control (QC) assay, versus a database of mature antibody sequences, e.g., the Kabat database) in an antigen binding protein. Thus, the disclosure further provides "enrichment/exclusion" methods for selecting a particular amino acid residue. Still further, the disclosure provides methods of engineering antigen binding proteins (e.g., scFvs) by mutating particular framework amino acid positions identified using the "functional consensus" approach described herein. In certain embodiments, the framework amino acid positions are mutated by substituting the existing amino acid residue by a residue which is found to be an "enriched" residue using the "enrichment/exclusion" analysis methods described herein. In one aspect, the disclosure provides a method of identifying an amino acid position for mutation in a single chain antibody (scFv), the scFv having VH and VL amino acid sequences, the method comprising: a) entering the scFv VH, VL or VH and VL amino acid sequences into a database that comprises a multiplicity of antibody VH, VL or VH and VL amino acid sequences such that the scFv VH, VL or VH and VL amino acid sequences are aligned with the antibody VH, VL or VH and VL amino acid sequences of the database; b) comparing an amino acid position within the scFv VH or VL amino acid sequence with a corresponding position within the antibody VH or VL amino acid sequences of the database; c) determining whether the amino acid position within the scFv VH or VL amino acid sequence is occupied by an amino acid residue that is conserved at the corresponding position within the antibody VH or VL amino acid sequences of the database; and d) identifying the amino acid position within the scFv VH or VL amino acid sequence as an amino acid position for mutation when the amino acid position is occupied by an amino acid residue that is not conserved at the corresponding position within the antibody VH or VL amino acid sequences of the database. ScFv optimization is described in further detail in WO2008110348, WO2009000099, WO2009000098, and WO2009155725, all of which are incorporated herein by reference.

In certain embodiments, the antigen binding protein comprises an Fc domain which is modified such that it does not induce cytotoxic immune responses and/or does not activate complement. For example, one or more substitutions may be introduced into the Fc domain so that its ADCC/ADCP or CDC effector function is inactivated. Such antigen binding protein has the advantage of increased half-life when compared to antibody fragments with a molecular weight below 60 kDa, without mediating mediate cytotoxic immune responses.

Chemical and/or Biological Modifications

In one aspect, the antigen binding protein is chemically and/or biologically modified. For example, the antigen binding protein may be glycosylated, phosphorylated, hydroxylated, PEGylated, HESylated, PASylated, sulfated, labeled with dyes and/or radioisotopes, conjugated with enzymes and/or toxins, and/or Albumin fusion technology. Likewise, any nucleic acid sequence, plasmid or vector and/or host cell described herein may be modified accordingly.

Such modification may for example be done to optimize pharmacodynamics, its water solubility or to lower its side effects. For example, PEGylation, PASylation, HESylation and/or the fusion to serum albumin may be applied to slow down renal clearance, thereby increasing plasma half-life time of the antigen binding protein. In one embodiment, a modification adds a different functionality to the antigen binding protein, for example, a detection label for diagnostics or a toxin to combat cancer cells even more efficiently.

In one embodiment, the antigen binding protein is glycosylated. Glycosylation refers to a process that attaches carbohydrates to proteins. In biological systems, this process is performed enzymatically within the cell as a form of co-translational and/or post-translational modification. A protein can also be chemically glycosylated. The carbohydrates may be N-linked to a nitrogen of asparagine or arginine side-chains; O-linked to the hydroxy oxygen of serine, threonine, tyrosine, hydroxylysine, or hydroxyproline side-chains; employ xylose, fucose, mannose, and N-acetylglucosamine attached to a phospho-serine; and/or adding mannose sugar to a tryptophan residue found in a specific recognition sequence. Glycosylation patterns may, e.g., be controlled by choosing appropriate cell lines, culturing media, protein engineering manufacturing modes and process strategies (see., HOSSLER, P. Optimal and consistent protein glycosylation in mammalian cell culture. Glycobiology 2009, vol. 19, no. 9, p. 936-949.). In some embodiments, the glycosylation patterns of the antigen binding proteins described herein are modified to enhance ADCC and CDC effector function.

The antigen binding protein may be engineered to control or alter the glycosylation pattern, e.g., by deleting and/or adding one or more glycosylation sites. The creation of glycosylation sites can e.g., be accomplished by introducing the corresponding enzymatic recognition sequence into the amino acid sequence of the antigen binding protein.

In some embodiments, the antigen binding protein is PEGylated. PEGylation may alter the pharmacodynamic and pharmacokinetic properties of a protein. Additionally, PEGylation may reduce the immunogenicity by shielding the PEGylated antigen binding protein from the immune system and/or alter its pharmacokinetics by, e.g., increasing the in vivo stability of the antigen binding protein, protecting it from proteolytic degradation, extending its half-life time and by altering its biodistribution. Typically, polyethyleneglycol (PEG) of an appropriate molecular weight is covalently attached to the protein. Similar effects may be achieved using PEG mimetics, e.g., HESylating or PASylating the antigen binding protein. HESylation utilizes hydroxyethyl starch ("HES") derivatives. During PASylation, the antigen binding protein is linked to conformationally disordered polypeptide sequences composed of the amino acids proline (P), alanine (A) and serine(S).

In certain embodiments, the antigen binding protein is labelled with or conjugated to a second moiety which attributes one or more ancillary functions to the antigen binding protein. For example, the second moiety may have an additional immunological effector function, be effective in drug targeting or useful for detection. The second moiety can, e.g., be chemically linked or fused genetically to the antigen binding protein using known methods in the art. As used herein, the term "label" refers to any substance or ion which is indicative of the presence of the antigen binding protein when detected or measured by physical or chemical means, either directly or indirectly. For example, the label may be directly detectable by, without being limited to, light absorbance, fluorescence, reflectivity, light scatter, phosphorescence, or luminescence properties, molecules or ions detectable by their radioactive properties or molecules or ions detectable by their nuclear magnetic resonance or paramagnetic properties. Examples of indirect detection include light absorbance or fluorescence; for example, various enzymes which cause appropriate substrates to convert, e.g., from non-light absorbing to light absorbing molecules, or from non-fluorescent to fluorescent molecules. A labelled antigen binding protein is particularly useful for in vitro and in vivo detection or diagnostic purposes. For example, an antigen binding protein labelled with a suitable radioisotope, enzyme, fluorophore or chromophore can be detected by radioimmunoassay (RIA), enzyme-linked immunosorbent assay (ELISA), or flow cytometry-based single cell analysis (e.g., FACS analysis), respectively. Similarly, the nucleic acids and/or vectors disclosed herein can be labeled for detection or diagnostic purposes, e.g., using labelled fragments thereof as probes in hybridization assays.

Non-limiting examples of second moieties include radioisotopes (35S, 32P, 14C, 18F, and/or 125I), apoenzymes, enzymes (e.g., alkaline phosphatase, horseradish peroxidase, beta-galactosidase and/or angiogenin), co-factors, peptide moieties (e.g., a HIS-tag), proteins (e.g. lectin, serum albumin), carbohydrates (e.g., mannose-6-phosphate tags), fluorophores (e.g., fluorescein isothiocyanate (FITC)), phycoerythrin, green/blue/red or other fluorescent proteins, allophycocyanin (APC), chromophores, vitamins (e.g., biotin), chelators, antimetabolites (e.g., methotrexate), toxins (e.g. a cytotoxic drug, or a radiotoxin).

In one aspect, the invention relates to drug conjugates (in particular antibody-drug conjugates ADCs) comprising the antigen binding proteins described herein conjugated to a toxin which further enhances efficient killing of specific cells, such as e.g., MAGE-A4 positive cells. The toxin moiety is typically a small molecular weight moiety, such as anthracycline toxins, taxol, gramicidin D and/or colchicine which may be linked via a peptide linker to the antigen binding protein.

The toxin may be conjugated non-site-specifically or site-specifically to the antigen binding protein. Non-site-specific conjugation typically involves the use of chemical linkers, e.g., with maleimide functionality, that mediate conjugation to lysine or cysteine amino acid side chains of the antibody. Site-specific conjugation may be achieved using chemical, chemo-enzymatic, or enzymatic conjugations known in the art, e.g., employing bifunctional linkers, bacterial transglutaminase or sortase enzymes, linkers allowing Pictet-Spengler chemistry on formyl-glycine forming enzyme modified antigen binding proteins, or glycan-remodeled antigen binding proteins.

Chimeric Antigen Receptors

In one aspect, the disclosure provides chimeric antigen receptors (CARs) and immune cells engineered to express such CARs, comprising the antigen binding proteins described herein. As used herein, the term "chimeric antigen receptor" or "CAR" refers to a receptor that is capable of activating an immune cell in response to antigen binding. CARs are recombinant membrane spanning molecules and are advantageously expressed on immune cells. Their structure typically comprises (i) an extracellular domain (ectodomain or antibody domain), (ii) a transmembrane domain and (iii) a cytoplasmic domain (endodomain or intracellular signaling domain).

The ectodomain (i.e., antibody domain) typically comprises a scFv but other antigen binding proteins may also be used. A spacer connects the ectodomain and the transmembrane domain, which in turn is connected to an endodomain. Upon binding of the ectodomain to the antigen, the receptors cluster and an activation signal is transmitted to the cell which results in initiation of an immune response. First generation CARs have a simply structured endodomain comprising CD3-zeta. To increase the activation signal, a co-stimulatory domain was added in the second-generation CARs; and third generation CARs include two or more co-stimulatory domains (Maus M V et al (2014) Blood, 123:2625-2635). Said co-stimulatory domains may be selected from the group consisting of CD28, OX40 and/or 4-1BB. Apart from CD3-zeta, other ITAM-containing domains have been explored including the Fc receptor for IgE-γ domain.

Suitable immune cells include, without being limited to, T cells, Natural Killer T (NKT) cells, natural killer (NK) cells, human embryonic stem cells, hematopoietic stem cells (HSC) or induced pluripotent stem cells (iPS). Such T cell may be a cytotoxic T lymphocyte (CTL), a regulatory T lymphocyte, an inflammatory T-lymphocytes, or a helper T-lymphocyte or a gamma-delta T cell. The T cell may be a CD4+ or CD8+ or a mixed population of CD4+ and CD8+ cells.

In one aspect, the disclosure provides a chimeric antigen receptor (CAR) that specifically recognizes a target antigen (e.g., a target peptide-MHC), comprising: i) an antigen binding protein identified from the nucleic acid libraries or methods described herein; ii) a transmembrane domain; and iii) an intracellular signaling domain.

In certain embodiments, the transmembrane domain is selected from the group consisting of an artificial hydrophobic sequence and transmembrane domains of a type I transmembrane protein, an alpha, beta or zeta chain of a T cell receptor, CD28, CD3 epsilon, CD45, CD4, CD5, CD8, CD9, CD16, CD22, CD33, CD37, CD64, CD80, CD86, CD134, CD137, and CD154.

In certain embodiments, the intracellular signaling domain is selected from the group consisting of cytoplasmic signaling domains of a human CD3 zeta chain, FcγRIII, a cytoplasmic tail of an Fc receptor, an immunoreceptor tyrosine-based activation motif (ITAM) bearing cytoplasmic receptors, TCR zeta, FcR gamma, FcR beta, CD3 gamma, CD3 delta, CD3 epsilon, CD5, CD22, CD79a, CD79b, and CD66d.

The antibody domain may be any of the antigen binding proteins outlined above. Thus, in certain embodiments, the antibody domain comprises an antibody variable light domain (VL) comprising an amino acid sequence represented by the formula LFR1-CDRL1-LFR2-CDRL2-LFR3-CDRL3-LFR4. In certain embodiments, the antibody domain comprises an antibody variable heavy domain (VH) comprising an amino acid sequence represented by the formula HFR1-CDRH1-HFR2-CDRH2-HFR3-CDRH3-HFR4. In certain embodiments, the antibody domain comprises an scFv as described herein.

Methods of Administering Antigen Binding Proteins

Methods of preparing and administering antigen binding proteins of the disclosure as well as the nucleic acids described herein, the vectors described herein, the host cell cells described herein (in particular the immune cells bearing a CAR) or the compositions described herein to a subject are well known to or are readily determined by those skilled in the art. The route of administration of the antigen binding proteins of the current disclosure may e.g., be oral, parenteral, by inhalation, or topical. The term parenteral as used herein includes intravenous, intraarterial, intraperitoneal, intramuscular, subcutaneous, rectal or vaginal administration. The term intraocular as used herein includes, but is not limited to, subconjunctival, intravitreal, retrobulbar, or intracameral. The term topical as used herein includes, but is not limited to, administration with liquid or solution eye drops, emulsions (e.g., oil-in-water emulsions), suspensions, and ointments.

While all these forms of administration are clearly contemplated as being within the scope of the current disclosure, a form for administration would be a solution for injection. Usually, a suitable pharmaceutical composition for injection may comprise a buffer (e.g., acetate, phosphate or citrate buffer), a surfactant (e.g., polysorbate), optionally a stabilizer agent (e.g., human albumin), etc. However, in other methods compatible with the teachings herein, the modified antibodies can be delivered directly to the site of the adverse cellular population thereby increasing the exposure of the diseased tissue to the therapeutic agent.

Effective doses of the compositions of the present disclosure, for the treatment of the related conditions vary depending upon many different factors, including means of administration, target site, physiological state of the patient, whether the patient is human or an animal, other medications administered, and whether treatment is prophylactic or therapeutic. Usually, the patient is a human, but non-human mammals, including transgenic mammals, can also be treated. Treatment dosages may be titrated using routine methods known to those of skill in the art to optimize safety and efficacy.

As previously discussed, the antigen binding proteins of the present disclosure, conjugates or recombinants thereof may be administered in a pharmaceutically effective amount for the in vivo treatment of mammalian disorders. In this regard, it will be appreciated that the disclosed antigen binding proteins will be formulated to facilitate administration and promote stability of the active agent.

Pharmaceutical compositions in accordance with the present disclosure typically include a pharmaceutically acceptable, non-toxic, sterile carrier such as physiological saline, nontoxic buffers, preservatives and the like. For the purposes of the instant application, a pharmaceutically effective amount of the antigen binding proteins shall be held to mean an amount sufficient to achieve effective binding to an antigen and to achieve a benefit, e.g., to ameliorate symptoms of a disease or disorder or to detect a substance or a cell. In the case of tumor cells, the antigen binding proteins will typically be capable of interacting with selected immunoreactive antigens on neoplastic or immunoreactive cells and provide for an increase in the death of those cells. Of course, the pharmaceutical compositions of the present disclosure may be administered in single or multiple doses to provide for a pharmaceutically effective amount of the modified binding polypeptide.

In keeping with the scope of the present disclosure, the antigen binding proteins of the disclosure may be administered to a human or other animal in accordance with the aforementioned methods of treatment in an amount sufficient to produce a therapeutic or prophylactic effect. The antigen binding proteins of the disclosure can be administered to such human or other animal in a conventional dosage form prepared by combining the antigen binding proteins of the disclosure with a conventional pharmaceutically acceptable carrier or diluent according to known techniques. It will be recognized by one of skill in the art that the form and character of the pharmaceutically acceptable carrier or diluent is dictated by the amount of active ingredient with which it is to be combined, the route of administration and other well-known variables. Those skilled in the art will further appreciate that a cocktail comprising one or more species of antigen binding proteins described in the current disclosure may prove to be particularly effective. Similarly, the nucleic acids described herein, the vectors described herein, the host cell cells described herein (in particular the immune cells bearing a CAR) or the compositions described herein may be administered to a human or other animal in accordance with the methods of treatment described above in an amount sufficient to produce a therapeutic or prophylactic effect.

"Efficacy" or "in vivo efficacy" as used herein refers to the response to a therapy by the pharmaceutical composition of the disclosure, using e.g., standardized response criteria, such as standard ophthalmological response criteria. The success or in vivo efficacy of the therapy using a pharmaceutical composition of the disclosure refers to the effectiveness of the composition for its intended purpose, i.e., the ability of the composition to cause its desired effect. The in vivo efficacy may be monitored by established standard methods for the specific diseases. In addition, various disease specific clinical chemistry parameters and other established standard methods may be used.

In some embodiments, the compounds and cells described herein are administered in combination with one or more different pharmaceutical compounds.

Generally, therapeutic use of the compounds and cells described herein may be in combination with one or more therapies selected from the group of antibody therapy, chemotherapy, cytokine therapy, dendritic cell therapy, gene therapy, hormone therapy, laser light therapy, radiation therapy or vaccine therapy.

Methods of Treating Peptide-MHC Mediated Diseases and Disorders

In one aspect, the aforementioned antigen binding proteins, nucleic acids, vectors or host cells (in particular immune cells expressing CARs) or the vector, are useful as a medicament. Typically, such a medicament includes a therapeutically effective amount of a molecule or cell as provided herein. Accordingly, a respective molecule or host cell can be used for the production of a medicament useful in the treatment of one or more disorders, in particular target antigen expressing cancer (e.g., target pMHC expressing cancer).

In one aspect, a method of treating a pMHC related or mediated disorder is provided. The method includes the steps of administering a pharmaceutically effective amount of a molecule or host cell as described herein, in particular the antigen binding proteins or host cell, to a subject in need thereof. In one embodiment, the pharmaceutical composition described above, which includes such pharmaceutically effective amount of the antigen binding protein, nucleic acid, vector or host cell is administered to the subject. The medicament referred to above may be administered to a subject.

The subject in need of a treatment can be a human or a non-human animal. Typically, the subject is a mammal, e.g., a mouse, a rat, rabbit, a hamster, a dog, a cat, a monkey, an ape, a goat, a sheep, a horse, a chicken, a guinea pig or a pig. In typical embodiments, the subject is diagnosed with a pMHC related disorder or may acquire such a disorder. In case of an animal model, the animal might be genetically engineered to develop a pMHC related disorder. In an animal model, an animal may also be genetically engineered in such a way that it shows the characteristics of pMHC related disease.

Use in Diagnostics and Detection Assays

An antigen binding protein as disclosed herein may be used for detection or diagnostic purposes in vivo and/or in vitro. For example, a wide range of immunoassays using antibodies for detecting the expression in specific cells or tissues are known to the skilled person. For such purposes, it may be advantageous to use a antigen binding protein connected to a detectable label, such a biotin.

In one embodiment, the described antigen binding proteins are useful for detecting the presence of a target peptide-MHC complex, in particular MAGE-A4, in a sample. The detection may be for quantitative or qualitative purposes. The sample is preferably of biological origin, such as blood, urine, cerebrospinal fluid, biopsy, lymph and/or non-blood tissues. In certain embodiments, a biological sample comprises a cell or tissue from a human patient. In certain embodiments, the method includes contacting a biological sample with an antigen binding protein under conditions permissive for binding of the inhibitor to the target peptide-MHC and then detecting the inhibitor-target complex. Such method may be an in vitro or in vivo method. In some embodiments, such method is performed to select subjects eligible for therapy with the antigen binding protein described herein.

Kits

Also contemplated are kits comprising at least one nucleic acid library or antigen binding protein or one or more pairs of primers as described herein, typically together with a packaged combination of reagents with instructions. In one embodiment, the kit includes a composition containing an effective amount of said antigen binding protein in unit dosage form. In one embodiment, the kit includes a composition comprising a one or more said pairs of primers, such as F1/R1, F1/R2, F1/R3, F1/R4, F1/R5, F1/R6, F1/R7, F1/R8, F1/R9, F1/R10, F2/R1, F2/R2, F2/R3, F2/R4, F2/R5, F2/R6, F2/R7, F2/R8, F2/R9, and F2/R10 (as recited in Table 3), or an oligonucleotide sequence derived thereof. Such derived sequence may comprise (i) additional nucleotides, such as 1, 2, 3, 4, 5 or more, such as 7, 8, 9, 10 or more nucleotides on the 5' and/or the 3' end of the sequence or (ii) a deletion of one or more nucleotides at the 5' and/or the 3' end of the sequence, such as 1, 2, 3, 4, 5 or more deletions. Preferably, the derived sequence does not change the amino acid sequence, but may or may not anneal at a different position than the parental sequence.

Typically, a pair of primers comprises a forward primer and a reverse primer. In some embodiments, the kit additionally comprises one or more primers specific for a rabbit kappa and/or lambda VL sequence.

Such kit may comprise a sterile container comprising the composition; non-limiting examples of such containers include, without being limited to, vials, ampoules, bottles, tubes, syringes, blister-packs. In some embodiments, the composition is a pharmaceutical composition and the containers is made of a material suitable for holding medicaments. In one embodiment, the kit may comprise in a first container the antigen binding protein in lyophilized form and a second container with a diluent (e.g., sterile water) for reconstitution or dilution of the antigen binding protein. In some embodiments, said diluent is a pharmaceutically acceptable diluent. In one embodiment, the kit is for diagnostic purposes and the antigen binding protein is formulated for diagnostic applications. In one embodiment, the kit is for therapeutic purposes and the antigen binding protein is formulated for therapeutic applications.

In one embodiment, the kit comprises one or more containers, each container comprising a primer as disclosed herein. The primer may be provided freeze-dried state. In such case, the kit may comprise at least one container comprising a buffer suitable for resuspension. The kit may further comprise a container for a master mix for performing a PCR amplification, optionally freeze-dried.

Typically, the kit will further comprise a separate sheet, pamphlet or card supplied in or with the container with instructions for use. If the kit is intended for pharmaceutical use, it may further comprise one or more of the following: information for administering the composition to a subject having a related disease or disorder (e.g., a MAGE-A4-mediated disease or disorder) and a dosage schedule, description of the therapeutic agent, precautions, warnings, indications, counter-indications, overdosage information and/or adverse reactions.

It will be readily apparent to those skilled in the art that other suitable modifications and adaptations of the methods described herein may be made using suitable equivalents without departing from the scope of the embodiments disclosed herein. Having now described certain embodiments in detail, the same will be more clearly understood by reference to the following examples, which are included for purposes of illustration only and are not intended to be limiting.

EXAMPLES

Example 1—Production of MHC Complexes as an Antigen for Immunization

MHC class I heavy chain and β2m were cloned into a pET-24D(+) vector using standard molecular biology techniques (J Biol Chem. 1995 Jan. 13; 270(2): 971-7). *E. coli* BL-21 (DE3) were transformed with the expression vectors according to the supplier's protocols. Protein expression was performed for 16-18 hours at 37° C. with 220 rpm shaking in MagicMedium (Invitrogen), as described by the supplier. Cells were harvested and lysed with BugBuster (Invitrogen) and the inclusion bodies were washed twice with TBS supplemented with 0.5% LDAO and twice with TBS. Such prepared inclusion bodies were solubilized in a denaturing buffer (8 M urea, 100 mM Tris-HCl pH 8) using 5 mL buffer per 1 g inclusion body pellet. Refolding and purification of the MHC with the target peptides (HLA-A*02:01 extracellular domain, human β2M, and MAGE-A4 peptide 230-239) was performed essentially as described by Rodenko et al. (2006). The amino acid sequences for each component of the pMHC antigen are recited below in Table 2.

TABLE 2

Amino Acid Sequences Of pMHC Antigen Components

| Sequence ID | Sequence |
|---|---|
| HLA-A*02:01 extracellular domain (SEQ ID NO: 1) | GSHSMRYFFTSVSRPGRGEPRFIAVGYVDDTQFV RFDSDAASQRMEPRAPWIEQEGPEYVVDGETRKV KAHSQTHRVDLGTLRGYYNQSEAGSHTVQRMY GCDVGSDWRFLRGYHQYAYDGKDYIALKEDLR SWTAADMAAQTTKHKWEAAHVAEQLRAYLEG TCVEWLRRYLENGKETLQRTDAPKTHMTHHAV SDHEATLRCWALSFYPAEITLTWQRDGEDQTQD TELVETRPAGDGTFQKWAAVVVPSGQEQRYTCH VQHEGLPKPLTLRWE |
| human β2m (SEQ ID NO: 2) | IQRTPKIQVYSRHPAENGKSNFLNCYVSGFHPSDI EVDLLKNGERIEKVEHSDLSFSKDWSFYLLYYTE FTPTEKDEYACRVNHVTLSQPKIVKWDRDM |
| MAGE-A4$_{230-239}$ (SEQ ID NO: 3) | GVYDGREHTV |

Example 2—Rabbit Immunization

To generate numerous antibodies able to specifically recognize the target peptides in the context of the HLA complex, 3 New Zealand white rabbits were immunized with the recombinantly produced MHC complex. Each animal received at different timepoints 4 injections of the pMHC complex with complete or incomplete Freund's adjuvant. The immune response of the animals was tested in ELISA to quantify anti-pMHC antibodies present in serum samples of the immunized animals. Antibody titers in sera indicated excellent immune responses.

Example 3—Construction of Immune Libraries Derived from Rabbits scFv antibody cDNA libraries were constructed from the RNA extracted from isolated PBMCs and spleen lymphocytes from rabbits via PCR amplification. Coding sequences for the variable light- and heavy-domain were amplified separately and linked through a series of overlap polymerase chain reaction (PCR) steps to give the final scFv products. The amplified DNA sequences coding for the scFvs from rabbits were digested using appropriate restriction enzymes and were subsequently ligated into the phagemid vectors. The phagemid vectors were transformed into *E. coli* TG1 electrocompetent cells which are well suited for antibody phage display library creation. These processes resulted in two antibody libraries comprising a diversity of $5.2 \times 10^8$ with a sequence accuracy of 87.5% for the kappa-based library and $2.0 \times 10^9$ with an accuracy of 91.7% for the lambda-based library.

Example 4—Alignment of the Kappa Light Chain Alleles 68 rabbit kappa light chain alleles are listed in the IMGT database. The DNA sequences of all 68 alleles were exported and aligned. Only 4 out of the 68 alleles do not have a cysteine at position 80 (according to Kabat numbering), which underlines the importance of optimizing scFv immune libraries comprising the rabbit kappa light chain repertoire. The nucleotide sequence in this cysteine flanking region shows a high sequence conservation. This allows the design of a primer set which covers the complete naïve rabbit kappa light chain repertoire. The alignment of the sequences is shown in FIG. 1.

Example 5—Design of Primers

Primers were designed to mutate the cysteine at position 80 in rabbit kappa light chains into an alanine. Two forward primers were designed comprising the nucleotide substitution C80A. In addition, 10 reverse primers are required to cover the full kappa light chain repertoire. See Table 3 below. Primer design was done according to Q5 site directed protocol of New England Biolabs.

TABLE 3

Primer sets used to remove the cysteine 80, comprising 2 forward primers and 10 reverse primers. This set of primers is meant to cover the full naïve rabbit Vκ repertoire.

| Primer | Sequence (5' to 3') | Tm |
|---|---|---|
| forward_1 (F1) SEQ ID NO: 4 | GCTGACGATGCTGCCAC | 62° C. |
| forward_2 (F2) SEQ ID NO: 5 | GCTGCCGATGCTGCC | 63° C. |
| reverse_1 (R1) SEQ ID NO: 6 | CTCCACGCCACTGATG | 63° C. |
| reverse_2 (R2) SEQ ID NO: 7 | CTGTACGCCACTGATGG | 63° C. |
| reverse_3 (R3) SEQ ID NO: 8 | CTGCACACCGCTGATG | 64° C. |
| reverse_4 (R4) SEQ ID NO: 9 | CTGCACGCCGCTG | 65° C. |
| reverse_5 (R5) SEQ ID NO: 10 | CTGCACGCCACTGATG | 64° C. |
| reverse_6 (R6) SEQ ID NO: 11 | CTGCACGCCGTTGATG | 65° C. |
| reverse_7 (R7) SEQ ID NO: 12 | CTCCAGGTCGCTGATGG | 65° C. |
| reverse_8 (R8) SEQ ID NO: 13 | CTGTGCACCGCTGATG | 64° C. |
| reverse_9 (R9) SEQ ID NO: 14 | CTGCACGTCGCTGATG | 64° C. |
| reverse_10 (R10) SEQ ID NO: 15 | CTGCACACCACTGATGG | 63° C. |

Figure 2:
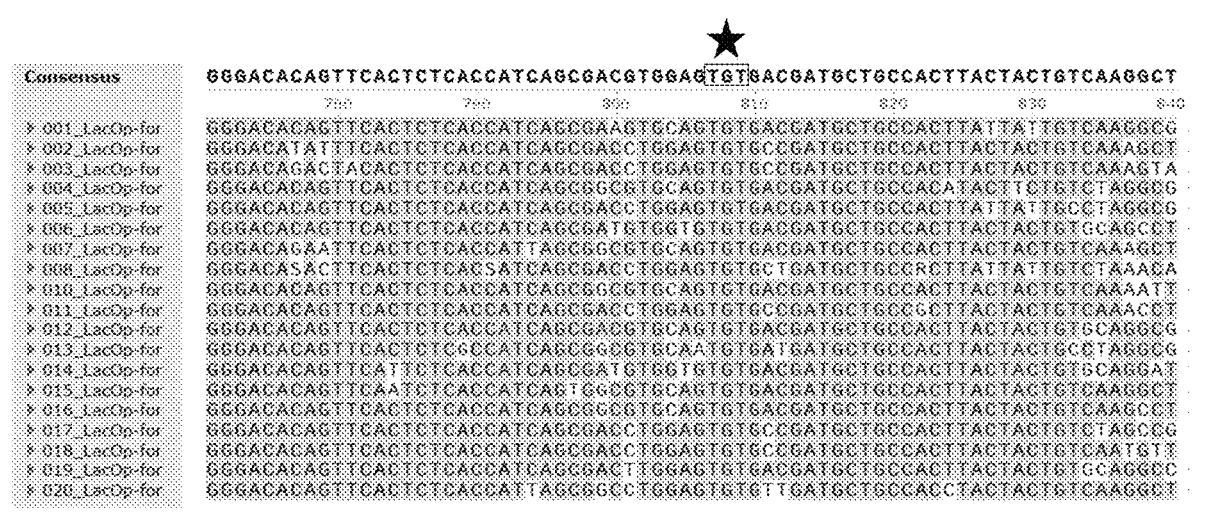

For a proof of concept, 20 clones of an in-house rabbit immune library were randomly picked. These variants have been sequenced and aligned against the naïve rabbit kappa light chains repertoire (IMGT database). Sequence alignment of the matured antibodies are listed in FIG. 2. Based on these antibodies, which have gone through the somatic hypermutation process, as well as the sequence rearrangement within the immune response of the rabbits, have been used to assess the designed primer set for its functionality of mutating an immune library repertoire while recovering a high diversity.

Within the 20 sequences which have been selected, 1/20 showed poor sequence quality. Of the 19 remaining sequences, 11/19 (58%) were fully covered by the primer set without any mismatches. From the remaining variants, 5/19 (26%) revealed 1 nucleotide mismatch in either the forward or the reverse primer. The other 3/19 (16%) showed two or three mismatches. With the assumption that a PCR would potentially still work for those with only 1 mismatch in the primer annealing region, a library recovery of 16/19 (84%) was found.

Example 6—Optimization of an in-House Rabbit scFv Immune Library

The DNA (Phagemid) of an in-house rabbit scFv immune library was used as template DNA to run all possible primer combinations of the explained primer set (20 PCR reactions). The Q5 Site-Directed Mutagenesis kit of New England Biolabs was used according to the provided protocol. The annealing temperature was set to 63° C. and 35 cycles were used with 1 ng of the original phagemid DNA as template. After PCR, the KLD reaction (a part of the Q5 Site-Directed Mutagenesis protocol) was done for each sample with incubating for 30 min at room temperature, followed by 30 min at 16° C. The KLD reactions were then purified using PCR purification followed by electroporation into TG1 cells. The transformed bacteria were plated on 2×YT plates containing 100 μg/ml ampicillin+1% glucose and incubated overnight at 37° C. After harvesting the bacteria, the phage amplification was initiated according to standard protocols. In addition, a serial dilution of bacteria was performed to determine the transformation titers which was indicating a library coverage of 8.5-fold above the original library. A few clones of each reaction were sequenced for quality control.

Example 7—Quality of Optimized Library 4-5 variants for each of the 20 PCR reactions (96 in total) were sequenced to check the quality of the optimized library. For all PCR reactions, there were successfully optimized variants available. Overall, 64/96 (67%) correct insert with the foreseen substitution C80A were identified. The remaining 32 sequences exhibit different problems such as frameshifts, sequencing problems, and primer mismatches. Combined with the diversity of the original library of 8.5-fold within the bacteria transformation readout from which a correct insert percentage of 67% was identified, an overall library coverage of around 6-fold was determined.

In addition, the sequenced variants (64/96) were further analyzed by designing a phylogenetic circle which indicated a good distribution of different rabbit kappa light chain subtypes, as shown in FIG. 3.

Example 8—Biopanning with Optimized Library

The optimized in-house rabbit scFv immune library was used for biopanning against the specific pMHC target. In parallel, the original rabbit scFv immune library has been used as direct control for the quality and efficacy of the optimized library. Three rounds of phage display were performed, before the libraries were screened for specific hits. Screening was done with a monoclonal phage ELISA against specific and unspecific target. The ratio of the signal from the specific target binding to the unspecific binding was then calculated to find hits binding specifically to the target. The data can be found in Table 4 (original rabbit library) and Table 5 (optimized library).

Specifically, Table 4 and Table 5 show the output of the monoclonal phage ELISA after three rounds of biopanning applied to the rabbit derived antibody library in which the C80 was removed. The values indicate the binding signal ratios to target peptide MAGE-A4 in context of the HLA complex/mix of 49 different unrelated peptides (SEQ ID NO: 268-316, as recited in Table 9) in context of the HLA complex. Ratios higher than 2.5 are highlighted in grey, each data point represents one phage displayed clone.

Whereas for the original library after three rounds of biopanning only one binder could be identified, there are 13 binders found in the optimized library. This clearly shows the evidence of removing the free cysteine to use the full diversity from the rabbit immunization libraries.

Additional rounds of panning have been executed by using the lambda library and the optimized kappa library. 19 unique and target specific antibodies were identified. The 19 antibody scFv sequences identified in the biopanning screen are recited below in Table 6.

TABLE 4

Output of the panning of the phage display rabbit antibodies with Cys80.

|   | 1 | 2 | 3 | 4 | 5 | 6 | 7 | 8 | 9 | 10 | 11 | 12 |
|---|---|---|---|---|---|---|---|---|---|---|---|---|
| A | 0.89 | 0.97 | 1.00 | 0.89 | 0.96 | 0.89 | 0.86 | 0.75 | 0.90 | 0.75 | 0.86 | 0.56 |
| B | 0.71 | 0.97 | 0.95 | 0.65 | 0.75 | 0.94 | 0.63 | 0.96 | 0.72 | 1.00 | 0.93 | 0.63 |
| C | 0.74 | 0.66 | 0.67 | 0.90 | 0.90 | 0.79 | 0.61 | 1.11 | 0.82 | 0.81 | 0.86 | 0.77 |
| D | 0.66 | 0.76 | 0.76 | 0.64 | 0.69 | 0.71 | 1.06 | 0.82 | 0.80 | 0.76 | 0.65 | 0.65 |
| E | 0.66 | 0.59 | 1.11 | 0.64 | 0.88 | 1.02 | 1.06 | 0.59 | 0.96 | 0.84 | 1.07 | 1.08 |
| F | 0.79 | 0.68 | 0.72 | 1.04 | 0.49 | 0.64 | 1.06 | 0.68 | 1.13 | 0.62 | 0.70 | 0.68 |
| G | 0.84 | 0.68 | 3.04 | 0.51 | 0.94 | 0.92 | 0.57 | 0.57 | 0.69 | 0.65 | 0.60 | 0.70 |
| H | 0.57 | 0.71 | 0.54 | 0.60 | 0.47 | 0.59 | 0.53 | 0.95 | 0.90 | 0.54 | 0.88 | 1.15 |

Original rabbit library.
Each data point A1-H12 represents on clone after three rounds of biopanning in a monoclonal phage ELISA for binding against HLA-A2/MAGE-A4 complex in relation to unspecific binding against HLA complex/mix of 49 different unrelated peptides (SEQ ID NO: 268-316).
Ratios higher than 2.5 are highlighted in bold text.

TABLE 5

Output of the panning of the phage display rabbit antibodies with Cys80.

|   | 1 | 2 | 3 | 4 | 5 | 6 | 7 | 8 | 9 | 10 | 11 | 12 |
|---|---|---|---|---|---|---|---|---|---|---|---|---|
| A | 0.73 | 0.94 | 0.67 | 0.80 | 0.94 | 11.64 | 0.83 | 0.95 | 15.58 | 0.99 | 1.73 | 12.60 |
| B | 0.88 | 10.18 | 11.26 | 0.75 | 0.87 | 22.48 | 1.13 | 10.85 | 0.94 | 1.02 | 0.88 | 0.94 |
| C | 0.97 | 0.27 | 0.65 | 0.89 | 0.89 | 0.89 | 3.74 | 0.87 | 0.84 | 0.76 | 0.97 | 1.11 |
| D | 0.95 | 0.83 | 0.90 | 0.94 | 17.06 | 0.70 | 0.97 | 0.87 | 0.70 | 19.62 | 0.96 | 1.02 |
| E | 0.86 | 0.94 | 0.75 | 0.60 | 0.84 | 0.88 | 0.67 | 0.92 | 0.89 | 0.57 | 0.76 | 11.32 |
| F | 0.53 | 0.92 | 0.96 | 2.66 | 0.95 | 1.31 | 0.64 | 0.92 | 12.50 | 0.98 | 0.94 | 0.76 |
| G | 0.97 | 0.96 | 0.93 | 0.92 | 0.68 | 0.56 | 1.67 | 0.71 | 0.73 | 0.81 | 0.68 | 0.62 |
| H | 1.12 | 0.75 | 0.82 | 0.60 | 0.95 | 0.93 | 0.59 | 0.92 | 0.80 | 0.74 | 0.91 | 4.51 |

Optimized library.
Each data point A1-H11 represents on clone after three rounds of biopanning in a monoclonal phage ELISA for binding against HLA-A2/MAGE-A4 complex in relation to unspecific binding against HLA complex/mix of 49 different unrelated peptides.
Ratios higher than 2.5 are highlighted in bold text.
H12 represents a positive control.

TABLE 6

Rabbit-Derived Antibody scFv Amino Acid Sequences. CDR sequences are highlighted in bold underlined text.

| Antibody ID | Sequence |
|---|---|
| M0848 scFV SEQ ID NO: 16 | QEQLVESGGGLVTPGTPLTLTCTVSGFSLSSYAMGWVRQ APGKGLEWIGTINDGGTAFYASWVKGRFTISRTTTVDLR VTSPTTEDTATYFCARAYGSNGDVYWGYFNLWGQGTLV TVSSGGGGSGGGGSGGGGSGGGGASELDLTQTPASVEVA VGGTVTIKCQASQSIGSYLSWYQQKPGQRPKLLIFRASTL ASGVSSRFKGSGSGTQFTLTISGVECADAATYYCQQGYSS TNLDNVFGGGTEVVVK |
| M0848 VH SEQ ID NO: 17 | QEQLVESGGGLVTPGTPLTLTCTVSGFSLSSYAMGWVRQ APGKGLEWIGTINDGGTAFYASWVKGRFTISRTTTVDLR VTSPTTEDTATYFCARAYGSNGDVYWGYFNLWGQGTLV TVSS |
| M0848 VL SEQ ID NO: 18 | ELDLTQTPASVEVAVGGTVTIKCQASQSIGSYLSWYQQKP GQRPKLLIFRASTLASGVSSRFKGSGSGTQFTLTISGVECA DAATYYCQQGYSSTNLDNVFGGGTEVVVK |
| M0848 CDRH1 SEQ ID NO: 19 | SSYAMG |
| M0848 CDRH2 SEQ ID NO: 20 | TINDGGTAFYASWVKG |

TABLE 6-continued

Rabbit-Derived Antibody scFv Amino Acid Sequences. CDR sequences are highlighted in bold underlined text.

| Antibody ID | Sequence |
|---|---|
| M0848 CDRH3<br>SEQ ID NO: 21 | AYGSNGDVYWGYENL |
| M0848 CDRL1<br>SEQ ID NO: 22 | QASQSIGSYLS |
| M0848 CDRL2<br>SEQ ID NO: 23 | RASTLAS |
| M0848 CDRL3<br>SEQ ID NO: 24 | QQGYSSTNLDNV |
| M0849 scFv<br>SEQ ID NO: 25 | QEQLEESGGGLVTPGGTLTLTCTVSGFSLSNYAMGWVRQ<br>APGKGLEWIGTINDGGTAFYAKWLKGRFTISRTSTTVDL<br>KITSPTTEDTATYFCARAYGSNGDVYWGYFNLWGQGTL<br>VTISSGGGGSGGGGSGGGGSGGGGASELVMTQTPSSVSEP<br>VGGTVTIKCQASQSIGSNLAWYQQRPGQPPKLLIYSASTL<br>ASGVSSRFKGSGSGTESTLTISGVQAADAATYYCQQGYSS<br>SNVDNVFGGGTELEIL |
| M0849 VH<br>SEQ ID NO: 26 | QEQLEESGGGLVTPGGTLTLTCTVSGFSLSNYAMGWVRQ<br>APGKGLEWIGTINDGGTAFYAKWLKGRFTISRTSTTVDL<br>KITSPTTEDTATYFCARAYGSNGDVYWGYFNLWGQGTL<br>VTISS |
| M0849 VL<br>SEQ ID NO: 27 | ELVMTQTPSSVSEPVGGTVTIKCQASQSIGSNLAWYQQRP<br>GQPPKLLIYSASTLASGVSSRFKGSGSGTESTLTISGVQAA<br>DAATYYCQQGYSSSNVDNVFGGGTELEIL |
| M0849 CDRH1<br>SEQ ID NO: 28 | SNYAMG |
| M0849 CDRH2<br>SEQ ID NO: 29 | TINDGGTAFYAKWLKG |
| M0849 CDRH3<br>SEQ ID NO: 30 | AYGSNGDVYWGYFNL |
| M0849 CDRL1<br>SEQ ID NO: 31 | QASQSIGSNLA |
| M0849 CDRL2<br>SEQ ID NO: 32 | SASTLAS |
| M0849 CDRL3<br>SEQ ID NO: 33 | QQGYSSSNVDNV |
| M0850 scFv<br>SEQ ID NO: 34 | QEQLEESGGGLVTPGTPLTLTCTASGFSLSSYAMIWVRQA<br>PGKGLEWIGTINDGGTAFYANWVKGRFTISRTSTTVDLK<br>MTSPTTEDTATYFCARAYGSNGDVYWGYVNLWGQGTL<br>VTVSSGGGGSGGGGSGGGGSGGGGASELVMTQTPASVSE<br>PVGGTVTIKCQASQSIGSNLAWYQQKPGQPPKLLIYAAAN<br>LASGVSSRFKGSRSGTEYTLTISGVQAADAATYYCQQGYS<br>SSNVANVFGGGTELEIL |
| M0850 VH<br>SEQ ID NO: 35 | QEQLEESGGGLVTPGTPLTLTCTASGFSLSSYAMIWVRQA<br>PGKGLEWIGTINDGGTAFYANWVKGRFTISRTSTTVDLK<br>MTSPTTEDTATYFCARAYGSNGDVYWGYVNLWGQGTL<br>VTVSS |
| M0850 VL<br>SEQ ID NO: 36 | ELVMTQTPASVSEPVGGTVTIKCQASQSIGSNLAWYQQKP<br>GQPPKLLIYAAANLASGVSSRFKGSRSGTEYTLTISGVQAA<br>DAATYYCQQGYSSSNVANVFGGGTELEIL |
| M0850 CDRH1<br>SEQ ID NO: 37 | SSYAMI |
| M0850 CDRH2<br>SEQ ID NO: 38 | TINDGGTAFYANWVKG |

TABLE 6-continued

Rabbit-Derived Antibody scFv Amino Acid Sequences. CDR sequences are highlighted in bold underlined text.

| Antibody ID | Sequence |
|---|---|
| M0850 CDRH3<br>SEQ ID NO: 39 | AYGSNGDVYWGYVNL |
| M0850 CDRL1<br>SEQ ID NO: 40 | QASQSIGSNLA |
| M0850 CDRL2<br>SEQ ID NO: 41 | AAANLAS |
| M0850 CDRL3<br>SEQ ID NO: 42 | QQGYSSSNVANV |
| M0851 scFv<br>SEQ ID NO: 43 | QEQLEESGGGLVTPGTPLTLTCTASGFSLSSYAMIWVRQA<br>PGKGLEWIGTINDGGTAFYASWVKGRFTISRTSTTVDLKI<br>TSPTTEDTATYFCARAYGSNGDVYWGYVNLWGQGTLVT<br>ISSGGGGSGGGGSGGGGSGGGASELVMTQTPSSVSAAV<br>GGTVTINCQASQNIGSVFAWYQQKPGQPPKLLIYKASSLA<br>SGVPSRFKGSGSGTQFTLTISGVEAADAATYYCQQGASSS<br>NVDNIFGGGTEVVVK |
| M0851 VH<br>SEQ ID NO: 44 | QEQLEESGGGLVTPGTPLTLTCTASGFSLSSYAMIWVRQA<br>PGKGLEWIGTINDGGTAFYASWVKGRFTISRTSTTVDLKI<br>TSPTTEDTATYFCARAYGSNGDVYWGYVNLWGQGTLVT<br>ISS |
| M0851 VL<br>SEQ ID NO: 45 | ELVMTQTPSSVSAAVGGTVTINCQASQNIGSVFAWYQQK<br>PGQPPKLLIYKASSLASGVPSRFKGSGSGTQFTLTISGVEA<br>ADAATYYCQQGASSSNVDNIFGGGTEVVVK |
| M0851 CDRH1<br>SEQ ID NO: 46 | SSYAMI |
| M0851 CDRH2<br>SEQ ID NO: 47 | TINDGGTAFYASWVKG |
| M0851 CDRH3<br>SEQ ID NO: 48 | AYGSNGDVYWGYVNL |
| M0851 CDRL1<br>SEQ ID NO: 49 | QASQNIGSVFA |
| M0851 CDRL2<br>SEQ ID NO: 50 | KASSLAS |
| M0851 CDRL3<br>SEQ ID NO: 51 | QQGASSSNVDNI |
| M0852 scFv<br>SEQ ID NO: 52 | QQQLEESGGGLVTPGTPLTLTCTVSGFSLSNYAMGWVRQ<br>APGKGLEWIGTINDGGTAFYANWLKGRFTISRTSTTVDL<br>KITSPTTEDTATYFCARAYGSNGDVYWGYFNLWGQGTL<br>VTVSSGGGGSGGGGSGGGGSGGGGASELVMTQTASPVSA<br>AVGGTVTINCQASQSISSRSLSWYQQKPGQPPKLLIYEAS<br>KLASGVPSRFSGSGSGTQFTLTISGVQADDAATYYCQQGY<br>SSSNVDNVFGGGTEVVVK |
| M0852 VH<br>SEQ ID NO: 53 | QQQLEESGGGLVTPGTPLTLTCTVSGFSLSNYAMGWVRQ<br>APGKGLEWIGTINDGGTAFYANWLKGRFTISRTSTTVDL<br>KITSPTTEDTATYFCARAYGSNGDVYWGYFNLWGQGTL<br>VTVSS |
| M0852 VL<br>SEQ ID NO: 54 | ELVMTQTASPVSAAVGGTVTINCQASQSISSRSLSWYQQK<br>PGQPPKLLIYEASKLASGVPSRFSGSGSGTQFTLTISGVQA<br>DDAATYYCQQGYSSSNVDNVFGGGTEVVVK |
| M0852 CDRH1<br>SEQ ID NO: 55 | SNYAMG |
| M0852 CDRH2<br>SEQ ID NO: 56 | TINDGGTAFYANWLKG |
| M0852 CDRH3<br>SEQ ID NO: 57 | AYGSNGDVYWGYFNL |
| M0852 CDRL1<br>SEQ ID NO: 58 | QASQSISSRSLS |

TABLE 6-continued

Rabbit-Derived Antibody scFv Amino Acid Sequences. CDR sequences are highlighted in bold underlined text.

| Antibody ID | Sequence |
|---|---|
| M0852 CDRL2<br>SEQ ID NO: 59 | EASKLAS |
| M0852 CDRL3<br>SEQ ID NO: 60 | QQGYSSSNVDNV |
| M0853 scFv<br>SEQ ID NO: 61 | QQQLVESGGGLVTPGTPLTLTCTVSGFSLSNYAMGWVRQ<br>APGKGLEWIGTINDGGTAFYANWLKGRFTISRTSTTVDL<br>KITSPTTEDTATYFCARAYGSNGDVYWGYFNLWGQGTL<br>VTVSSGGGGSGGGGSGGGGSGGGGASELVMTQTASPVSA<br>AVGGTVTINCQASQSISSRSLSWYQQKPGQPPKLLIYEAS<br>KLASGVPSRFSGSGSGTQFTLTISGVQADDAATYYCQQGY<br>SSSNVDNFGGGTEVVVK |
| M0853 VH<br>SEQ ID NO: 62 | QQQLVESGGGLVTPGTPLTLTCTVSGFSLSNYAMGWVRQ<br>APGKGLEWIGTINDGGTAFYANWLKGRFTISRTSTTVDL<br>KITSPTTEDTATYFCARAYGSNGDVYWGYFNLWGQGTL<br>VTVSS |
| M0853 VL<br>SEQ ID NO: 63 | ELVMTQTASPVSAAVGGTVTINCQASQSISSRSLSWYQQK<br>PGQPPKLLIYEASKLASGVPSRFSGSGSGTQFTLTISGVQA<br>DDAATYYCQQGYSSSNVDNFGGGTEVVVK |
| M0853 CDRH1<br>SEQ ID NO: 64 | SNYAMG |
| M0853 CDRH2<br>SEQ ID NO: 65 | TINDGGTAFYANWLKG |
| M0853 CDRH3<br>SEQ ID NO: 66 | AYGSNGDVYWGYFNL |
| M0853 CDRL1<br>SEQ ID NO: 67 | QASQSISSRSLS |
| M0853 CDRL2<br>SEQ ID NO: 68 | EASKLAS |
| M0853 CDRL3<br>SEQ ID NO: 69 | QQGYSSSNVDN |
| M0854 scFv<br>SEQ ID NO: 70 | QSVKESWGRLVTPGGSLTLTCTVSGIDLNNYAMGWVRQA<br>PGKGLEWIGTINNDGATYYPSWARGRFTISKTSTTVDLKI<br>TSPTTEDTATYFCARTYGSNGDVYWGYFNLWGQGTLVT<br>VSSGGGGSGGGGSGGGGSGGGGASALELTQTPASVEVAV<br>GGTVTINCQASQSIGGALNWYQQKSGQPPKLLIYLASTLA<br>SGVSSRFKGSGSGTQFTLTISGVEAADAATYYCQQGYSAS<br>NIDNAFGGGTEVVVK |
| M0854 VH<br>SEQ ID NO: 71 | QSVKESWGRLVTPGGSLTLTCTVSGIDLNNYAMGWVRQA<br>PGKGLEWIGTINNDGATYYPSWARGRFTISKTSTTVDLKI<br>TSPTTEDTATYFCARTYGSNGDVYWGYFNLWGQGTLVT<br>VSS |
| M0854 VL<br>SEQ ID NO: 72 | ALELTQTPASVEVAVGGTVTINCQASQSIGGALNWYQQK<br>SGQPPKLLIYLASTLASGVSSRFKGSGSGTQFTLTISGVEA<br>ADAATYYCQQGYSASNIDNAFGGGTEVVVK |
| M0854 CDRH1<br>SEQ ID NO: 73 | NNYAMG |
| M0854 CDRH2<br>SEQ ID NO: 74 | TINNDGATYYPSWARG |
| M0854 CDRH3<br>SEQ ID NO: 75 | TYGSNGDVYWGYFNL |
| M0854 CDRL1<br>SEQ ID NO: 76 | QASQSIGGALN |

TABLE 6-continued

Rabbit-Derived Antibody scFv Amino Acid Sequences. CDR sequences are highlighted in bold underlined text.

| Antibody ID | Sequence |
|---|---|
| M0854 CDRL2 SEQ ID NO: 77 | LASTLAS |
| M0854 CDRL3 SEQ ID NO: 78 | QQGYSASNIDNA |
| M0855 scFv SEQ ID NO: 79 | QQQLEESGGGLVTPGTPLTLTCTVSGIDLSSYAMGWVRQ APGKGLEWIGTINDGGSAFYASWVKGRFTISRTSTTVDLK ITSPTAEDTATYFCAKTYGTNGDVYWGYFNLWGQGTLV TISSGGGGSGGGGSGGGGSGGGGASELVMTQTPASVSEPV GGTVTIKCQASQSIGSNLAWYQQKPGQPPKLLIYYESILA SGVPSRFSGSGSGTEYTLTISGAQADDAATYYCQQGYSSS NIDNAFGGGTEVVVK |
| M0855 VH SEQ ID NO: 80 | QQQLEESGGGLVTPGTPLTLTCTVSGIDLSSYAMGWVRQ APGKGLEWIGTINDGGSAFYASWVKGRFTISRTSTTVDLK ITSPTAEDTATYFCAKTYGTNGDVYWGYFNLWGQGTLV TISS |
| M0855 VL SEQ ID NO: 81 | ELVMTQTPASVSEPVGGTVTIKCQASQSIGSNLAWYQQKP GQPPKLLIYYESILASGVPSRFSGSGSGTEYTLTISGAQADD AATYYCQQGYSSSNIDNAFGGGTEVVVK |
| M0855 CDRH1 SEQ ID NO: 82 | SSYAMG |
| M0855 CDRH2 SEQ ID NO: 83 | TINDGGSAFYASWVKG |
| M0855 CDRH3 SEQ ID NO: 84 | TYGTNGDVYWGYFNL |
| M0855 CDRL1 SEQ ID NO: 85 | QASQSIGSNLA |
| M0855 CDRL2 SEQ ID NO: 86 | YESILAS |
| M0855 CDRL3 SEQ ID NO: 87 | QQGYSSSNIDNA |
| M0856 scFv SEQ ID NO: 88 | QQQLEESGGGLVTPGTPLTLTCTVSGIDLSSYAMGWVRQ APGKGLEWIGTINDGGSAFYASWVKGRFTISRTSTTVDLK ITSPTAEDTATYFCAKTYGTNGDVYWGYFNLWGQGTLV TISSGGGGSGGGGSGGGGSGGGGASELVMTQTPASVSEPV GGTVTIKCQASQSIGSNLAWYQQKPGQPPKLLIYYESILA SGVPSRFSGSGSGTEYTLTISGAQADDAATYYCQQGYSSS NILNAFGGGTEVVVK |
| M0856 VH SEQ ID NO: 89 | QQQLEESGGGLVTPGTPLTLTCTVSGIDLSSYAMGWVRQ APGKGLEWIGTINDGGSAFYASWVKGRFTISRTSTTVDLK ITSPTAEDTATYFCAKTYGTNGDVYWGYFNLWGQGTLV TISS |
| M0856 VL SEQ ID NO: 90 | ELVMTQTPASVSEPVGGTVTIKCQASQSIGSNLAWYQQKP GQPPKLLIYYESILASGVPSRFSGSGSGTEYTLTISGAQADD AATYYCQQGYSSSNILNAFGGGTEVVVK |
| M0856 CDRH1 SEQ ID NO: 91 | SSYAMG |
| M0856 CDRH2 SEQ ID NO: 92 | TINDGGSAFYASWVKG |
| M0856 CDRH3 SEQ ID NO: 93 | TYGTNGDVYWGYFNL |
| M0856 CDRL1 SEQ ID NO: 94 | QASQSIGSNLA |
| M0856 CDRL2 SEQ ID NO: 95 | YESILAS |
| M0856 CDRL3 SEQ ID NO: 96 | QQGYSSSNILNA |

TABLE 6-continued

Rabbit-Derived Antibody scFv Amino Acid Sequences. CDR sequences are highlighted in bold underlined text.

| Antibody ID | Sequence |
|---|---|
| M0857 scFv<br>SEQ ID NO: 97 | QQQLVESGGRLVTPGTPLTLTCTASGIDLNSNAMSWVRQ<br>GPGKGLEWIGDIWSGGYTDYASWAKGRFTISKTSTTVDL<br>KMTSLTAADTATYFCARDRLAGDGVVDYDLWGQGTLVT<br>ISSGGGGSGGGGSGGGGSGGGGASELDMTQTPASVEVAV<br>GGTVTIKCQASQNIYSNLAWYQQKPGQRPKLLIYGASTL<br>ASGVPSRFKGSGSGTEYTLTINGVQAADAATYYCQQGFSS<br>SNVDNVFGGGTEVVVK |
| M0857 VH<br>SEQ ID NO: 98 | QQQLVESGGRLVTPGTPLTLTCTASGIDLNSNAMSWVRQ<br>GPGKGLEWIGDIWSGGYTDYASWAKGRFTISKTSTTVDL<br>KMTSLTAADTATYFCARDRLAGDGVVDYDLWGQGTLVT<br>ISS |
| M0857 VL<br>SEQ ID NO: 99 | ELDMTQTPASVEVAVGGTVTIKCQASQNIYSNLAWYQQK<br>PGQRPKLLIYGASTLASGVPSRFKGSGSGTEYTLTINGVQA<br>ADAATYYCQQGFSSSNVDNVFGGGTEVVVK |
| M0857 CDRH1<br>SEQ ID NO: 100 | NSNAMS |
| M0857 CDRH2<br>SEQ ID NO: 101 | DIWSGGYTDYASWAKG |
| M0857 CDRH3<br>SEQ ID NO: 102 | DRLAGDGVVDYDL |
| M0857 CDRL1<br>SEQ ID NO: 320 | QASQNIYSNLA |
| M0857 CDRL2<br>SEQ ID NO: 103 | GASTLAS |
| M0857 CDRL3<br>SEQ ID NO: 104 | QQGFSSSNVDNV |
| M0858 scFv<br>SEQ ID NO: 105 | QSVEESGGRLVTPGTPLTLTCTVSGFSLSNYAMSWVRQAP<br>GKGLEYIGIVSSGGTTYYASWAKGRFTISKTSTTVDLKITS<br>PTTEDTATYFCAKDLYYGPTTYSAFNLWGQGTLVTVSSG<br>GGGSGGGGSGGGGSGGGGASELVLTQPQSVSGSLGQTVSI<br>SCKRARNNIEDYYVHWYQQHPGRSPTIVIHKDDQRPSGV<br>PDRFSGSIDSTSNSASLTITGLLAEDEADYFCQSFDNNANP<br>VFGGGTQLTVTG |
| M0858 VH<br>SEQ ID NO: 106 | QSVEESGGRLVTPGTPLTLTCTVSGFSLSNYAMSWVRQAP<br>GKGLEYIGIVSSGGTTYYASWAKGRFTISKTSTTVDLKITS<br>PTTEDTATYFCAKDLYYGPTTYSAFNLWGQGTLVTVSS |
| M0858 VL<br>SEQ ID NO: 107 | ELVLTQPQSVSGSLGQTVSISCKRARNNIEDYYVHWYQQ<br>HPGRSPTIVIHKDDQRPSGVPDRFSGSIDSTSNSASLTITGL<br>LAEDEADYFCQSFDNNANPVFGGGTQLTVTG |
| M0858 CDRH1<br>SEQ ID NO: 108 | SNYAMS |
| M0858 CDRH2<br>SEQ ID NO: 109 | IVSSGGTTYYASWAKG |
| M0858 CDRH3<br>SEQ ID NO: 110 | DLYYGPTTYSAFNL |
| M0858 CDRL1<br>SEQ ID NO: 111 | KRARNNIEDYYVH |
| M0858 CDRL2<br>SEQ ID NO: 112 | KDDQRPS |
| M0858 CDRL3<br>SEQ ID NO: 113 | QSFDNNANPV |
| M0859 scFv<br>SEQ ID NO: 114 | QSVKESGGRLVTPGTPLTLTCTVSGFSLSNYAMSWVRQAP<br>GKGLEYIGIVSSGGTTYYASWAKGRFTISKTSTTVDLKITS<br>PTTEDTATYFCAKDLYYGPTTYSAFNLWGQGTLVTISSG<br>GGGSGGGGSGGGGSGGGGASELVLTQPQSVSGSLGQTVSI<br>SCKRARDNIEDYYVHWYQQHPGKTPTIVIHKDDQRPSGV |

TABLE 6-continued

Rabbit-Derived Antibody scFv Amino Acid Sequences. CDR sequences are highlighted in bold underlined text.

| Antibody ID | Sequence |
|---|---|
| | PDRFSGSIDSTSNSASLTITGLLAEDEADYFCQSFDNDASPVFGGGTQLTVTG |
| M0859 VH SEQ ID NO: 115 | QSVKESGGRLVTPGTPLTLTCTVSGFSLSNYAMSWVRQAPGKGLEYIGIVSSGGTTYYASWAKGRFTISKTSTTVDLKITSPTTEDTATYFCAKDLYYGPTTYSAFNLWGQGTLVTISS |
| M0859 VL SEQ ID NO: 116 | ELVLTQPQSVSGSLGQTVSISCKRARDNIEDYYVHWYQQHPGKTPTIVIHKDDQRPSGVPDRFSGSIDSTSNSASLTITGLLAEDEADYFCQSFDNDASPVFGGGTQLTVTG |
| M0859 CDRH1 SEQ ID NO: 117 | SNYAMS |
| M0859 CDRH2 SEQ ID NO: 118 | IVSSGGTTYYASWAKG |
| M0859 CDRH3 SEQ ID NO: 119 | DLYYGPTTYSAFNL |
| M0859 CDRL1 SEQ ID NO: 120 | KRARDNIEDYYVH |
| M0859 CDRL2 SEQ ID NO: 121 | KDDQRPS |
| M0859 CDRL3 SEQ ID NO: 122 | QSFDNDASPV |
| M0860 scFv SEQ ID NO: 123 | QSVKESGGRLVTPGTPLTLTCTVSGFSLSNYAMSWVRQAPGKGLEYIGIVSSGGTTYYASWAKGRFTISKTSTTVDLKITSPTTEDTATYFCAKDLYYGPTTYSAFNLWGQGTLVTISSGGGSGGGGSGGGGSGGGGASELVLTQPQSVSGSLGQTVSISCKRARDNIEDYYVHWYQQYPGKTPTIVIYKDDQRPSGVPDRFSGSIDSTSNSASLTITGLLAEDEADYFCQSFDNNANVVFGGGTQLTVTG |
| M0860 VH SEQ ID NO: 124 | QSVKESGGRLVTPGTPLTLTCTVSGFSLSNYAMSWVRQAPGKGLEYIGIVSSGGTTYYASWAKGRFTISKTSTTVDLKITSPTTEDTATYFCAKDLYYGPTTYSAFNLWGQGTLVTISS |
| M0860 VL SEQ ID NO: 125 | ELVLTQPQSVSGSLGQTVSISCKRARDNIEDYYVHWYQQYPGKTPTIVIYKDDQRPSGVPDRFSGSIDSTSNSASLTITGLLAEDEADYFCQSFDNNANVVFGGGTQLTVTG |
| M0860 CDRH1 SEQ ID NO: 126 | SNYAMS |
| M0860 CDRH2 SEQ ID NO: 127 | IVSSGGTTYYASWAKG |
| M0860 CDRH3 SEQ ID NO: 128 | DLYYGPTTYSAFNL |
| M0860 CDRL1 SEQ ID NO: 129 | KRARDNIEDYYVH |
| M0860 CDRL2 SEQ ID NO: 130 | KDDQRPS |
| M0860 CDRL3 SEQ ID NO: 131 | QSFDNNANVV |
| M0861 scFv SEQ ID NO: 132 | QSVKESGGRLVTPGTPLTLTCTVSGFSLSNYAMSWVRQAPGKGLEYIGIVSSGGTTYYASWAKGRFTISKTSTTVDLKITSPTTEDTATYFCAKDLYYGPTTYSAFNLWGQGTLVTISSGGGSGGGGSGGGGSGGGGASELVLTQPASVQVNLGQTVSLTCTADTLSRSYASWYQLKPGQAPVLLIYRDTSRPSGVPDRFSGSSSGNTATLTISGAQAGDEGDYVCATSDGSGSNFQLFGGGTQLTVTG |
| M0861 VH SEQ ID NO: 133 | QSVKESGGRLVTPGTPLTLTCTVSGFSLSNYAMSWVRQAPGKGLEYIGIVSSGGTTYYASWAKGRFTISKTSTTVDLKITSPTTEDTATYFCAKDLYYGPTTYSAFNLWGQGTLVTISS |

TABLE 6-continued

Rabbit-Derived Antibody scFv Amino Acid Sequences. CDR sequences are highlighted in bold underlined text.

| Antibody ID | Sequence |
|---|---|
| M0861 VL<br>SEQ ID NO: 134 | ELVLTQPASVQVNLGQTVSLTCTADTLSRSYASWYQLKP<br>GQAPVLLIYRDTSRPSGVPDRFSGSSSGNTATLTISGAQAG<br>DEGDYVCATSDGSGSNFQLFGGGTQLTVTG |
| M0861 CDRH1<br>SEQ ID NO: 135 | SNYAMS |
| M0861 CDRH2<br>SEQ ID NO: 136 | IVSSGGTTYYASWAKG |
| M0861 CDRH3<br>SEQ ID NO: 137 | DLYYGPTTYSAFNL |
| M0861 CDRL1<br>SEQ ID NO: 138 | TADTLSRSYAS |
| M0861 CDRL2<br>SEQ ID NO: 139 | RDTSRPS |
| M0861 CDRL3<br>SEQ ID NO: 140 | ATSDGSGSNFQL |
| M0862 scFv<br>SEQ ID NO: 141 | PEQLMESGGGLVTPGGVLTLTCTASGFSFSSYGVNWVRQ<br>APGKGLEWIGFIFGDGTTYYANWAKGRFTISKTSTTVDL<br>KMTSPTTEDTATYFCARDGYGGYDYIINLWGQGTLVTVS<br>SGGGGSGGGGSGGGGSGGGGASAQVLTQTPASVSAAVGG<br>TVSISCQSSQSVVNNNWLAWYQQKPGQPPKLLIYKASTL<br>ESGVPSRFKGSGSGTQFTLTISGVQADDAATYYCLGEFSC<br>SSADCHAFGGGTELEIL |
| M0862 VH<br>SEQ ID NO: 142 | PEQLMESGGGLVTPGGVLTLTCTASGFSFSSYGVNWVRQ<br>APGKGLEWIGFIFGDGTTYYANWAKGRFTISKTSTTVDL<br>KMTSPTTEDTATYFCARDGYGGYDYIINLWGQGTLVTVS<br>S |
| M0862 VL<br>SEQ ID NO: 143 | AQVLTQTPASVSAAVGGTVSISCQSSQSVVNNNWLAWYQ<br>QKPGQPPKLLIYKASTLESGVPSRFKGSGSGTQFTLTISGV<br>QADDAATYYCLGEFSCSSADCHAFGGGTELEIL |
| M0862 CDRH1<br>SEQ ID NO: 144 | SYGVN |
| M0862 CDRH2<br>SEQ ID NO: 145 | FIFGDGTTYYANWAKG |
| M0862 CDRH3<br>SEQ ID NO: 146 | DGYGGYDYIINL |
| M0862 CDRL1<br>SEQ ID NO: 147 | QSSQSVVNNN |
| M0862 CDRL2<br>SEQ ID NO: 148 | KASTLES |
| M0862 CDRL3<br>SEQ ID NO: 149 | LGEFSCSSADCHA |
| M0863 scFv<br>SEQ ID NO: 150 | PEQLMESGGGLVTPGGVLTLTCTASGFSFSSSYGVNWVRQ<br>APGKGLEWIGFIFGDGTTYYANWAKGRFTISKTSTTVDL<br>KMTSPTTEDTATYFCARDGYGGYDYIINLWGQGTLVTVS<br>SGGGGSGGGGSGGGGSGGGGASAQVLTQTPASVSAAVGG<br>TVSISCQSSQSVVNNNWLAWYQQKPGQPPKLLIYKASTL<br>ESGVPSRFKGSGSGTQFTLTISGVQADDAATYYCQGAYSG<br>NIYYNAFGGGTEVVVK |
| M0863 VH<br>SEQ ID NO: 151 | PEQLMESGGGLVTPGGVLTLTCTASGFSFSSSYGVNWVRQ<br>APGKGLEWIGFIFGDGTTYYANWAKGRFTISKTSTTVDL<br>KMTSPTTEDTATYFCARDGYGGYDYIINLWGQGTLVTVS<br>S |

TABLE 6-continued

Rabbit-Derived Antibody scFv Amino Acid Sequences. CDR sequences are highlighted in bold underlined text.

| Antibody ID | Sequence |
|---|---|
| M0863 VL<br>SEQ ID NO: 152 | AQVLTQTPASVSAAVGGTVSISCOSSOSVVNNNWLAWYQ<br>QKPGQPPKLLIYKASTLESGVPSRFKGSGSGTQFTLTISGV<br>QADDAATYYCQGAYSGNIYYNAFGGGTEVVVK |
| M0863 CDRH1<br>SEQ ID NO: 153 | SSYGVN |
| M0863 CDRH2<br>SEQ ID NO: 154 | FIFGDGTTYYANWAKG |
| M0863 CDRH3<br>SEQ ID NO: 155 | DGYGGYDYIINL |
| M0863 CDRL1<br>SEQ ID NO: 156 | OSSOSVVNNN |
| M0863 CDRL2<br>SEQ ID NO: 157 | KASTLES |
| M0863 CDRL3<br>SEQ ID NO: 158 | QGAYSGNIYYNA |
| M0864 scFv<br>SEQ ID NO: 159 | QSVKESGGGLVTPGTPLTLTCTVSGFSLSTYAISWVRQAP<br>GKGLEWIGFIDTVDSAYYASWAKGRFTISKTSSTTVDLK<br>MTSPTTEDTATYFCAKLRYGDYGDYTLWGQGTLVTVSS<br>GGGGSGGGGSGGGGSGGGGASELVMTQTPSPVSGAVGGT<br>VTIKCQASONIYSYLAWYQQKPGQPPKLLIYKASTLASGV<br>PSRVKGSGSGTEYTLTISGVQAADAATYYCQCTYYDSNTF<br>GGGTEVVVK |
| M0864 VH<br>SEQ ID NO: 160 | QSVKESGGGLVTPGTPLTLTCTVSGFSLSTYAISWVRQAP<br>GKGLEWIGFIDTVDSAYYASWAKGRFTISKTSSTTVDLK<br>MTSPTTEDTATYFCAKLRYGDYGDYTLWGQGTLVTVSS |
| M0864 VL<br>SEQ ID NO: 161 | ELVMTQTPSPVSGAVGGTVTIKCQASONIYSYLAWYQQK<br>PGQPPKLLIYKASTLASGVPSRVKGSGSGTEYTLTISGVQA<br>ADAATYYCQCTYYDSNTFGGGTEVVVK |
| M0864 CDRH1<br>SEQ ID NO: 162 | STYAIS |
| M0864 CDRH2<br>SEQ ID NO: 163 | FIDTVDSAYYASWAKG |
| M0864 CDRH3<br>SEQ ID NO: 164 | LRYGDYGDYTL |
| M0864 CDRL1<br>SEQ ID NO: 165 | QASQNIYSYLA |
| M0864 CDRL2<br>SEQ ID NO: 166 | KASTLAS |
| M0864 CDRL3<br>SEQ ID NO: 167 | QCTYYDSNT |
| M0865 scFv<br>SEQ ID NO: 168 | PAALMESGGRLVTPGTPLTLTCTVSGIDLSTFAMTWVRQA<br>PGKGLEWLGIINTGGSAYYTSWAKGRFTISRTSTTVDLKI<br>TSPTTEDTATYFCARGDWSSATDLWGQGTLVTISSGGGGS<br>GGGGSGGGGSGGGGASDPDMTQTPSSVSAAVGGTVTINC<br>QASQSVYDNKVLAWYRQKPGQPPKLLIYKASTLASGVPS<br>RFKGRGSGTQFTLTISGVQADDAATYYCLGEFSCSSADCH<br>AFGGGTELEIL |
| M0865 VH<br>SEQ ID NO: 169 | PAALMESGGRLVTPGTPLTLTCTVSGIDLSTFAMTWVRQA<br>PGKGLEWLGIINTGGSAYYTSWAKGRFTISRTSTTVDLKI<br>TSPTTEDTATYFCARGDWSSATDLWGQGTLVTISS |
| M0865 VL<br>SEQ ID NO: 170 | DPDMTQTPSSVSAAVGGTVTINCQASQSVYDNKVLAWY<br>RQKPGQPPKLLIYKASTLASGVPSRFKGRGSGTQFTLTISG<br>VQADDAATYYCLGEFSCSSADCHAFGGGTELEIL |
| M0865 CDRH1<br>SEQ ID NO: 171 | STFAMT |

TABLE 6-continued

Rabbit-Derived Antibody scFv Amino Acid Sequences. CDR sequences are highlighted in bold underlined text.

| Antibody ID | Sequence |
|---|---|
| M0865 CDRH2<br>SEQ ID NO: 172 | IINTGGSAYYTSWAKG |
| M0865 CDRH3<br>SEQ ID NO: 173 | GDWSSATDL |
| M0865 CDRL1<br>SEQ ID NO: 174 | QASQSVYDNKVLA |
| M0865 CDRL2<br>SEQ ID NO: 175 | KASTLAS |
| M0865 CDRL3<br>SEQ ID NO: 176 | LGEFSCSSADCHA |
| M0866 scFv<br>SEQ ID NO: 177 | QSVKESGGRLVTPGTPLTLTCTASGFTISSSAISWVRQAPG KGLEYIGIIRSGGTTDYASWAKGRFAISKTSTTVDLKITSP TTEDTATYFCARDPPYITSTYFDLWGQGTLVTVSSGGGGS GGGGSGGGGSGGGGASELVLTQPQSVSGSLGQTVSISCKR ARDSVESYDVHWYQQHPGKTPTIVIYKDDQRPSGVPDRF SGSIDSTSNSASLTITGLLAEDEADYFCQSFDGDAVVFGGG TQLTVTG |
| M0866 VH<br>SEQ ID NO: 178 | QSVKESGGRLVTPGTPLTLTCTASGFTISSSAISWVRQAPG KGLEYIGIIRSGGTTDYASWAKGRFAISKTSTTVDLKITSP TTEDTATYFCARDPPYITSTYFDLWGQGTLVTVSS |
| M0866 VL<br>SEQ ID NO: 179 | ELVLTQPQSVSGSLGQTVSISCKRARDSVESYDVHWYQQ HPGKTPTIVIYKDDQRPSGVPDRFSGSIDSTSNSASLTITGL LAEDEADYFCQSFDGDAVVFGGGTQLTVTG |
| M0866 CDRH1<br>SEQ ID NO: 180 | SSSAIS |
| M0866 CDRH2<br>SEQ ID NO: 181 | HIRSGGTTDYASWAKG |
| M0866 CDRH3<br>SEQ ID NO: 182 | DPPYITSTYFDL |
| M0866 CDRL1<br>SEQ ID NO: 183 | KRARDSVESYDVH |
| M0866 CDRL2<br>SEQ ID NO: 184 | KDDQRPSG |
| M0866 CDRL3<br>SEQ ID NO: 185 | QSFDGDAVV |
| M0700 HC<br>SEQ ID NO: 190 | QEQLVESGGGLVTPGTPLTLTCTVSGFSLSSYAMGWVRQ APGKGLEWIGTINDGGTAFYASWVKGRFTISRTSTTVDLR VTSPTTEDTATYFCARAYGSNGDVYWGYFNLWGQGTLV TVSSASTKGPSVFPLAPSSKSTSGGTAALGCLVKDYFPEPV TVSWNSGALTSGVHTFPAVLQSSGLYSLSSVVTVPSSSLGT QTYICNVNHKPSNTKVDKKVEPKSC |
| M0700 LC<br>SEQ ID NO: 191 | ASELDLTQTPASVEVAVGGTVTIKCQASQSIGSYLSWYQQ KPGQRPKLLIRASTLASGVSSRFKGSGSGTQFTLTISGVEC ADAATYYCQQGYSSTNLDNVFGGGTEVVVKRTVAAPSV FIFPPSDEQLKSGTASVVCLLNNFYPREAKVQWKVDNALQ SGNSQESVTEQDSKDSTYSLSSTLTLSKADYEKHKVYACE VTHQGLSSPVTKSFNRGEC |
| M0700 VH<br>SEQ ID NO: 192 | QEQLVESGGGLVTPGTPLTLTCTVSGFSLSSYAMGWVRQ APGKGLEWIGTINDGGTAFYASWVKGRFTISRTSTTVDLR VTSPTTEDTATYFCARAYGSNGDVYWGYFNLWGQGTLV TVSS |
| M0700 VL<br>SEQ ID NO: 193 | ASELDLTQTPASVEVAVGGTVTIKCQASQSIGSYLSWYQQ KPGQRPKLLIRASTLASGVSSRFKGSGSGTQFTLTISGVEC ADAATYYCQQGYSSTNLDNVFGGGTEVVVK |
| M0701 HC<br>SEQ ID NO: 194 | QEQLEESGGGLVTPGGTLTLTCTVSGFSLSNYAMGWVRQ APGKGLEWIGTINDGGTAFYAKWLKGRFTISRTSTTVDL KITSPTTEDTATYFCARAYGSNGDVYWGYFNLWGQGTL |

TABLE 6-continued

Rabbit-Derived Antibody scFv Amino Acid Sequences. CDR sequences are highlighted in bold underlined text.

| Antibody ID | Sequence |
|---|---|
| | VTVSSASTKGPSVFPLAPSSKSTSGGTAALGCLVKDYFPEP VTVSWNSGALTSGVHTFPAVLQSSGLYSLSSVVTVPSSSLG TQTYICNVNHKPSNTKVDKKVEPKSC |
| M0701 LC<br>SEQ ID NO: 195 | ASELVMTQTPSSVSEPVGGTVTIKCQASQSIGSNLAWYQQ RPGQPPKLLIYSASTLASGVSSRFKGSGSGTESTLTISGVQA ADAATYYCQQGYSSSNVDNVFGGGTELEILRTVAAPSVFI FPPSDEQLKSGTASVVCLLNNFYPREAKVQWKVDNALQS GNSQESVTEQDSKDSTYSLSSTLTLSKADYEKHKVYACEV THQGLSSPVTKSFNRGEC |
| M0701 VH<br>SEQ ID NO: 196 | QEQLEESGGGLVTPGGTLTLTCTVSGFSLSNYAMGWVRQ APGKGLEWIGTINDGGTAFYAKWLKGRFTISRTSTTVDL KITSPTTEDTATYFCARAYGSNGDVYWGYFNLWGQGTL VTVSS |
| M0701 VL<br>SEQ ID NO: 197 | ASELVMTQTPSSVSEPVGGTVTIKCQASQSIGSNLAWYQQ RPGQPPKLLIYSASTLASGVSSRFKGSGSGTESTLTISGVQA ADAATYYCQQGYSSSNVDNVFGGGTELEIL |
| M0702 HC<br>SEQ ID NO: 198 | QEQLEESGGGLVTPGTPLTLTCTASGFSLSSYAMIWVRQA PGKGLEWIGTINDGGTAFYANWVKGRFTISRTSTTVDLK MTSPTTEDTATYFCARAYGSNGDVYWGYVNLWGQGTL VTVSSASTKGPSVFPLAPSSKSTSGGTAALGCLVKDYFPEP VTVSWNSGALTSGVHTFPAVLQSSGLYSLSSVVTVPSSSLG TQTYICNVNHKPSNTKVDKKVEPKSC |
| M0702 LC<br>SEQ ID NO: 199 | ASELVMTQTPASVSEPVGGTVTIKCQASQSIGSNLAWYQQ KPGQPPKLLIYAAANLASGVSSRFKGSRSGTEYTLTISGVQ AADAATYYCQQGYSSSNVANVFGGGTELEILRTVAAPSV FIFPPSDEQLKSGTASVVCLLNNFYPREAKVQWKVDNALQ SGNSQESVTEQDSKDSTYSLSSTLTLSKADYEKHKVYACE VTHQGLSSPVTKSFNRGEC |
| M0702 VH<br>SEQ ID NO: 200 | QEQLEESGGGLVTPGTPLTLTCTASGFSLSSYAMIWVRQA PGKGLEWIGTINDGGTAFYANWVKGRFTISRTSTTVDLK MTSPTTEDTATYFCARAYGSNGDVYWGYVNLWGQGTL VTVSS |
| M0702 VL<br>SEQ ID NO: 201 | ASELVMTQTPASVSEPVGGTVTIKCQASQSIGSNLAWYQQ KPGQPPKLLIYAAANLASGVSSRFKGSRSGTEYTLTISGVQ AADAATYYCQQGYSSSNVANVFGGGTELEIL |
| M0703 HC<br>SEQ ID NO: 202 | QEQLEESGGGLVTPGTPLTLTCTASGFSLSSYAMIWVRQA PGKGLEWIGTINDGGTAFYASWVKGRFTISRTSTTVDLKI TSPTTEDTATYFCARAYGSNGDVYWGYVNLWGQGTLVT VSSASTKGPSVFPLAPSSKSTSGGTAALGCLVKDYFPEPVT VSWNSGALTSGVHTFPAVLQSSGLYSLSSVVTVPSSSLGTQ TYICNVNHKPSNTKVDKKVEPKSC |
| M0703 LC<br>SEQ ID NO: 203 | ASELVMTQTPSSVSAAVGGTVTINCQASQNIGSVFAWYQ QKPGQPPKLLIYKASSLASGVPSRFKGSGSGTQFTLTISGV EAADAATYYCQQGASSSNVDNIFGGGTEVVVKRTVAAPS VFIFPPSDEQLKSGTASVVCLLNNFYPREAKVQWKVDNAL QSGNSQESVTEQDSKDSTYSLSSTLTLSKADYEKHKVYAC EVTHQGLSSPVTKSFNRGEC |
| M0703 VH<br>SEQ ID NO: 204 | QEQLEESGGGLVTPGTPLTLTCTASGFSLSSYAMIWVRQA PGKGLEWIGTINDGGTAFYASWVKGRFTISRTSTTVDLKI TSPTTEDTATYFCARAYGSNGDVYWGYVNLWGQGTLVT VSS |
| M0703 VL<br>SEQ ID NO: 205 | ASELVMTQTPSSVSAAVGGTVTINCQASQNIGSVFAWYQ QKPGQPPKLLIYKASSLASGVPSRFKGSGSGTQFTLTISGV EAADAATYYCQQGASSSNVDNIFGGGTEVVVK |
| M0704 HC<br>SEQ ID NO: 206 | QQQLEESGGGLVTPGTPLTLTCTVSGIDLSSYAMGWVRQ APGKGLEWIGTINDGGSAFYASWVKGRFTISRTSTTVDLK ITSPTAEDTATYFCAKTYGTNGDVYWGYFNLWGQGTLV TVSSASTKGPSVFPLAPSSKSTSGGTAALGCLVKDYFPEPV TVSWNSGALTSGVHTFPAVLQSSGLYSLSSVVTVPSSSLGT QTYICNVNHKPSNTKVDKKVEPKSC |

TABLE 6-continued

Rabbit-Derived Antibody scFv Amino Acid Sequences. CDR sequences are highlighted in bold underlined text.

| Antibody ID | Sequence |
|---|---|
| M0704 LC SEQ ID NO: 207 | ASELVMTQTPASVSEPVGGTVTIKCQASQSIGSNLAWYQQ KPGQPPKLLIYYESILASGVPSRFSGSGSGTEYTLTISGAQA DDAATYYCQQGYSSSNIDNAFGGGTEVVVKRTVAAPSVF IFPPSDEQLKSGTASVVCLLNNFYPREAKVQWKVDNALQS GNSQESVTEQDSKDSTYSLSSTLTLSKADYEKHKVYACEV THQGLSSPVTKSFNRGEC |
| M0704 VH SEQ ID NO: 208 | QQQLEESGGGLVTPGTPLTLTCTVSGIDLSSYAMGWVRQ APGKGLEWIGTINDGGSAFYASWVKGRFTISRTSTTVDLK ITSPTAEDTATYFCAKTYGTNGDVYWGYFNLWGQGTLV TVSS |
| M0704 VL SEQ ID NO: 209 | ASELVMTQTPASVSEPVGGTVTIKCQASQSIGSNLAWYQQ KPGQPPKLLIYYESILASGVPSRFSGSGSGTEYTLTISGAQA DDAATYYCQQGYSSSNIDNAFGGGTEVVVK |
| M0705 HC SEQ ID NO: 210 | QQQLVESGGRLVTPGTPLTLTCTASGIDLNSNAMSWVRQ GPGKGLEWIGDIWSGGYTDYASWAKGRFTISKTSTTVDL KMTSLTAADTATYFCARDRLAGDGVVDYDLWGQGTLVT VSSASTKGPSVFPLAPSSKSTSGGTAALGCLVKDYFPEPVT VSWNSGALTSGVHTFPAVLQSSGLYSLSSVVTVPSSSLGTQ TYICNVNHKPSNTKVDKKVEPKSC |
| M0705 LC SEQ ID NO: 211 | ASELDMTQTPASVEVAVGGTVTIKCQASQNIYSNLAWYQ QKPGQRPKLLIYGASTLASGVPSRFKGSGSGTEYTLTINGV QAADAATYYCQQGFSSSNVDNVFGGGTEVVVKRTVAAP SVFIFPPSDEQLKSGTASVVCLLNNFYPREAKVQWKVDNA LQSGNSQESVTEQDSKDSTYSLSSTLTLSKADYEKHKVYA CEVTHQGLSSPVTKSFNRGEC |
| M0705 VH SEQ ID NO: 212 | QQQLVESGGRLVTPGTPLTLTCTASGIDLNSNAMSWVRQ GPGKGLEWIGDIWSGGYTDYASWAKGRFTISKTSTTVDL KMTSLTAADTATYFCARDRLAGDGVVDYDLWGQGTLVT VSS |
| M0705 VL SEQ ID NO: 213 | ASELDMTQTPASVEVAVGGTVTIKCQASQNIYSNLAWYQ QKPGQRPKLLIYGASTLASGVPSRFKGSGSGTEYTLTINGV QAADAATYYCQQGFSSSNVDNVFGGGTEVVVK |
| M0706 HC SEQ ID NO: 214 | QQQLEESGGGLVTPGTPLTLTCTVSGFSLSNYAMGWVRQ APGKGLEWIGTINDGGTAFYANWLKGRFTISRTSTTVDL KITSPTTEDTATYFCARAYGSNGDVYWGYFNLWGQGTL VTVSSASTKGPSVFPLAPSSKSTSGGTAALGCLVKDYFPEP VTVSWNSGALTSGVHTFPAVLQSSGLYSLSSVVTVPSSSLG TQTYICNVNHKPSNTKVDKKVEPKSC |
| M0706 LC SEQ ID NO: 215 | ASELVMTQTASPVSAAVGGTVTINCQASQSISSRSLSWYQ QKPGQPPKLLIYEASKLASGVPSRFSGSGSGTQFTLTISGV QADDAATYYCQQGYSSSNVDNVFGGGTEVVVKRTVAAP SVFIFPPSDEQLKSGTASVVCLLNNFYPREAKVQWKVDNA LQSGNSQESVTEQDSKDSTYSLSSTLTLSKADYEKHKVYA CEVTHQGLSSPVTKSFNRGEC |
| M0706 VH SEQ ID NO: 216 | QQQLEESGGGLVTPGTPLTLTCTVSGFSLSNYAMGWVRQ APGKGLEWIGTINDGGTAFYANWLKGRFTISRTSTTVDL KITSPTTEDTATYFCARAYGSNGDVYWGYFNLWGQGTL VTVSS |
| M0706 VL SEQ ID NO: 217 | ASELVMTQTASPVSAAVGGTVTINCQASQSISSRSLSWYQ QKPGQPPKLLIYEASKLASGVPSRFSGSGSGTQFTLTISGV QADDAATYYCQQGYSSSNVDNVFGGGTEVVVK |
| M0707 HC SEQ ID NO: 218 | QQQLEESGGGLVTPGTPLTLTCTVSGIDLSSYAMGWVRQ APGKGLEWIGTINDGGSAFYASWVKGRFTISRTSTTVDLK ITSPTAEDTATYFCAKTYGTNGDVYWGYFNLWGQGTLV TVSSASTKGPSVFPLAPSSKSTSGGTAALGCLVKDYFPEPV TVSWNSGALTSGVHTFPAVLQSSGLYSLSSVVTVPSSSLGT QTYICNVNHKPSNTKVDKKVEPKSC |
| M0707 LC SEQ ID NO: 219 | ASELVMTQTPASVSEPVGGTVTIKCQASQSIGSNLAWYQQ KPGQPPKLLIYYESILASGVPSRFSGSGSGTEYTLTISGAQA DDAATYYCQQGYSSSNILNAFGGGTEVVVKRTVAAPSVF IFPPSDEQLKSGTASVVCLLNNFYPREAKVQWKVDNALQS GNSQESVTEQDSKDSTYSLSSTLTLSKADYEKHKVYACEV THQGLSSPVTKSFNRGEC |

TABLE 6-continued

Rabbit-Derived Antibody scFv Amino Acid Sequences. CDR sequences are highlighted in bold underlined text.

| Antibody ID | Sequence |
|---|---|
| M0707 VH SEQ ID NO: 220 | QQQLEESGGGLVTPGTPLTLTCTVSGIDLSSYAMGWVRQ APGKGLEWIGTINDGGSAFYASWVKGRFTISRTSTTVDLK ITSPTAEDTATYFCAKTYGTNGDVYWGYFNLWGQGTLV TVSS |
| M0707 VL SEQ ID NO: 221 | ASELVMTQTPASVSEPVGGTVTIKCQASQSIGSNLAWYQQ KPGQPPKLLIYYESILASGVPSRFSGSGSGTEYTLTISGAQA DDAATYYCQOGYSSSNILNAFGGGTEVVVK |
| M0708 HC SEQ ID NO: 222 | QSVEESGGRLVTPGTPLTLTCTVSGFSLSNYAMSWVRQAP GKGLEYIGIVSSGGTTYYASWAKGRFTISKTSTTVDLKITS PTTEDTATYFCAKDLYYGPTTYSAFNLWGQGTLVTVSSA STKGPSVFPLAPSSKSTSGGTAALGCLVKDYFPEPVTVSW NSGALTSGVHTFPAVLQSSGLYSLSSVVTVPSSSLGTQTYI CNVNHKPSNTKVDKKVEPKSC |
| M0708 LC SEQ ID NO: 223 | ASELVLTQPQSVSGSLGQTVSISCKRARNNIEDYYVHWY QQHPGRSPTIVIHKDDORPSGVPDRFSGSIDSTSNSASLTIT GLLAEDEADYFCQSFDNNANPVFGGGTQLTVTGRTVAAP SVFIFPPSDEQLKSGTASVVCLLNNFYPREAKVQWKVDNA LQSGNSQESVTEQDSKDSTYSLSSTLTLSKADYEKHKVYA CEVTHQGLSSPVTKSFNRGEC |
| M0708 VH SEQ ID NO: 224 | QSVEESGGRLVTPGTPLTLTCTVSGFSLSNYAMSWVRQAP GKGLEYIGIVSSGGTTYYASWAKGRFTISKTSTTVDLKITS PTTEDTATYFCAKDLYYGPTTYSAFNLWGQGTLVTVSS |
| M0708 VL SEQ ID NO: 225 | ASELVLTQPQSVSGSLGQTVSISCKRARNNIEDYYVHWY QQHPGRSPTIVIHKDDORPSGVPDRFSGSIDSTSNSASLTIT GLLAEDEADYFCQSFDNNANPVFGGGTQLTVTG |
| M0709 HC SEQ ID NO: 226 | QSVKESGGRLVTPGTPLTLTCTVSGFSLSNYAMSWVRQAP GKGLEYIGIVSSGGTTYYASWAKGRFTISKTSTTVDLKITS PTTEDTATYFCAKDLYYGPTTYSAFNLWGQGTLVTVSSA STKGPSVFPLAPSSKSTSGGTAALGCLVKDYFPEPVTVSW NSGALTSGVHTFPAVLQSSGLYSLSSVVTVPSSSLGTQTYI CNVNHKPSNTKVDKKVEPKSC |
| M0709 LC SEQ ID NO: 227 | ASELVLTQPQSVSGSLGQTVSISCKRARDNIEDYYVHWY QQHPGKTPTIVIHKDDORPSGVPDRFSGSIDSTSNSASLTIT GLLAEDEADYFCQSFDNDASPVFGGGTQLTVTGRTVAAP SVFIFPPSDEQLKSGTASVVCLLNNFYPREAKVQWKVDNA LQSGNSQESVTEQDSKDSTYSLSSTLTLSKADYEKHKVYA CEVTHQGLSSPVTKSFNRGEC |
| M0709 VH SEQ ID NO: 228 | QSVKESGGRLVTPGTPLTLTCTVSGFSLSNYAMSWVRQAP GKGLEYIGIVSSGGTTYYASWAKGRFTISKTSTTVDLKITS PTTEDTATYFCAKDLYYGPTTYSAFNLWGQGTLVTVSS |
| M0709 VL SEQ ID NO: 229 | ASELVLTQPQSVSGSLGQTVSISCKRARDNIEDYYVHWY QQHPGKTPTIVIHKDDORPSGVPDRFSGSIDSTSNSASLTIT GLLAEDEADYFCQSFDNDASPVFGGGTQLTVTG |
| M0710 HC SEQ ID NO: 230 | QSVKESGGRLVTPGTPLTLTCTVSGFSLSNYAMSWVRQAP GKGLEYIGIVSSGGTTYYASWAKGRFTISKTSTTVDLKITS PTTEDTATYFCAKDLYYGPTTYSAFNLWGQGTLVTVSSA STKGPSVFPLAPSSKSTSGGTAALGCLVKDYFPEPVTVSW NSGALTSGVHTFPAVLQSSGLYSLSSVVTVPSSSLGTQTYI CNVNHKPSNTKVDKKVEPKSC |
| M0710 LC SEQ ID NO: 231 | ASELVLTQPQSVSGSLGQTVSISCKRARDNIEDYYVHWY QQYPGKTPTIVIYKDDORPSGVPDRFSGSIDSTSNSASLTIT GLLAEDEADYFCQSFDNNANVVFGGGTQLTVTGRTVAAP SVFIFPPSDEQLKSGTASVVCLLNNFYPREAKVQWKVDNA LQSGNSQESVTEQDSKDSTYSLSSTLTLSKADYEKHKVYA CEVTHQGLSSPVTKSFNRGEC |
| M0710 VH SEQ ID NO: 232 | QSVKESGGRLVTPGTPLTLTCTVSGFSLSNYAMSWVRQAP GKGLEYIGIVSSGGTTYYASWAKGRFTISKTSTTVDLKITS PTTEDTATYFCAKDLYYGPTTYSAFNLWGQGTLVTVSS |
| M0710 VL SEQ ID NO: 233 | ASELVLTQPQSVSGSLGQTVSISCKRARDNIEDYYVHWY QQYPGKTPTIVIYKDDORPSGVPDRFSGSIDSTSNSASLTIT GLLAEDEADYFCQSFDNNANVVFGGGTQLTVTG |

TABLE 6-continued

Rabbit-Derived Antibody scFv Amino Acid Sequences. CDR sequences are highlighted in bold underlined text.

| Antibody ID | Sequence |
|---|---|
| M0762 HC SEQ ID NO: 234 | QSVKESGGRLVTPGTPLTLTCTASGFTISSSAISWVRQAPG KGLEYIGIIRSGGTTDYASWAKGRFAISKTSTTVDLKITSP TTEDTATYFCARDPPYITSTYFDLWGQGTLVTVSSASTKG PSVFPLAPSSKSTSGGTAALGCLVKDYFPEPVTVSWNSGA LTSGVHTFPAVLQSSGLYSLSSVVTVPSSSLGTQTYICNVN HKPSNTKVDKKVEPKSC |
| M0762 LC SEQ ID NO: 235 | ASELVLTQPQSVSGSLGQTVSISCKRARDSVESYDVHWY QQHPGKTPTIVIYKDDORPSGVPDRFSGSIDSTSNSASLTIT GLLAEDEADYFCQSFDGDAVVFGGGTQLTVTGRTVAAPS VFIFPPSDEQLKSGTASVVCLLNNFYPREAKVQWKVDNAL QSGNSQESVTEQDSKDSTYSLSSTLTLSKADYEKHKVYAC EVTHQGLSSPVTKSFNRGEC |
| M0762 VH SEQ ID NO: 236 | QSVKESGGRLVTPGTPLTLTCTASGFTISSSAISWVRQAPG KGLEYIGIIRSGGTTDYASWAKGRFAISKTSTTVDLKITSP TTEDTATYFCARDPPYITSTYFDLWGQGTLVTVSS |
| M0762 VL SEQ ID NO: 237 | ASELVLTQPQSVSGSLGQTVSISCKRARDSVESYDVHWY QQHPGKTPTIVIYKDDORPSGVPDRFSGSIDSTSNSASLTIT GLLAEDEADYFCQSFDGDAVVFGGGTQLTVTG |
| M0763 HC SEQ ID NO: 238 | QSVKESGGRLVTPGTPLTLTCTVSGFSLSNYAMSWVRQAP GKGLEYIGIVSSGGTTYYASWAKGRFTISKTSTTVDLKITS PTTEDTATYFCAKDLYYGPTTYSAFNLWGQGTLVTVSSA STKGPSVFPLAPSSKSTSGGTAALGCLVKDYFPEPVTVSW NSGALTSGVHTFPAVLQSSGLYSLSSVVTVPSSSLGTQTYI CNVNHKPSNTKVDKKVEPKSC |
| M0763 LC SEQ ID NO: 239 | ASELVLTQPASVQVNLGQTVSLTCTADTLSRSYASWYQL KPGQAPVLLIYRDTSRPSGVPDRFSGSSSGNTATLTISGAQ AGDEGDYVCATSDGSGSNFOLFGGGTQLTVTGRTVAAPS VFIFPPSDEQLKSGTASVVCLLNNFYPREAKVQWKVDNAL QSGNSQESVTEQDSKDSTYSLSSTLTLSKADYEKHKVYAC EVTHQGLSSPVTKSFNRGEC |
| M0763 VH SEQ ID NO: 240 | QSVKESGGRLVTPGTPLTLTCTVSGFSLSNYAMSWVRQAP GKGLEYIGIVSSGGTTYYASWAKGRFTISKTSTTVDLKITS PTTEDTATYFCAKDLYYGPTTYSAFNLWGQGTLVTVSS |
| M0763 VL SEQ ID NO: 241 | ASELVLTQPASVQVNLGQTVSLTCTADTLSRSYASWYQL KPGQAPVLLIYRDTSRPSGVPDRFSGSSSGNTATLTISGAQ AGDEGDYVCATSDGSGSNFOLFGGGTQLTVTG |
| M0764 HC SEQ ID NO: 242 | QQQLEESGGGLVTPGTPLTLTCTVSGFSLSNYAMGWVRQ APGKGLEWIGTINDGGTAFYANWLKGRFTISRTSTTVDL KITSPTTEDTATYFCARAYGSNGDVYWGYFNLWGQGTL VTVSSASTKGPSVFPLAPSSKSTSGGTAALGCLVKDYFPEP VTVSWNSGALTSGVHTFPAVLQSSGLYSLSSVVTVPSSSLG TQTYICNVNHKPSNTKVDKKVEPKSC |
| M0764 LC SEQ ID NO: 243 | ASELVMTQTASPVSAAVGGTVTINCQASQSISSRSLSWYQ QKPGQPPKLLIYEASKLASGVPSRFSGSGSGTQFTLTISGV QADDAATYYCQQGYSSSNVDNFGGGTEVVVKRTVAAPS VFIFPPSDEQLKSGTASVVCLLNNFYPREAKVQWKVDNAL QSGNSQESVTEQDSKDSTYSLSSTLTLSKADYEKHKVYAC EVTHQGLSSPVTKSFNRGEC |
| M0764 VH SEQ ID NO: 244 | QQQLEESGGGLVTPGTPLTLTCTVSGFSLSNYAMGWVRQ APGKGLEWIGTINDGGTAFYANWLKGRFTISRTSTTVDL KITSPTTEDTATYFCARAYGSNGDVYWGYFNLWGQGTL VTVSS |
| M0764 VL SEQ ID NO: 245 | ASELVMTQTASPVSAAVGGTVTINCQASQSISSRSLSWYQ QKPGQPPKLLIYEASKLASGVPSRFSGSGSGTQFTLTISGV QADDAATYYCQQGYSSSNVDNFGGGTEVVVK |
| M0765 HC SEQ ID NO: 246 | QSVKESWGRLVTPGGSLTLTCTVSGIDLNNYAMGWVRQA PGKGLEWIGTINNDGATYYPSWARGRFTISRTSTTVDLKI TSPTTEDTATYFCARTYGSNGDVYWGYFNLWGQGTLVT VSSASTKGPSVFPLAPSSKSTSGGTAALGCLVKDYFPEPVT VSWNSGALTSGVHTFPAVLQSSGLYSLSSVVTVPSSSLGTQ TYICNVNHKPSNTKVDKKVEPKSC |

TABLE 6-continued

Rabbit-Derived Antibody scFv Amino Acid Sequences. CDR sequences are highlighted in bold underlined text.

| Antibody ID | Sequence |
|---|---|
| M0765 LC<br>SEQ ID NO: 247 | ASALELTQTPASVEVAVGGTVTINCQASQSIGGALNWYQ<br>QKSGQPPKLLIYLASTLASGVSSRFKGSGSGTQFTLTISGV<br>EAADAATYYCQQGYSASNIDNAFGGGTEVVVKRTVAAPS<br>VFIFPPSDEQLKSGTASVVCLLNNFYPREAKVQWKVDNAL<br>QSGNSQESVTEQDSKDSTYSLSSTLTLSKADYEKHKVYAC<br>EVTHQGLSSPVTKSFNRGEC |
| M0765 VH<br>SEQ ID NO: 248 | QSVKESWGRLVTPGGSLTLTCTVSGIDLNNYAMGWVRQA<br>PGKGLEWIGTINNDGATYYPSWARGRFTISKTSTTVDLKI<br>TSPTTEDTATYFCARTYGSNGDVYWGYFNLWGQGTLVT<br>VSS |
| M0765 VL<br>SEQ ID NO: 249 | ASALELTQTPASVEVAVGGTVTINCQASQSIGGALNWYQ<br>QKSGQPPKLLIYLASTLASGVSSRFKGSGSGTQFTLTISGV<br>EAADAATYYCQQGYSASNIDNAFGGGTEVVVK |
| M0766 HC<br>SEQ ID NO: 250 | PEQLEESGGGLVTPGGVLTLTCTASGFSFSSYGVNWVRQA<br>PGKGLEWIGFIFGDGTTYYANWAKGRFTISKTSTTVDLK<br>MTSPTTEDTATYFCARDGYGGYDYI INLWGQGTLVTVSS<br>ASTKGPSVFPLAPSSKSTSGGTAALGCLVKDYFPEPVTVS<br>WNSGALTSGVHTFPAVLQSSGLYSLSSVVTVPSSSLGTQT<br>YICNVNHKPSNTKVDKKVEPKSC |
| M0766 LC<br>SEQ ID NO: 251 | ASAQVLTQTPASVSAAVGGTVSISCQSSQSVVNNNWLAW<br>YQQKPGQPPKLLIYKASTLESGVPSRFKGSGSGTQFTLTIS<br>GVQADDAATYYCLGEFSCSSADCHAFGGGTELEILRTVA<br>APSVFIFPPSDEQLKSGTASVVCLLNNFYPREAKVQWKVD<br>NALQSGNSQESVTEQDSKDSTYSLSSTLTLSKADYEKHKV<br>YACEVTHQGLSSPVTKSFNRGEC |
| M0766 VH<br>SEQ ID NO: 252 | PEQLEESGGGLVTPGGVLTLTCTASGFSFSSYGVNWVRQA<br>PGKGLEWIGFIFGDGTTYYANWAKGRFTISKTSTTVDLK<br>MTSPTTEDTATYFCARDGYGGYDYI INLWGQGTLVTVSS |
| M0766 VL<br>SEQ ID NO: 253 | ASAQVLTQTPASVSAAVGGTVSISCQSSQSVVNNNWLAW<br>YQQKPGQPPKLLIYKASTLESGVPSRFKGSGSGTQFTLTIS<br>GVQADDAATYYCLGEFSCSSADCHAFGGGTELEIL |
| M0767 HC<br>SEQ ID NO: 254 | PEQLEESGGGLVTPGGVLTLTCTASGFSFSSYGVNWVRQA<br>PGKGLEWIGFIFGDGTTYYANWAKGRFTISKTSTTVDLK<br>MTSPTTEDTATYFCARDGYGGYDYI INLWGQGTLVTVSS<br>ASTKGPSVFPLAPSSKSTSGGTAALGCLVKDYFPEPVTVS<br>WNSGALTSGVHTFPAVLQSSGLYSLSSVVTVPSSSLGTQT<br>YICNVNHKPSNTKVDKKVEPKSC |
| M0767 LC<br>SEQ ID NO: 255 | ASAQVLTQTPASVSAAVGGTVSISCQSSQSVVNNNWLAW<br>YQQKPGQPPKLLIYKASTLESGVPSRFKGSGSGTQFTLTIS<br>GVQADDAATYYCQGAYSGNIYYNAFGGGTEVVVKRTVA<br>APSVFIFPPSDEQLKSGTASVVCLLNNFYPREAKVQWKVD<br>NALQSGNSQESVTEQDSKDSTYSLSSTLTLSKADYEKHKV<br>YACEVTHQGLSSPVTKSFNRGEC |
| M0767 VH<br>SEQ ID NO: 256 | PEQLEESGGGLVTPGGVLTLTCTASGFSFSSYGVNWVRQA<br>PGKGLEWIGFIFGDGTTYYANWAKGRFTISKTSTTVDLK<br>MTSPTTEDTATYFCARDGYGGYDYI INLWGQGTLVTVSS |
| M0767 VL<br>SEQ ID NO: 257 | ASAQVLTQTPASVSAAVGGTVSISCQSSQSVVNNNWLAW<br>YQQKPGQPPKLLIYKASTLESGVPSRFKGSGSGTQFTLTIS<br>GVQADDAATYYCQGAYSGNIYYNAFGGGTEVVVK |
| M0768 HC<br>SEQ ID NO: 258 | QSVKESGGGLVTPGTPLTLTCTVSGFSLSTYAISWVRQAP<br>GKGLEWIGFIDTVDSAYYASWAKGRFTISKTSSTTVDLK<br>MTSPTTEDTATYFCAKLRYGDYGDYTLWGQGTLVTVSS<br>ASTKGPSVFPLAPSSKSTSGGTAALGCLVKDYFPEPVTVS<br>WNSGALTSGVHTFPAVLQSSGLYSLSSVVTVPSSSLGTQT<br>YICNVNHKPSNTKVDKKVEPKSC |
| M0768 LC<br>SEQ ID NO: 259 | ASELVMTQTPSPVSGAVGGTVTIKCQASQNIYSYLAWYQ<br>QKPGQPPKLLIYKASTLASGVPSRVKGSGSGTEYTLTISGV<br>QAADAATYYCQCTYYDSNTFGGGTEVVVKRTVAAPSVFI<br>FPPSDEQLKSGTASVVCLLNNFYPREAKVQWKVDNALQS<br>GNSQESVTEQDSKDSTYSLSSTLTLSKADYEKHKVYACEV<br>THQGLSSPVTKSFNRGEC |

TABLE 6-continued

Rabbit-Derived Antibody scFv Amino Acid Sequences. CDR sequences are highlighted in bold underlined text.

| Antibody ID | Sequence |
|---|---|
| M0768 VH<br>SEQ ID NO: 260 | QSVKESGGGLVTPGTPLTLTCTVSGFSLSTYAISWVRQAP<br>GKGLEWIGFIDTVDSAYYASWAKGRFTISKTSSTTVDLK<br>MTSPTTEDTATYFCAKLRYGDYGDYTLWGQGTLVTVSS |
| M0768 VL<br>SEQ ID NO: 261 | ASELVMTQTPSPVSGAVGGTVTIKCQASQNIYSYLAWYQ<br>QKPGQPPKLLIYKASTLASGVPSRVKGSGSGTEYTLTISGV<br>QAADAATYYCQCTYYDSNTFGGGTEVVVK |
| M0769 HC<br>SEQ ID NO: 262 | PAALEESGGRLVTPGTPLTLTCTVSGIDLSTFAMTWVRQA<br>PGKGLEWLGIINTGGSAYYTSWAKGRFTISRTSTTVDLKI<br>TSPTTEDTATYFCARGDWSSATDLWGQGTLVTVSSASTK<br>GPSVFPLAPSSKSTSGGTAALGCLVKDYFPEPVTVSWNSG<br>ALTSGVHTFPAVLQSSGLYSLSSVVTVPSSSLGTQTYICNV<br>NHKPSNTKVDKKVEPKSC |
| M0769 LC<br>SEQ ID NO: 263 | ASDPDMTQTPSSVSAAVGGTVTINCQASQSVYDNKVLAW<br>YRQKPGQPPKLLIYKASTLASGVPSRFKGRGSGTQFTLTIS<br>GVQADDAATYYCLGEFSCSSADCHAFGGGTELEILRTVA<br>APSVFIFPPSDEQLKSGTASVVCLLNNFYPREAKVQWKVD<br>NALQSGNSQESVTEQDSKDSTYSLSSTLTLSKADYEKHKV<br>YACEVTHQGLSSPVTKSFNRGEC |
| M0769 VH<br>SEQ ID NO: 264 | PAALEESGGRLVTPGTPLTLTCTVSGIDLSTFAMTWVRQA<br>PGKGLEWLGIINTGGSAYYTSWAKGRFTISRTSTTVDLKI<br>TSPTTEDTATYFCARGDWSSATDLWGQGTLVTVSS |
| M0769 VL<br>SEQ ID NO: 265 | ASDPDMTQTPSSVSAAVGGTVTINCQASQSVYDNKVLAW<br>YRQKPGQPPKLLIYKASTLASGVPSRFKGRGSGTQFTLTIS<br>GVQADDAATYYCLGEFSCSSADCHAFGGGTELEIL |
| CDR4-bispecific 01 (M0719 HC)<br>SEQ ID NO: 266 | QSVEESGGRLVTPGTPLTLTCTVSGFSLSNYAMSWVRQAP<br>GKGLEYIGIVSSGGTTYYASWAKGRFTISKTSTTVDLKITS<br>PTTEDTATYFCAKDLYYGPTTYSAFNLWGQGTLVTVSSA<br>STKGPSVFPLAPSSKSTSGGTAALGCLVKDYFPEPVTVSW<br>NSGALTSGVHTFPAVLQSSGLYSLSSVVTVPSSSLGTQTYI<br>CNVNHKPSNTKVDKKVEPKSC |
| CDR4-bispecific 01 (M0719 LC)<br>SEQ ID NO: 267 | ASELVLTQPQSVSGSLGQTVSISCKRARNNIEDYYVHWY<br>QQHPGRSPTIVIHKDDORPSGVPDRFSGSIDSTSNSASLTIT<br>GLLAEDEADYFCQSFDNNANPVFGGGTQLTVTGRTVAAP<br>SVFIFPPSDEQLKSGTASVVCLLNNFYPREAKVQWKVDNA<br>LQSGNSQESVTEQDSKDSTYSLSSTLTLSKADYEKHKVYA<br>CEVTHQGLSSPVTKSFNRGECGGGGSAVVTQEPSLTVSPG<br>GTVTLTCGSSTGAVTTSNYANWVQQKPGKSPRGLIGGTN<br>KRAPGVPARFSGSLLGGKAALTISGAQPEDEADYYCALW<br>YSNHWVFGGGTKLTVLGGGGSGGGGSGGGGSGGGGSE<br>VQLVESGGGSVQPGGSLRLSCAASGFTFSTYAMNWVRQA<br>PGKGLEWVGRIRSKANNYATYYADSVKGRFTISRDDSKN<br>TLYLQMNSLRAEDTATYYCVRHGNFGDSYVSWFAYWG<br>QGTTVTVSS |

Example 9—Expression of Antibodies as Monovalent Monospecific Fabs or Bispecific Antibodies The monovalent monospecific antibodies were expressed in a Fab format. Additionally, bispecific antibodies including a CD3 binding moiety were expressed based on a Fab format, which is highly stable and an efficient heterodimerization scaffold. scFvs or sdAbs were fused to the C-terminal regions of the Fab. The rabbit variable domains were paired with human constant domains (heavy chain and kappa light chain) to generate the chimeric Fab, which binds to the target pMHC. An scFv with binding specificity to CD3 was linked to the C terminus of the Fab light chain constant region. The amino acid sequences of the constant domains, amino acid linker, and CD3 scFv are recited below in Table 7.

TABLE 7

Amino Acid Sequences For Generating Chimeric Fab

| Sequence ID | Sequence |
|---|---|
| Human constant kappa<br>SEQ ID NO: 186 | RTVAAPSVFIFPPSDEQLKSGTASVVCLLNNFYPR<br>EAKVQWKVDNALQSGNSQESVTEQDSKDSTYSL<br>SSTLTLSKADYEKHKVYACEVTHQGLSSPVTKSF<br>NRGEC |

TABLE 7-continued

Amino Acid Sequences For Generating Chimeric Fab

| Sequence ID | Sequence |
|---|---|
| Human constant heavy<br>SEQ ID NO: 187 | ASTKGPSVFPLAPSSKSTSGGTAALGCLVKDYFPE<br>PVTVSWNSGALTSGVHTFPAVLQSSGLYSLSSVVT<br>VPSSSLGTQTYICNVNHKPSNTKVDKKVEPKSC |
| Linker (linking the CL to the scFv)<br>SEQ ID NO: 188 | GGGGS |
| CD3 scFv (CDR sequences are highlighted in bold, underlined text)<br>SEQ ID NO: 189 | AVVTQEPSLTVSPGGTVTLTCGSSTGAVTTSNYA<br>NWVQQKPGKSPRGLIGGTNKRAPGVPARFSGSLL<br>GGKAALTISGAQPEDEADYYCALWYSNHWVFG<br>GGTKLTVLGGGGSGGGGSGGGGSGGGGSEVQL<br>VESGGGSVQPGGSLRLSCAASGFTFSTYAMNWV<br>RQAPGKGLEWVGRIRSKANNYATYYADSVKGR<br>FTISRDDSKNTLYLQMNSLRAEDTATYYCVRHGN<br>FGDSYVSWFAYWGQGTTVTVSS |

Synthetic genes encoding for the different antibody chains (i.e., heavy chain and light chain) were constructed at Twist Bioscience Corporation and were separately cloned into the expression vectors for transient expression in HEK 293 6E cells. Expression vector DNA was prepared using conventional plasmid DNA purification methods (for example Qiagen HiSpeed plasmid maxi kit, cat. #12662).

The monospecific antigen binding proteins and bispecific antigen binding proteins including a CD3 binding moiety were expressed by transient co-transfection of the respective mammalian expression vectors in HEK293-6E cells, which were cultured in suspension using polyethylenimine (PEI 40 kD linear). The HEK293-6E cells were seeded at $1.7 \times 10^6$ cells/mL in Freestyle F17 medium supplemented with 2 mM L-Glutamine. The DNA for every mL of the final production volume was prepared by adding DNA and PEI separately to 50 µL medium without supplement. Both fractions were mixed, vortexed and rested for 15 minutes, resulting in a DNA:PEI ratio of 1:2.5 (1 µg DNA/mL cells). The cells and DNA/PEI mixture were put together and then transferred into an appropriate container which was placed in a shaking device (37° C., 5% $CO_2$, 80% RH). After 24 hours, 25 µL of Tryptone N1 was added for every mL of final production volume.

After 7 days, cells were harvested by centrifugation and sterile filtered. The antigen binding proteins were purified by an affinity step. For the affinity purification of Fab-based constructs, the supernatant was loaded on a protein CH1 column (Thermo Fisher Scientific, #494320005) equilibrated with 6 CV PBS (pH 7.4). After a washing step with the same buffer, the antigen binding protein was eluted from the column by step elution with 100 mM Citric acid (pH 3.0). The fractions with the desired antigen binding protein were immediately neutralized by 1 M Tris Buffer (pH 9.0) at 1:10 ratio, then pooled, dialyzed and concentrated by centrifugation.

After concentration and dialysis against PBS buffer, content and purity of the purified proteins were assessed by SDS-PAGE and size-exclusion HPLC. After expression in HEK293-6E cells, the proteins were purified by a single capture step and analyzed by analytical size exclusion chromatography.

Example 10—Characterization of Hits

Figure 4:
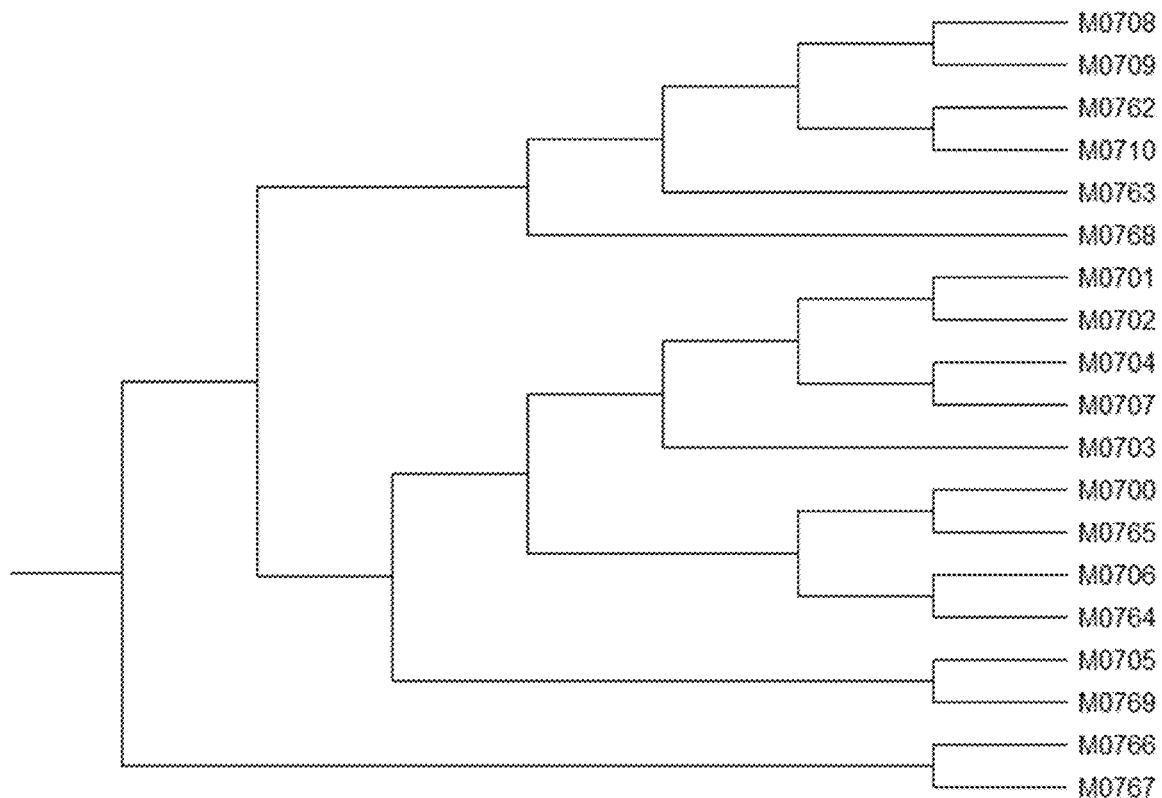
FIG. 4 depicts a selection of 19 unique HLA-A2/MAGE-A4 specific antibodies generated via rabbit immunizations, followed by construction and biopanning of the respective phage libraries. Selected hits were grouped according to the amino acid sequence diversity, as determined by the phylogenetic analysis.

Phylogenetic analysis of the selected HLA-A2/MAGE-A4 binding hits originating from the rabbit immunization libraries was performed using the Maximum Likelihood method based on a Jones-Taylor-Thornton (JTT) model (MEGAX software). Sequence diversity of the selected binders is depicted in FIG. 4. Selected hits represent a collection HLA-A2/MAGE-A4 binders with high sequence diversity and distinct origins.

Figure 5:
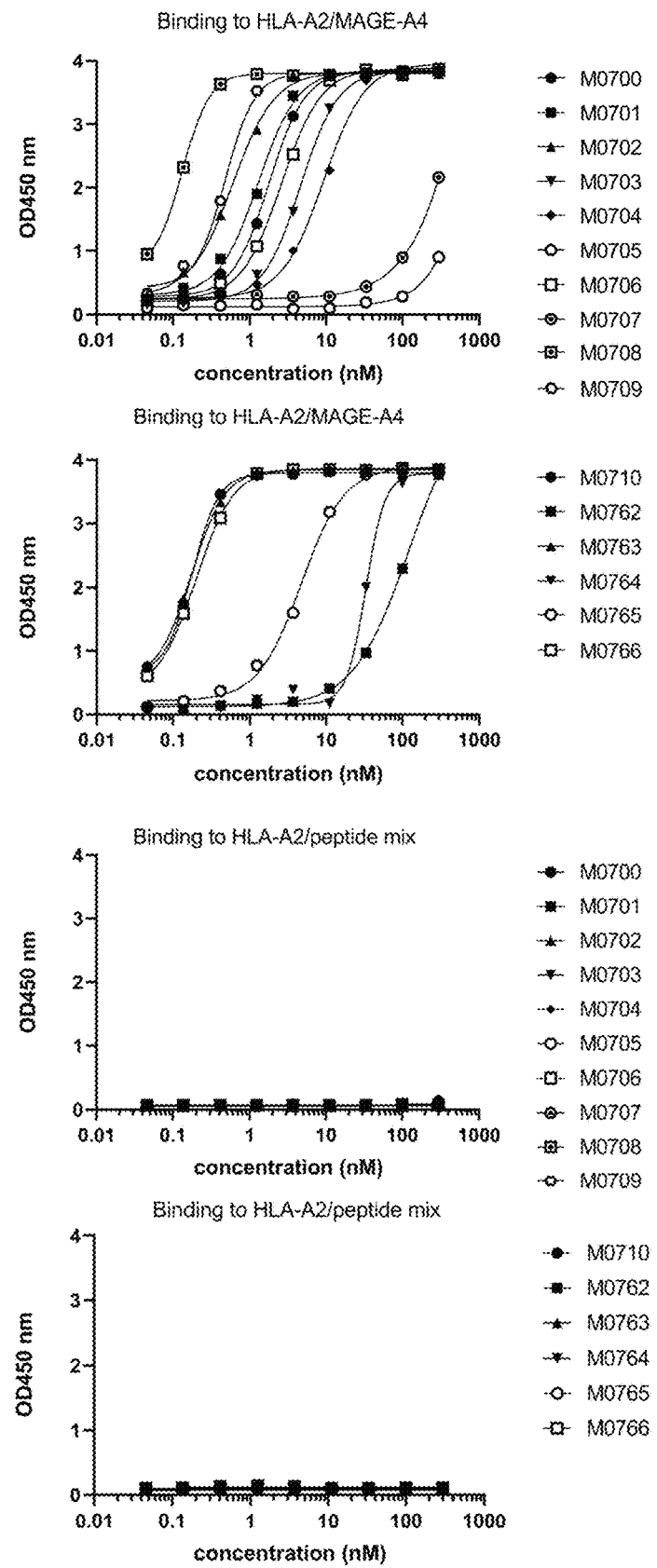
FIG. 5 depicts binding of the selected antibody hits M0700-M0710 and M0762-M0766 to HLA-A2/MAGE-A4 or control complex, as determined by direct ELISA.

All available hits were evaluated for their ability to bind MAGE-A4/HLA-A2 complex and a control peptide/HLA-A2 complex in a direct binding ELISA assay. The control peptide/HLA-A2 complex in this assay comprised an HLA-A2 complex loaded with a mixture of 49 unrelated peptides, as recited in Table 9 (SEQ ID NOs: 268-316). Briefly, 96 well ELISA plates were coated with purified human MAGE-A4/HLA-A2 complex or control HLA-A2 complex. Serial dilutions of antibody molecules were added to the plate and detected by an anti-kappa light chain-HRP (Invitrogen) followed by goat anti-rabbit IgG (H+L) HRP (Southern Biotech). Binders were considered for further characterization when showing high binding to MAGE-A4/HLA-A2 complex and no binding to control peptide/HLA-A2 complex. Binding of M0700-M0710 and M0762-M0766 to HLA-A2/MAGE-A4 complex, as determined by ELISA, is shown in FIG. 5. All tested molecules showed specific binding to the HLA-A2/MAGE-A4 complex and no binding to the control HLA-A2 complex. All tested molecules are rabbit-derived antibodies that are representative of antibodies identified from the nucleic acid libraries described herein. Each of the tested antibodies contained a kappa light chain, with the exception of M0709 and M0763, which contained a lambda light chain.

Figure 6:
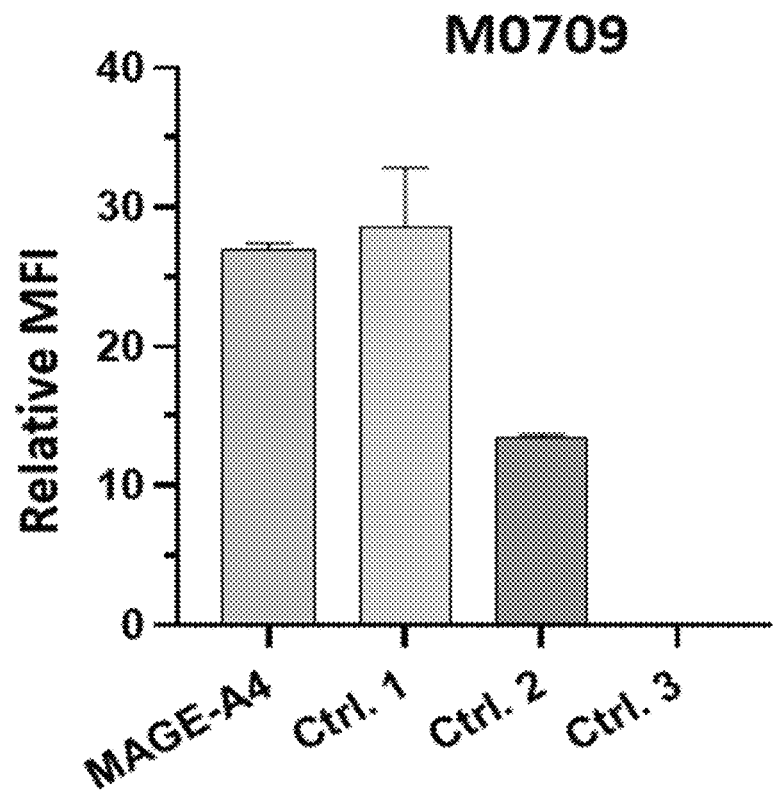
FIG. 6 depicts binding of the select antibody hits M0709 and M0763 to T2 cells displaying MAGE-A4 or control peptides 1, 2 and 3. TAP-deficient T2 cells were pulsed with HLA-A2-restricted peptides (MAGE-A4 or control peptides) and incubated with MAGE-A4 binders followed by fluorophore-labeled specific detection antibodies and analysis by flow cytometry. Peptide loading was confirmed with PE-labeled anti-HLA-A2 antibody BB7.2. Results of the ratio of binding efficiency over peptide loading capacity are shown as Relative Median Fluorescence Intensity (MFI).
Figure 6:
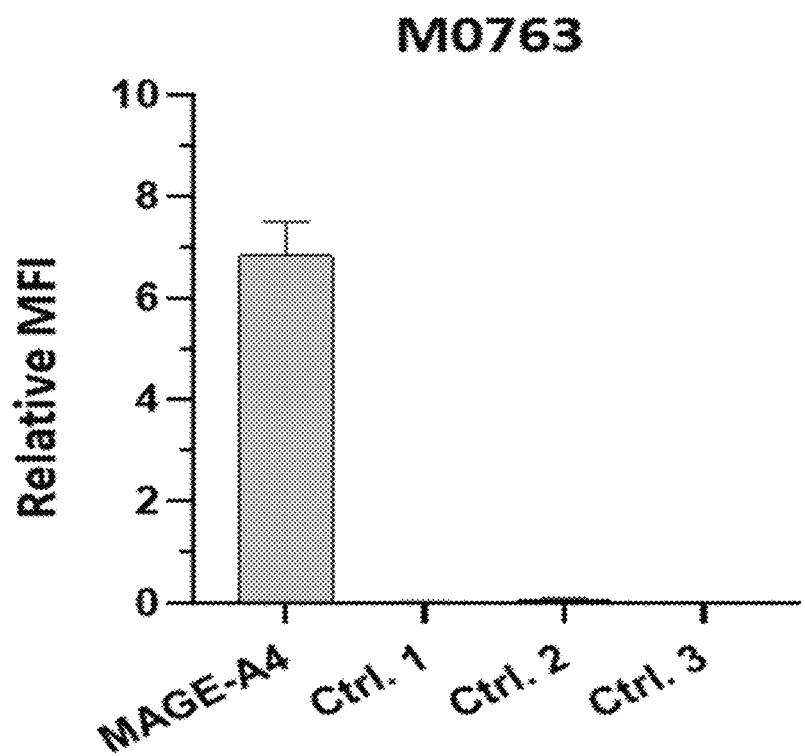

Binding of the specific antibodies M0709 and M0763 to the MAGE-A4 peptide-HLA-A2 complex presented on cells was determined. Briefly, T-B hybrid T2 cells were incubated with serum-free RPMI1640 medium containing MAGE-A4 or control peptides. Control peptides constituted sequences with high identity to MAGE-A4 and had previously been identified in healthy human tissues, i.e., Ctrl.1 (GLADGRTHTV; SEQ ID NO: 317), Ctrl.2 (GLYDGPVHEV; SEQ ID NO: 318) and Ctrl.3 (GVFDGLHTV; SEQ ID NO: 319) (US20180171024, incorporated herein by reference). Peptide loading efficiency was verified by using the ratio between median fluorescent intensity (MFI) of HLA-A2-binding antibody BB7.2 on peptide loaded T2 cells and MFI of unloaded T2 cells (>1). T2 cells were incubated with each of the specific antibodies followed by fluorophore-labeled detection antibodies (anti-kappa light chain or anti-Flag). The cells were fixed and fluorescence was measured by flow cytometry. Binding and specificity of the selected antibodies M0709 and M0763 to the T2 cells displaying MAGE-A4 or control peptides 1, 2 and 3 is presented in FIG. 6. All tested molecules showed binding to the HLA-A2/MAGE-A4 displayed on the T2 cells. Moreover, M0763 showed a very high specificity for the MAGE-A4 peptide and did not show binding to any of the control peptides displayed by the HLA-A2 on T2 cells. M0709 showed the lowest specificity of all tested molecules and was also binding control peptide 1 and 2.

Example 11—Optimization of Rabbit Immunization Libraries Leads to Higher Library Diversity Immunization of rabbits with a different specific pMHC complex was performed as described previously (Example 2). Constructed libraries were optimized using the methods described herein. Biopanning of the native and optimized kappa libraries was conducted according to the method described in Example 8. Monoclonal phage ELISA was performed with phages displaying scFvs from the native and optimized kappa libraries to identify pMHC-specific hits following the second and third biopanning round. The ratio of the signal from the specific target binding to the unspecific binding was then calculated to find hits binding specifically to the target. 73 and 35 hits from the native and optimized kappa libraries, respectively, were identified and sequenced.

Figure 7:
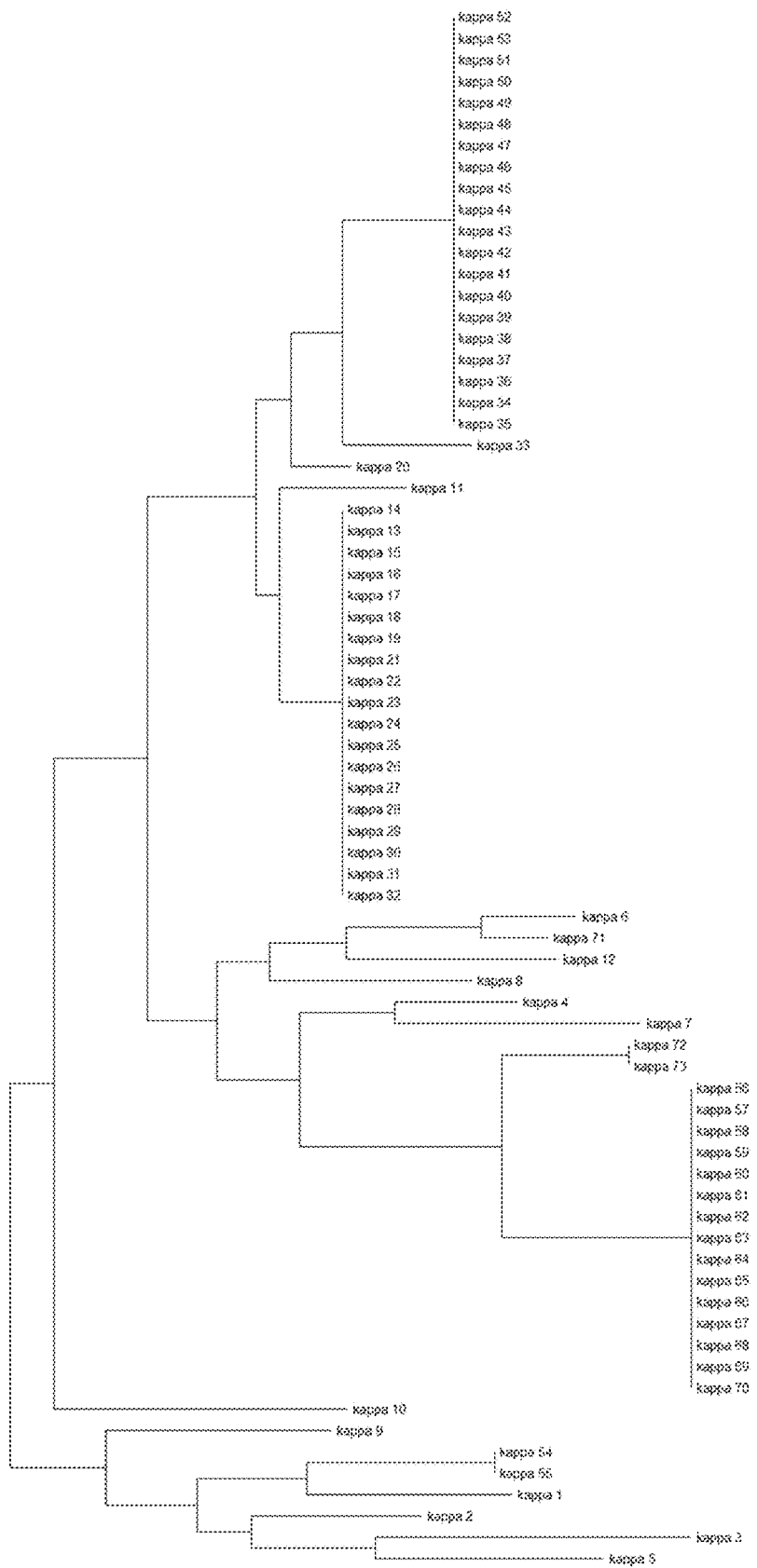
FIG. 7 depicts a phylogenetic tree of 73 hits from the non-optimized kappa rabbit immunization library. Immunization was performed with an alternative pMHC antigen. Low sequence diversity is depicted with only 20 unique sequences among 73 identified hits.
Figure 8:
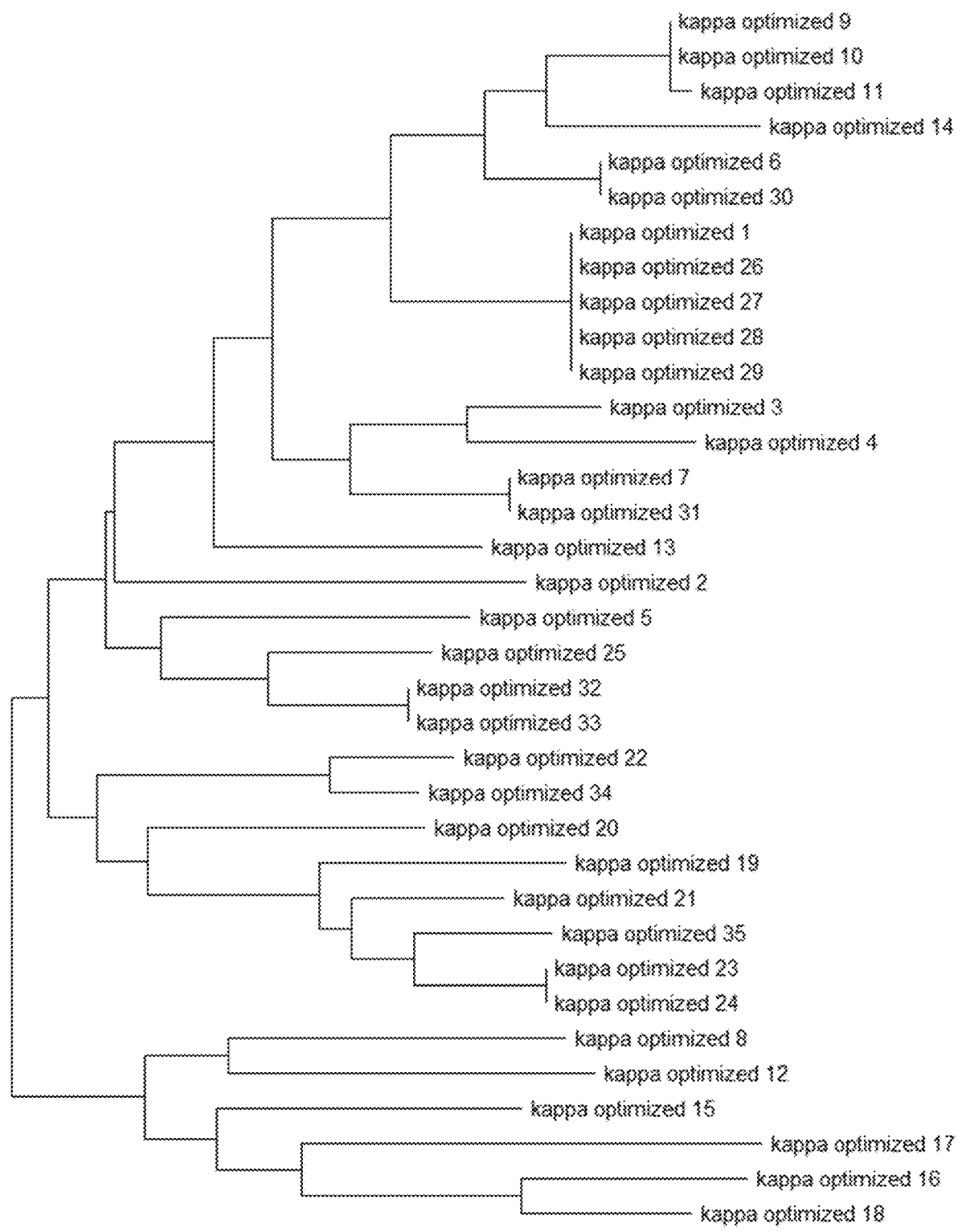
FIG. 8 depicts a phylogenetic tree of 35 hits from the optimized kappa rabbit immunization library. Immunization was performed with an alternative pMHC antigen. High sequence diversity is depicted with 26 unique sequences among 35 identified hits.

Phylogenetic analysis of the selected alternative pMHC binding hits was performed using the Maximum Likelihood method based on a Jones-Taylor-Thornton (JTT) model (MEGAX software). Sequence diversity of the selected binders originating from the native and optimized kappa libraries is depicted in FIG. 7 and FIG. 8, respectively. Among 73 sequenced pMHC specific hits from the native kappa library only 20 (27.4%) showed unique sequences. Among 35 hits identified in the optimized kappa library, 26 (74.3%) had unique sequences. Therefore, optimization of the kappa library allowed identification of a larger number of unique binders with a broader sequence diversity.

Example 12—Redirected T Cell Killing of Antigen-Positive and -Negative Cell Lines Using pHLA-Targeting Bispecific Antibodies Redirected T cell killing of tumor cell lines by peptide-HLA (pHLA) targeting bispecific antibodies was determined by endpoint cytotoxicity measurements (LDH release) and real-time imaging (IncuCyte).

Figure 9:
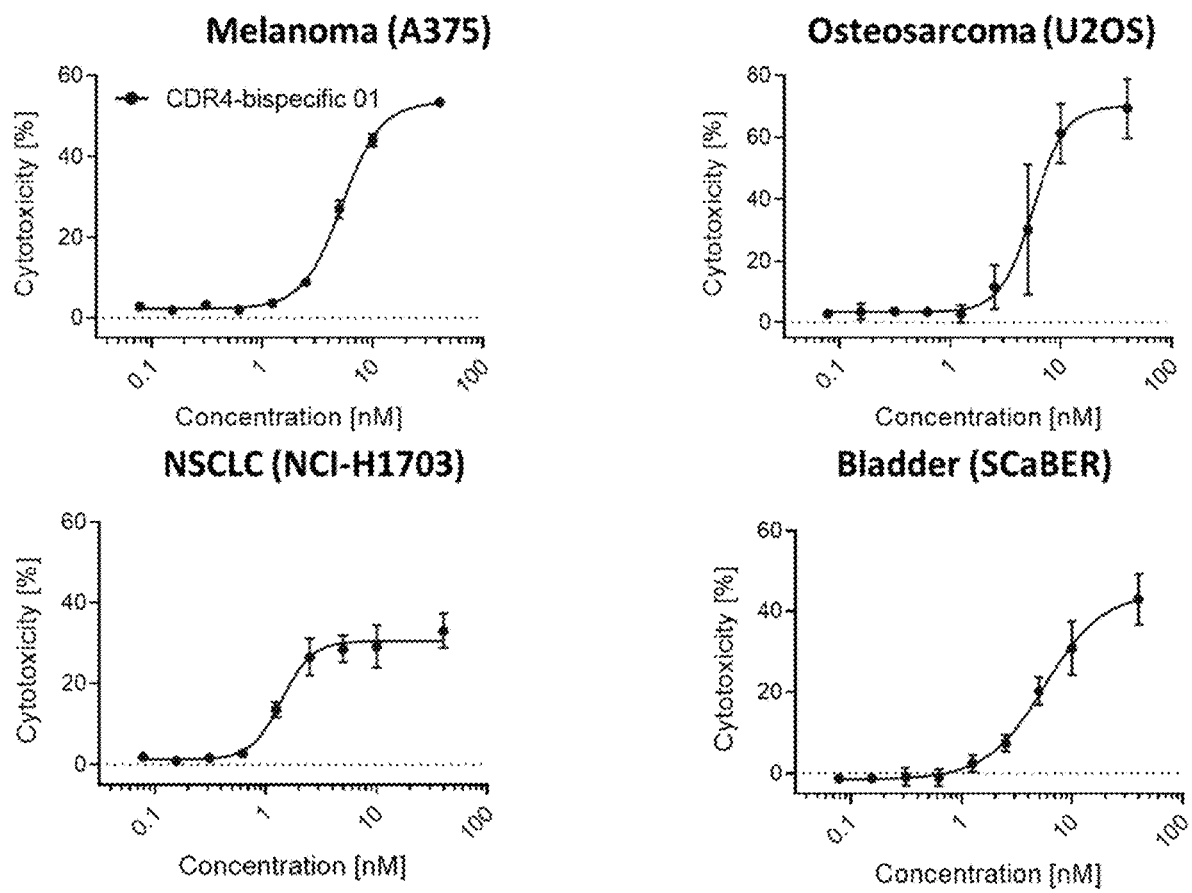
FIG. 9 depicts T cell-mediated cytotoxicity triggered by the CDR4-bispecific 01. Cell killing was determined by measuring the released LDH after 48 h of co-incubation of MAGE-A4 positive cell lines with PBMCs at E:T ratio 10:1 and CDR4-bispecific 01 at the indicated concentrations.

The Lactate Dehydrogenase release assay was performed. Briefly, target cells were co-cultured with effector cells (e.g., PBMCs) at an ET ratio of about 10:1. Solutions of the CDR4-bispecific 01 antibody, M0719 covering a concentration range from 0.4 nM to 40 nM were added to the relevant wells. Cytotoxicity was quantified by colorimetric absorbance measurements of the amount of LDH released from damaged cells into the medium after 48 h. The analysis was performed on HLA-A2 expressing antigen-positive cell lines (e.g., A375 (melanoma), U2OS (osteosarcoma), SCaBER (bladder carcinoma) and NCI-H1703 (non-small cell lung adenocarcinoma). The obtained data is presented in FIG. 9. The tested antibody CDR4-bispecific 01 showed potent T cell mediated killing of antigen positive tumor cells, even at low concentrations.

Figure 10:
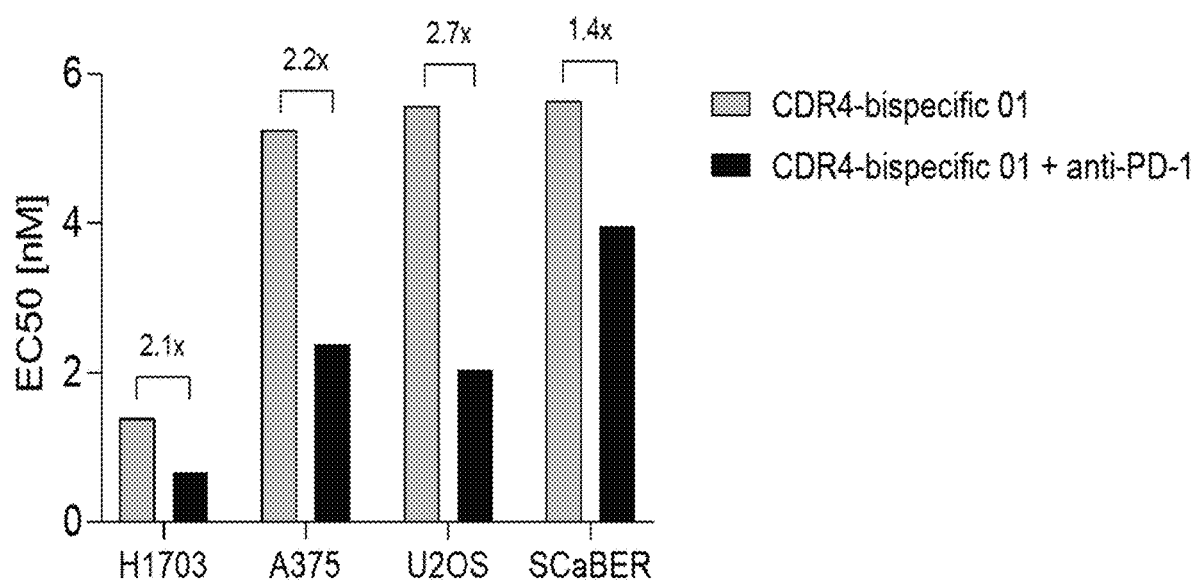
FIG. 10 depicts the EC50 values for cell killing, as determined by the LDH assay. The LDH release was measured after 48 h co-incubation of PBMCs and MAGE-A4 positive cell lines at E:T ratio 10:1 in presence of MAGE-A4 bispecific 01 with or without anti-PD-1 (Pembrolizumab).
Figure 11:
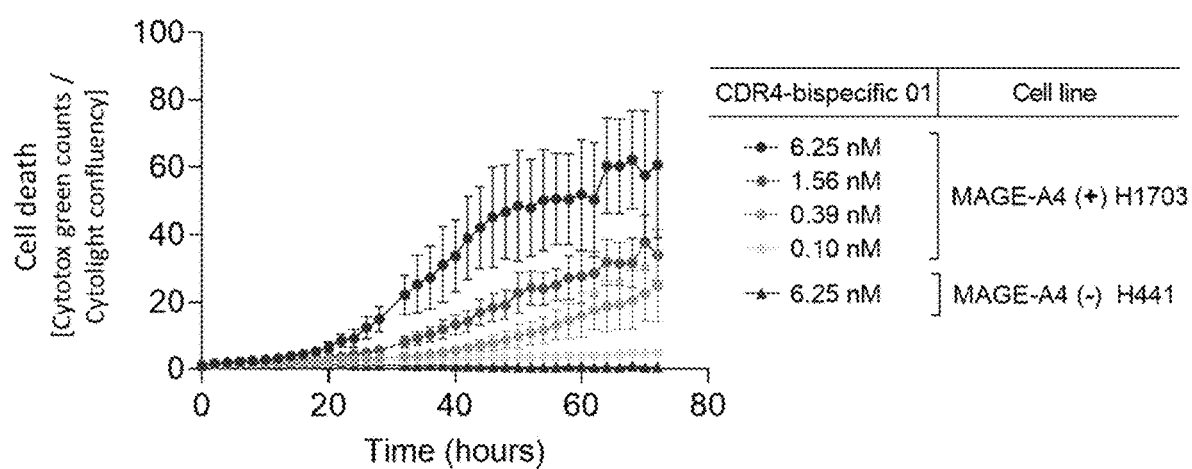
FIG. 11 depicts T cell-mediated cytotoxicity triggered by the CDR4-bispecific 01, as determined by live cell imaging in vitro. MAGE-A4 positive NCI-H1703 cells were co-incubated with PBMCs at ET ratio 10:1 and CDR4-bispecific 01 at the indicated concentrations. Images were recorded by the IncuCyte S3 system for up to 72 h. Quantification of cytotoxicity is reported as ratio of green object count per image (dead cells, Cytotox Green Dye) to red area confluence (cell lines, Cytolight Rapid Red). MAGE-A4 negative/HLA-A2 positive H441 cells were used as control at the highest concentration (6.3 nM) of bispecific to demonstrate specific killing.

Moreover, CDR4-bispecific 01 was also tested in an LDH assay in combination with an immune checkpoint inhibitor pembrolizumab (anti-PD-1 antibody). Briefly, LDH assay was performed as described above. EC50 for cell killing was determined by LDH release after 48 h co-incubation of PBMCs and MAGE-A4 positive cell lines A375, U2OS, SCaBER and NCI-H1703 at E:T ratio 10:1 in the presence of MAGE-A4 bispecific 01 (concentrations ranging from 0.078 to 40 nM) with or without 300 nM anti-PD-1 antibody (pembrolizumab). The EC50 values for cell killing by CDR4-bispecific 01 and pembrolizumab with CDR4-bispecific 01 combination were plotted and are shown in FIG. 10. CDR4-bispecific 01 showed a synergistic killing of the HLA-A2/MAGE-A4 positive cells in combination with pembrolizumab with EC50 values at between 1.4-fold to 2.7-fold higher than CDR4-bispecific 01 alone. In addition, cell killing was analyzed in a time-resolved manner using the IncuCyte S3 system. Briefly, cells were seeded along with effector cells and treated with the bispecific antibodies, as described above. Briefly, antigen-positive target cells (e.g., NCI-H1703, A375) or antigen-negative target cells (e.g., NCI-H441, Panc-1) were incubated with Cytolight Rapid Red (Sartorius, #4706). CDR4-bispecific antibody 01 solutions were prepared at final concentrations between 6.25 nM and 0.1 nM and added to the relevant well. Cytotox Green Dye (Sartorius, #4633) was added to the PBMCs. The plate was imaged over time to monitor cell growth. The growth of cancer cells in each image was determined and recorded as red area confluence normalized to time 0. The number of apoptotic cells in each image was determined and recorded as green area per red area normalized to time 0. The tested bispecific antibody CDR4-bispecific 01 showed potent dose-dependent T cell mediated killing of antigen positive tumor cells over time, while no killing of antigen-negative cells was observed (FIG. 11).

Figure 12:
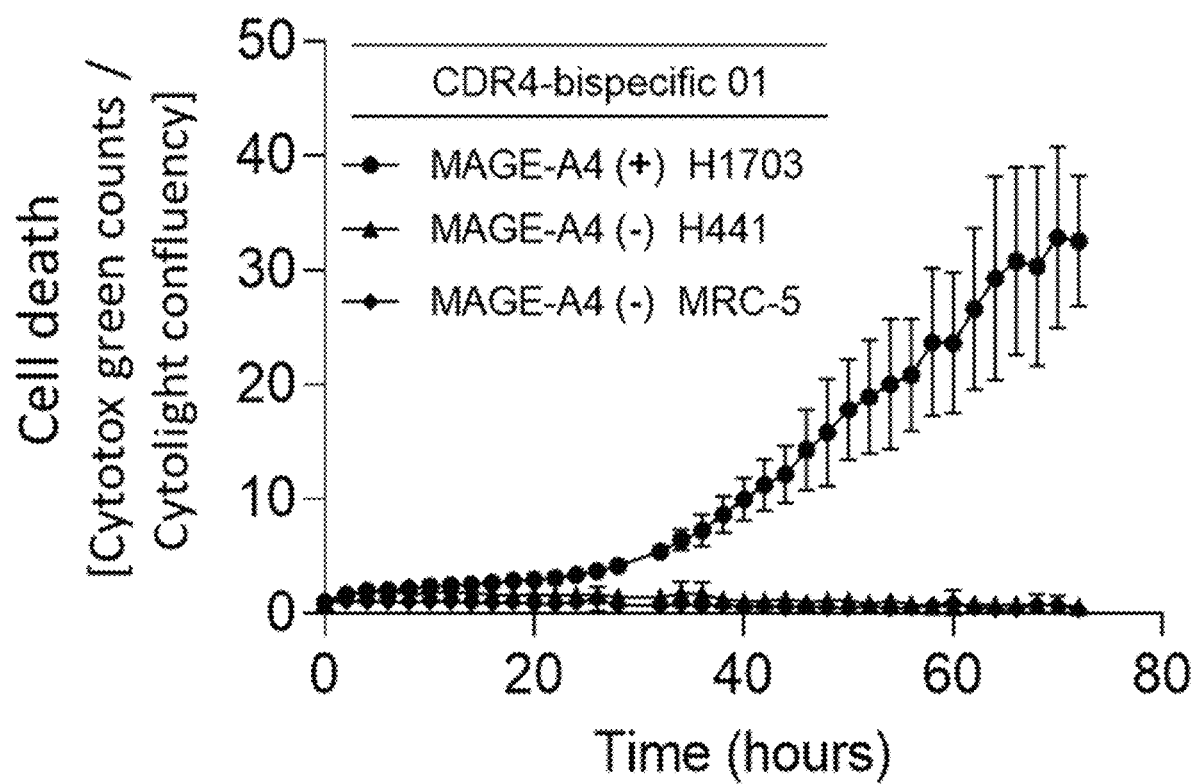
FIG. 12 depicts T cell-mediated cytotoxicity triggered by the CDR4-bispecific 01, as determined by live cell imaging in vitro. MAGE-A4 positive/HLA-A2 positive NCI-H1703 cells or MAGE-A4 negative/HLA-A2 positive cells (H441 and MRC5) were co-incubated with PBMCs at E:T ratio 10:1 and single concentrations of 0.8 nM CDR4-bispecific 01. Images were recorded with the IncuCyte S3 system for up to 72 h. Quantification of cytotoxicity is reported as ratio of green object count per image (dead cells, Cytotox Green Dye) to red area confluence (cell lines, Cytolight Rapid Red).

In addition, MAGE-A4 positive/HLA-A2 positive NCI-H1703 cells and MAGE-A4 negative/HLA-A2 positive cells (NCI-H441 (lung adenocarcinoma) and MRC5 (normal human fibroblasts)) were co-incubated with PBMCs (E:T 10:1) and CDR4-bispecific 01 at a concentration of 0.8 nM. Images were recorded with the IncuCyte S3 system for up to 72 h and the respective cytotoxicity is depicted in FIG. 12. CDR4-bispecific 01 demonstrated potent killing of MAGE-A4 positive/HLA-A2 positive NCI-H1703 cells and no killing of the control MAGE-A4 negative/HLA-A2 positive cancer cells NCI-H441 and normal fibroblasts MRC5, thus demonstrating good efficacy and safety.

TABLE 9

| HLA complex control peptides | |
|---|---|
| SEQ ID NO: | Peptide Sequence |
| SEQ ID NO: 268 | GVRGRVEEI |
| SEQ ID NO: 269 | AVLDGLLSL |
| SEQ ID NO: 270 | FLYDDNQRV |
| SEQ ID NO: 271 | YMLDLQPETT |
| SEQ ID NO: 272 | ELAGIGILTV |
| SEQ ID NO: 273 | EAAGIGILTV |
| SEQ ID NO: 274 | LLGDLFGV |
| SEQ ID NO: 275 | FLWGPRALV |
| SEQ ID NO: 276 | SLYNTVATL |

TABLE 9-continued

| SEQ ID NO: | Peptide Sequence |
|---|---|
| SEQ ID NO: 277 | SLYSYFQKV |
| SEQ ID NO: 278 | GLCTLVAML |
| SEQ ID NO: 279 | GILGFVFTL |
| SEQ ID NO: 280 | VLAGGFFLL |
| SEQ ID NO: 281 | FVGEFFTDV |
| SEQ ID NO: 282 | FLYALALLL |
| SEQ ID NO: 283 | YMDDVVLGV |
| SEQ ID NO: 284 | ALLTSRLRFI |
| SEQ ID NO: 285 | FLPSDFFPSV |
| SEQ ID NO: 286 | KIFGSLAFL |
| SEQ ID NO: 287 | SLLMWITQV |
| SEQ ID NO: 288 | RMFPNAPYL |
| SEQ ID NO: 289 | YMDGTMSQV |
| SEQ ID NO: 290 | VLFGLGFAI |
| SEQ ID NO: 291 | SLPPPGTRV |
| SEQ ID NO: 292 | VLEETSVML |
| SEQ ID NO: 293 | RMPEAAPPV |
| SEQ ID NO: 294 | ILKEPVHGV |
| SEQ ID NO: 295 | KTWGQYWQV |
| SEQ ID NO: 296 | SLLPIMWQL |
| SEQ ID NO: 297 | NLVPMVATV |
| SEQ ID NO: 298 | VLQELNVTV |
| SEQ ID NO: 299 | CINGVCWTV |
| SEQ ID NO: 300 | LMLGEFLKL |
| SEQ ID NO: 301 | VLDFAPPGA |
| SEQ ID NO: 302 | LTLGEFLKL |
| SEQ ID NO: 303 | IMDQVPFSV |
| SEQ ID NO: 304 | CLGGLLTMV |
| SEQ ID NO: 305 | VTEHDTLLY |
| SEQ ID NO: 306 | FLLTKILTI |
| SEQ ID NO: 307 | WLSLLVQFV |
| SEQ ID NO: 308 | LLLLTVLTV |
| SEQ ID NO: 309 | FLLTRILTI |
| SEQ ID NO: 310 | ITDQVPFSV |
| SEQ ID NO: 311 | YMCSFLFNL |
| SEQ ID NO: 312 | ILSLELMKL |
| SEQ ID NO: 313 | YLEYRQVPV |
| SEQ ID NO: 314 | RLPLVLPAV |
| SEQ ID NO: 315 | KLQVFLIVL |
| SEQ ID NO: 316 | YLGSYGFRL |

What is claimed:

1. A method of producing an antigen binding protein that specifically recognizes a target antigen, the method comprising the steps of:
   (i) immunizing a rabbit with the target antigen;
   (ii) isolating a plurality of antigen binding protein encoding polynucleotide sequences from the rabbit, wherein the antigen binding protein encoding polynucleotide sequences encode for at least kappa VL;
   (iii) cloning the polynucleotide sequences into a nucleic acid library;
   (iv) mutagenizing the nucleic acid library to introduce an amino acid substitution at position C80 of the kappa VL, according to Kabat numbering; and
   (v) selecting the antigen binding protein that specifically recognizes a target antigen, wherein the library comprises polynucleotide sequences derived from one or more parental rabbit kappa VL genes IGKV1S1 to IGKV1S68.

2. The method of claim 1, comprising a C80A, a C80S, a C80P or a C80 germline amino acid substitution in the kappa VL, according to Kabat numbering.

3. The method of claim 1, wherein the target antigen comprises a pMHC.

4. The method of claim 1, wherein the kappa VL or lambda VL are operatively linked to the VH with an amino acid linker.

5. The method of claim 1, wherein the selecting step (v) is performed through biopanning against the target antigen.

6. The method of claim 2, wherein the amino acid substitution is introduced with a polymerase chain reaction (PCR).

7. The method of claim 6, wherein multiple PCRs with different pairs of primers specific for rabbit VL sequences are performed.

8. The method of claim 7, wherein 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67 or 68 PCRs are performed, each with a different pair of primers.

9. The method of claim 7, wherein the said pair of primers comprises a first primer introducing a C80 substitution and a second primer.

10. The method of claim 9, wherein the second primer anneals with a conserved sequence stretch of a rabbit VL germline sequence.

11. The method of claim 6, wherein the PCR is performed with one or more primer pairs selected from F1/R1 (SEQ ID NO: 4/SEQ ID NO: 6), F1/R2 (SEQ ID NO: 4/SEQ ID NO: 7), F1/R3 (SEQ ID NO: 4/SEQ ID NO: 8), F1/R4 (SEQ ID NO: 4/SEQ ID NO: 9), F1/R5 (SEQ ID NO: 4/SEQ ID NO: 10), F1/R6 (SEQ ID NO: 4/SEQ ID NO: 11), F1/R7 (SEQ ID NO: 4/SEQ ID NO: 12), F1/R8 (SEQ ID NO: 4/SEQ ID NO: 13), F1/R9 (SEQ ID NO: 4/SEQ ID NO: 14), F1/R10 (SEQ ID NO: 4/SEQ ID NO: 15), F2/R1 (SEQ ID NO: 5/SEQ ID NO: 6), F2/R2 (SEQ ID NO: 5/SEQ ID NO: 7), F2/R3 (SEQ ID NO: 5/SEQ ID NO: 8), F2/R4 (SEQ ID NO: 5/SEQ ID NO: 9), F2/R5 (SEQ ID NO: 5/SEQ ID NO: 10), F2/R6 (SEQ ID NO: 5/SEQ ID NO: 11), F2/R7 (SEQ ID NO: 5/SEQ ID NO: 12), F2/R8 (SEQ ID NO: 5/SEQ ID NO: 13), F2/R9 (SEQ ID NO: 5/SEQ ID NO: 14), and F2/R10 (SEQ ID NO: 5/SEQ ID NO: 15).

12. The method of claim 6, wherein the PCR is performed with one or more primer pairs derived from the sequences of the group consisting of F1/R1 (SEQ ID NO: 4/SEQ ID NO: 6), F1/R2 (SEQ ID NO: 4/SEQ ID NO: 7), F1/R3 (SEQ ID NO: 4/SEQ ID NO: 8), F1/R4 (SEQ ID NO: 4/SEQ ID NO: 9), F1/R5 (SEQ ID NO: 4/SEQ ID NO: 10), F1/R6 (SEQ ID NO: 4/SEQ ID NO: 11), F1/R7 (SEQ ID NO: 4/SEQ ID NO: 12), F1/R8 (SEQ ID NO: 4/SEQ ID NO: 13), F1/R9 (SEQ ID NO: 4/SEQ ID NO: 14), F1/R10 (SEQ ID NO: 4/SEQ ID NO: 15), F2/R1 (SEQ ID NO: 5/SEQ ID NO: 6), F2/R2 (SEQ ID NO: 5/SEQ ID NO: 7), F2/R3 (SEQ ID NO: 5/SEQ ID NO: 8), F2/R4 (SEQ ID NO: 5/SEQ ID NO: 9), F2/R5 (SEQ ID NO: 5/SEQ ID NO: 10), F2/R6 (SEQ ID NO: 5/SEQ ID NO: 11), F2/R7 (SEQ ID NO: 5/SEQ ID NO: 12), F2/R8 (SEQ ID NO: 5/SEQ ID NO: 13), F2/R9 (SEQ ID NO: 5/SEQ ID NO: 14), and F2/R10 (SEQ ID NO: 5/SEQ ID NO: 15).

13. The method of claim 1, wherein each of said polynucleotide sequences is present in a circular DNA construct.

14. The method of claim 13, wherein multiple PCRs with different pairs of primers specific for rabbit VL sequences are performed, each pair of primers annealing specifically to rabbit kappa VL sequences, comprising a first and a second primer, wherein the first primer introduces an amino acid substitution at Kabat position 80 and the 5' ends of both primers anneal back-to-back on the template, and the primers hybridize with one or more, such as 2, 3, 4, 5, 6, 7, 8, 9 or more allelic variant of rabbit kappa VL germline sequences.

15. The method of claim 1, wherein the antigen binding protein encoding polynucleotide sequences are isolated from a B cell population.

16. The method of claim 15, wherein the B cell population is a peripheral blood mononuclear cell (PBMC) population, a B cell population from spleen, a B cell population from lymph nodes, or a combination thereof.

17. The method of claim 1, wherein the antigen binding protein encoding polynucleotide sequences further encode for one or both of lambda VL and VH.

18. The method of claim 1, wherein the kappa VL and lambda VL is operatively linked to a CL domain and the VH is operatively linked to a CH1 domain.

19. The method of claim 1, wherein the antigen binding protein specifically binds to a tumor antigen.

20. The method of claim 19, wherein the tumor antigen is selected from the group consisting of: a melanoma-associated antigen A (MAGE-A), New York esophageal squamous cell carcinoma-1 (NY-ESO-1), synovial sarcoma X (SSX), carcinoembryonic antigen (CEA), preferentially expressed antigen in melanoma (PRAME), melanoma antigen recognized by T cells 1 (MART-1), Kirsten rat sarcoma viral oncogene (K-ras), kinetochore NDC80 protein homolog (NDC80), Kita-Kyushu lung cancer antigen (KK-LC-1), and Wilms tumor 1 (WT1).

21. The method of claim 1, wherein the antigen binding protein specifically binds to a viral antigen.

22. The method of claim 21, wherein the viral antigen is selected from the group consisting of: Epstein-Barr virus derived EBNA1, EBNA2, EBNA3, LMP1, or LMP2; hepatitis B virus derived HBX; hepatitis C virus derived NS3 or NS5A; human papillomavirus derived type E5, E6, and E7 proteins; cytomegalovirus derived PP65; human immunodeficiency virus derived gag; and Kaposi sarcoma-associated herpesvirus derived vGPCR or vIRF-1.

23. The method of claim 1, wherein the nucleic acid library is selected from the group consisting of a ribosome display library, a phage display library, a yeast cell display library, a mammalian cell display library, and a DNA display library.

24. The method of claim 1, wherein the nucleic acid library is a phage display library.

25. The method of claim 1, wherein the nucleic acid library comprises a diversity of at least $10^2$, $10^3$, $10^4$, $10^5$, $10^6$, $10^7$, $10^8$, $10^9$, $10^{10}$, $10^{11}$, $10^{12}$, $10^{13}$, $10^{14}$, or $10^{15}$ unique polynucleotide sequences.

26. The method of claim 1, wherein the one or more parental rabbit kappa VL genes IGKVIS1 to IGKV1S68 comprise a sequence of SEQ ID NOs 322-334, 333, 335, 330, 336, 330, 337, 333, 338-339, 332, 329, 333, 332, 340, 328, 332, 329, 332, 339, 328, 341, 338, 342, 331, 328, 330, 343-346, 330, 332, 347-348, 333, 332, 332, 332, 333, 328, 332, 349-350, 330, 330, 330, 351, 332, 332, 352, 332, 332, and 332, respectively.

27. The method of claim 1, wherein the nucleic acid library comprises polynucleotide sequences encoding about 20%, about 30%, about 40%, about 50%, about 60%, about 70%, about 80%, about 90%, about 95%, or 100% of VL genes derived from parental rabbit kappa VL genes IGKVIS1 to IGKVIS68.

28. The method of claim 20, wherein the MAGE-A is selected from the group consisting of MAGE-A1, MAGE-A3 and MAGE-A4.

* * * * *